(12) United States Patent
Brittingham et al.

(10) Patent No.: US 8,202,097 B1
(45) Date of Patent: Jun. 19, 2012

(54) COMPUTER BASED TEST ITEM GENERATION

(75) Inventors: Peter Brittingham, Titusville, NJ (US); Mary E. Morley, Princeton Junction, NJ (US); James H. Fife, Collegeville, PA (US); Robert L. Rarich, Titusville, NJ (US); Irvin R. Katz, Hopewell, NJ (US); Randy E. Bennett, Newton, PA (US); Mark G. Zelman, Princeton, NJ (US); Mark Kevin Singley, Skillman, NJ (US); Krishna Jha, Media, PA (US)

(73) Assignee: Educational Testing Service, Princeton, NJ (US)

(*) Notice: Subject to any disclaimer, the term of this patent is extended or adjusted under 35 U.S.C. 154(b) by 1444 days.

(21) Appl. No.: 09/654,949

(22) Filed: Sep. 1, 2000

Related U.S. Application Data

(60) Provisional application No. 60/152,121, filed on Sep. 1, 1999.

(51) Int. Cl.
G09B 7/00 (2006.01)
(52) U.S. Cl. ......... 434/322; 434/323
(58) Field of Classification Search ......... 434/322–364, 434/118, 165
See application file for complete search history.

(56) References Cited

U.S. PATENT DOCUMENTS

| | | | | |
|---|---|---|---|---|
| 5,657,256 A | * | 8/1997 | Swanson et al. | 702/119 |
| 5,779,486 A | * | 7/1998 | Ho et al. | 434/353 |
| 5,890,911 A | * | 4/1999 | Griswold et al. | 434/322 X |
| 6,000,945 A | * | 12/1999 | Sanchez-Lazer et al. | 434/322 X |
| 6,018,617 A | * | 1/2000 | Sweitzer et al. | 358/1.15 |
| 6,112,049 A | * | 8/2000 | Sonnenfeld | 434/350 X |
| 6,112,051 A | * | 8/2000 | De Almeida | 434/362 |
| 6,301,571 B1 | * | 10/2001 | Tatsuoka | 706/45 X |
| 6,315,572 B1 | * | 11/2001 | Owens et al. | 434/322 X |
| 6,413,100 B1 | * | 7/2002 | Dickmeyer et al. | 434/322 X |
| 6,442,370 B1 | * | 8/2002 | Driscoll et al. | 434/350 X |
| 2002/0045155 A1 | * | 4/2002 | Sugimoto | 434/362 |

OTHER PUBLICATIONS

Martin S. Feather, Ben Smith, "Automatic Generation of Test Oracles-From Pilot Studies to Application," ase, pp. 63, 14th IEEE International Conference on Automated Software Engineering (ASE'99), 1999.*

* cited by examiner

*Primary Examiner* — Ronald Laneau
*Assistant Examiner* — Ross Williams
(74) *Attorney, Agent, or Firm* — Jones Day

(57) ABSTRACT

A computerized method and system for creating test items by generating variants from a test item model, comprising the steps of creating a new test item model by identifying elements of an initial test item or test item model to be variabilized, variabilizing the elements thereby creating test item variables, indicating values the variables can assume, defining the variables, and generating test item variants utilizing a simultaneous constraint solver. The initial test item can be a pre-existing test item or test item model, a newly created test item or even a conceptual template in the mind of the test item creator. The generated test item variants are displayed to the test item creator. The test item creator can store and forward acceptable test item variants for later use as test items. Test item models can be stored for later use in generating new test item variants.

23 Claims, 118 Drawing Sheets

TCA Standard Multiple Choice Model reserved for variant stem key
| Key | distractor1
| Distractor1 | distractor2
| Distractor2 | distractor3
| Distractor3 | distractor4
| Distractor4 | distractor5
| Distractor5 | distractor6
| Distractor6 | distractor7
| Distractor7 | distractor8
| Distractor8 | scratch pad
| Scratch Pad Area |

FIG. 6

Variables and constraints for model NEWMC$R

---

Variables:
  Variable name: SMaleName
    Type: String
    Status: Enabled
    Checksum: Enabled
    Indexed: False
    Values:
      John
      Tom
      Richard
      Michael
      Steve
      Phil
      Jeff
      Peter
      Harry
  Variable name: INum1
    Type: Integer
    Status: Enabled
    Checksum: Enabled
    Is independent = True, Range: from 2 to 26 by 3
  Variable name: SItems
    Type: String
    Status: Enabled
    Checksum: Enabled
    Indexed: False
    Values:
      apples
      oranges
      pears
      marbles
      pennies
      comic books
      pieces of bubble gum
      pencils
      crayons
  Variable name: SFemaleName
    Type: String
    Status: Enabled
    Checksum: Enabled
    Indexed: False
    Values:
      Mary
      Sharon
      Tina
      Michelle

FIG. 80A

Variables and constraints for model NEWMC$R

Susan
       Linda
       Crystal
       Deidre
   Variable name: INum2
     Type: Integer
     Status: Enabled
     Checksum: Enabled
     Is independent = True, Range: from 2 to 27 by 5
   Variable name: IKey
     Type: Integer
     Status: Enabled
     Checksum: Enabled
     Is independent = False
   Variable name: IDistractor1
     Type: Integer
     Status: Enabled
     Checksum: Enabled
     Is independent = False
   Variable name: IDistractor2
     Type: Integer
     Status: Enabled
     Checksum: Enabled
     Is independent = False
   Variable name: IDistractor3
     Type: Integer
     Status: Enabled
     Checksum: Enabled
     Is independent = False
   Variable name: IDistractor4
     Type: Integer
     Status: Enabled
     Checksum: Enabled
     Is independent = False
Constraints:
   Variation constraints:
     Constraint: IKey=INum1+INum2
       Status: Enabled
     Constraint: INum1=/=INum2
       Status: Enabled
   Distractor constraints:
     Constraint: IDistractor1=INum1+INum2+2*min(INum1,INum2)
       Status: Enabled
     Constraint: IDistractor2=2*INum1+INum2
       Status: Enabled
     Constraint: IDistractor3=INum1+INum2+7

FIG. 80B

Variables and constraints for model NEWMC$R

Status: Enabled
Constraint: IDistractor4=IKey-3
Status: Enabled

FIG. 80C

Variables and constraints for model NEWMC$RA

Variables:
  Variable name: SMaleName
    Type: String
    Status: Enabled
    Checksum: Enabled
    Indexed: False
    Values:
      John
      Tom
      Richard
      Michael
      Steve
      Phil
      Jeff
      Peter
      Harry
  Variable name: INum1
    Type: Integer
    Status: Enabled
    Checksum: Enabled
    Is independent = True, Range: from 2 to 26 by 3
  Variable name: SItems
    Type: String
    Status: Enabled
    Checksum: Enabled
    Indexed: False
    Values:
      apples
      oranges
      pears
      marbles
      pennies
      comic books
      pieces of bubble gum
      pencils
      crayons
  Variable name: SFemaleName
    Type: String
    Status: Enabled
    Checksum: Enabled
    Indexed: False
    Values:
      Mary
      Sharon
      Tina
      Michelle

FIG.82A

Variables and constraints for model NEWMC$RA

Susan
    Linda
    Crystal
    Deidre
Variable name: INum2
  Type: Integer
  Status: Enabled
  Checksum: Enabled
  Is independent = True, Range: from 2 to 27 by 5
Variable name: IKey
  Type: Integer
  Status: Enabled
  Checksum: Enabled
  Is independent = False
Variable name: IDistractor1
  Type: Integer
  Status: Enabled
  Checksum: Enabled
  Is independent = False
Variable name: IDistractor2
  Type: Integer
  Status: Enabled
  Checksum: Enabled
  Is independent = False
Variable name: IDistractor3
  Type: Integer
  Status: Enabled
  Checksum: Enabled
  Is independent = False
Variable name: IDistractor4
  Type: Integer
  Status: Enabled
  Checksum: Enabled
  Is independent = False
Constraints:
  Variation constraints:
    Constraint: IKey=INum1+INum2
      Status: Enabled
    Constraint: INum1=/=INum2
      Status: Enabled
  Distractor constraints:
    Constraint: IDistractor1=INum1+INum2+2*min(INum1,INum2)
      Status: Enabled
    Constraint: IDistractor2=2*INum1+INum2
      Status: Enabled
    Constraint: IDistractor3=INum1+INum2+7

FIG. 82B

Variables and constraints for model NEWMC$RA

Status: Enabled
Constraint: IDistractor4=IKey-3
Status: Enabled

FIG. 82C

FILE: NEWMC$R.doc

TCA Standard Multiple Choice Model reserved for variant

```
[                                    ]
``` stem

| If SMaleName has INum1 SItems and SFemaleName has INum2 SItems, how many SItems do they have together? |
|---| key

| IKey |
|---| distractor1

| IDistractor1 |
|---| distractor2

| IDistractor2 |
|---| distractor3

| IDistractor3 |
|---| distractor4

| IDistractor4 |
|---| distractor5

| Distractor5 |
|---| distractor6

| Distractor6 |
|---| distractor7

| Distractor7 |
|---| distractor8

| Distractor8 |
|---| scratch pad

| Scratch Pad Area |
|---|

FIG. 83

FILE: NEWMC$R3.doc

TCA Standard Multiple Choice Model reserved for variant

If Tom has 2 comic books and Crystal has 12 comic books, how many comic books do they have together?

stem

If Tom has 2 comic books and Crystal has 12 comic books, how many comic books do they have together?

key

14 distractor1

18 distractor2

16 distractor3

21 distractor4

11 distractor5

Distractor5 distractor6

Distractor6 distractor7

Distractor7 distractor8

Distractor8 scratch pad

Scratch Pad Area

FIG. 84

FILE: NEWMC$R4.doc

TCA Standard Multiple Choice Model reserved for variant

| If Harry has 17 pears and Mary has 2 pears, how many pears do they have together? |
|---| stem

| If Harry has 17 pears and Mary has 2 pears, how many pears do they have together? |
|---| key

| 19 |
|---| distractor1

| 23 |
|---| distractor2

| 36 |
|---| distractor3

| 26 |
|---| distractor4

| 16 |
|---| distractor5

| Distractor5 |
|---| distractor6

| Distractor6 |
|---| distractor7

| Distractor7 |
|---| distractor8

| Distractor8 |
|---| scratch pad

| Scratch Pad Area |
|---|

FIG. 85

FILE: NEWMC$RA.doc

TCA Standard Multiple Choice Model reserved for variant

| If Harry has 17 pears and Mary has 2 pears, how many pears do they have together? | stem

| If Harry has 17 pears and Mary has 2 pears, how many pears do they have together? | key

| 19 | distractor1

| 23 | distractor2

| 36 | distractor3

| 26 | distractor4

| 16 | distractor5

| Distractor5 | distractor6

| Distractor6 | distractor7

| Distractor7 | distractor8

| Distractor8 | scratch pad

| Scratch Pad Area |

FIG. 86

FILE: NEWMC$RB.doc

TCA Standard Multiple Choice Model reserved for variant

| |
|---|
| | stem

| |
|---|
| If SMaleName has INum1 SItems and SFemaleName has INum2 SItems, how many SItems do they have together? | key

| IKey |
|---| distractor1

| IDistractor1 |
|---| distractor2

| IDistractor2 |
|---| distractor3

| IDistractor3 |
|---| distractor4

| IDistractor4 |
|---| distractor5

| Distractor5 |
|---| distractor6

| Distractor6 |
|---| distractor7

| Distractor7 |
|---| distractor8

| Distractor8 |
|---| scratch pad

| Scratch Pad Area |
|---|

FIG. 87

FILE: NEWMC$RBA.doc

TCA Standard Multiple Choice Model reserved for variant

[                                                      ]

stem

| If SMaleName has INum1 SItems and SFemaleName has INum2 SItems, how many SItems do they have together? | key

[IKey                                                  ]

distractor1

[IDistractor1                                          ]

distractor2

[IDistractor2                                          ]

distractor3

[IDistractor3                                          ]

distractor4

[IDistractor4                                          ]

distractor5

[Distractor5                                           ]

distractor6

[Distractor6                                           ]

distractor7

[Distractor7                                           ]

distractor8

[Distractor8                                           ]

scratch pad

[Scratch Pad Area                                      ]

FIG. 88

FILE: NEWQC$R.doc

TCA Quantitative Comparison Model reserved for variant

| Column A | Column B |
|----------|----------|
|          |          |

(a) The quantity in Column A is greater.
(b) The quantity in Column B is greater.
(c) The two quantities are equal.
(d) The relationship cannot be determined from the information given.

stem

| |
|---|
| |

| column A | column A value |
|--------------|--------------------|
|              |                    |

| column B | column B value |
|--------------|--------------------|
|              |                    | key

| Key |
|-----| scratch pad

| Scratch Pad Area |
|------------------|

FIG. 91

FILE: NEWDS$R.doc

TCA Data Sufficiency Model reserved for variant

Statement (1)

Statement (2)

(a) Statement (1) ALONE is sufficient.
(b) Statement (2) ALONE is sufficient.
(c) Statements TOGETHER are sufficient.
(d) EACH statement ALONE is sufficient.
(e) Statements TOGETHER are NOT sufficient.

stem first statement          N/S/E second statement         N/S/E key

Key scratch pad

Scratch
Pad
Area

FIG. 93

FILE: MICNEWMC$R1.doc

TCA Standard Multiple Choice Model reserved for variant

> If Bill had 2 apples and Teresa had 5 apples, how many apples did they have together?
> A. 3
> B. 4
> C. 7
> D. 10
> E. 13
> Key is C stem

> If Bill had 2 apples and Teresa had 5 apples, how many apples did they have together?

key

> 7 distractor1

> 3 distractor2

> 10 distractor3

> 13 distractor4

> 4 distractor5

> Distractor5 distractor6

> Distractor6 distractor7

> Distractor7 distractor8

> Distractor8 scratch pad

> Scratch Pad Area

FIG. 95

FILE: MICNEWMC$RA.doc

TCA Standard Multiple Choice Model reserved for variant

| |
|---|
| If Bill had 2 apples and Joan had 4 apples, how many apples did they have together?<br>A. 2<br>B. 4<br>C. 6<br>D. 8<br>E. 10<br>Key is C | stem

| |
|---|
| If Bill had 2 apples and Joan had 4 apples, how many apples did they have together? | key

| |
|---|
| 6 | distractor1

| |
|---|
| 2 | distractor2

| |
|---|
| 8 | distractor3

| |
|---|
| 10 | distractor4

| |
|---|
| 4 | distractor5

| |
|---|
| Distractor5 | distractor6

| |
|---|
| Distractor6 | distractor7

| |
|---|
| Distractor7 | distractor8

| |
|---|
| Distractor8 | scratch pad

| |
|---|
| Scratch Pad Area |

FIG. 96

FILE:   MICNEWMC$R2.doc

TCA Standard Multiple Choice Model reserved for variant

> If Bill had 2 apples and Joan had 4 apples, how many apples did they have together?
> A. 2
> B. 4
> C. 6
> D. 8
> E. 10
> Key is C stem

> If Bill had 2 apples and Joan had 4 apples, how many apples did they have together?

key

> 6 distractor1

> 2 distractor2

> 8 distractor3

> 10 distractor4

> 4 distractor5

> Distractor5 distractor6

> Distractor6 distractor7

> Distractor7 distractor8

> Distractor8 scratch pad

> Scratch Pad Area

FIG. 97

Variables and constraints for model MICNEWMC$R

Variables:
  Variable name: SMaleName
    Type: String
    Status: Enabled
    Checksum: Enabled
    Indexed: False
    Values:
      Michael
      Bill
      Harry
      Roger
  Variable name: INum1
    Type: Integer
    Status: Enabled
    Checksum: Enabled
    Is independent = True, Range: from 2 to 8 by 1
  Vanable name: SThing
    Type: String
    Status: Enabled
    Checksum: Enabled
    Indexed: False
    Values:
      apples
      uzis
  Variable name: SFemaleName
    Type: String
    Status: Enabled
    Checksum: Enabled
    Indexed: False
    Values:
      Holly
      Mary
      Teresa
      Joan
  Variable name: INum2
    Type: Integer
    Status: Enabled
    Checksum: Enabled
    Is independent = True, Range: from 4 to 12 by 1
  Variable name: IKey
    Type: Integer
    Status: Enabled
    Checksum: Enabled
    Is independent = False
  Variable name: IDistractor1
    Type: Integer

FIG. 98A

Variables and constraints for model MICNEWMC$R

Status: Enabled
    Checksum: Enabled
    Is independent = False
  Variable name: IDistractor2
    Type: Integer
    Status: Enabled
    Checksum: Enabled
    Is independent = False
  Variable name: IDistractor3
    Type: Integer
    Status: Enabled
    Checksum: Enabled
    Is independent = False
  Variable name: IDistractor4
    Type: Integer
    Status: Enabled
    Checksum: Enabled
    Is independent = False
Constraints:
  Variation constraints:
    Constraint: IKey = INum1 + INum2
      Status: Enabled
  Distractor constraints:
    Constraint: IDistractor1 = |INum1 - INum2|
      Status: Enabled
    Constraint: IDistractor2 = INum1 * INum2
      Status: Enabled
    Constraint: IDistractor3 = IDistractor1 + IDistractor2
      Status: Enabled
    Constraint: IDistractor4 = 2 * INum1
      Status: Enabled

FIG. 98B

FILE: MICNEWQC$R.doc

TCA Quantitative Comparison Model reserved for variant

| Column A | Column B |
|---|---|
|   |   |

(a) The quantity in Column A is greater.
(b) The quantity in Column B is greater.
(c) The two quantities are equal.
(d) The relationship cannot be determined from the information given.

stem

An article of clothing was reduced in price by x percent from $IOriginalPrice to $IReducedPrice. Later, the price was increased by y percent to return the price to $IOriginalPrice.

column A            column B

| x | y |
|---|---|
| x + 1 | y - 1 | key

| Key |
|---| scratch pad

| Scratch Pad Area |
|---|

FIG. 100

FILE: MICNEWQC$R1.doc

TCA Quantitative Comparison Model reserved for variant

| An article of clothing was reduced in price by x percent from $20 to $16. Later, the price was increased by y percent to return the price to $20.              Column A                            Column B ||
|---|---|
| x + 1 | y - 1 |
| (a) The quantity in Column A is greater.<br>(b) The quantity in Column B is greater.<br>(c) The two quantities are equal.<br>(d) The relationship cannot be determined from the information given. || stem

| An article of clothing was reduced in price by x percent from $20 to $16. Later, the price was increased by y percent to return the price to $20. |
|---|

| column A | column B |
|---|---|
| x | y |
| x + 1 | y - 1 | key

| Key |
|---| scratch pad

| Scratch<br>Pad<br>Area |
|---|

FIG. 101

FILE: MICNEWQC$R5.doc

TCA Quantitative Comparison Model reserved for variant

| An article of clothing was reduced in price by x percent from $25 to $20. Later, the price was increased by y percent to return the price to $25. |||
|---|---|---|
| | Column A | Column B |
| | x + 1 | y |
| (a) The quantity in Column A is greater.<br>(b) The quantity in Column B is greater.<br>(c) The two quantities are equal.<br>(d) The relationship cannot be determined from the information given. ||| stem

| An article of clothing was reduced in price by x percent from $25 to $20. Later, the price was increased by y percent to return the price to $25. |
|---|

| column A | column B |
|---|---|
| x | y |
| x + 1 | y - 1 | key

| Key |
|---| scratch pad

| Scratch<br>Pad<br>Area |
|---|

FIG. 102

FILE: MICNEWDS$R.doc

TCA Data Sufficiency Model reserved for variant

Statement (1)

Statement (2)

(a) Statement (1) ALONE is sufficient.
(b) Statement (2) ALONE is sufficient.
(c) Statements TOGETHER are sufficient.
(d) EACH statement ALONE is sufficient.
(e) Statements TOGETHER are NOT sufficient.

stem

A SThing.1 and a SThing.2 cost a total of $ICost1. How much does the SThing.2 cost?

first statement

The SThing.1 costs SRelationship as much as the SThing.2.

second statement

The SThing.1 costs $ICost2.

key

Key scratch pad

Scratch
Pad
Area

FIG. 105

Variables and constraints for model MICNEWDS$R

---

Variables:
  Variable name: SThing
    Type: String
    Status: Enabled
    Checksum: Disabled
    Indexed: True
    Value Sets:
      Values:
        1. apples
        2. oranges
      Values:
        1. hat
        2. coat
  Variable name: ICost1
    Type: Integer
    Status: Enabled
    Checksum: Enabled
    Is independent = False
  Variable name: ICost2
    Type: Integer
    Status: Enabled
    Checksum: Enabled
    Is independent = False
  Variable name: ITotalCost
    Type: Integer
    Status: Enabled
    Checksum: Enabled
    Is independent = True, Range: from 40 to SVal by 1
  Variable name: SVal
    Type. String
    Status: Enabled
    Checksum: Enabled
    Indexed: False
    Values:
      50
      55
      60
      65
  Variable name: SRelationship
    Type: String
    Status: Enabled
    Checksum: Enabled
    Indexed: False
    Values:
      half
      twice

FIG. 106A

Variables and constraints for model MICNEWDS$R one quarter
      three times
Constraints:
   Variation constraints:
      Constraint: ITotalCost = ICost1 + ICost2
         Status: Enabled
      Constraint: ICost1 = ITotalCost - 20
         Status: Enabled

COMPUTER BASED TEST ITEM GENERATION

BACKGROUND OF THE INVENTION
  FIELD OF THE INVENTION
SUMMARY OF THE INVENTION
BRIEF DESCRIPTIONS OF THE DRAWINGS
DETAILED SUMMARY OF THE INVENTION
  THE COMPUTER ENVIRONMENT
    PROLOG IV
  CREATING A NEW TEST ITEM
    NEW FAMILY PROPERTIES DIALOG BOX
    MULTIPLE CHOICE MODEL
  CREATING A TEST ITEM MODEL
    DEFINING VARIABLES BY INDICATING VALUES THE VARIABLES CAN TAKE ON
      DEFINING VARIABLES DIRECTLY IN VARIABLES WINDOW
      VARIABILIZING BY USING NAMING CONVENTION AND HIGHLIGHTING
      VARIABLE NAMING CONVENTION FOR USE IN AUTO-DEFINING VARIABLES
    IDENTIFYING ELEMENTS OF THE TEST ITEM TO BE VARIABILIZED VARIABILIZING BY USING PRIOR UNFROZEN MODELS OR CHILDREN THEREOF
    EDITING STRING VARIABLES
      CREATING AND IMPORTING STRING VALUES
        Using the "Add" Button
        Using the "Export Strings" and "Import String" Buttons
    EDITING INTEGER VARIABLES
    SPECIFYING THE CONSTRAINTS
      Operators
      Variables
      Functions
      Constraining "IKey"
      Exporting and Importing Constraints
      Constraining the Distractors
      Testing the Constraints
GENERATING TEST ITEM VARIANTS
WORKING WITH GENERATED VARIANTS
  ACCEPTING VARIANTS
    DEFERRING AND DISCARDING VARIANTS
  CREATING NEW VARIANT MODELS FROM A GENERATED VARIANT
  ACCEPTED VARIANTS AND NEW FAMILY MODELS
WORKING WITH MODELS AND ACCEPTED VARIANTS
  EDITING THE PROFILE OF A VARIANT
    The GRE Difficulty Portion of the Profile of a Variant Window
  WORKING WITH FAMILY MEMBERS
    Using a New Active Model to Generate Far Variants
    Creating Still More Models
PRINT OPTIONS
GRE QUANTITATIVE COMPARISON ITEMS
GMAT DATA SUFFICIENCY ITEMS
FURTHER EXAMPLES OF ITEM MODELS
PROLOG SIMULTANEOUS CONSTRAINT SOLVER
  HLP4lib.p4
  PrlgExpr.l
  PrlgExpr.y
  hlP4API.h
TCA CONSTRAINT LANGUAGE
  NOTATIONAL CONVENTION
  TCA CONSTRAINT LANGUAGE IN DETAIL
  BASIC ELEMENTS
    Constants
    Variables
    Lists
    Functions
    Algebraic Expressions (referred to as: AlgExpr)
  CONSTRAINT SPECIFICATION
    Type Constraint Specification
    Optimizable-Relation Specification
    Precision Specification
    Relational Constraints (RelExpr)
    Ranges Enumerated Range
    if-then-else Constraint
    if-then-elseif Constraint
    Freeze Constraint
    Primitive succeed and fail constraints
    Combining Constraints
  WRITING CONSTRAINTS IN TCA CONSTRAINT LANGUAGE
  SOME TECHNIQUES TO SOLVE CONSTRAINTS IN TCA
    Variable Type Specification
    Range specification
    Enumerated-Range Specification
    Efficient Solving
    Representing lists and
    Bidirectionality of functions and operators
    Constraints are Solved in Order-independent Fashion
    Constraints are Solved as a Whole
    Variable Names are the Links to Bind Various Constraints
    Use of Sets and Ranges
    Logical Operators
    Equality by Assigning Same Variable Name
VISUAL BASIC SOURCE CODE APPENDIX
PROLOG SOURCE CODE APPENDIX
CLAIMS
ABSTRACT This application claims priority from U.S. Provisional Application Ser. No. 60/152,121, filed Sep. 1, 1999, the disclosure of which is incorporated herein by reference. A portion of the disclosure of this patent document contains material which is subject to copyright protection. The copyright owner has no objection to the facsimile reproduction by any-one of the patent disclosure, as it appears in the Patent and Trademark Office public patent files or records, but otherwise reserves all copyright rights whatsoever.

This specification incorporates by reference, in their entirety, Copy 1 and Copy 2 of the computer program listing appendix, which were created on Nov. 26, 2003. Each of Copy 1 and Copy 2 include the following files: TCA.vbp, AXProlog.vbp, Common.bas, Main.bas, modUtil.bas, MTAPI.BAS, MTDeclaration.bas, MTUtil.bas, Timer.bas, Constraint.frm, EditConstraint.frm, Form1.frm, frmAbout.frm, frmAttributes.frm, frmComments.frm, frmDifficulty.frm, frmDrag.frm, frmIED.frm, frmIndexedString.frm, frmNew.frm, frmNewModel.frm, frmProgram.frm, frmProgress.frm, frmProlog.frm, frmSplash.frm, SetPrecision.frm, String.frm, TCA.FRM, Variable.frm, Application.cls, CClones.cls, CConstraints.cls, Checksum.cls, Clone.cls, CModels.cls, Constraint.cls, ConstraintSolver.cls, CVariables.cls, CVariants.cls, DifficultyEstimate.cls, DocStatus.cls, DSMODEL.CLS, Family.cls, File.cls, FileFind.cls, GMAT-DifficultyEstimate.cls, GREDifficultyEstimate.cls, IniFile.cls, LockedItem.cls, Model.cls, PrintModel.cls, Progress.cls, Prolog.cls, PSMODEL.cls, QCModel.cls, String- Solver.cls, StringSolverx.cls, SubString.cls, Value.cls, VarFraction.cls, Variable.cls, VarInteger.cls, VarReal.cls, VarString.cls, VarUntyped.cls, Win32API.cls, Word.cls, HLP4lib.p4, PrlgExpr.l, PrlgExpr.y, and hlP4API.h.

The files comprising the Prolog source code appendix have been concatenated into a single file of 251 kilobytes. The date of creation of the files comprising the Prolog source code appendix is prior to Sep. 1, 2000. The files comprising the VB source code appendix have been concatenated into a single file of 847 kilobytes. The date of creation of the files comprising the VB source code appendix is prior to Sep. 1, 2000.

BACKGROUND OF THE INVENTION

Field of the Invention

The present invention relates to computer-based technology in the generation of test items. In particular, to the semi-automated (i.e. test-developer assisted) generation of surface-level (near), medium-level, and deep (far) clones ("variants") of test items.

Applicants' assignee, Education Testing Service administers many different tests, including the following three tests. The Graduate Management Admission Test® (GMAT®) Program is used by graduate business schools and measures general verbal, mathematical, and analytical writing skills that an individual has developed over a long period of time. The Graduate Record Examinations® (GRE®) Program provides tests that assist graduate schools and departments in graduate admissions activities. Tests offered include the General Test, which measures developed verbal, quantitative, and analytical abilities, and the Subject Tests, which measure achievement in 14 different fields of study. The SAT® Program consists of the SAT I: Reasoning Test and SAT II: Subject Tests. The SAT I is a three-hour test, primarily multiple-choice, that measures verbal and mathematical reasoning abilities. The SAT II: Subject Tests are one-hour, mostly multiple-choice, tests in specific subjects. These tests measure knowledge of particular subjects and the ability to apply that knowledge. The SAT® Program tests are used by colleges for admission or placement purposes.

These and other tests require a large number of test items. However, creating tests items is an expensive and time consuming process. Therefore, there is a need for a process and system for creating test items in a relatively cost effective and expeditious manner.

It is an object of the present invention to provide a process and system for the cost effective and expeditious creation of test items.

It is a further object of the present invention to provide a process and system for the cost effective and expeditious generation of test item variants from existing or newly created test items, wherein said test item variants can be used as test items.

SUMMARY OF THE INVENTION

A computerized method and system for creating test items by generating variants of a test item model, comprising the steps of creating a new test item model by identifying elements of an initial test item or a test item model to be variabilized, variabilizing the elements thereby creating test item variables, indicating values the variables can assume, specifying the constraints that define the relationships among the variables, and generating test item variants utilizing a simultaneous constraint solver.

The initial test item can be a pre-existing test item or test item model, a newly created test item or even a conceptual template in the mind of the test item creator. The generated test item variants are displayed to the test item creator. The test item creator can store and forward acceptable test item variants for later use as test items. Test item models can be stored for later use in generating new test item variants.

In one preferred embodiment of the present invention, a frozen test item model can be extended to create its child which child model can be modified to generate its own test item variants. Moreover, item classification and tracking functions are provided. Test item creators can type in test items, edit them, import graphics, etc. Items that are created are compatible with test delivery software. Item management features allow the test developer to track the location and status of an item throughout its life cycle. In addition, items may be arranged in a searchable and browsable library in terms of whatever conceptual frameworks are used in the automatic generation and/or analysis of items. The text/graphics of these library items can be directly accessible by the item creation tools, i.e. the user is able to edit the text of a library item to create a new item.

One preferred embodiment of the present invention was written in Visual Basic, as well as the PROLOG IV programming language and provides an environment where the user can create a test item model or a family of test item models. For example, with this embodiment of the present invention, referred to as the "Test Creation Assistant" or "TCA", the user may want to create a single model for a specific purpose, but could find out that it makes sense to have a family of models that have some sort of related theme and therefor TCA includes the notion of test model families.

Although preferred embodiments of the present invention are described below in detail, it is desired to emphasize that this is for the purpose of illustrating and describing the invention, and should not be considered as necessarily limiting the invention, it being understood that many modifications can be made by those skilled in the art while still practicing the invention claimed herein.

BRIEF DESCRIPTIONS OF THE DRAWINGS

FIG. 1 shows the initial Test Creation Assistant window of this preferred embodiment and its associated work areas.

FIG. 6 shows the TCA Standard Multiple Choice Model Word template of this preferred embodiment.

FIGS. 31-51 show how test item variants may be generated in accordance with a preferred embodiment of the invention.

FIGS. 56-78 show how the user can work with models and accepted variants in accordance with a preferred embodiment of the invention.

FIGS. 79-88 shows one way to print variants and the print outs generated by the system, after the user clicks on "Print All" in FIG. 79, the print outs showing the variables and constraints, test item model, and test item model variants in accordance with a preferred embodiment of the invention.

FIGS. 89-91 show screen displays from Quantitative Comparison items in accordance with a preferred embodiment of the invention.

FIGS. 92-93 show screen displays from Data Sufficiency items in accordance with a preferred embodiment of the invention.

FIGS. 94-106 show screen displays for various item types in accordance with a preferred embodiment of the invention.

FIG. 107 show an overview of the computer architecture for one preferred embodiment of the present invention.

DETAILED SUMMARY OF THE INVENTION

The Computer Environment

The computer system of the present invention was designed so that people could use it at home as well as on currently available desktops at work or notebooks. One preferred embodiment works with the MICROSOFT WINDOWS® 95, 98 or NT operating systems. This embodiment requires the MICROSOFT WORD® 97 word processing application, PROLOG IV and a Control Language Program called TCL 7.6, which is available on the Internet. See the Source Code Appendix for further details about this embodiment. The present invention is not limited to the foregoing operating systems, programming languages and/or software applications, etc. For example, an extensible markup language editor could be used in place of MICROSOFT WORD®.

Prolog IV

Prolog IV, is a compiled constraint programming language. The Prolog IV language allows the programmer to process a wide variety of constraints describing relations over real and rational numbers, integers, booleans and lists. The Prolog IV constraint solving techniques are based on exact and approximation methods.

PROLOG IV is distributed by PrologIA, Parc Technologique de Luminary-Case 919, 13288 Marseille cedex 09, France. PROLOG IV is a programming environment.

Creating a New Test Item

Figure 1:
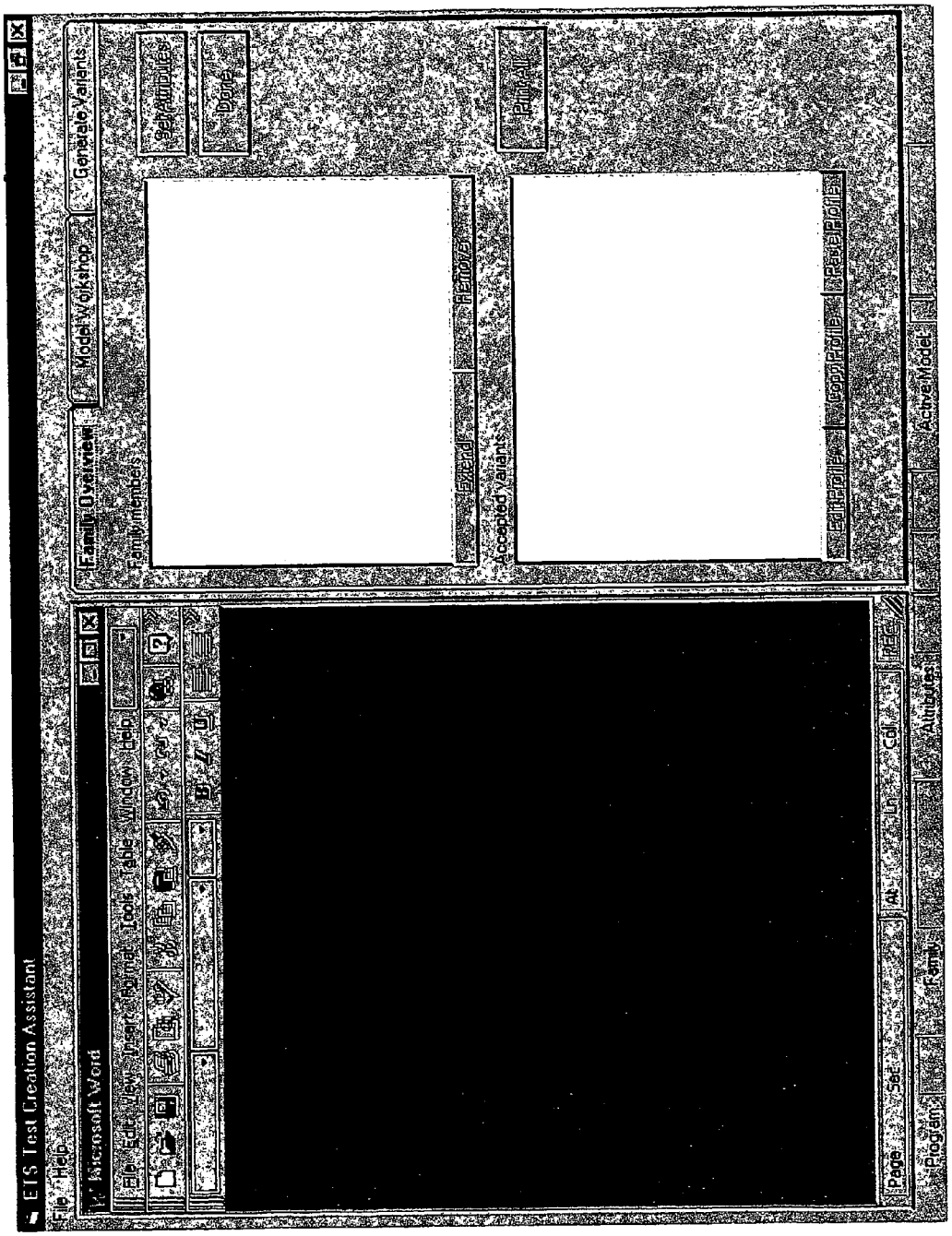
FIGS. 1-107 show the computer generated screen displays of one preferred embodiment of the present invention.

In accordance with the preferred embodiment as exemplified by the software application disclosed in the SOURCE CODE APPENDICES, the user upon initializing the software application is presented with the initial Test Creation Assistant window. FIG. 1.

The initial window is subdivided into several work areas. One important area is the MICROSOFT WORD® area, which occupies most of the left side of the initial window. Also important are the three tabbed areas: "Family Overview"; "Model Workshop"; and "Generate Variants" and the two pull down menus: "File" and "Help". FIG. 1.

The Family Overview windows provide information regarding Family members and Accepted variants and permits the user to Set Attributes and Print a Family member. The Model Workshop tab moves the user to areas for creating variabilized test items. The Generate Variants tab permits the user to generate one or more test item variants. An item variant is a test item automatically generated from an item model, where the item model is comprised of constraints, stem, and key. In this tab, item variants can be displayed, saved or rejected.

Figure 2:
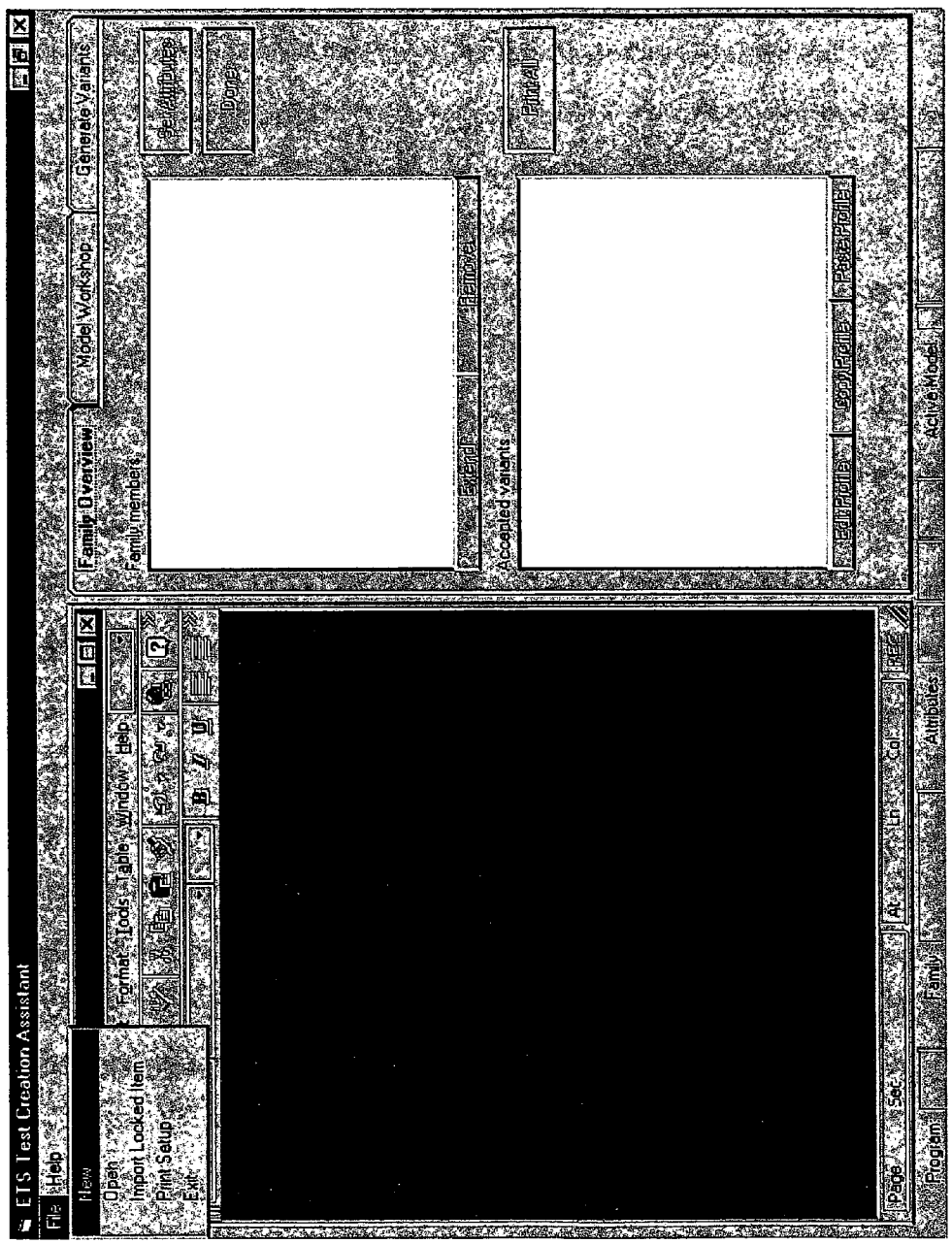
FIG. 2 shows the "File" menu options.

Clicking on "File" menu heading in FIG. 1, opens the pull down menu shown on FIG. 2. The menu options are "New", "Open", "Import Locked Item", "Print Setup" and "Exit".

New Family Properties Dialog Box

Figure 3:
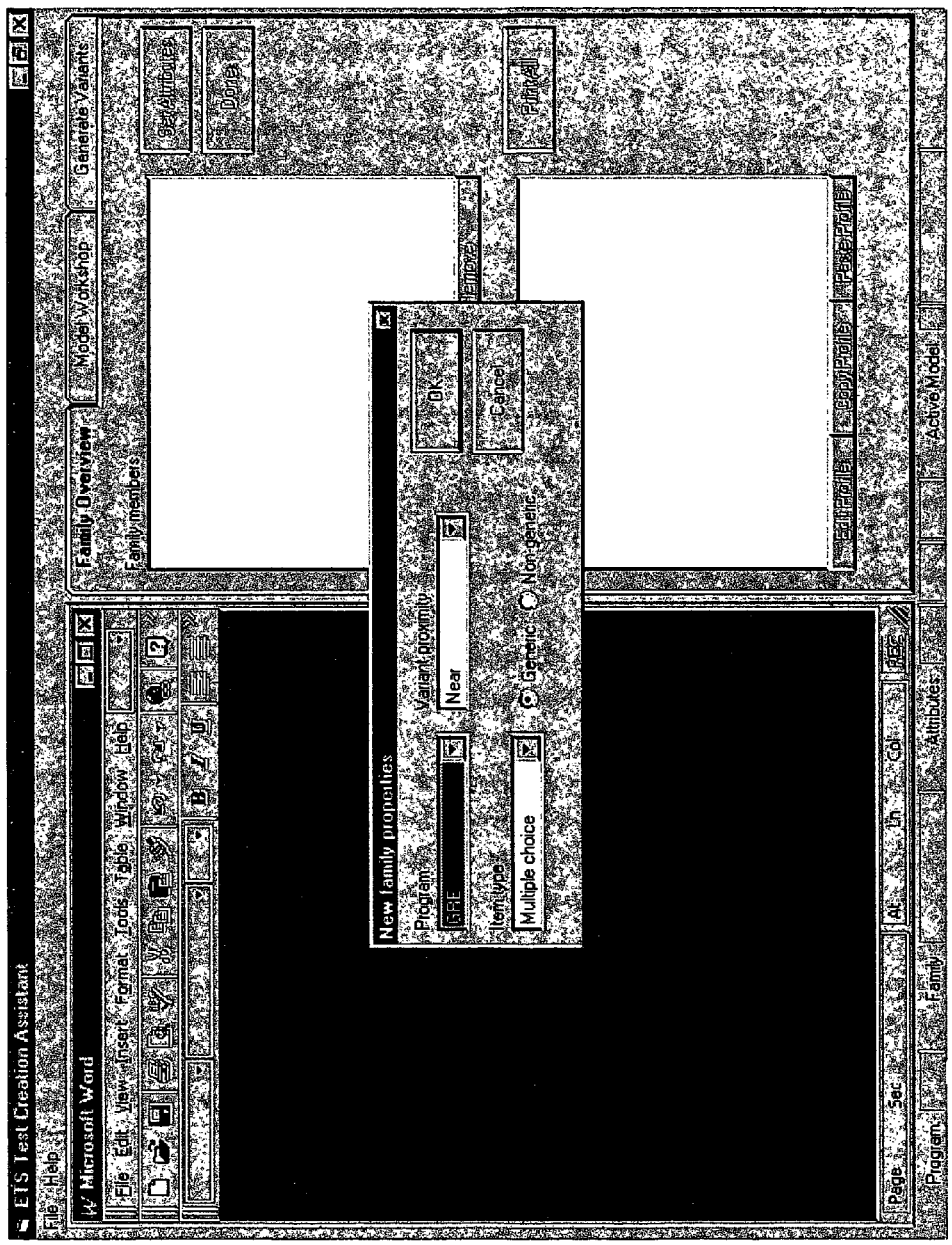
FIG. 3 shows the "New family properties" dialog box which appears by clicking on "New" in the "File" menu shown in FIG. 2.

Clicking on "New" brings up the "New family properties" dialog box. FIG. 3. Using this dialog box the user can select the particular family properties for the new test item. Family properties refers to the major properties associated with a test item. In one preferred embodiment, it refers to the type of "Program" (e.g., GMAT®, GRE®, or SAT®), the "Item type", the "Variant proximity" and whether the test item is to be "generic" or "non-generic".

In the New family properties dialog box, using a drop-down menu, the user can select the "Program": GMAT®, GRE®, or SAT®. GRE has been selected. FIG. 3.

Figure 89:
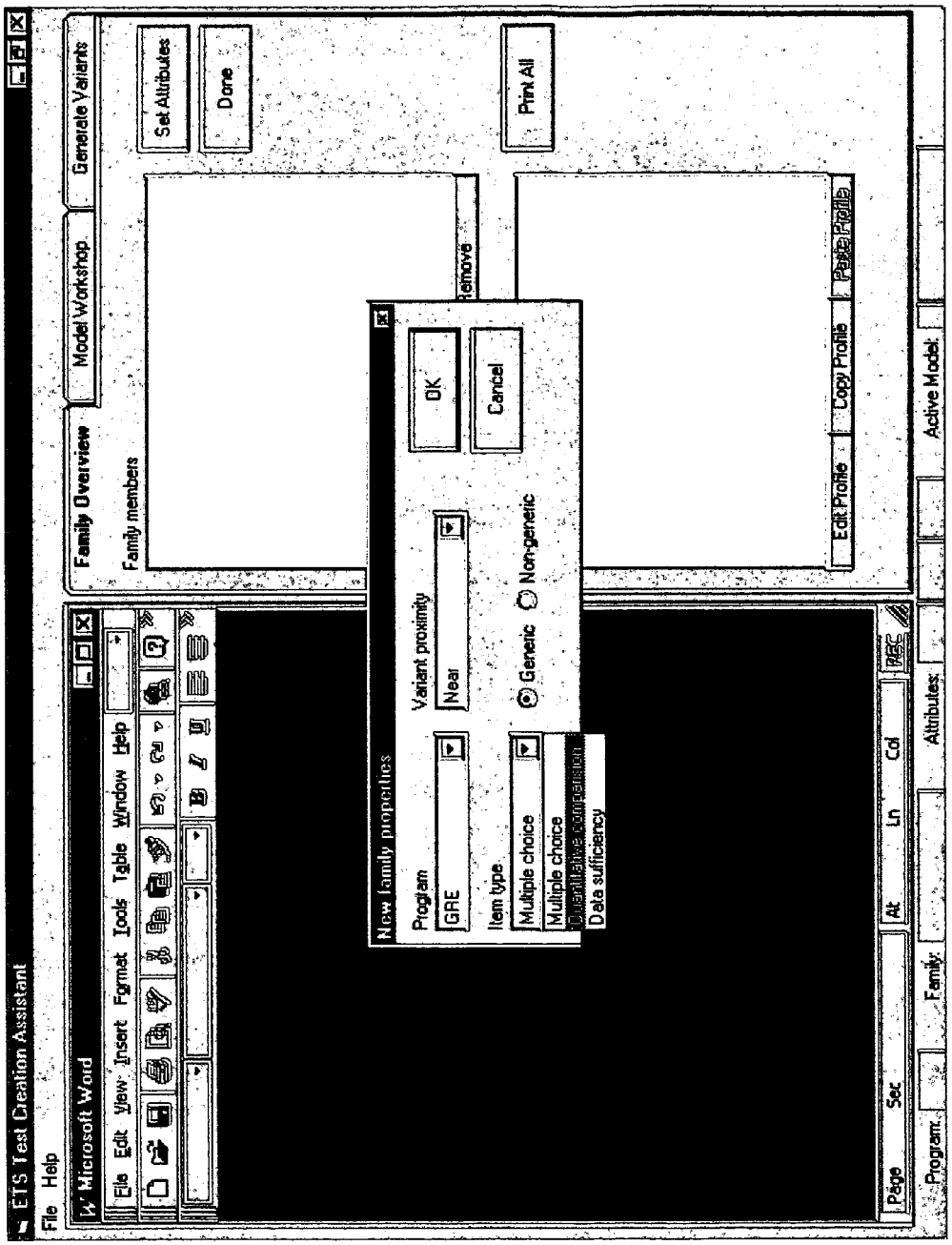

In the New family properties dialog box, the user can also select the "Item Type" or format of the question, in this embodiment: Multiple choice (MC), Quantitative comparison (QC), or Data sufficiency (DS). All three options are shown in FIG. 89; while Multiple choice appears in FIG. 3.

The user can also select the "Variant proximity": the choices are: Near (variants that are easily recognizable as belonging to the same variant family by test developers and test takers, this selection is shown in FIG. 3); Medium (variants that are not easily recognizable as belonging to the same variant family by test developers and test takers); and Far (variants which are difficult to recognize as belonging to the same variant family). Once selected, the user may strive to ensure that generated variants are of the identified proximity.

Finally, the user has the choice of selecting either "Generic" items or "Non-generic" items. Pure items, i.e., test items in a mathematical setting, are Generic as long as they have no distinguishing surface features, such as an unusual figure or table. Real items, i.e., test items based on a real-life situation, are Generic only if the context is commonly used in the text. For example, common context for GMAT includes buying and selling questions, profit questions, stock questions, interest questions, etc. These would not be Generic items for GRE, since the GRE is not aimed at a business school population. Generic items for GRE would include simple rate-time-distance questions, percent questions, etc.

Figure 4:
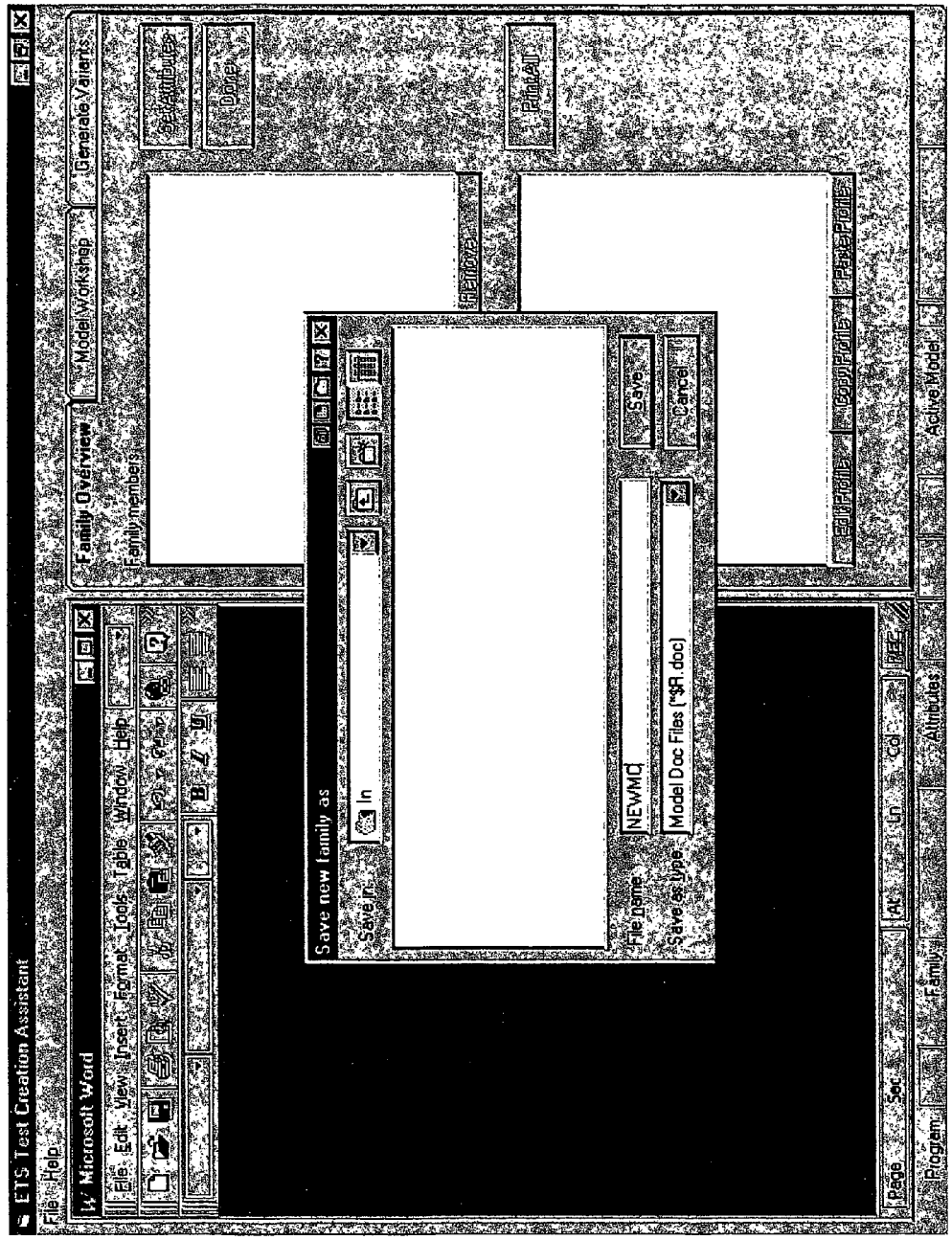
FIG. 4 shows the "Save new family as" dialog box which appears by clicking on the "OK" button in the "New family properties" dialog box shown in FIG. 3.

Clicking on the "OK" button in FIG. 3 brings up the "Save new family as" dialog box shown in FIG. 4. The user then enters the name of a family of test items, for example "NEWMC" and clicks on the "Save" action button, the file is saved as a "Model Doc Files (*$R.doc) and the result is shown in FIG. 5.

Figure 50:
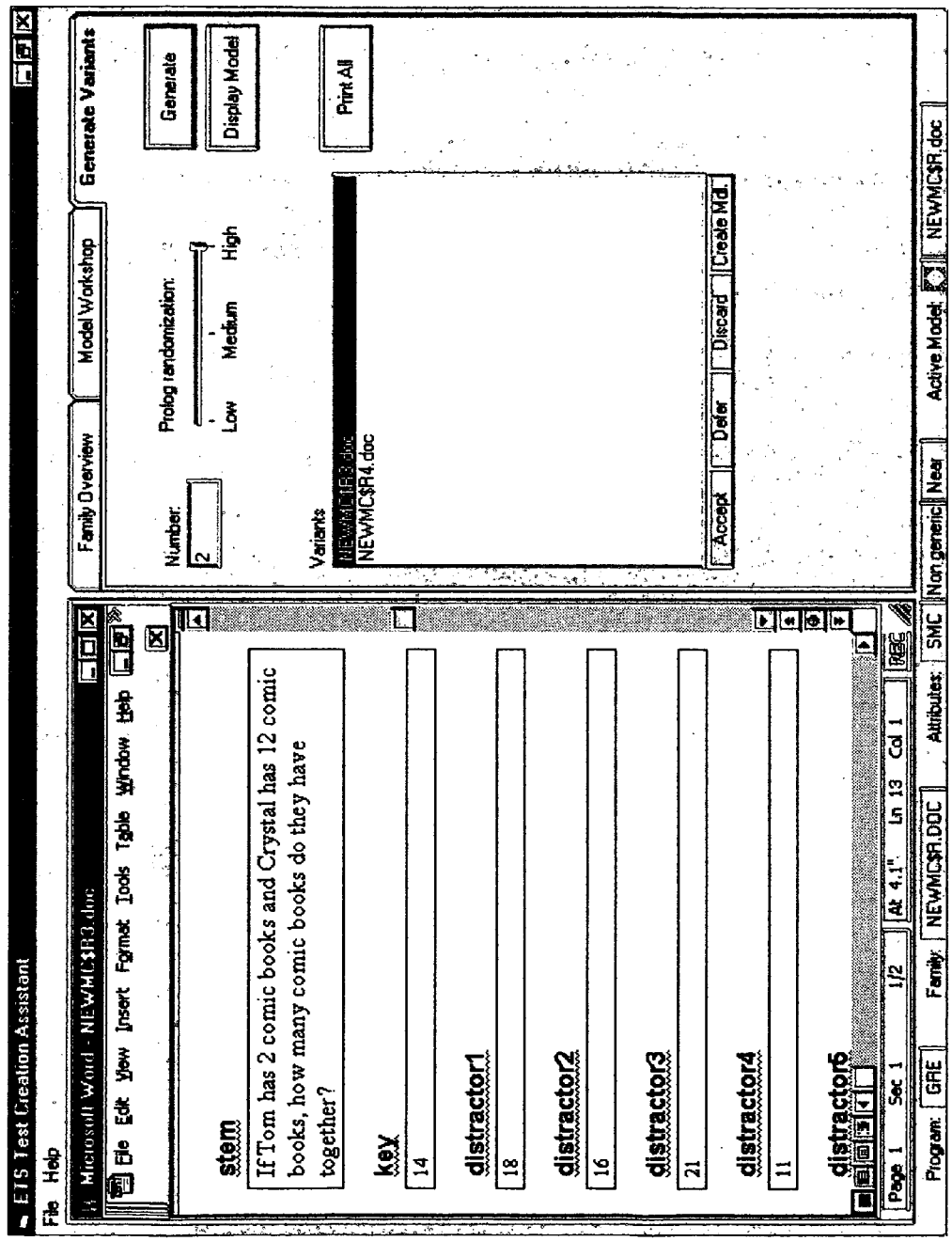

At this point the Program (GRE), Family (NEWMC$R.doc), Attributes (Single multiple choice or SMC; Non generic and Near), and the Active Model (NEWMC$R.doc) are displayed in status bars at the bottom of the ETS Test Creation Assistant window. This information is displayed to the user across all three tabs: Family Overview (FIG. 5); Model Workshop (FIG. 13); and Generate Variables (FIG. 50).

Multiple Choice Model

Figure 5:
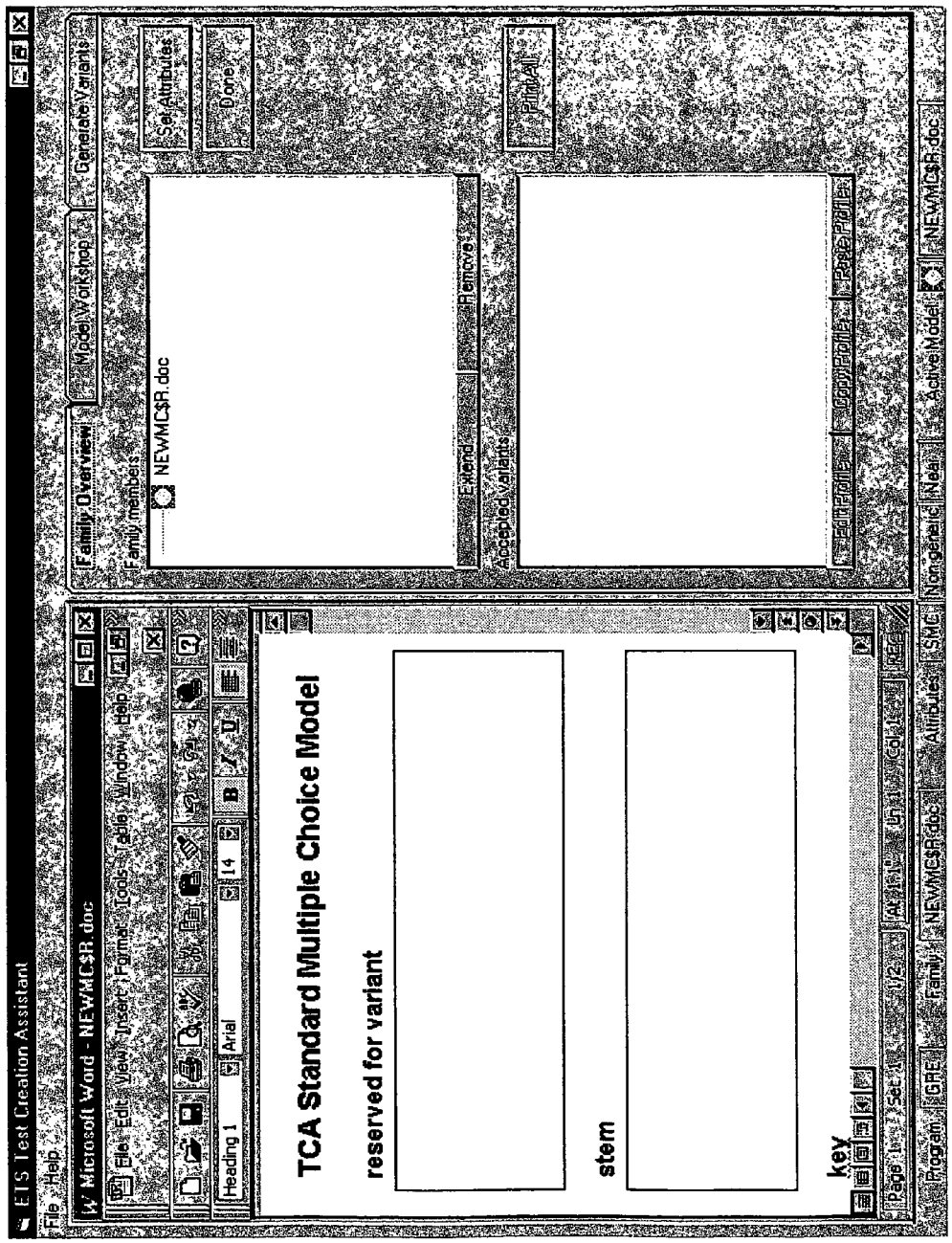
FIG. 5 shows the result of the user entering "NEWMC" as the name of a family of test items in FIG. 4 and saving the choice.
Figure 90:
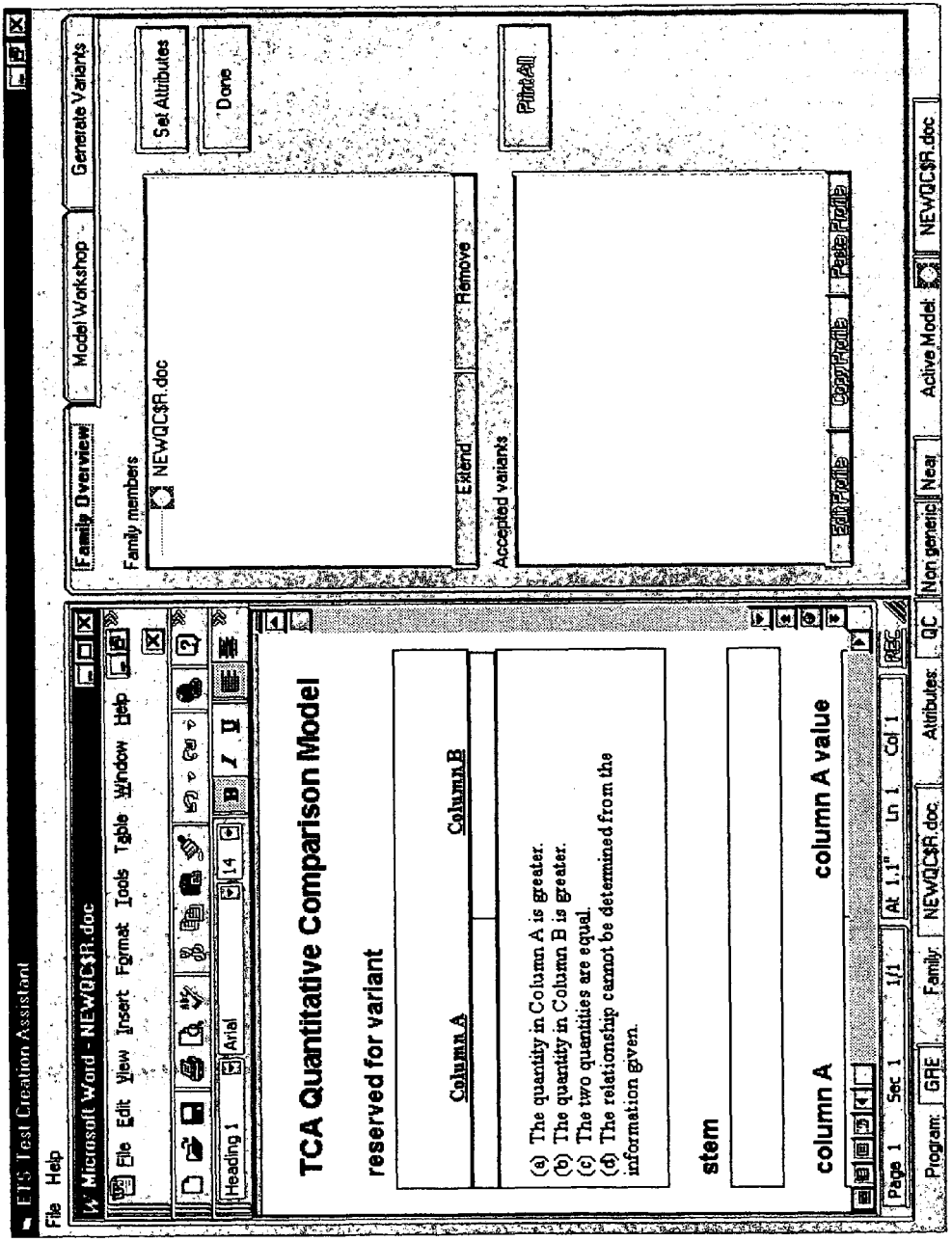
Figure 103:
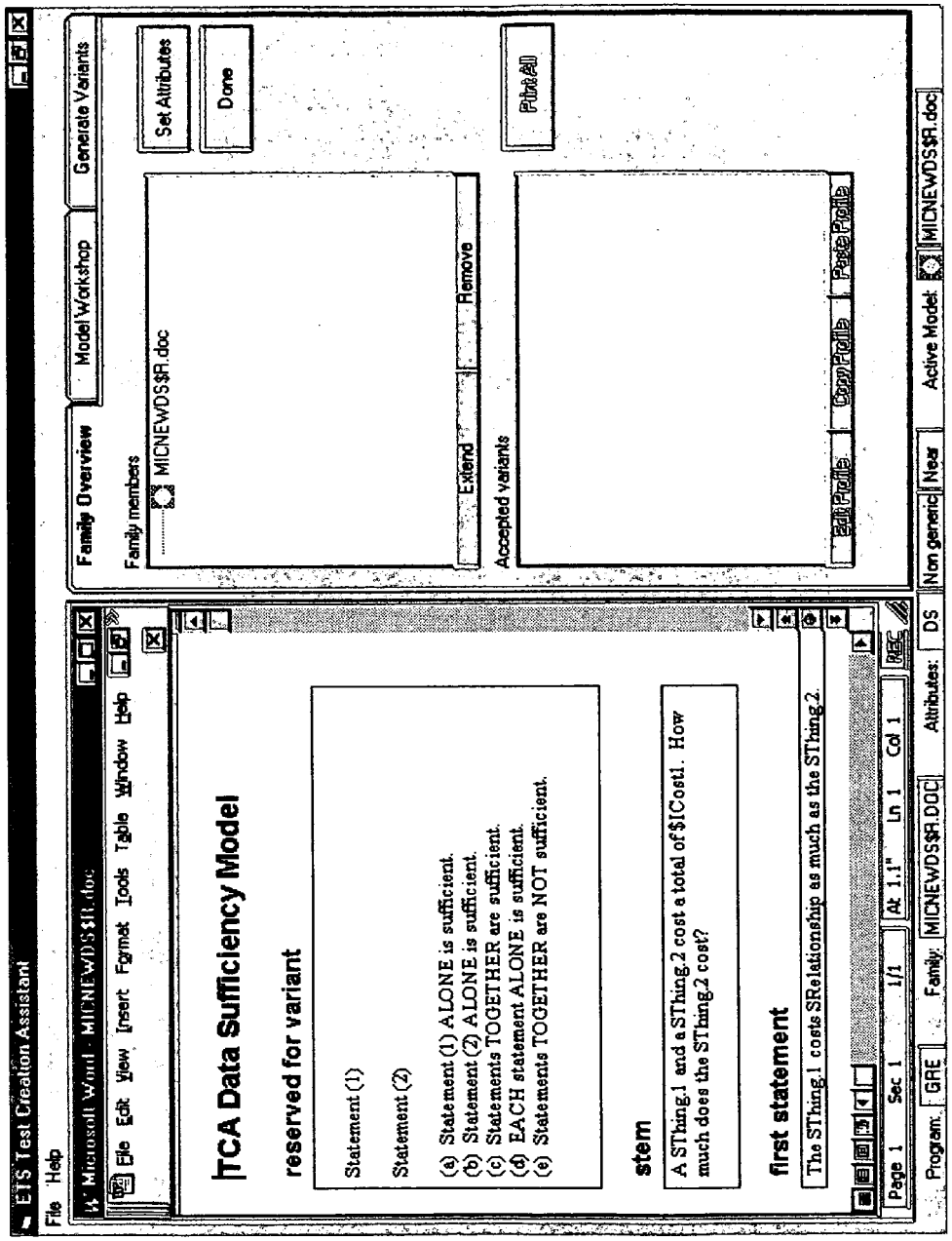
Figure 104:
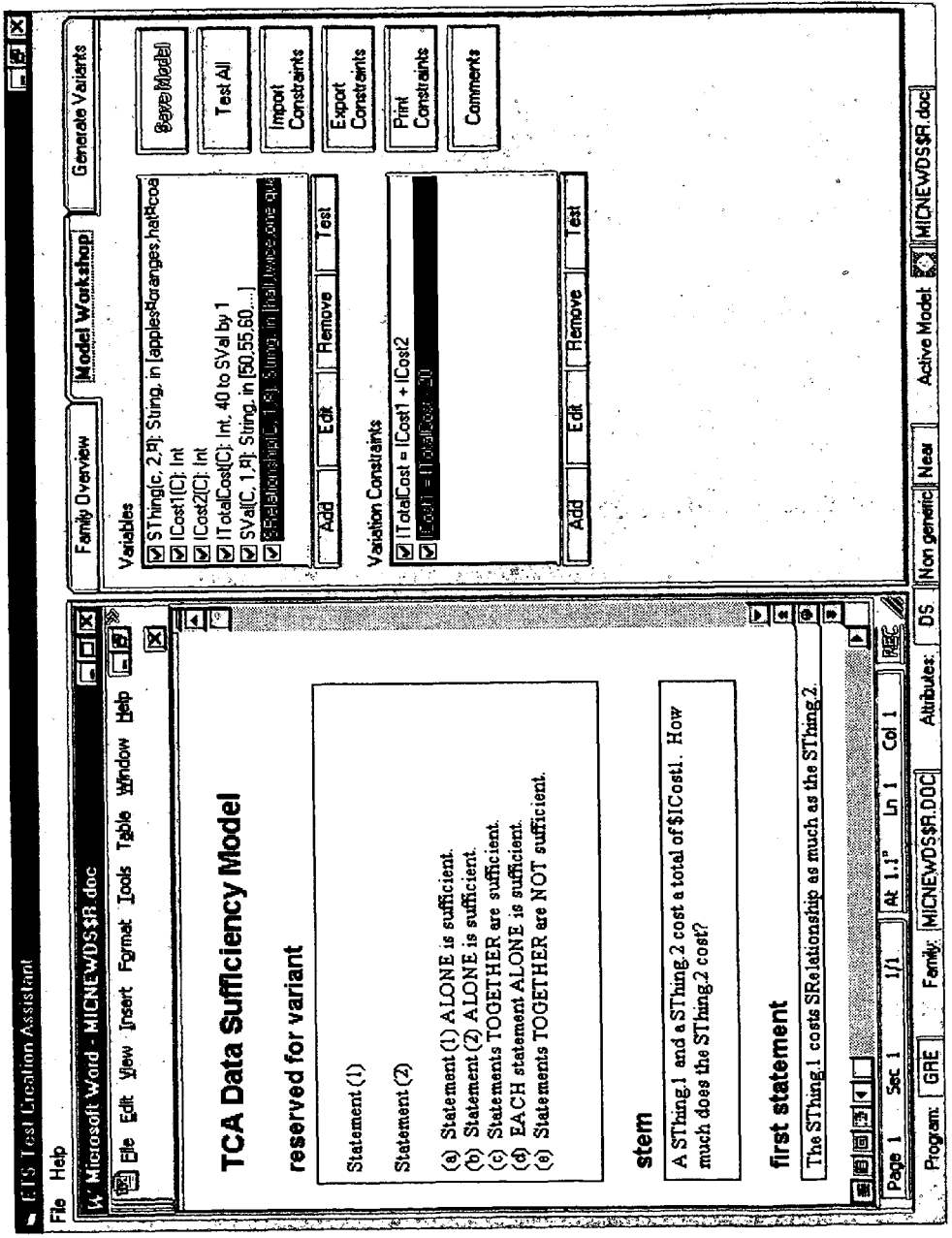
Figure 107:
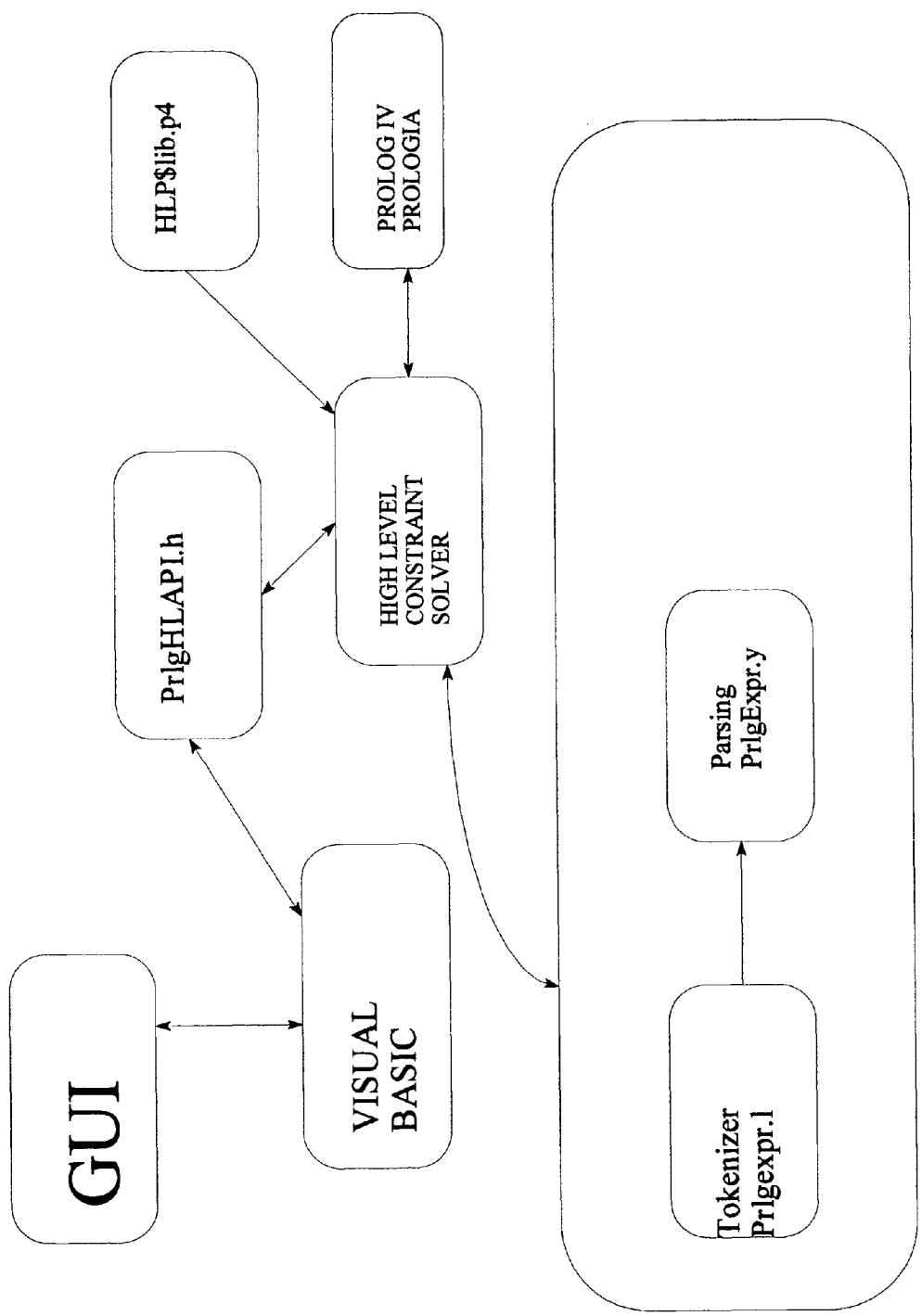

In the left part of the window in FIG. 5 appears the MICROSOFT WORD® document window with titles: "TCA Standard Multiple Choice Model", "reserved for variants", "stem", and "key". (Also present but not shown are the distractor titles and scratch pad, which can be seen in FIG. 6.) The first title will depend on the item type that the user chooses in the "New family properties" dialog box, see for example FIG. 3. The TCA Standard Multiple Choice Model Word template as printed out is shown in FIG. 6. When the user chooses Quantitative comparison, see FIG. 89, the result shown in FIG. 90 is the TCA Quantitative Comparison Model (see also FIG. 91), if Data Sufficiency is chosen the result shown in FIG. 103 is the TCA Data Sufficiency Model (see also FIG. 105).

In the right part of the window in FIG. 5 the "Family Overview" tab is highlighted. In "Family members" appears an icon with a "Sun" and the name of the variant family, chosen in FIG. 4, "NEWMC", and an extension "$R.doc". The "R" identifies the test item model as the root model, while the ".doc" identifies the file as a WORD document. The "Sun" icon indicates that the model is active, that is, an item model that has of yet not produce accepted variants and, therefore, is not blocked for future changes.

At the bottom of the "Family members" are two active buttons: "Extend" and "Remove". These buttons enable the user to extend or remove a variant family, respectively.

Figure 7:
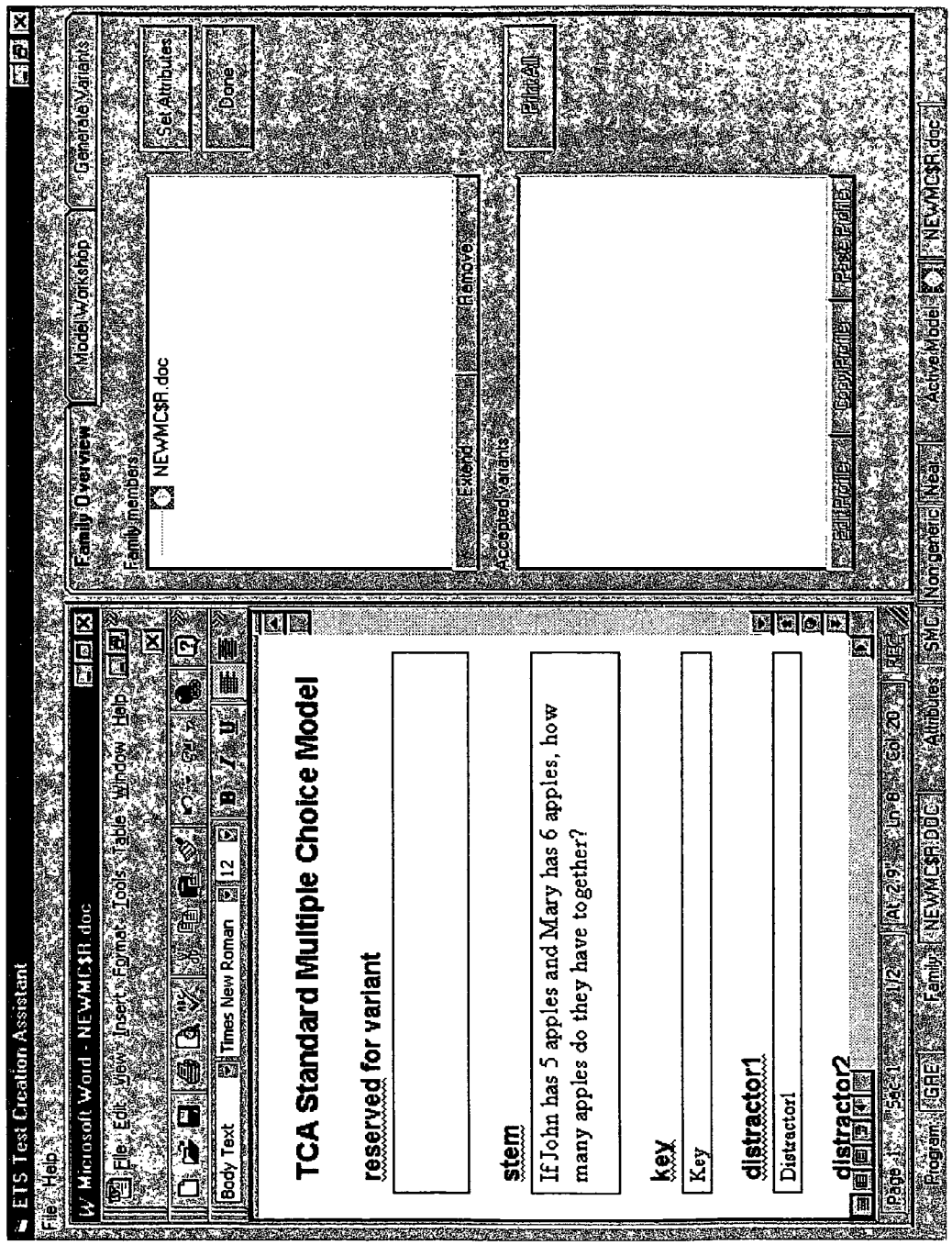
FIG. 7 shows the stem after the user has entered an initial test item.

Creating an item begins with making entries in the "stem" section of the TCA Standard Multiple Choice Model. This is preferably done in the "Model Workshop" environment, but may be started in the "Family Overview" environment as shown in FIG. 7. As shown in FIG. 7, the user entered the following initial test item.

If John has 5 apples and Mary has 6 apples, how many apples do they have together?

Creating a Test Item Model

The present invention provides for the automatic generation of test item variants. To do this the user builds a test item model. Both the John and Mary initial test item above and an existing model can form the basis for building a new test item model. A test item model, whatever its size, consists of "variables" and "constraints". A constraint is a statement specifying the relationships among the variables. A variable, in turn, indicates an item element that can take on more than one value. Variables are defined by the user in terms of type (integer, real, string, etc.) as well as the value range those variables can take on. Therefore, to build a new model the user needs to introduce some variables and define a set of constraints for those variables—the variabilizing process.

Defining Variables by Indicating Values the Variables can Take on

In accordance with one preferred embodiment of the present invention, there are three ways of starting the variabilizing process: direct entry of information related to the term to be variabilized, such as, name of variable, type, etc.; by pre-defining variables in the stem using a naming convention so that the system will automatically include the variable and its associated information in the "Variables" window; or by starting with existing test item models or their child models.

Defining Variables Directly in Variables Window

Figure 22:
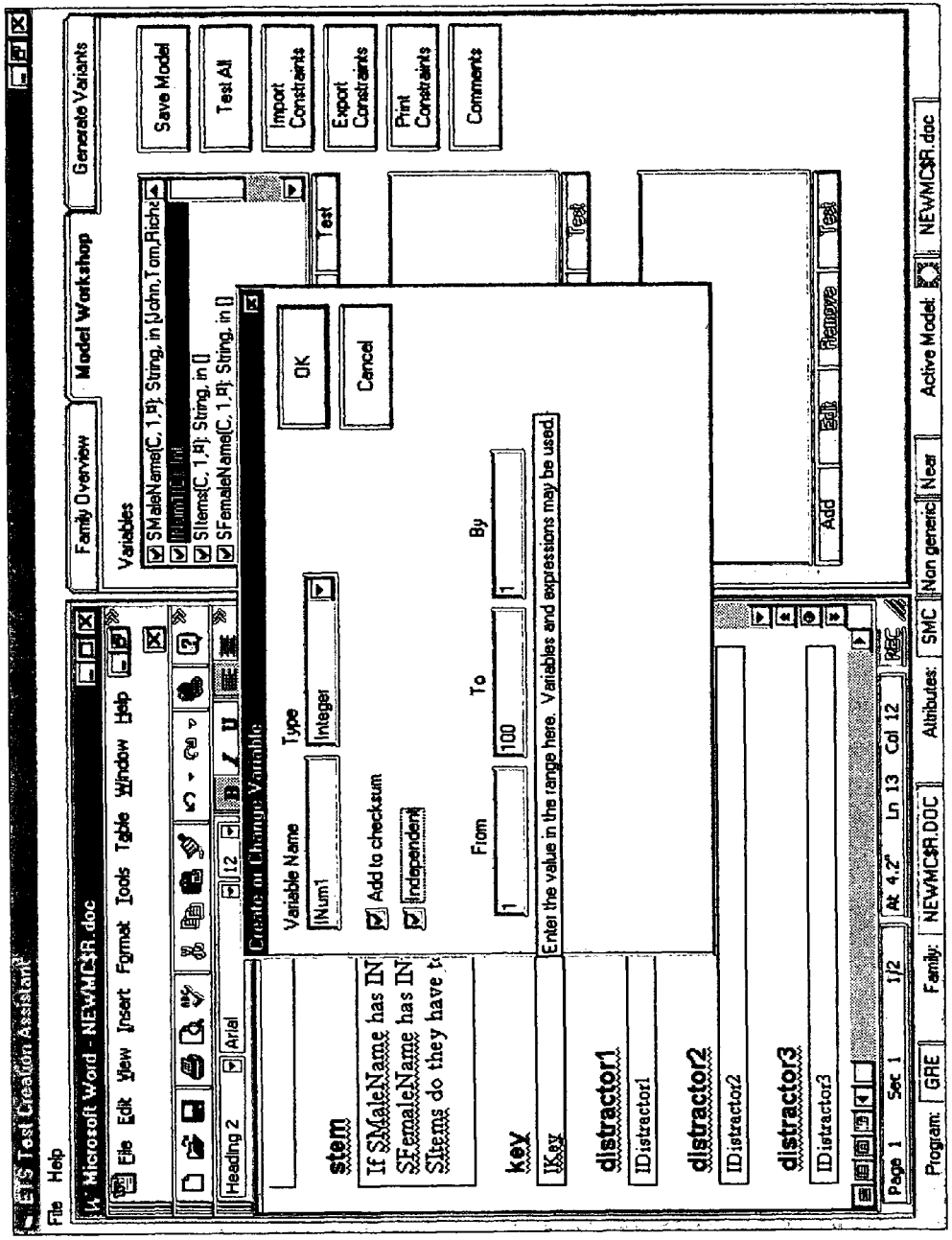

The first method is to go over to the Model Workshop tab, and under the "Variables window" in the Model Workshop click on "Add", a "Create or Change Variable" dialog box will open, similar to that shown in FIG. 22, except that the "Variable Name" box is empty and the user must type the name in himself/herself instead of having the system do it automatically as in the second method.

Variabilizing by Using Naming Convention and Highlighting

The second method is to rename those elements of the initial test item when in the stem in accordance with the naming convention disclosed below, highlight the text typed in the stem section, right click and chose variabilize, and the system will allow the user to automatically add all capitalized words which are highlighted.

Variable Naming Convention for Use in Auto-Defining Variables

When naming variables in the stem for use in auto-defining variables, one preferred embodiment of the present invention uses the following conventions. Names of the variables are made up of letters and digits; however the first character must be a letter. A string variable begins with an "S"; an integer variable begins with an "I"; a real variable begins with an "R"; a fraction begins with an "F"; and an untyped variable begins with an "U". A "String Variable" is a variable that does text substitutions, it does not involve mathematical operations. The system just searches and replaces one combination of letters, numbers, and/or symbols with another. For example, the text substitutions could be substituting a male name from a list of male names. On the other hand, the text substitutions could be as complex as substituting a model (with all its variables) from a list of models, etc. "Untyped variables" are any variables representing a list, a boolean, or whose type is not known at test-item design time. These variables need not be defined unless they are referenced in the stem or in the distractors. Related information can be found in the TCA CONSTRAINT LANGUAGE section below.

Identifying Elements of the Test Item to be Variabilized

Figure 8:
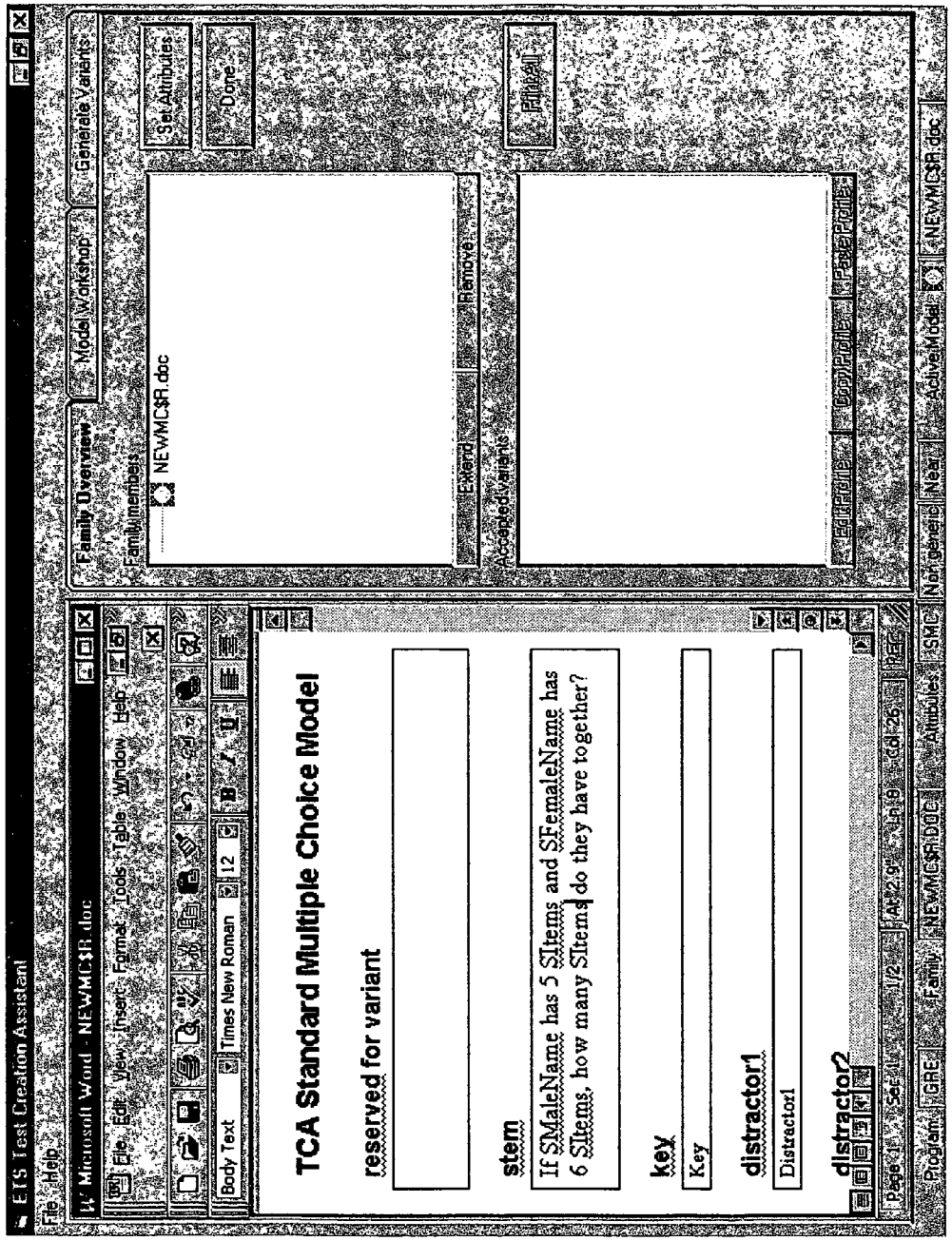
FIGS. 8 and 9 show one way to identify elements of the test item to be variabilized using a preferred naming convention.
Figure 9:
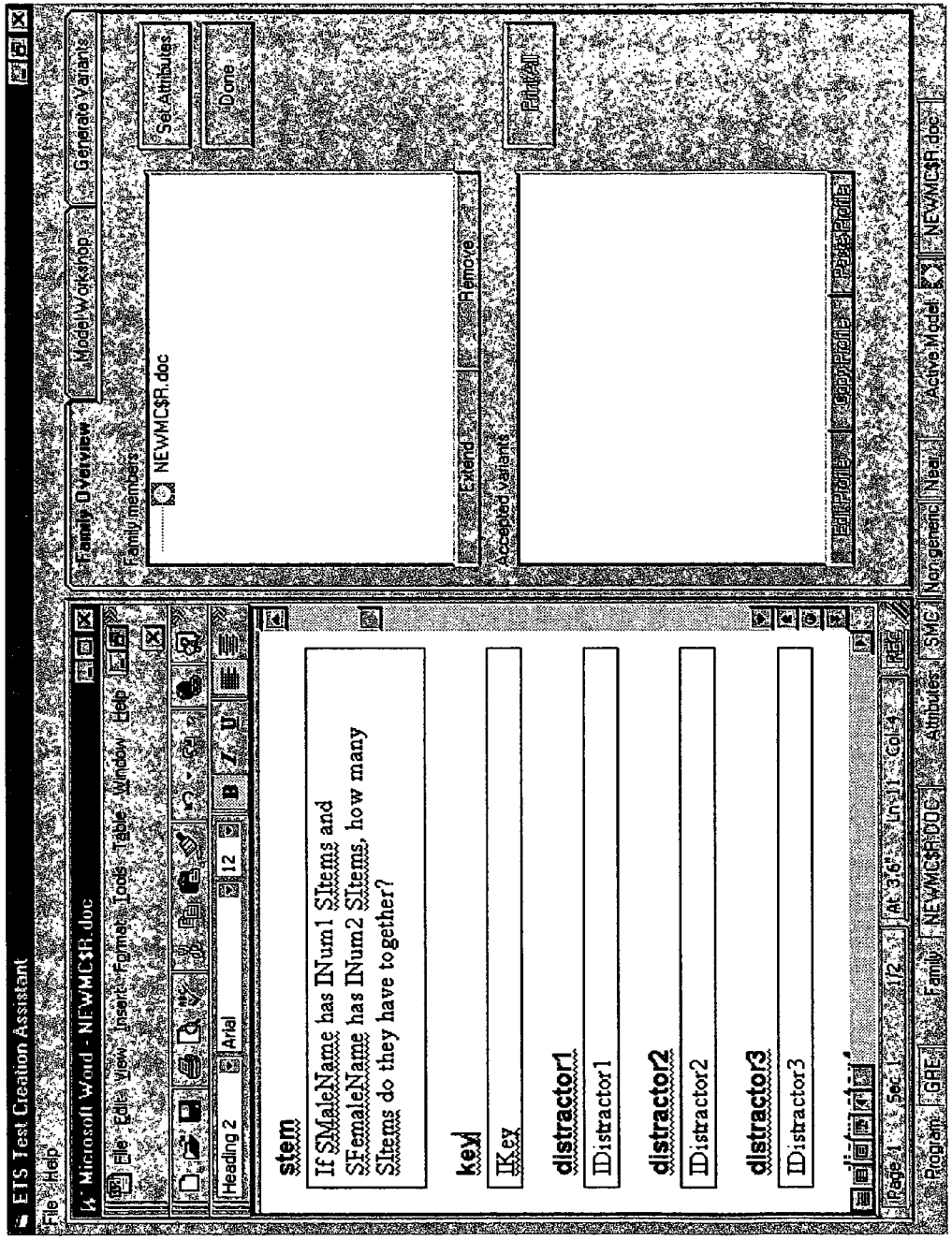

Using the naming conventions above, elements of the test item to be variabilized can be identified. The elements are identified by typing variable identifiers in place of the original test item element. An example of one such identification is shown in FIG. 8 and FIG. 9. The user changed John to "SMaleName" and Mary to "SFemaleName". The "S" indicating that the variable is a string variable. The user replaced the numbers 5 and 6 with "INum1" and "INum2", respectively. The "I" indicating that the variable is an integer. The user also replaced "apples" with "SItems", another string variable. So the stem portion has become:

"If SMaleName had INum1 SItems and SFemaleName had INum2 SItems, how many SItems would they have together?"

FIG. 9.

The user also changed the key from "Key" to "IKey" and all the distractors from "Distractor_" to "IDistractor_" because he/she is contemplating that all the solutions with be integers. FIG. 9.

Figure 10:
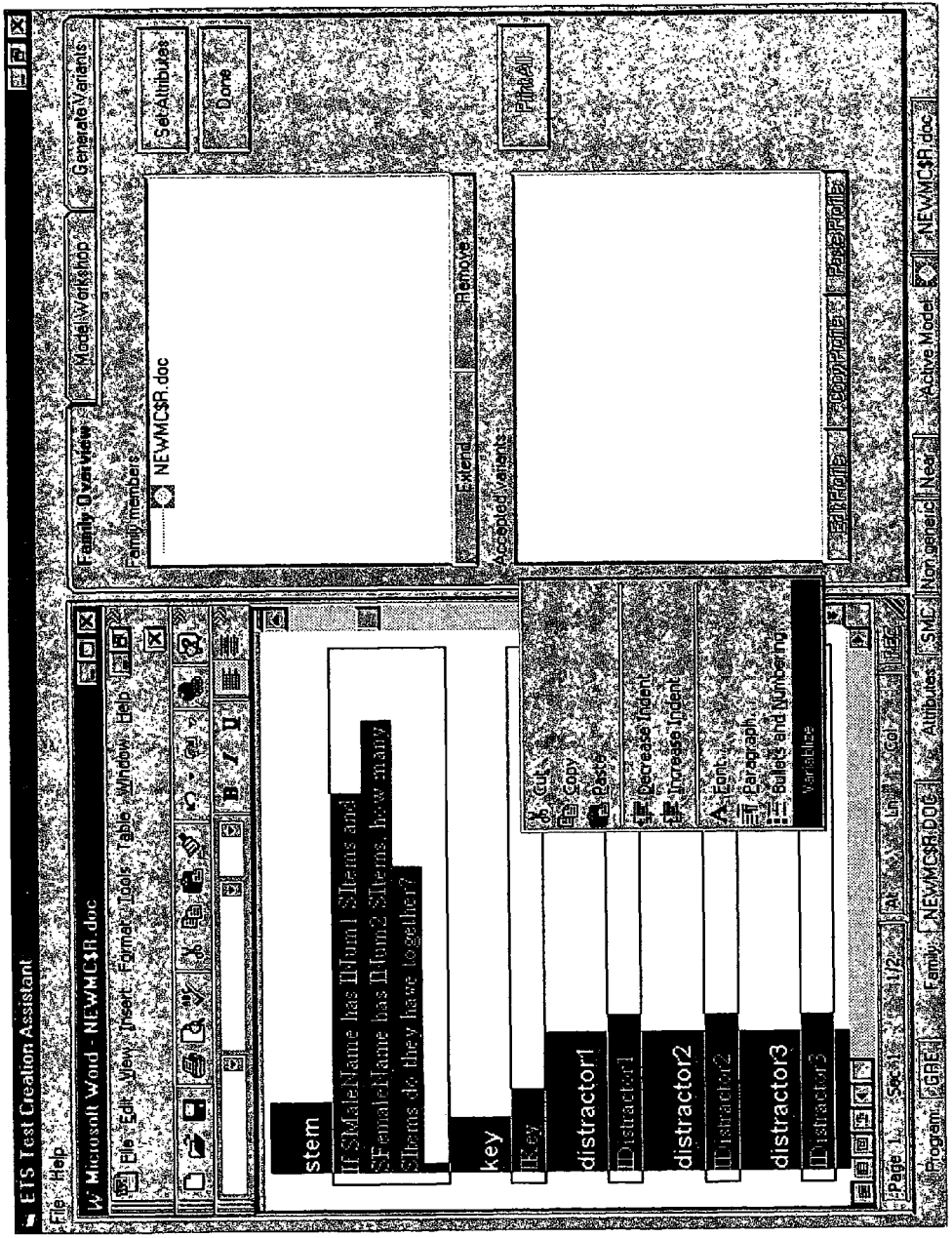
FIGS. 10-12 show a method for variabilizing and autodefining preidentified test item elements.
Figure 11:
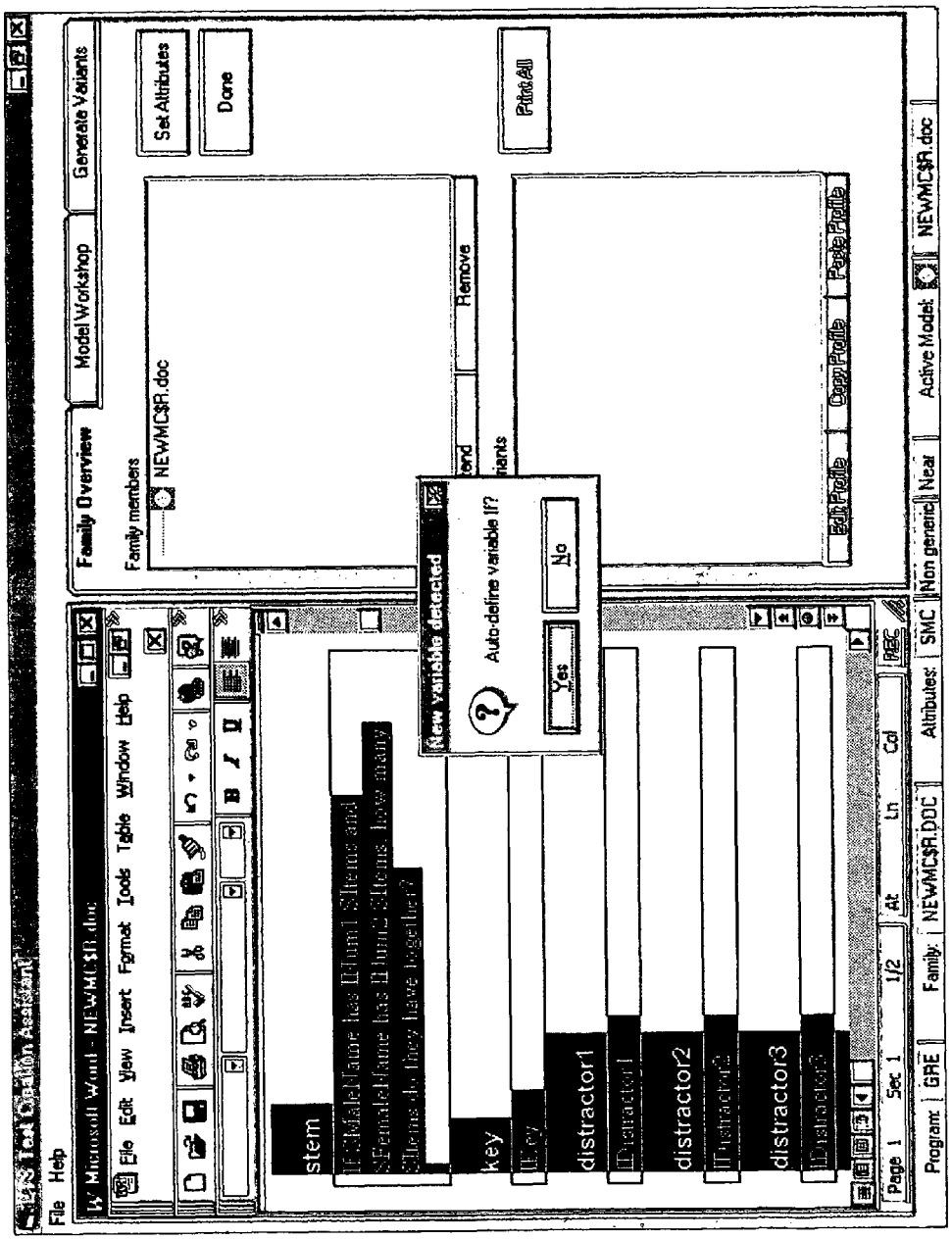

At this point, variables can be defined by highlighting the terms to be variabilized and then right clicking. FIG. 10. In the menu that appears, highlight and click "Variabilize". The result is shown in FIG. 11.

Figure 12:
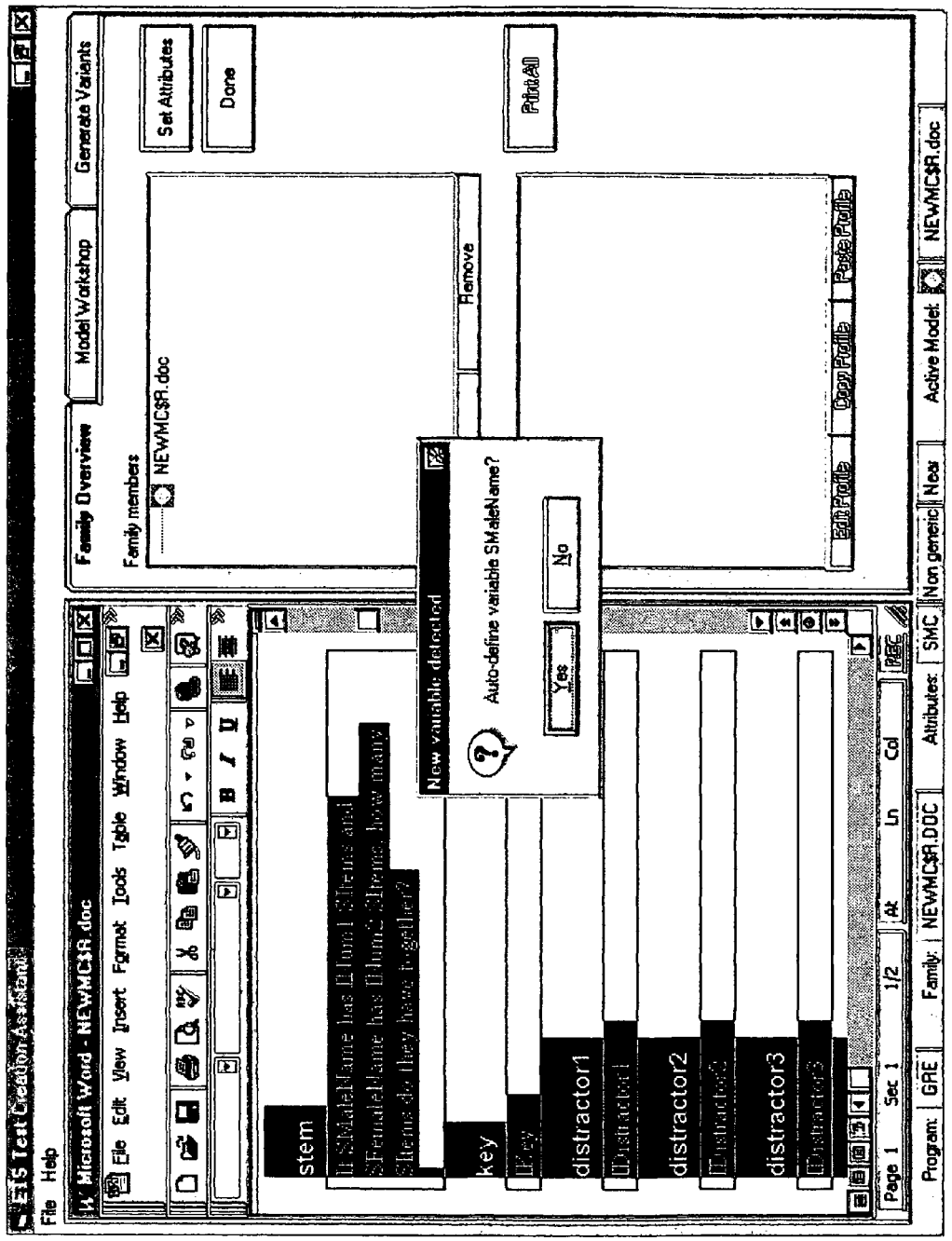
Figure 13:
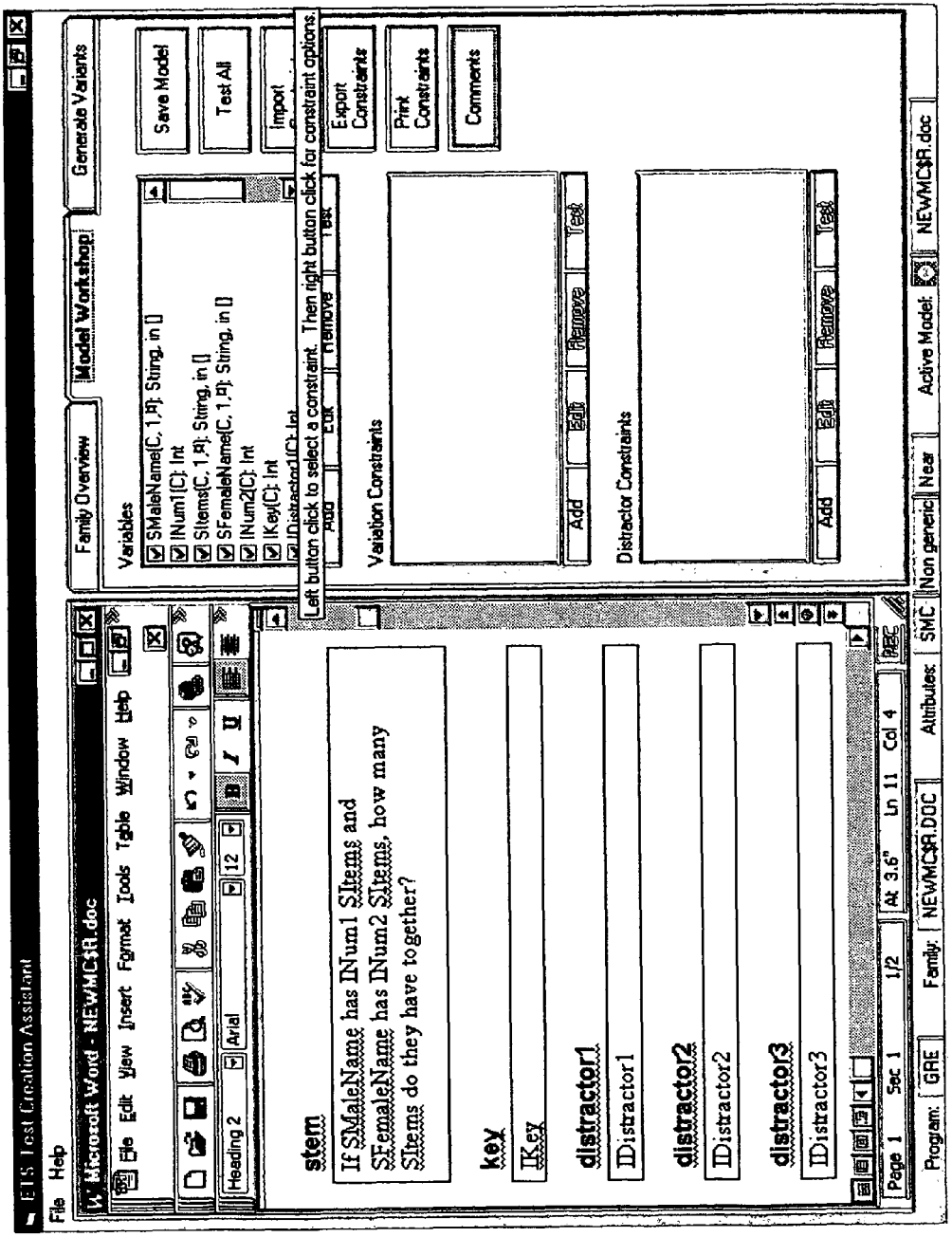
FIG. 13 shows the result of auto-defining the variables.

The "New variable detected" dialog box with words "Auto-define variable . . . ? appears. The system will try to auto-define any sequence of letters or digits that begins with a capital letter. The system asks the user whether the first word which is capitalized "If" should be auto-defined as a variable. The user should click on "No", which causes the system to address the next capitalized word "SMaleNames". FIG. 12. The result of clicking on "Yes" with respect to all words to be variabilized is to automatically classify the chosen terms in accordance with the naming convention. All chosen terms then appear in the "Variables" window as is shown in FIG. 13. Providing the user with additional information, not only do the names of the variables appear the "Variables" window, but also their characteristics. For example, string, integer, etc.

Variabilizing by Using Prior Unfrozen Models or Children Thereof

The third method is to chose an existing unfrozen model or child model and edit the existing variables and constraints in the Model Workshop. This is an important advantage of the preferred embodiment of the present invention, as it permits the reuse of prior test item models. If the model is frozen, it can still be used by extending the model and having the system create a "child" model of it; if the model is unfrozen, it can be used or, again, the system can create a "child" model of it. In either case, the "Variables" window, as well as other "constraint" windows, in the Model Workshop are populated with variabilized terms, ready for modifying through the editing process. See, FIG. 55-FIG. 57, FIG. 71-FIG. 77, and FIG. 81.

Editing String Variables

At this point, all the selected variables appear in the "Variables" window. Next the variables must be constrained by assigning values or expressions to them. One way of doing this, is to select a particular variable by making a left mouse button click on the chosen variable, then right clicking, which brings up the menu shown in FIG. 14. The user selects "Edit" so as to begin the process of providing constraints to the possible values or expressions the selected variable can assume. However, as can be readily seen from FIG. 14, the system also permits the user to perform other useful functions at this stage.

Figure 14:
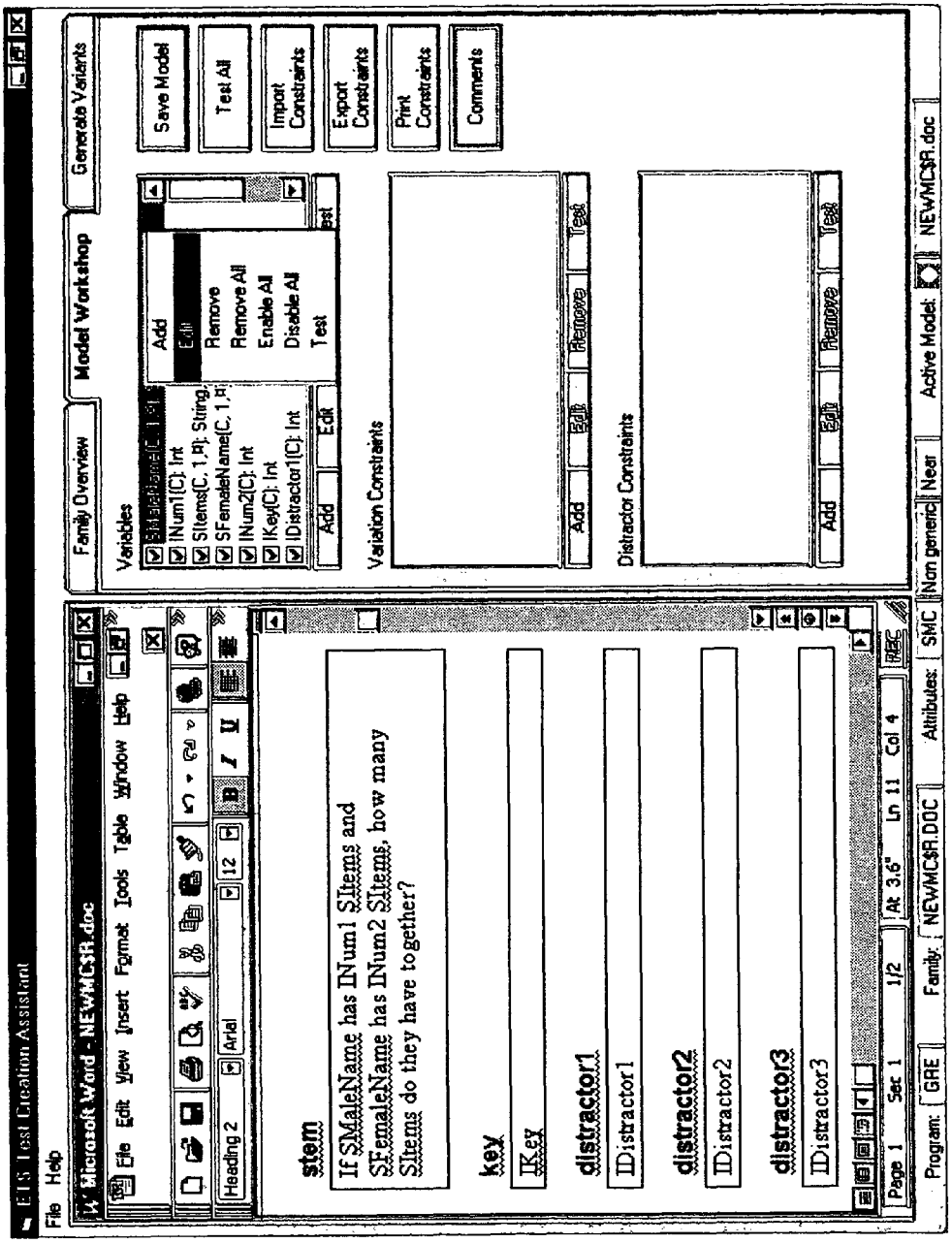
FIGS. 14-18 and 24-26 show how string variables may be edited in accordance with a preferred embodiment of the invention.
Figure 15:
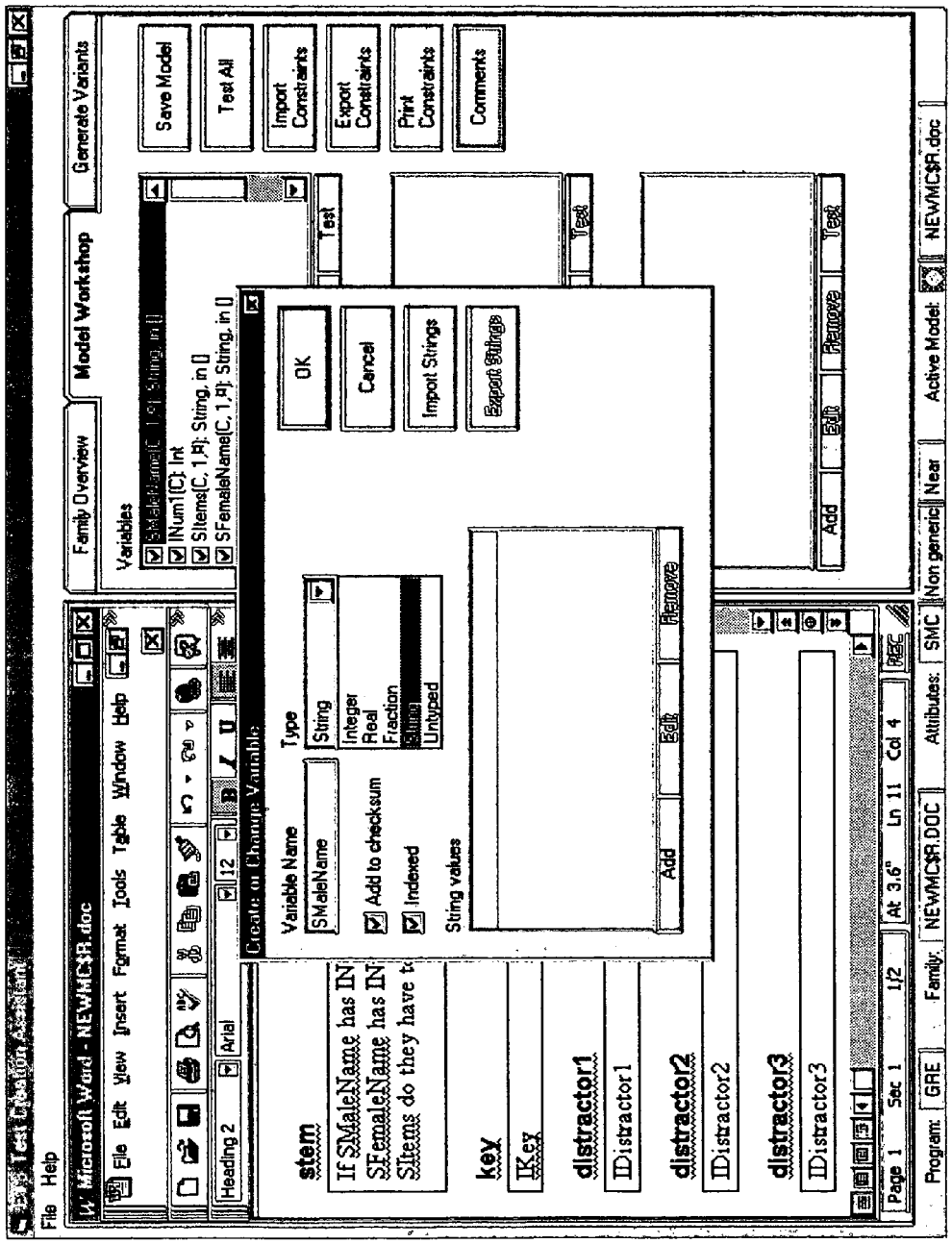

Selecting "Edit" in FIG. 14 brings up the "Create or Change Variable" dialog box of FIG. 15. In accordance with the naming convention, as implemented via the auto-define variabilizing function of the present invention, and as was indicated in the "Variables" window, the variable "SMaleName" in the "Create or Change Variable" dialog box has been classified as a "String" type variable. SMaleName will be a male name selected from a list. The user may at this point, change the variable type, notwithstanding the naming convention, by highlighting and clicking on any of the other types listed in the "Type" menu of the "Create or Change Variable" dialog box of FIG. 15.

In this preferred embodiment, "Add to checksum" and "Indexed" boxes are selected by default. Selecting the checksum option helps ensure that a value of a variable will be unique; that is, if you want to make sure that all the male names will be different. The "Indexed" option enables the user to assign a particular order to list SmaleName. FIG. 15.

Figure 16:
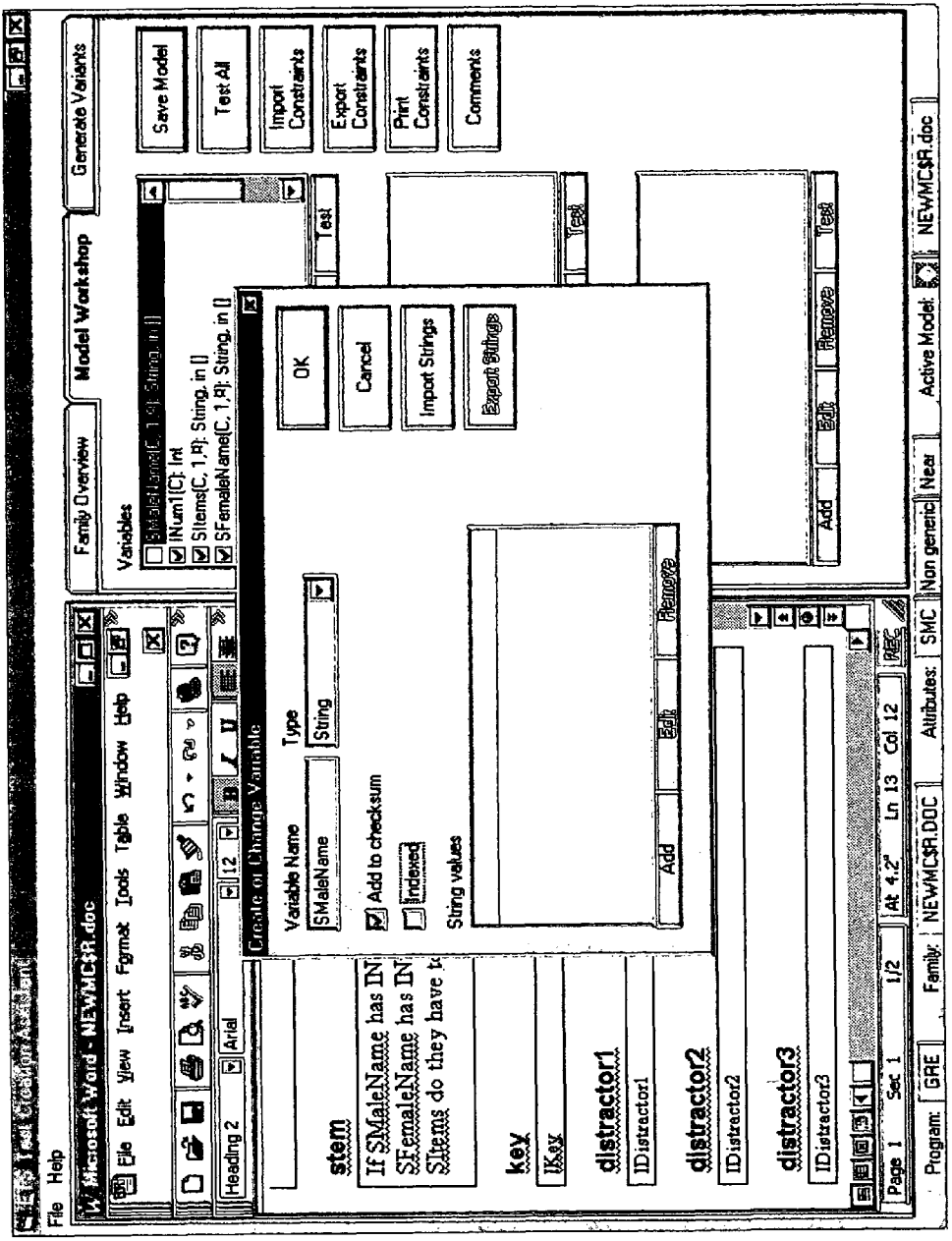

Indexing is particular to Strings. Using indexing, if the user has an item where the stem reads "a lawyer asked his paralegal to call the client", and he/she wanted that to change in some other variant to "a doctor asked his nurse to call a patient". The user would never want to use "lawyer" and "patient" or "nurse" together, or "doctor" and "client" or "paralegal" together. Those three things need to stay together in the items and indexing permits the user to ensure that they do. The user can build sub-strings, so instead of just having String values like John or Mary, the user can have value subsets; for example, where lawyer, paralegal, client always go together and doctor, nurse, patient always go together. As shown in FIG. 16, the user has de-selected "Indexed" and left the remaining options alone.

Creating and Importing String Values

Next the user must provide the available String values and the present invention provides several ways of doing that. One way is simply to click on the "Add" button in FIG. 16. Actually, in this preferred embodiment, everything on the icon bar of the "Create or Change Variable" dialog box of FIG. 15 (and for that matter everything on most of the other icon bars) can also be replicated with a right button click.

Another useful feature of this embodiment is the ability to save the male name String values (or any other list of String values) for subsequent use with different models. The "Exporting Strings" feature is used to save the list and then the "Importing Strings" feature is used to automatically populate the String values of the variable in the new model. Both ways are discussed below.

Using the "Add" Button

Figure 17:
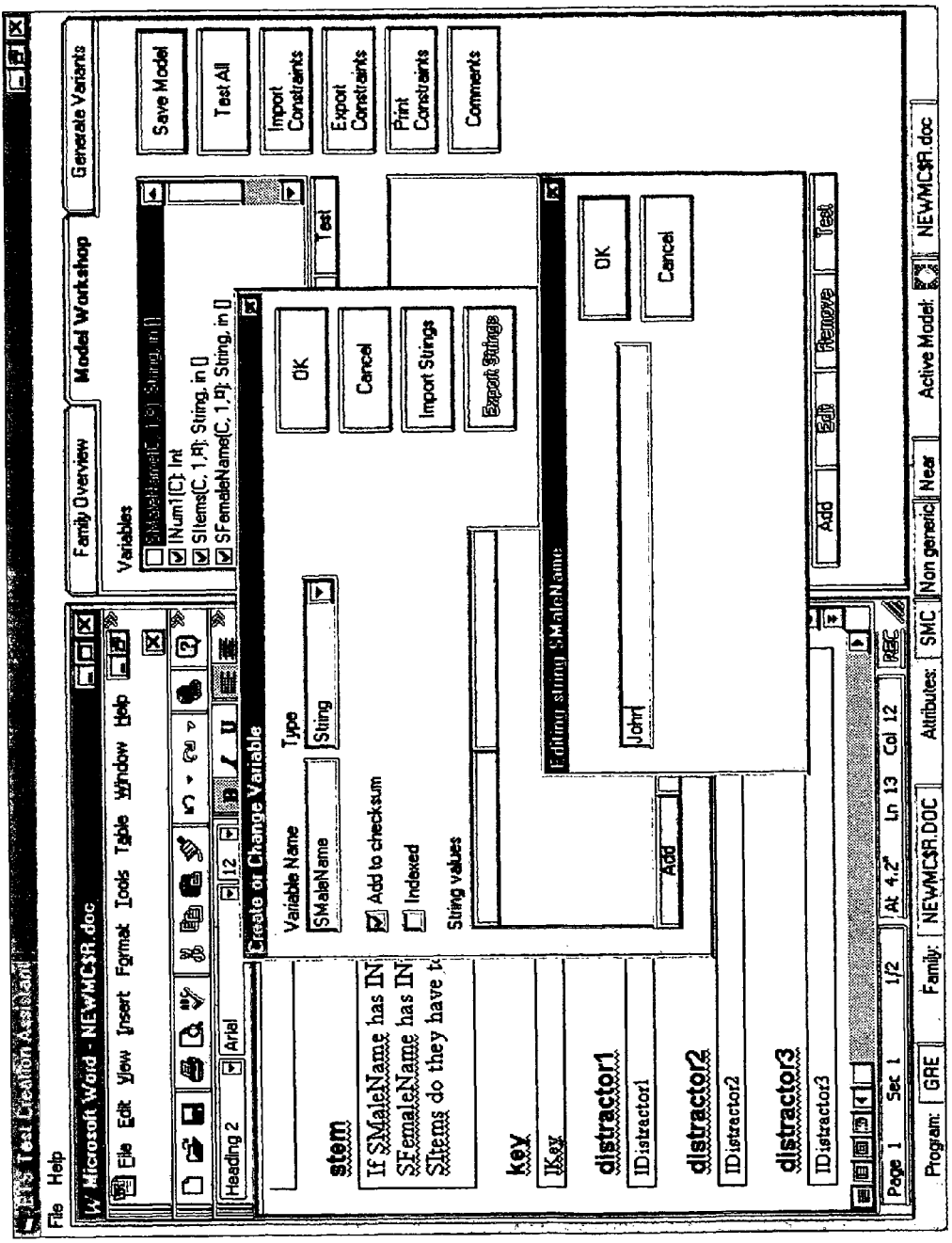
Figure 18:
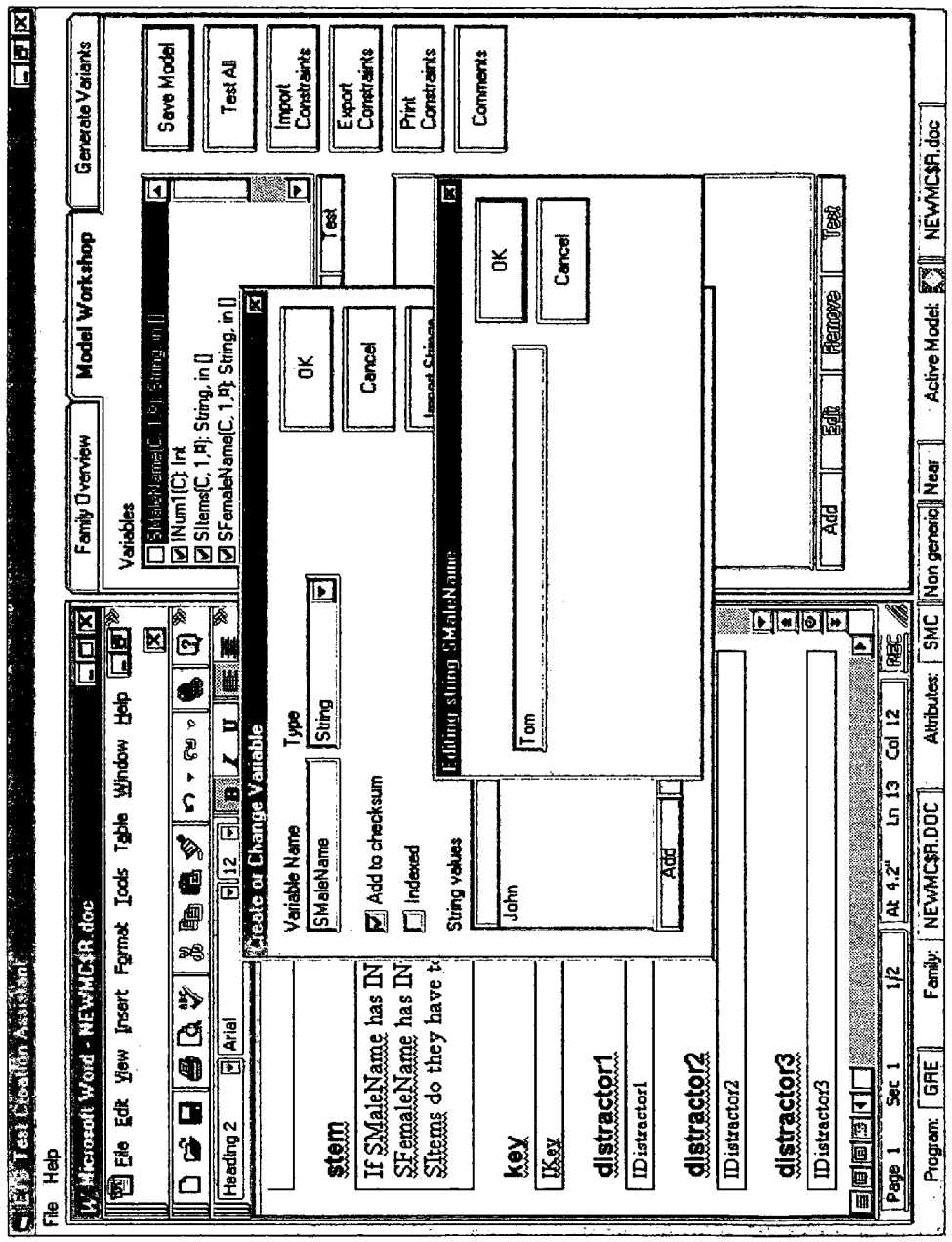
Figure 19:
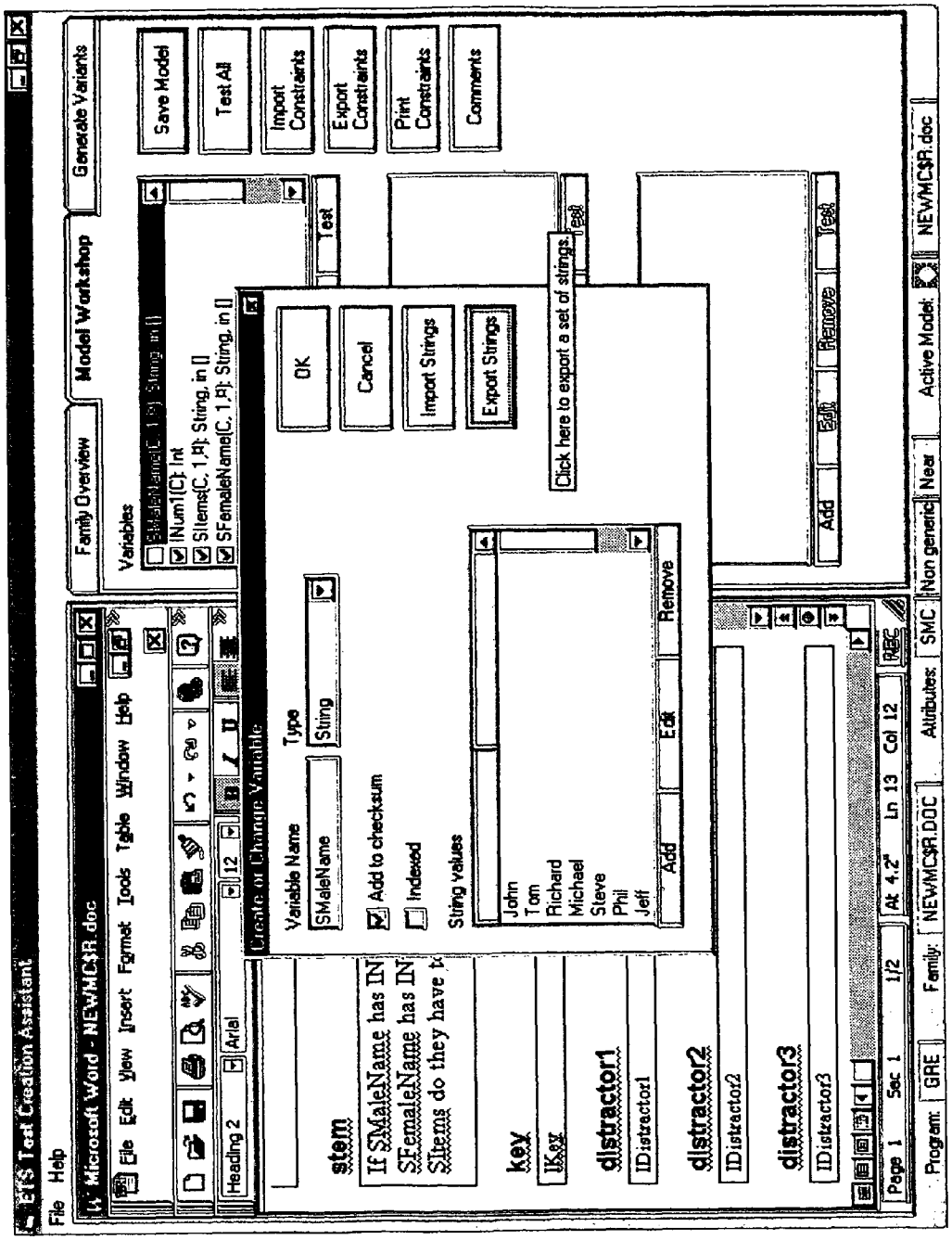
FIGS. 19-20 show how string variables may be exported to a file for later use in accordance with a preferred embodiment of the invention.

Click on the "Add" button in the "Create or Change Variable" dialog box shown in FIG. 16 and the system provides the user with a new dialog box: "Edit string SMaleName". FIG. 17. The user then enters a name, for example John, and then clicks "OK". This procedure is repeated, this time with the String value equal to Tom. FIG. 18. After several more male name String values are inputted the result looks like FIG. 19, where the list of male names String values all appear, not surprisingly, in the "String values" window. The "Edit" button may be used to edit existing string values.

Using the "Export Strings" and "Import String" Buttons

Figure 20:
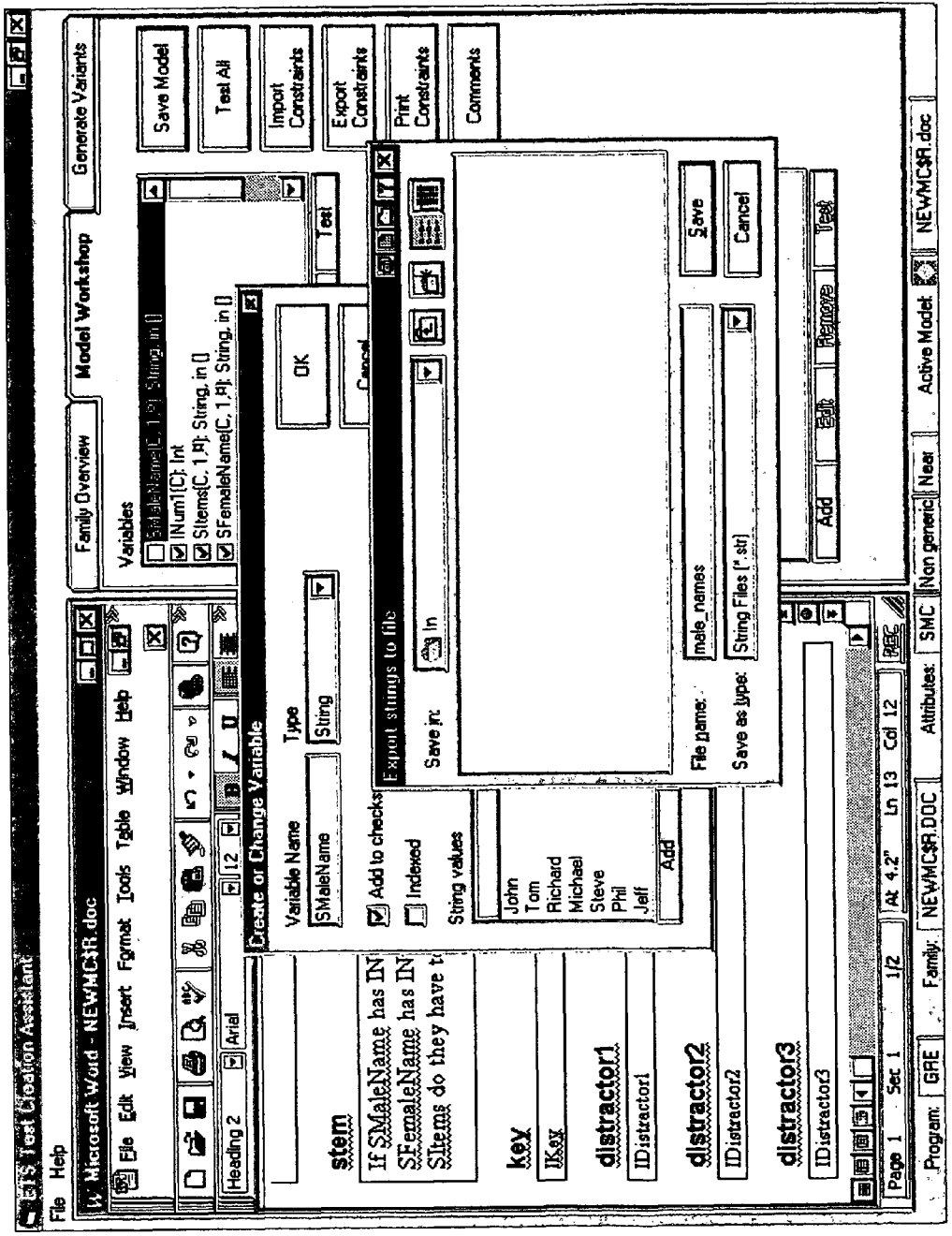

The user can utilize the "Export Strings" function to save this particular list of String values for reuse with another model. The user clicks on the "Export Strings" button shown in FIG. 19 resulting in the "Export string to file" dialog box appearing. The user can then name the file the String values will be saved in (e.g., "male_names") and save the file by clicking on the "Save" button in FIG. 20.

In this preferred embodiment, the file is saved into the directory "TCS/TCA/In. The saved Strings can be shared with other users. If the user needs "male_names" String values, all he/she needs to do is use the "Import Strings" button (e.g., in FIG. 16) and choose the appropriate String file found in the resulting dialog box.

Figure 24:
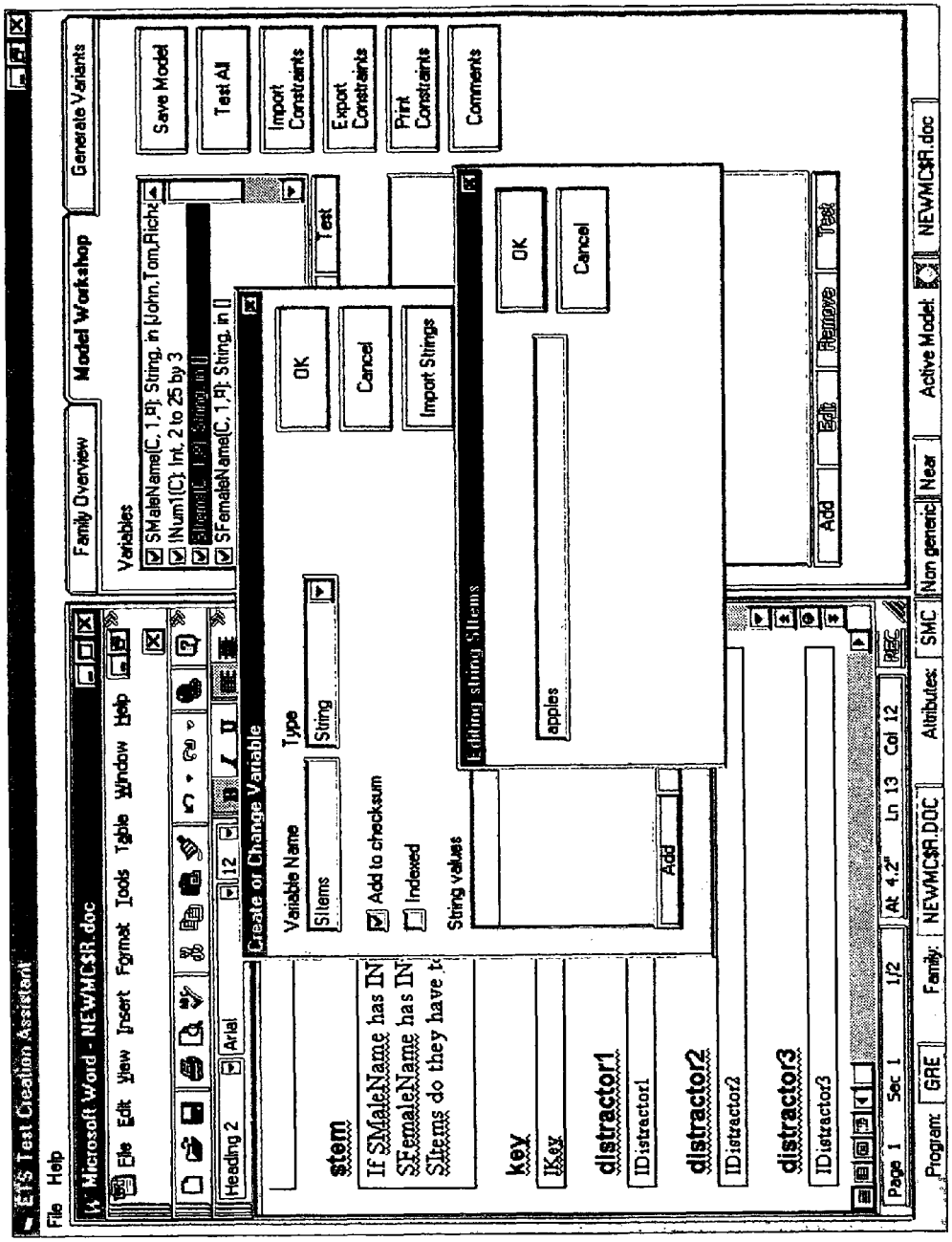
Figure 25:
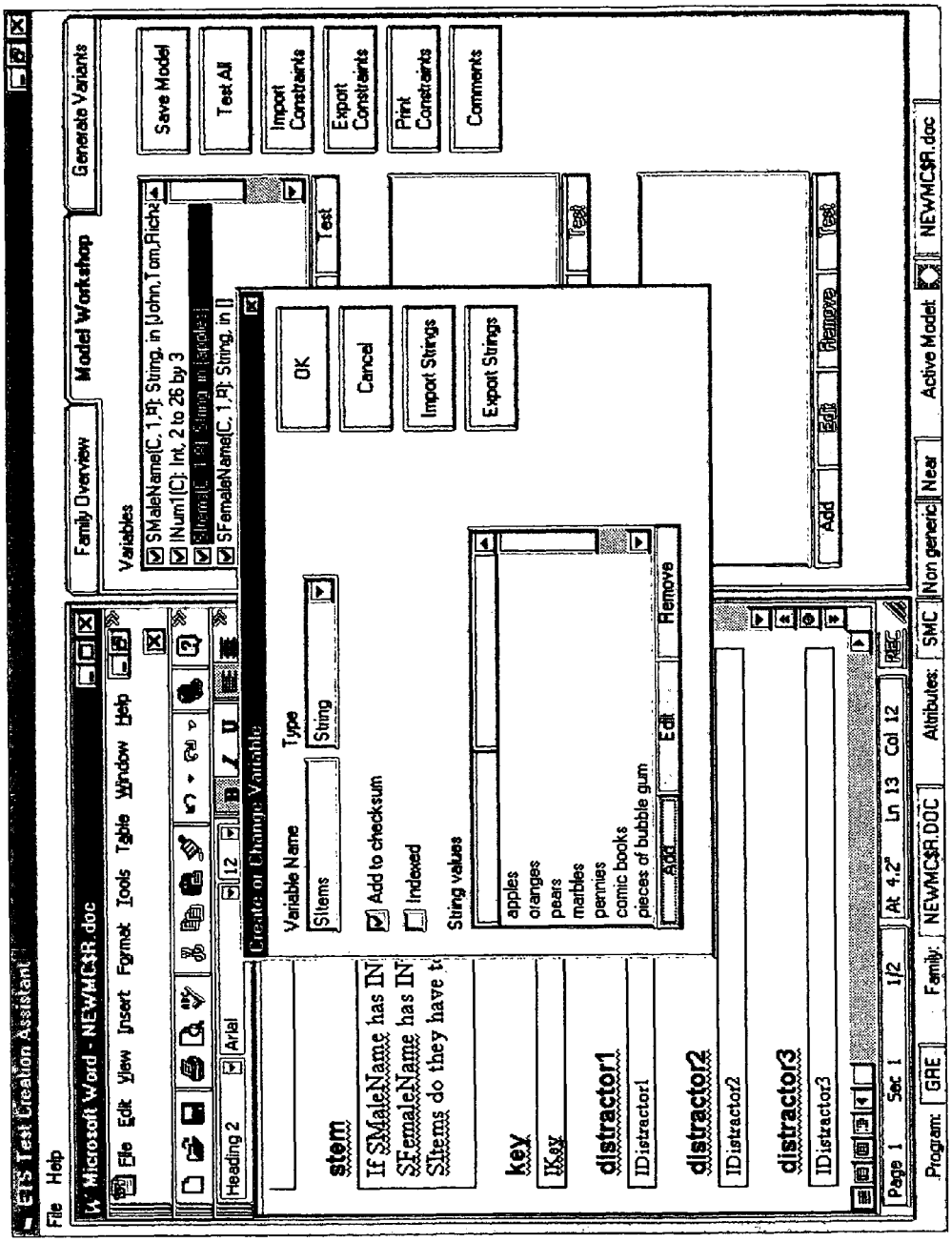
Figure 26:
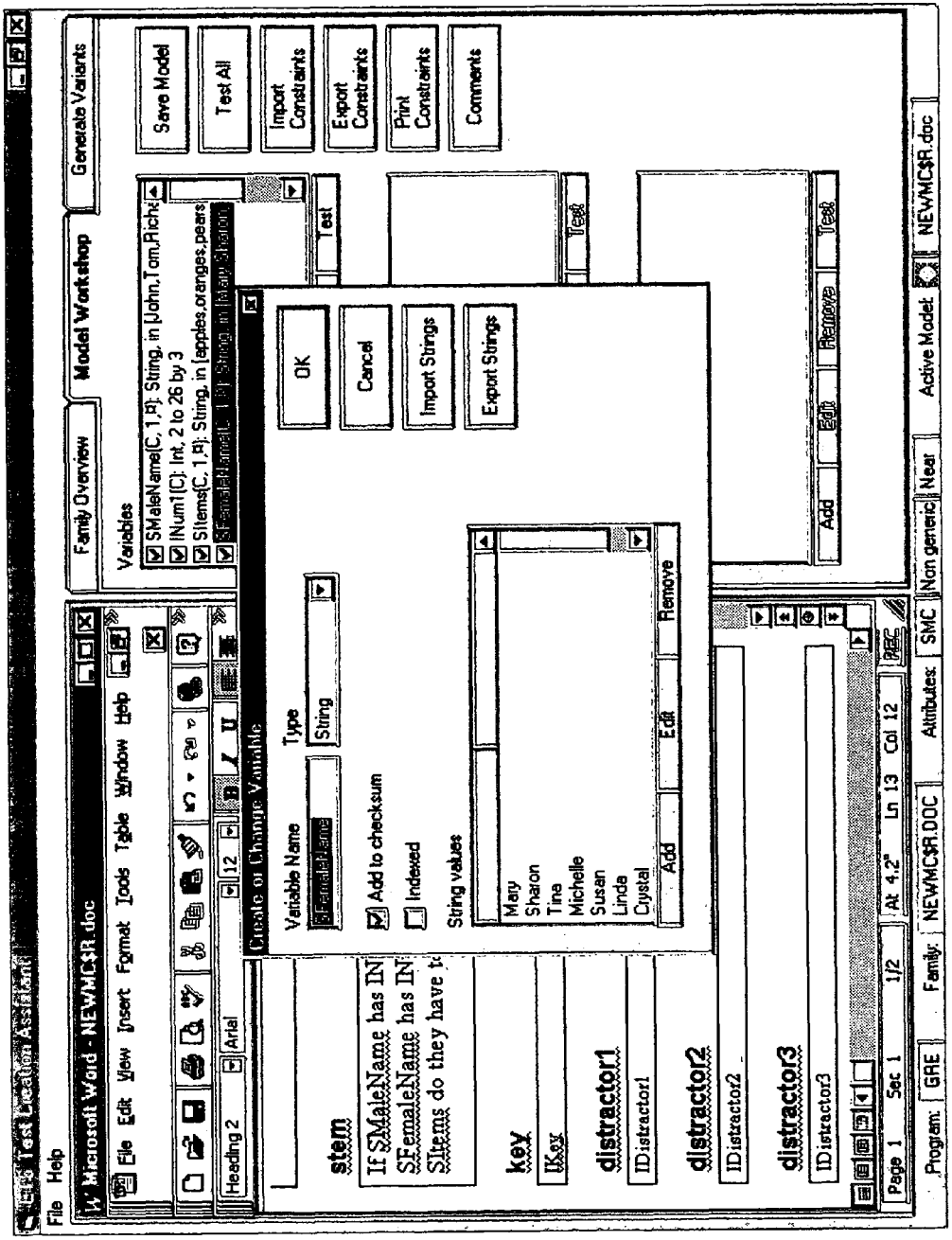

FIGS. 24 through 26 show parts of the above process for providing the String values for the String variables "SItems" and "SFemaleName".

Editing Integer Variables

Figure 21:
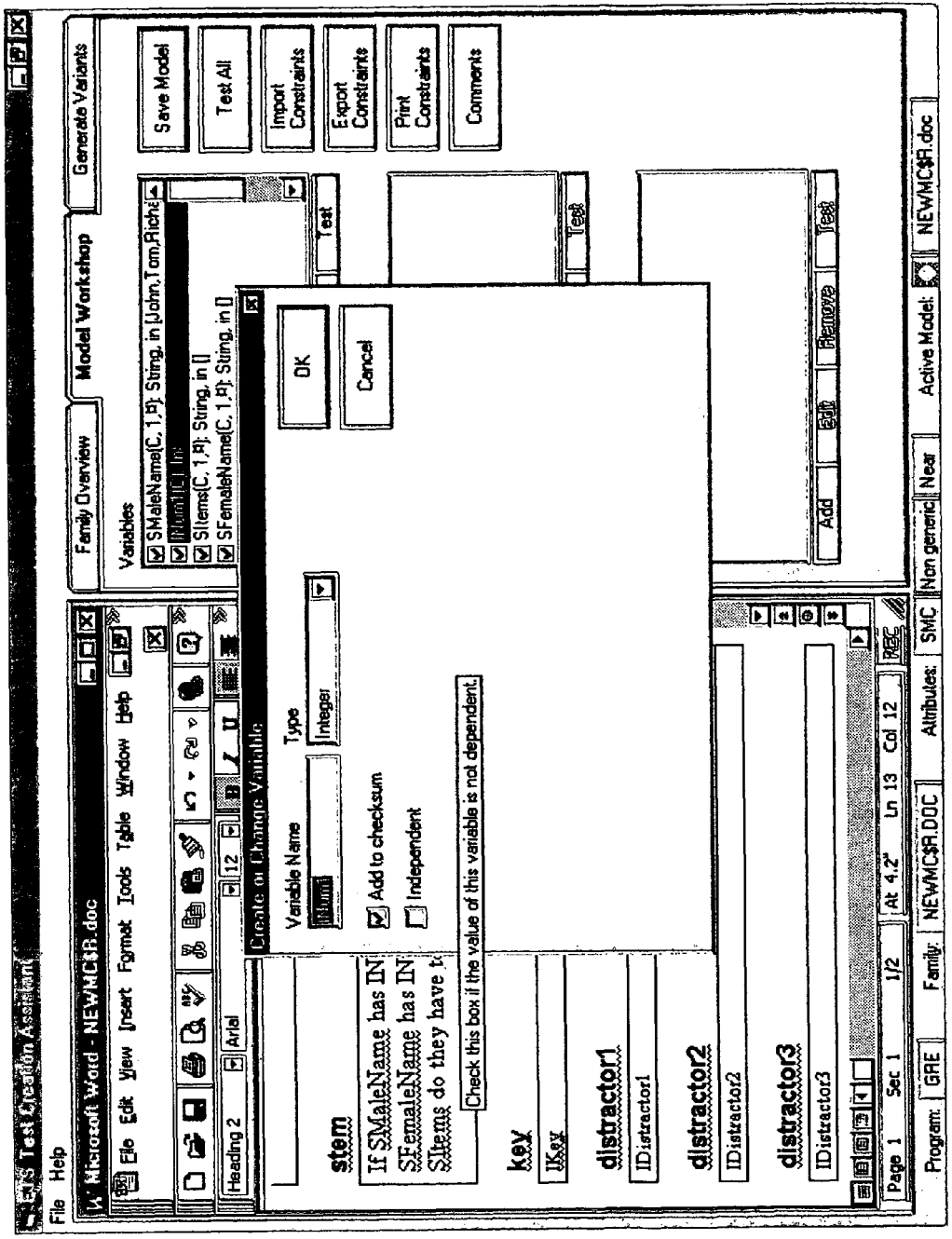
FIGS. 21-23 and 27-29 show how integer variables may be edited in accordance with a preferred embodiment of the invention.

Select INum1 in the Variables window by making a left mouse button click on INum1 and then make a right mouse button click to open the options menu and "Edit". Once again the "Create or Change Variable" dialog box will appear. FIG. 21. In accordance with the naming convention and the auto-define variables function, "INum1" has been assigned the type "Integer". In the dialog box of FIG. 21 can be found the "Add to checksum" box discussed with respect to String variables and a new box entitled "Independent". FIG. 21. Checking the "Independent" box ensures that the value of the variable will fall into the range of values defined for that variable. If an independent variable (e.g., INum1 in FIG. 22) is not assigned a value in a constraint, a value from the defined range of values (shown in the FROM/TO/BY windows) is chosen at random. If an independent variable (e.g., INum1 in FIG. 22) is assigned a value in a constraint (e.g., "INum1=/= INum2" (FIG. 49)), the value chosen for the independent variable will still fall within the defined range of values (shown in the FROM/TO/BY windows) chosen at random, but the actual value chosen for the variable will also be required to satisfy the constraint.

Figure 23:
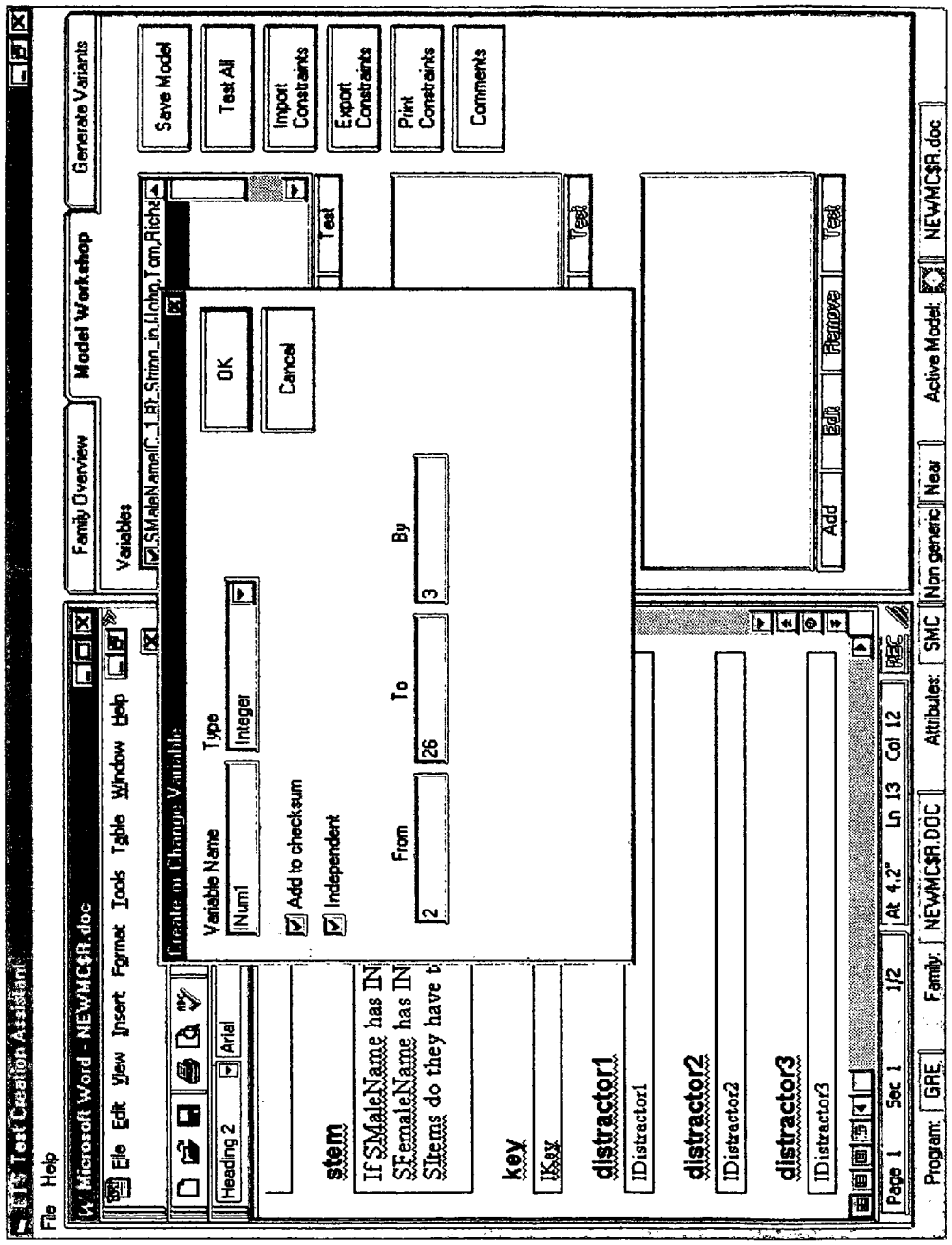

When "Independent" is checked a default range of from 1 (its lowest value) to 100 (it largest value) by 1 (or in increments of 1) appears. That is, at this point, INum1 can have the following values: 1, 2, 3, . . . , 100. FIG. 22. As shown in FIG. 23, the range has been change to from 2 to 26 by 3, and therefore variable INum1 can have the following values: 2, 5, 8, . . . , 26.

Figure 27:
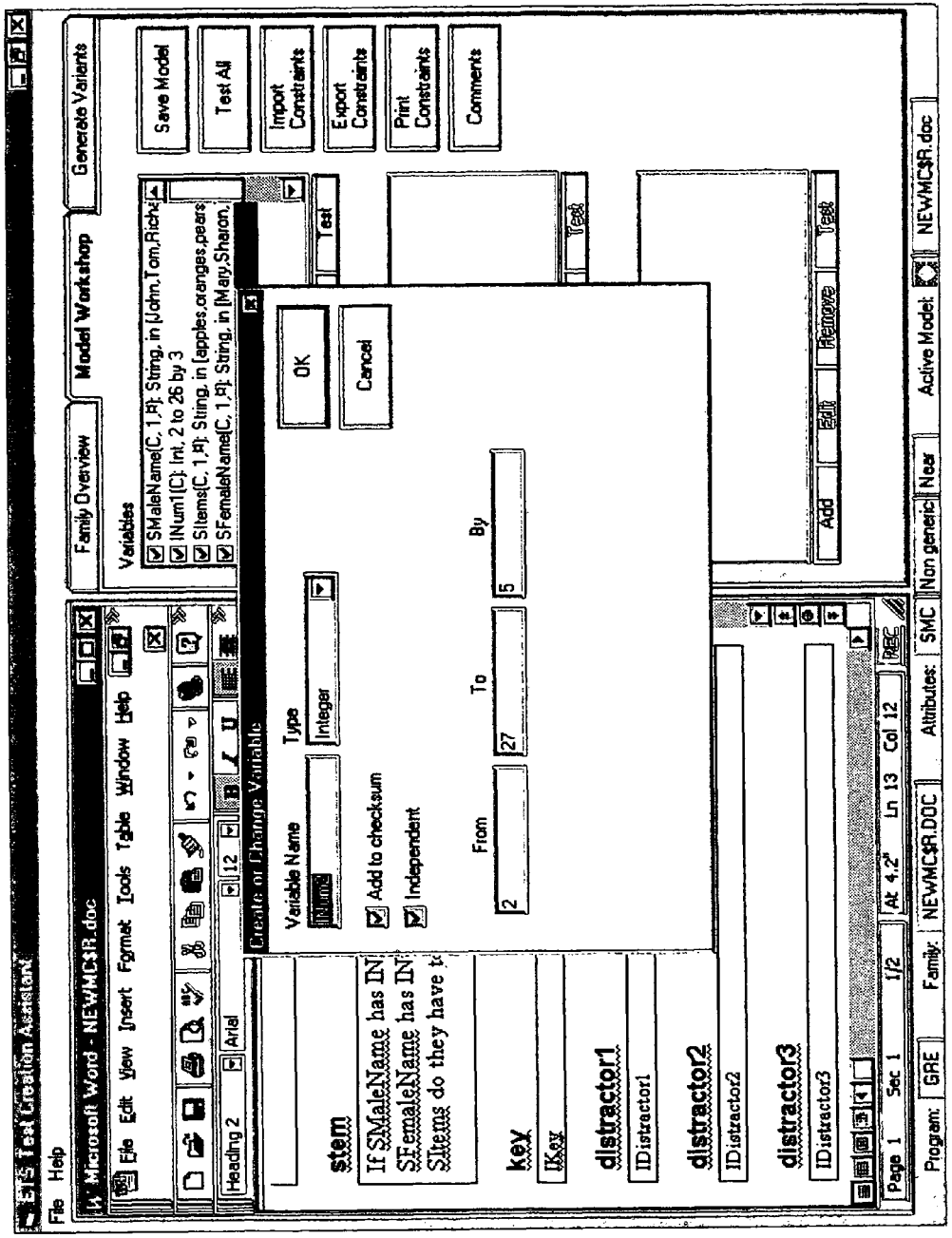
Figure 28:
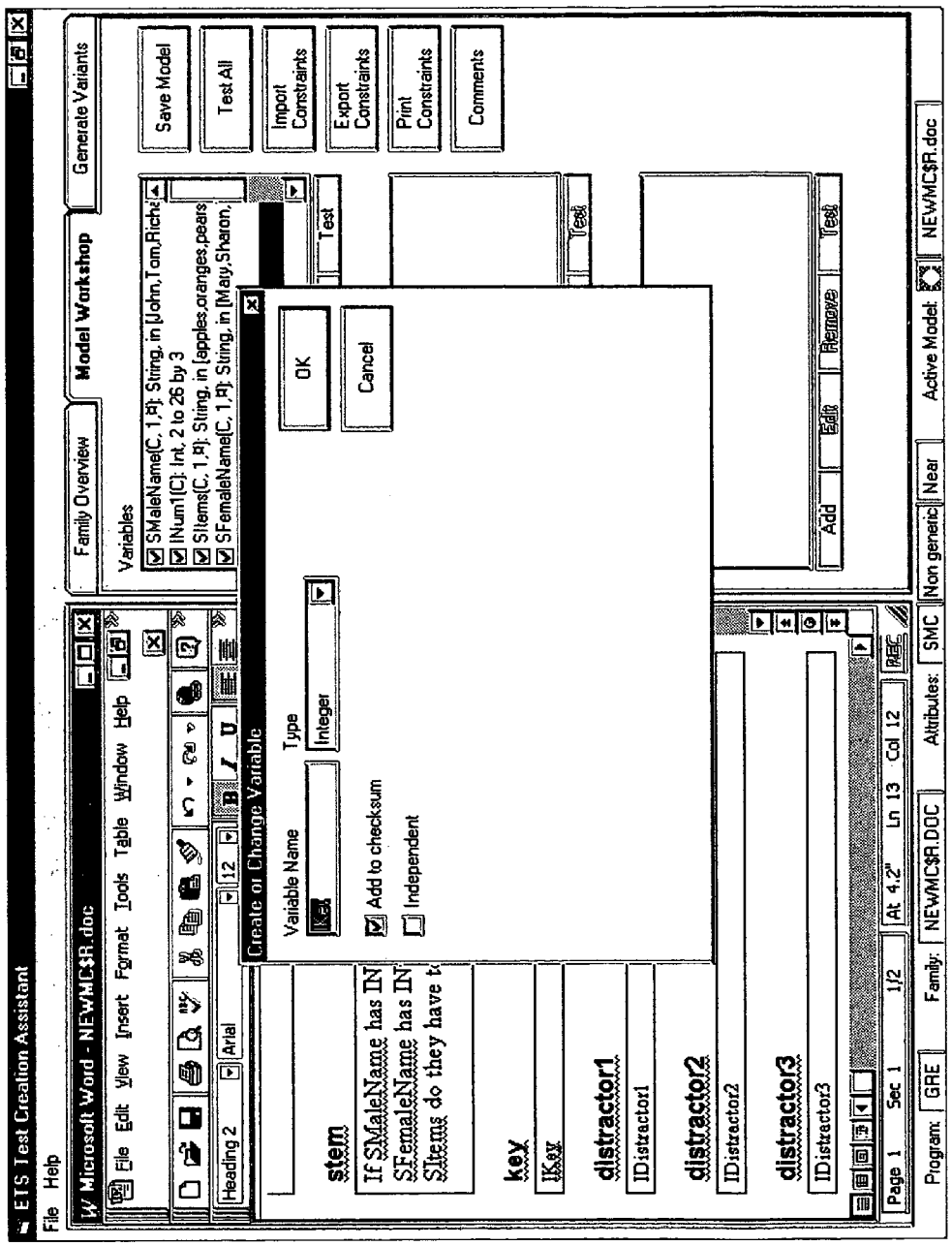
Figure 29:
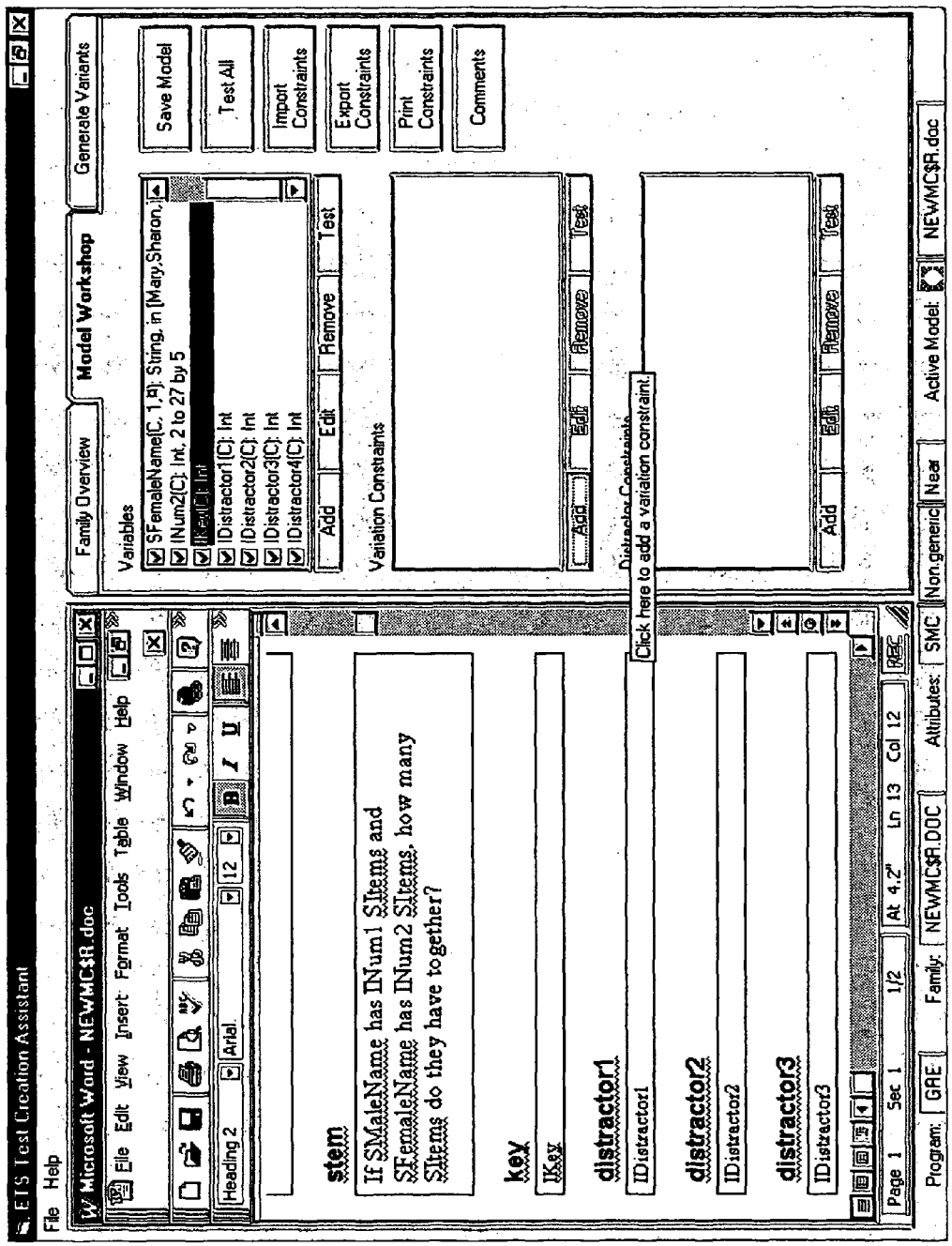

In a like manner, the range of values of independent integer "INum2" has been chosen by the user to be 2 to 27 by 5. FIG. 27. Finally, as IKey represents the answer, the user leaves the "Independent" box unchecked as its value will depend upon the values of the variables. FIGS. 28 and 29.

Specifying the Constraints

Figure 30:
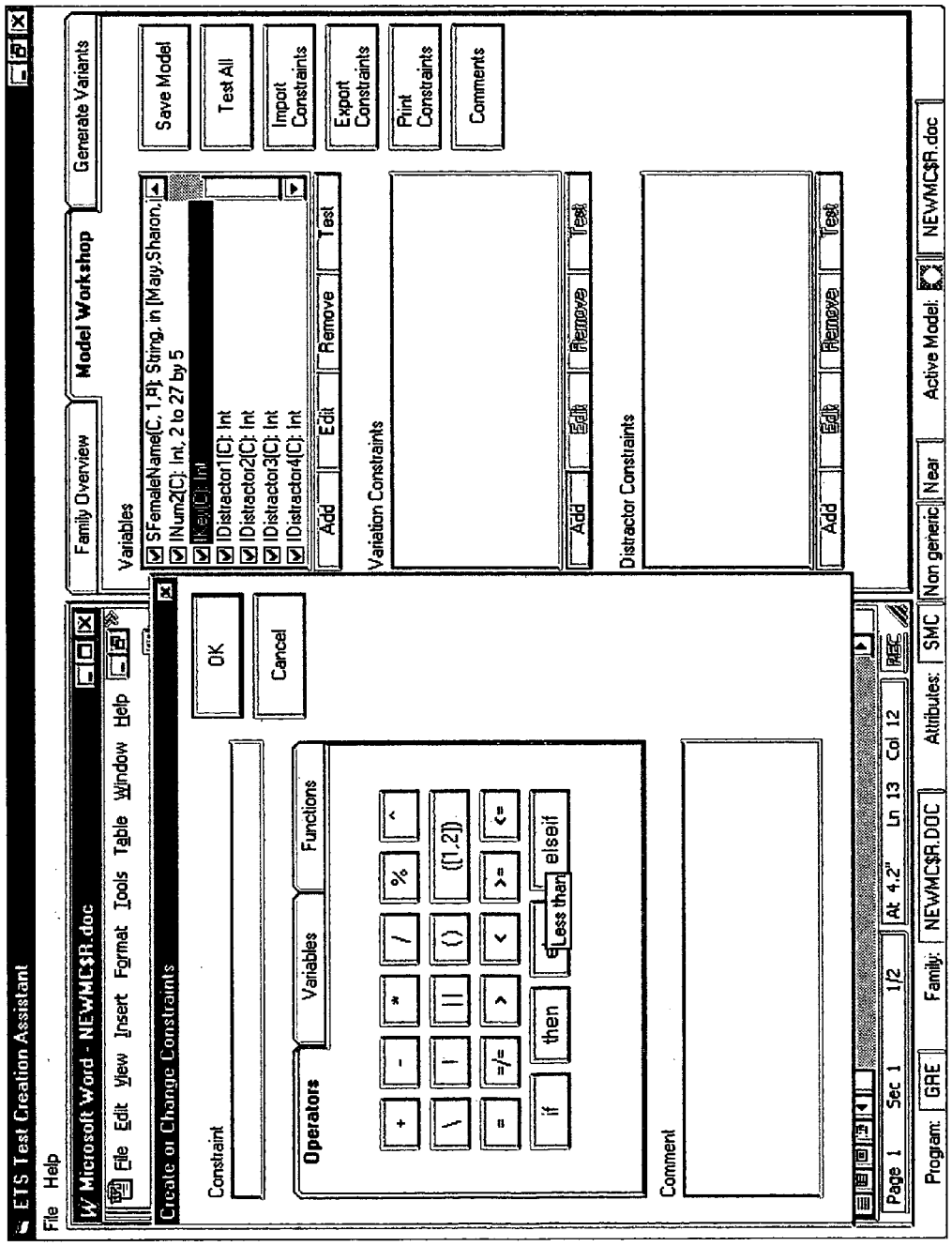
FIGS. 30-44 show how the variable constraints may be specified in accordance with a preferred embodiment of the invention.

To define relations for determining a value of "IKey" the user can click on "Add" button in the "Variation Constraints" window in FIG. 29. This will bring up the "Create or Change Constraints" dialog box. FIG. 30. This dialog box is divided into three areas. The first entitled "Constraint" is the box wherein variables are constrained. The second comprises three work environments entitled "Operators", "Variables", and "Functions". Clicking on the title/tab activates the chosen environment. Finally, there is a section entitled "Comment" which allows the user to provide comments documenting the particular constraint for use by the current user or another user at some later time.

Operators

The first tab in the box entitled "Operators" appears in bold indicating that the buttons associated with this tab are available to the user. That is, clicking on a button places its operator in the "Constraint" box. The buttons in the "Operators" environment appear in FIG. 30 and comprise mathematical operators: +, −, =, /, %, >, <, >=, <=, if, then, else, elseif, ( ), etc.

Variables

Figure 31:
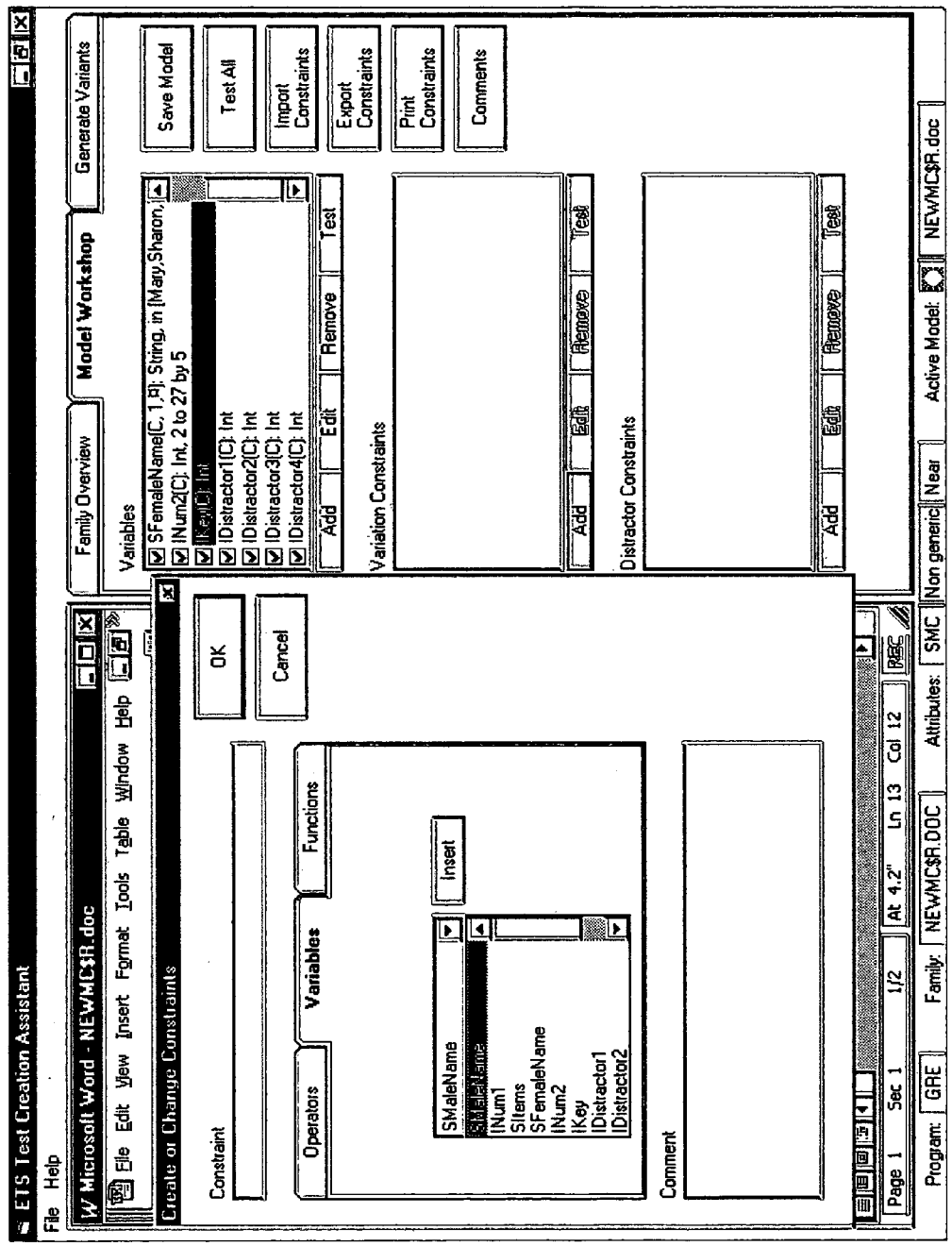

Clicking on the "Variables" tab, activates the "Variables" environment, and allows the user to enter into the "Constraint" box all currently identified variables. FIG. 31. The user just highlights the variable and clicks on the "Insert" button.

Functions

Figure 32:
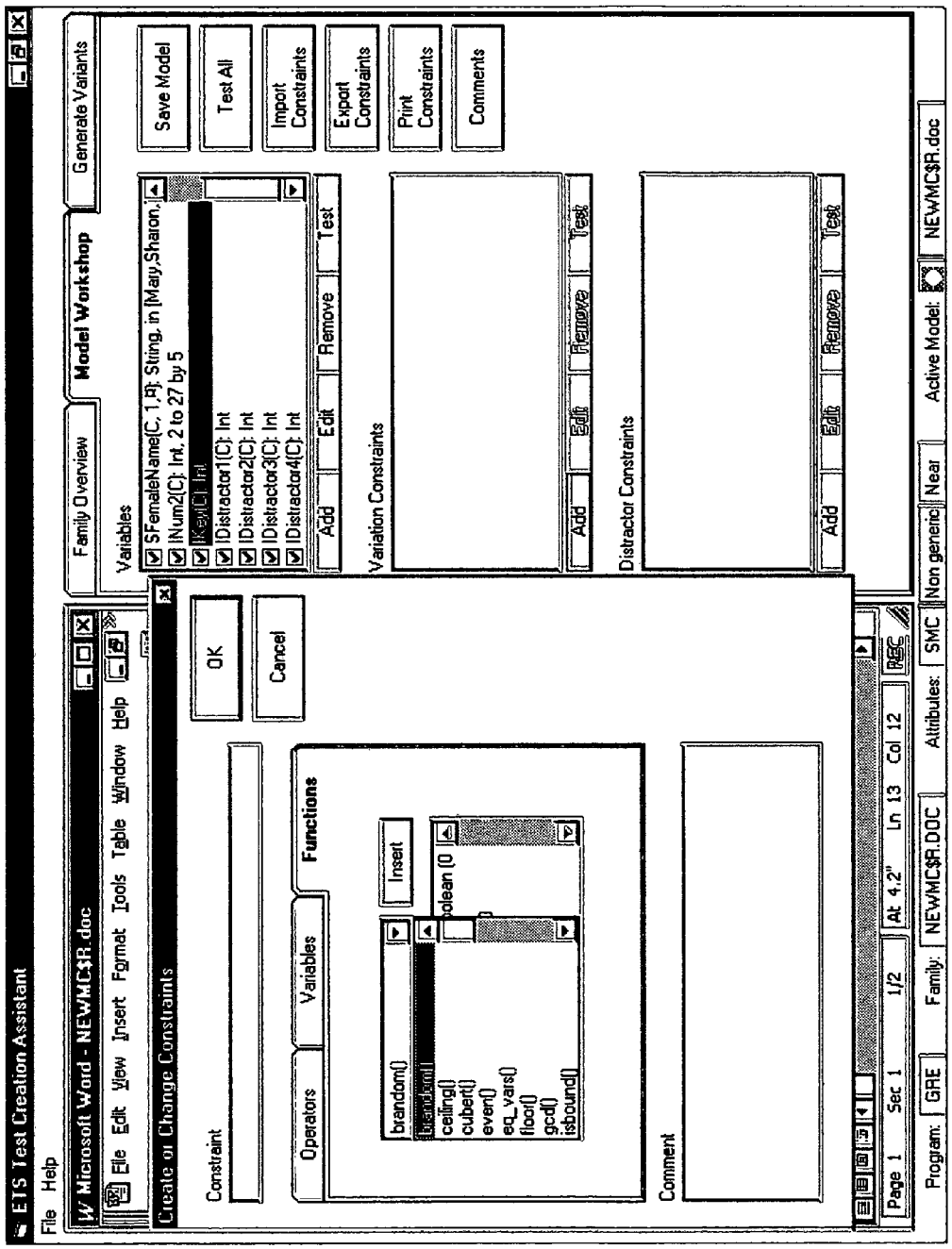

Clicking on the "Functions" tab, activates the "Functions" environment, and allows the user to enter into the "Constraint" box all TCA library functions. FIG. 32. The user just highlights the variable and clicks on the "Insert" button. Moreover, clicking on a function brings the function to the top box of the "Functions" environment and provides the user with a definition of the function immediately below it. See, for example, FIG. 39.

Constraining "IKey"

Figure 33:
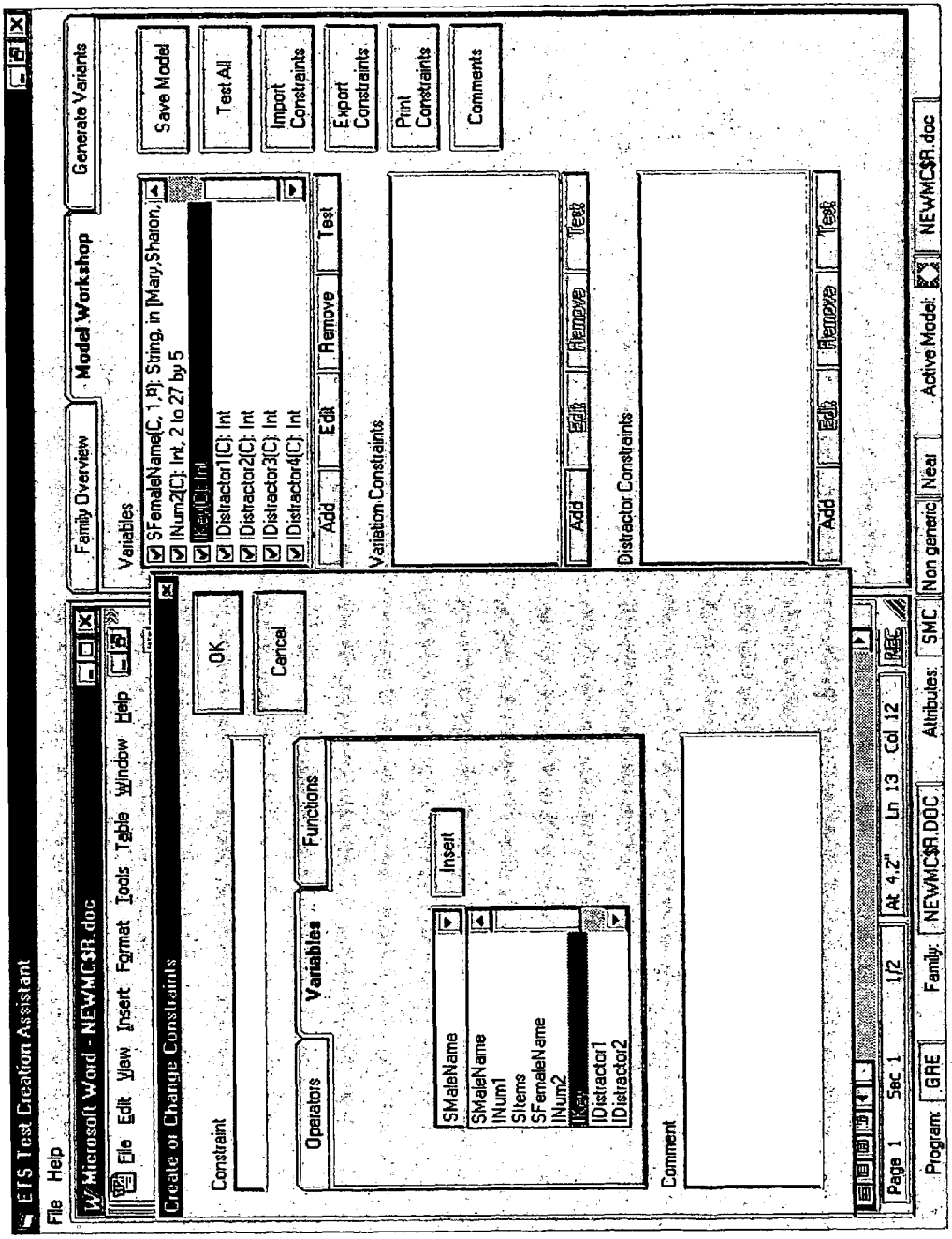
Figure 34:
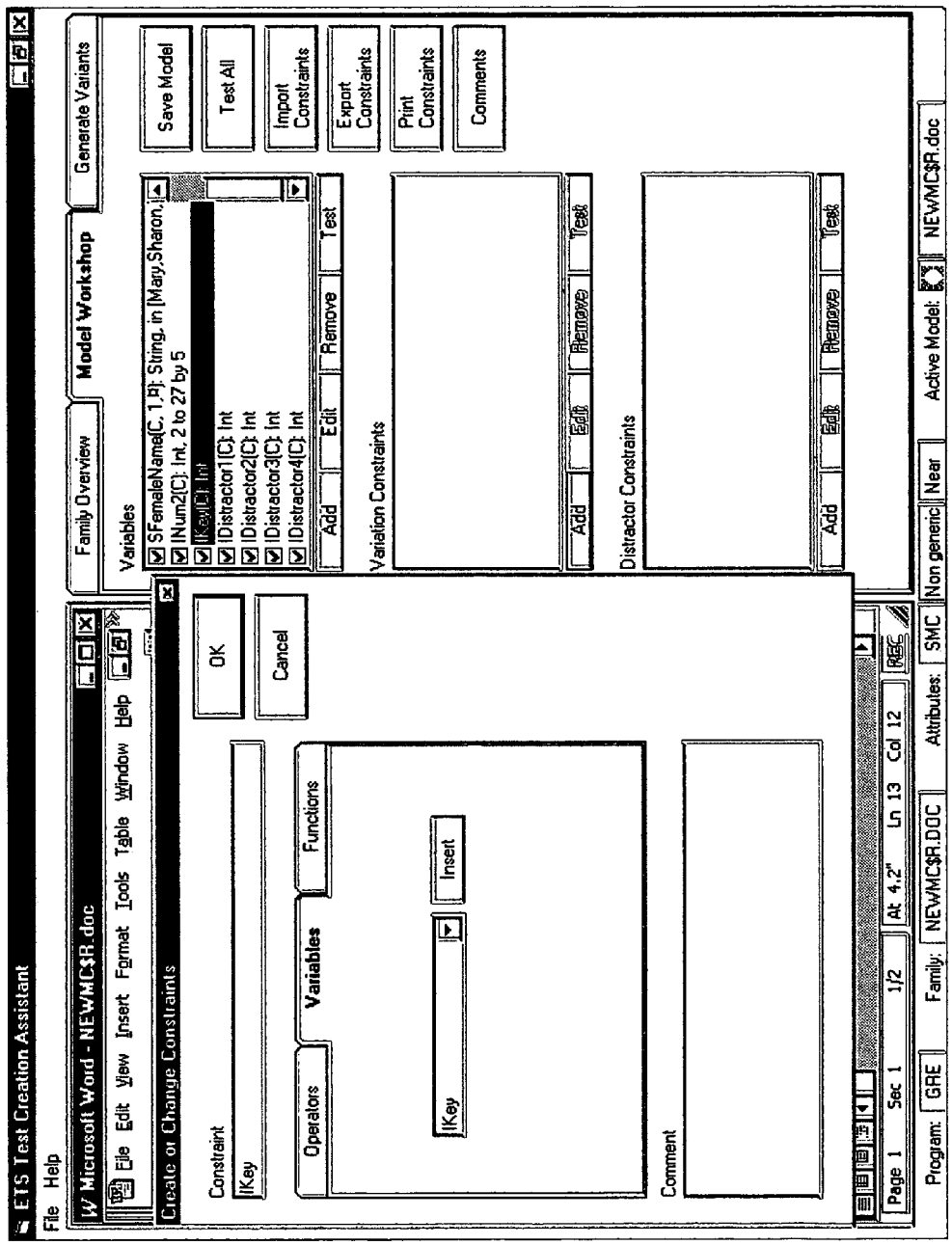
Figure 35:
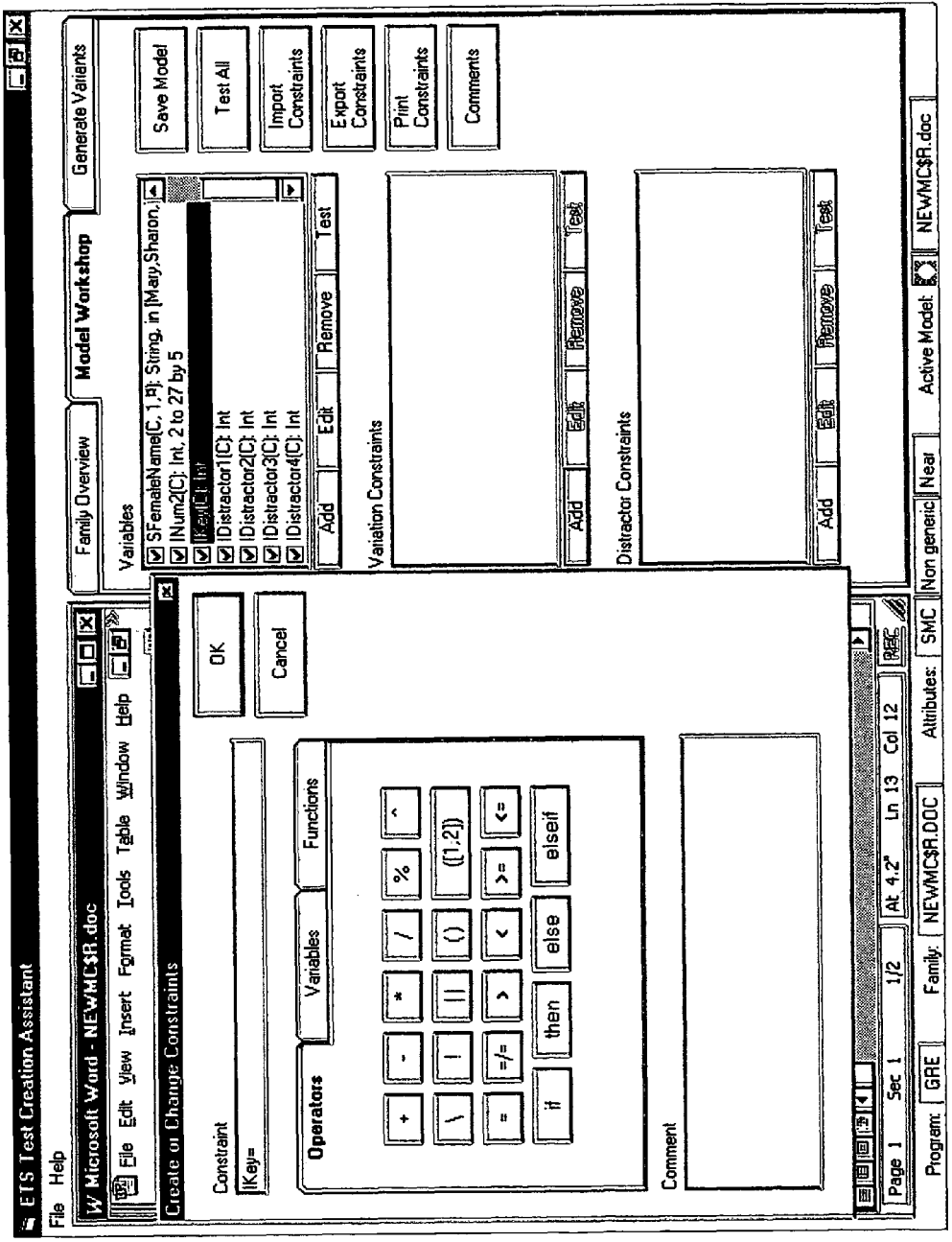
Figure 36:
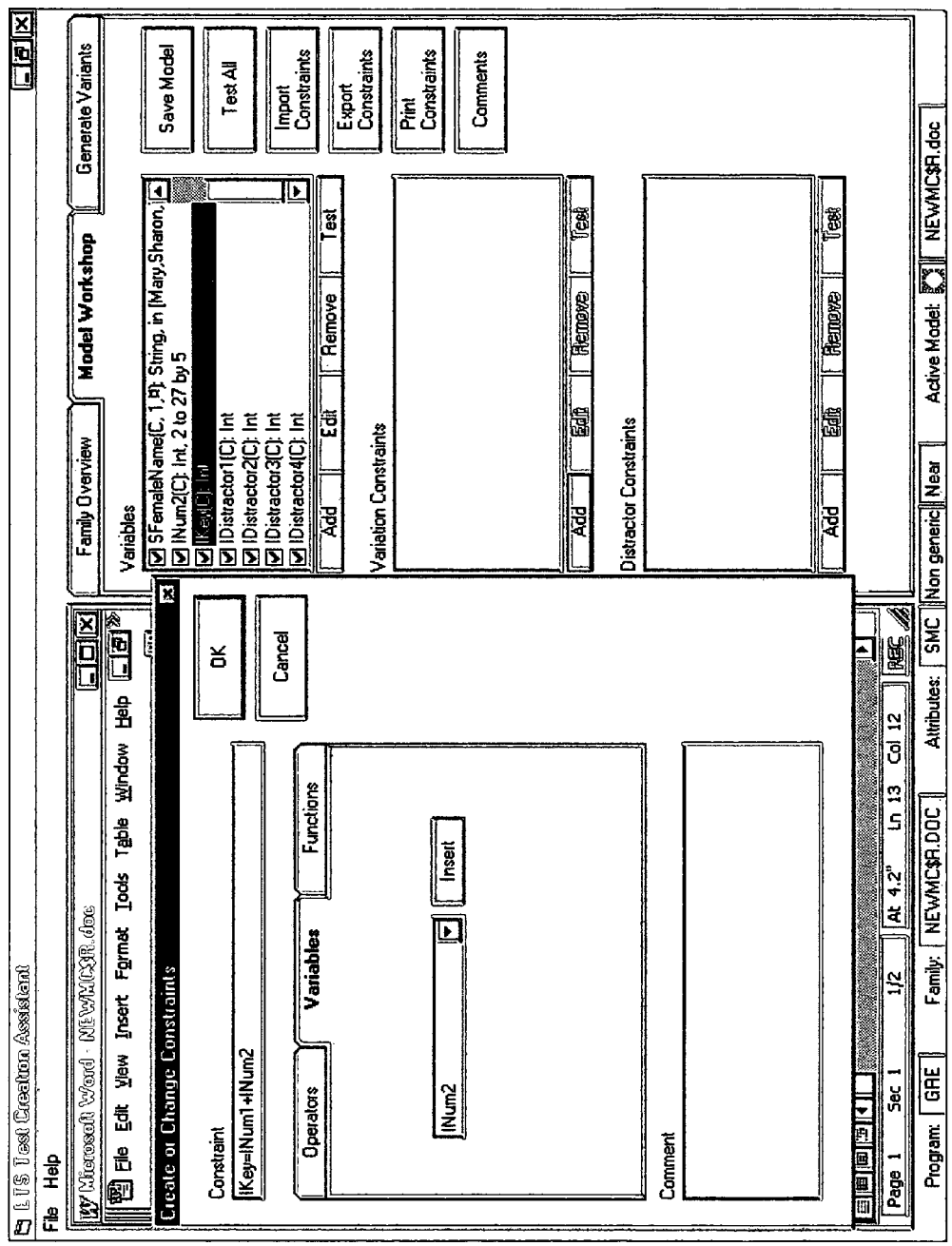

The user clicks on the "Variables" tab and selects "Ikey". FIG. 33. Clicking on the "Insert" button causes the system of the present invention to put "IKey" at the current cursor location in the "Constraint" box. FIG. 34. Clicking on the "Operators" tab and then clicking on the "=" operator button results in the start of a constraint, namely: "Ikey=". FIG. 35. Going back and forth from "Variables" to "Operators" and inserting INum1, "+", and INum2 results in FIG. 36. The system allows the direct entry of the constraint in the "Constraint" box, however, providing the ability to pick and choose by clicking facilitates constraint generation, by among other things, reducing typographical errors.

Exporting and Importing Constraints

Figure 37:
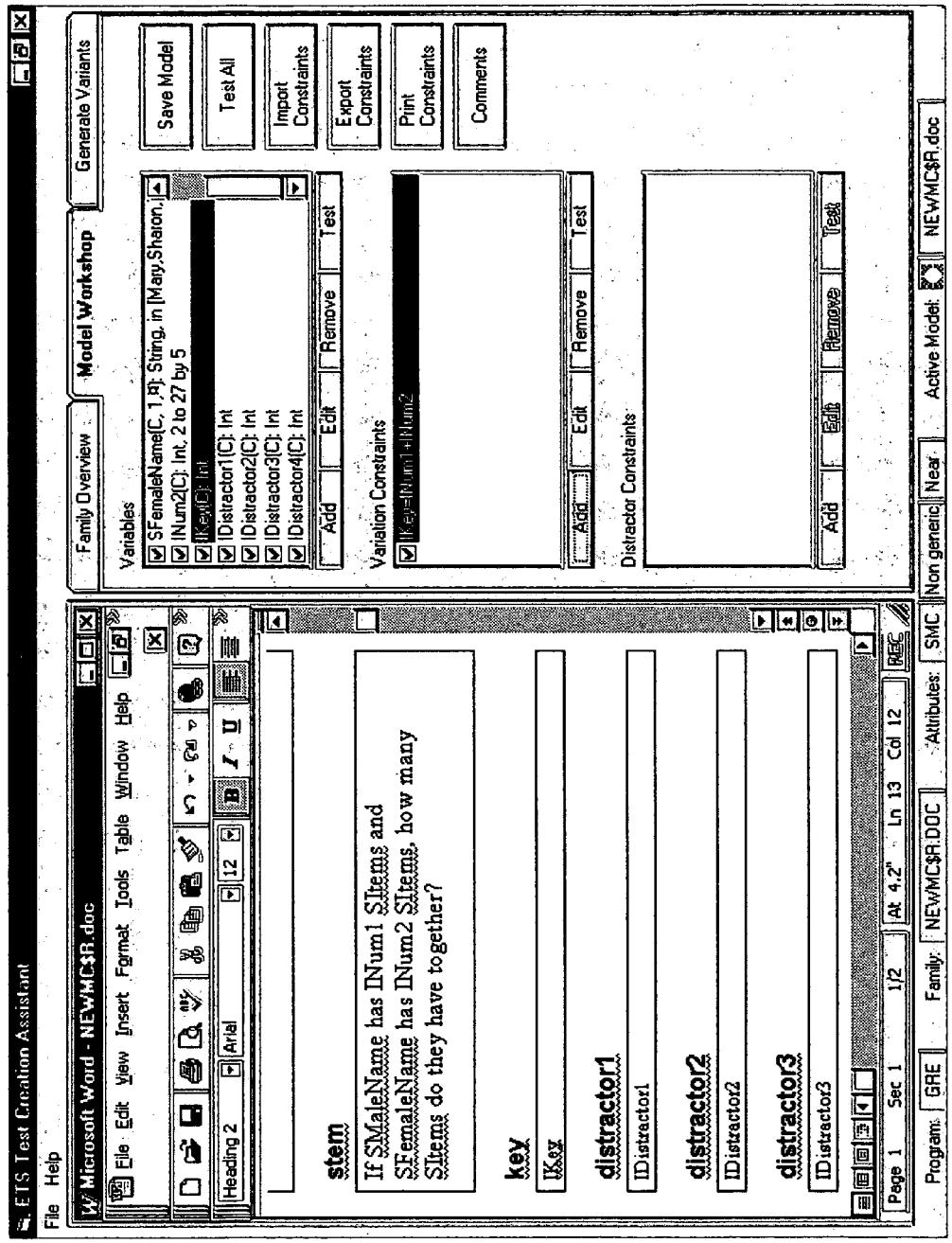

The user can export and import variation constraints in a fashion similar to exporting and importing strings. The "Export Constraints" and "Import Constraints" buttons in the "Model Workshop" are used. FIG. 37. The only difference is that when the user exports or imports constraints the system necessarily exports/imports variables, variable constraints, and associated comments. Clicking on the "Print Constraints" button, FIG. 37, in one embodiment, prints out the constraints.

Constraining the Distractors

Figure 38:
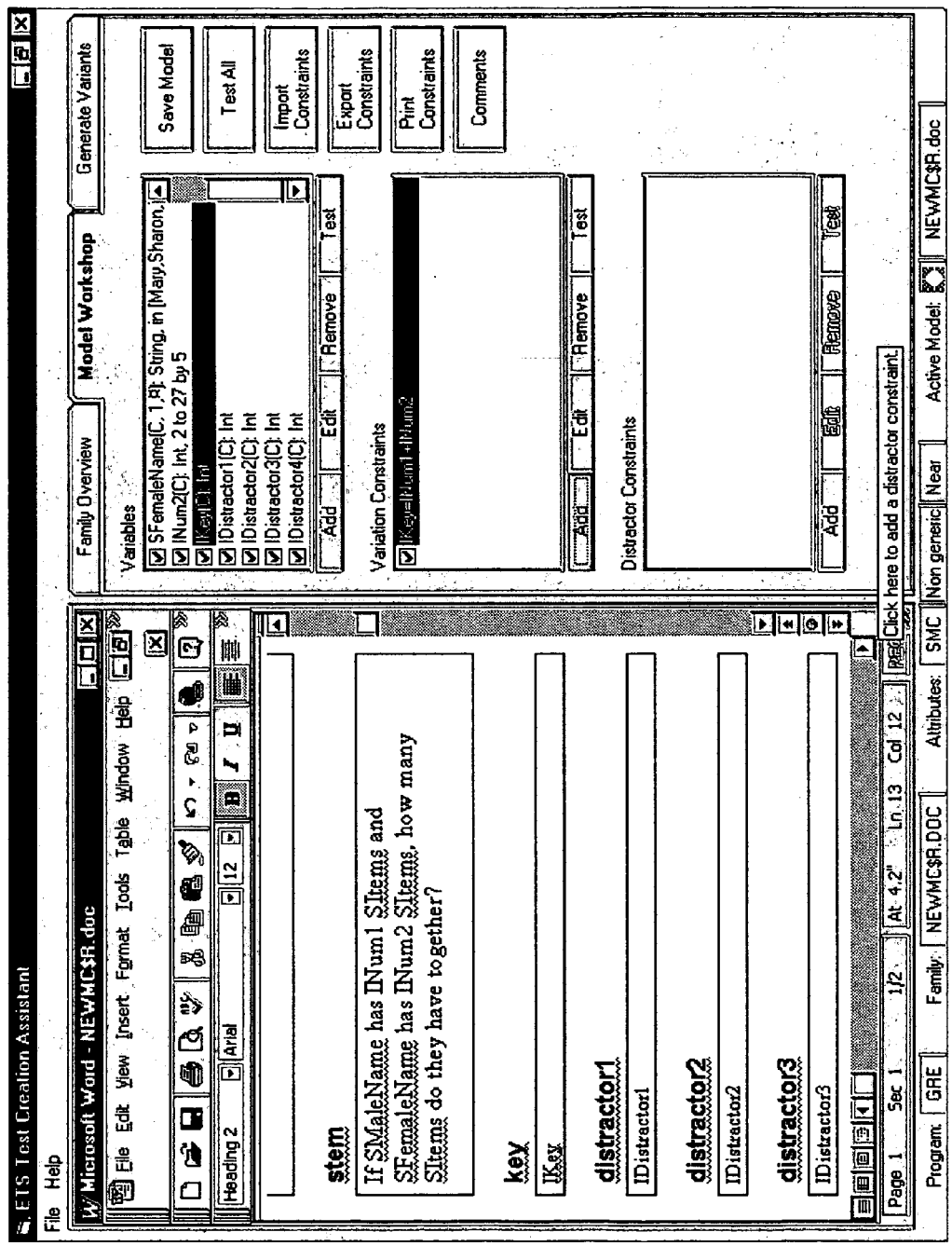
Figure 39:
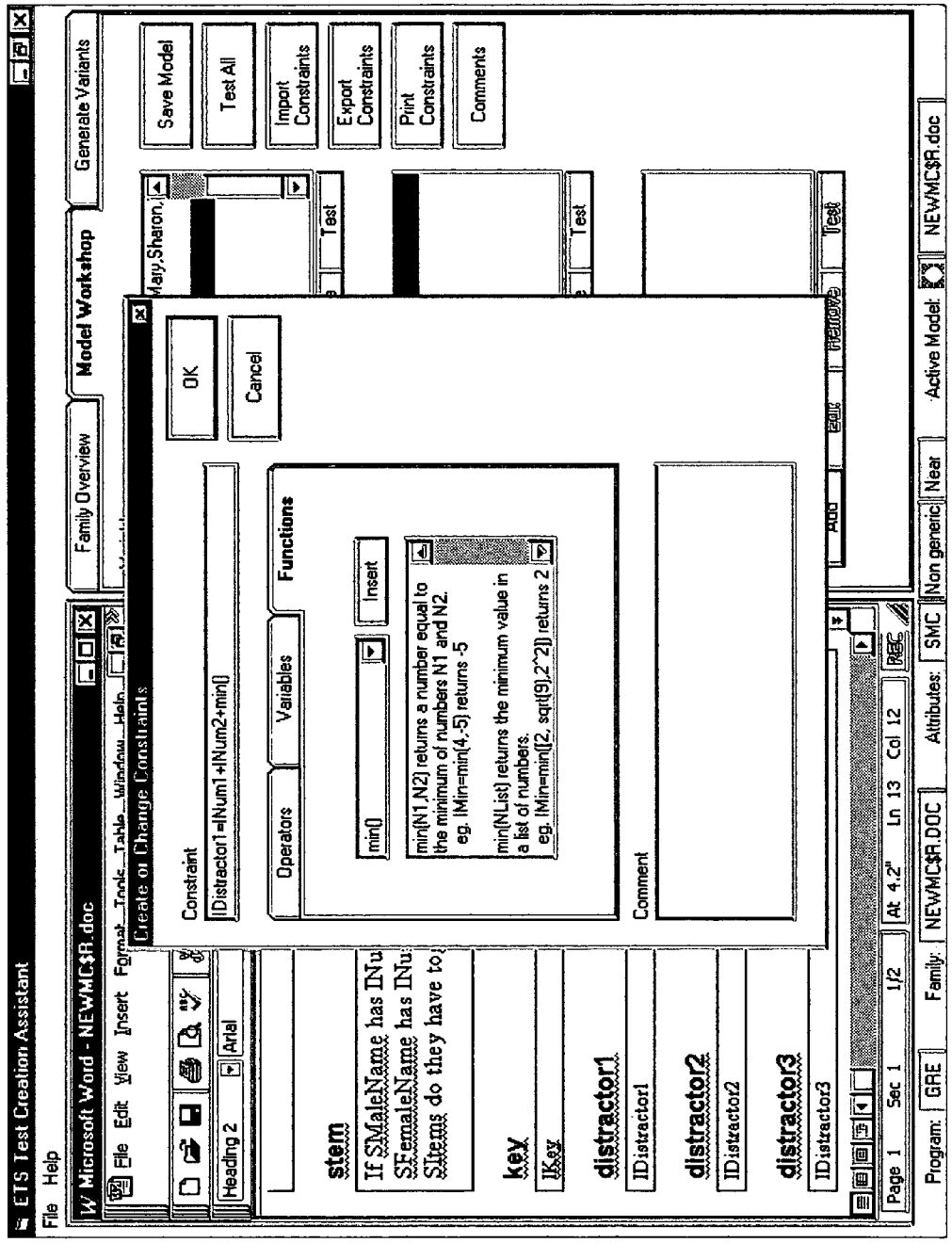

Multiple choice tests items are designed to have several responses from which the test taker will choose the correct answer. The correct answer is the key or in this example "IKey". The other responses are wrong answers or distractors and are called "IDistractor_". The user defines as many distractors as the test item calls for, in this example four (4) distractors. To add distractor constraints, the user can click the "Add" in "Distractor Constraints" window, FIG. 38, and the "Create or Change Constraints" dialog box will appear. FIG. 39.

Figure 40:
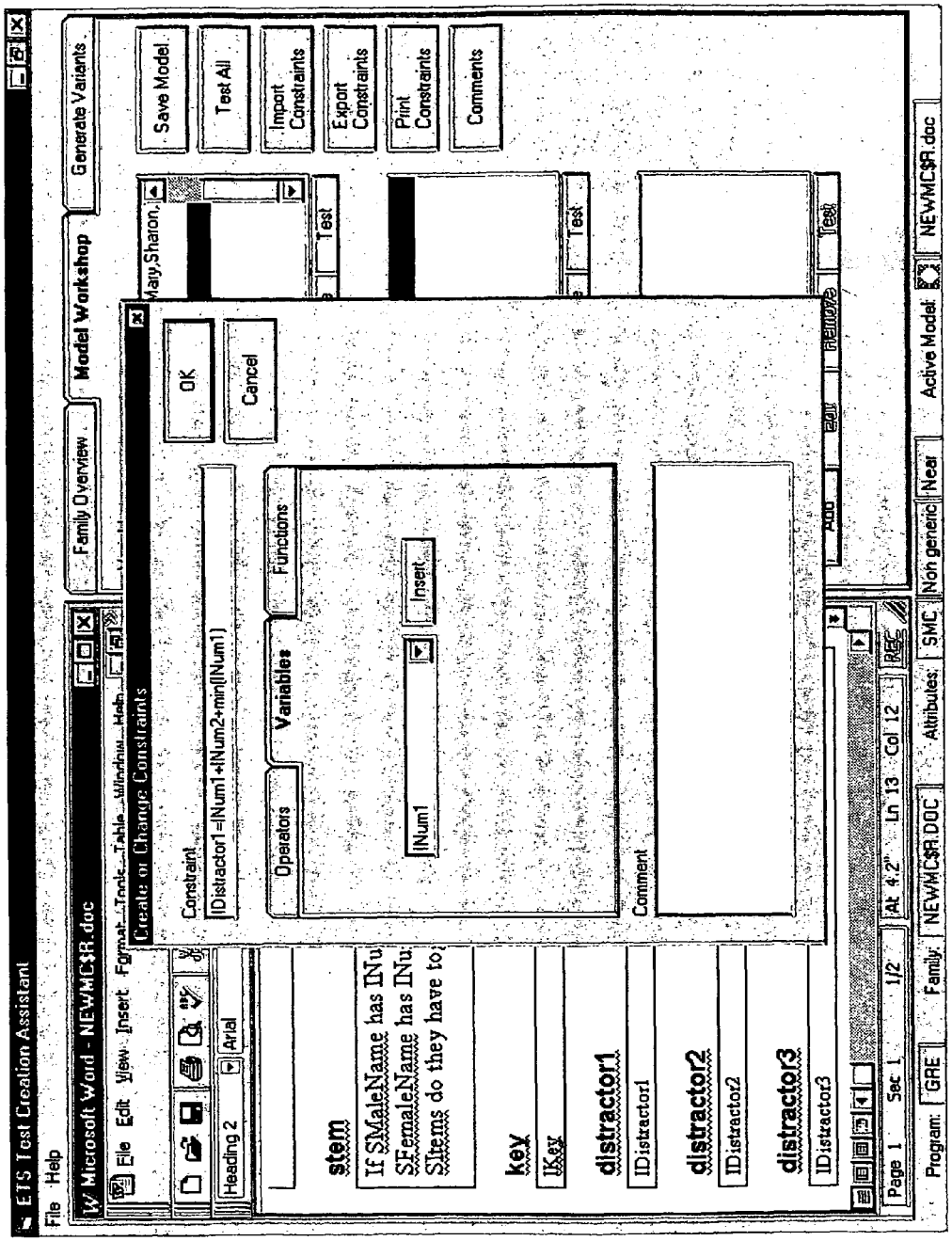
Figure 41:
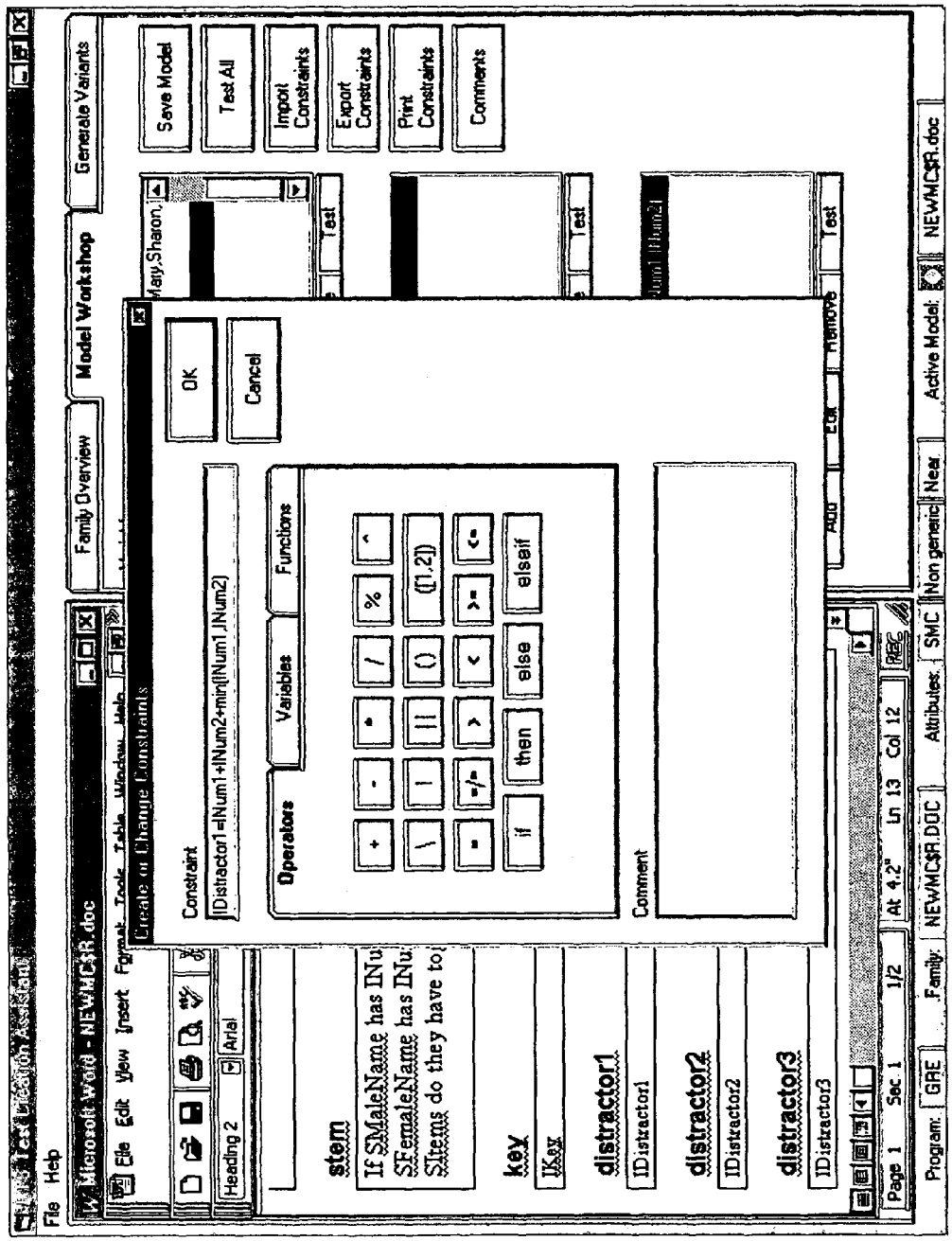

To add an expression for distractor "IDistractor1", the user can either directly type it in the "Constraint" window/box or insert it by going to the "Functions" tab, selecting a function from the list, and inserting it by clicking on the "Insert" button. When a function is selected, a useful description of the function is displayed to the user. FIG. 39. Variables can be inserted into functions, for example, "INum1" and "INum2" into "min( )". See FIGS. 39-41. Clicking on the "OK" button in the "Create or Change Constraints" dialog box finishes defining the constraint for the time being and all the constrained distractors appear in the "Distractor Constraints" window of the Model Workshop. See, e.g., FIG. 42.

Testing the Constraints

Figure 42:
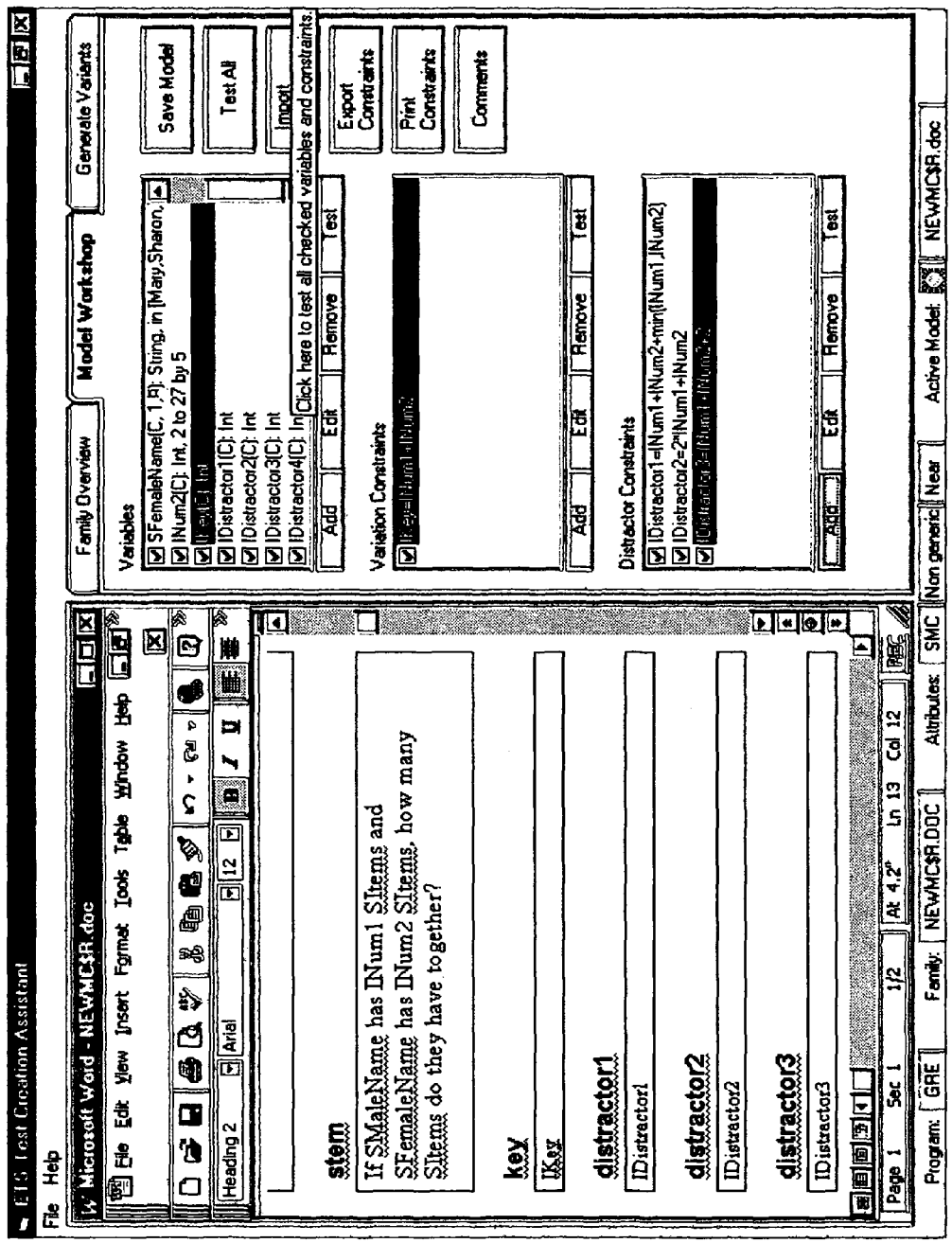
Figure 43:
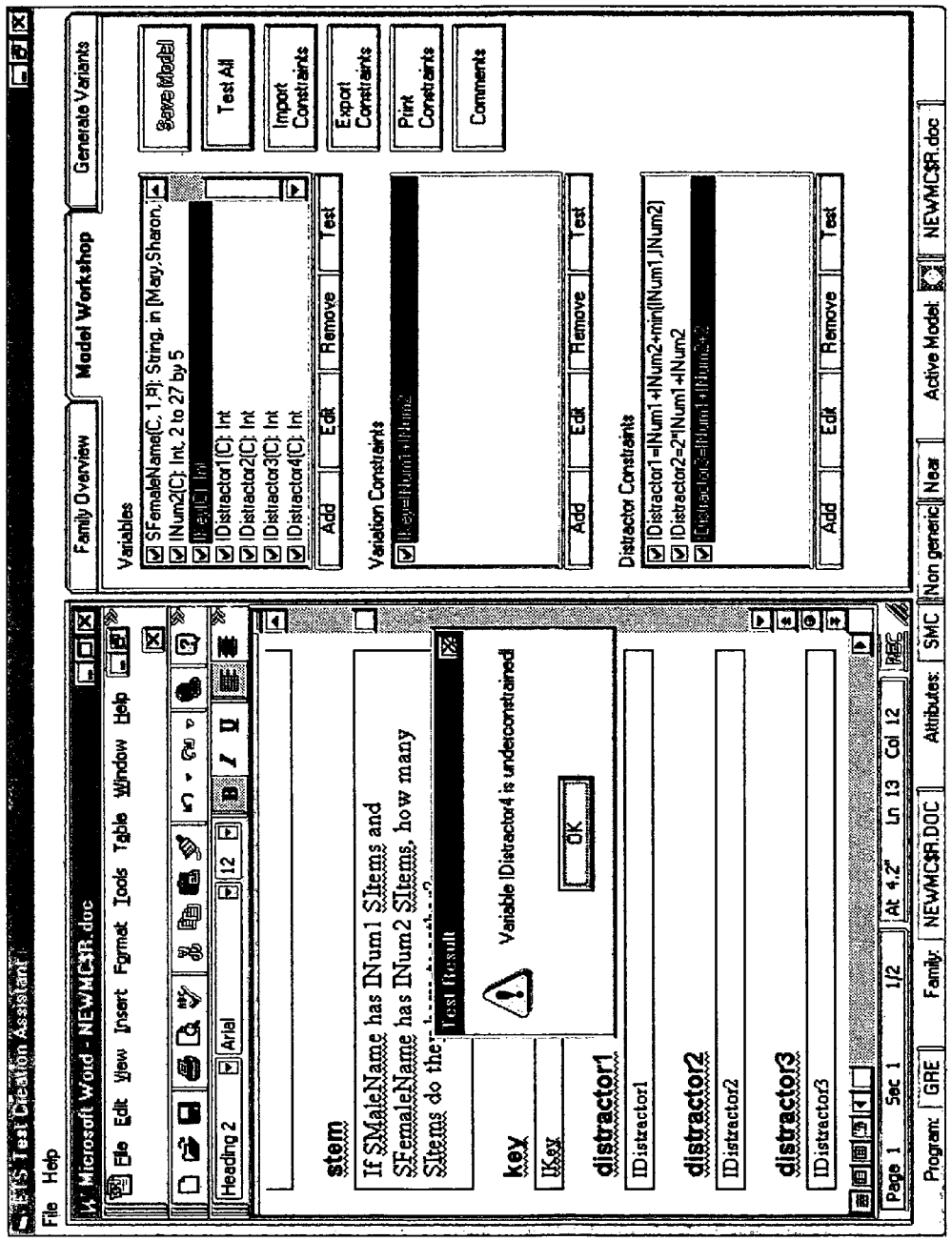
Figure 44:
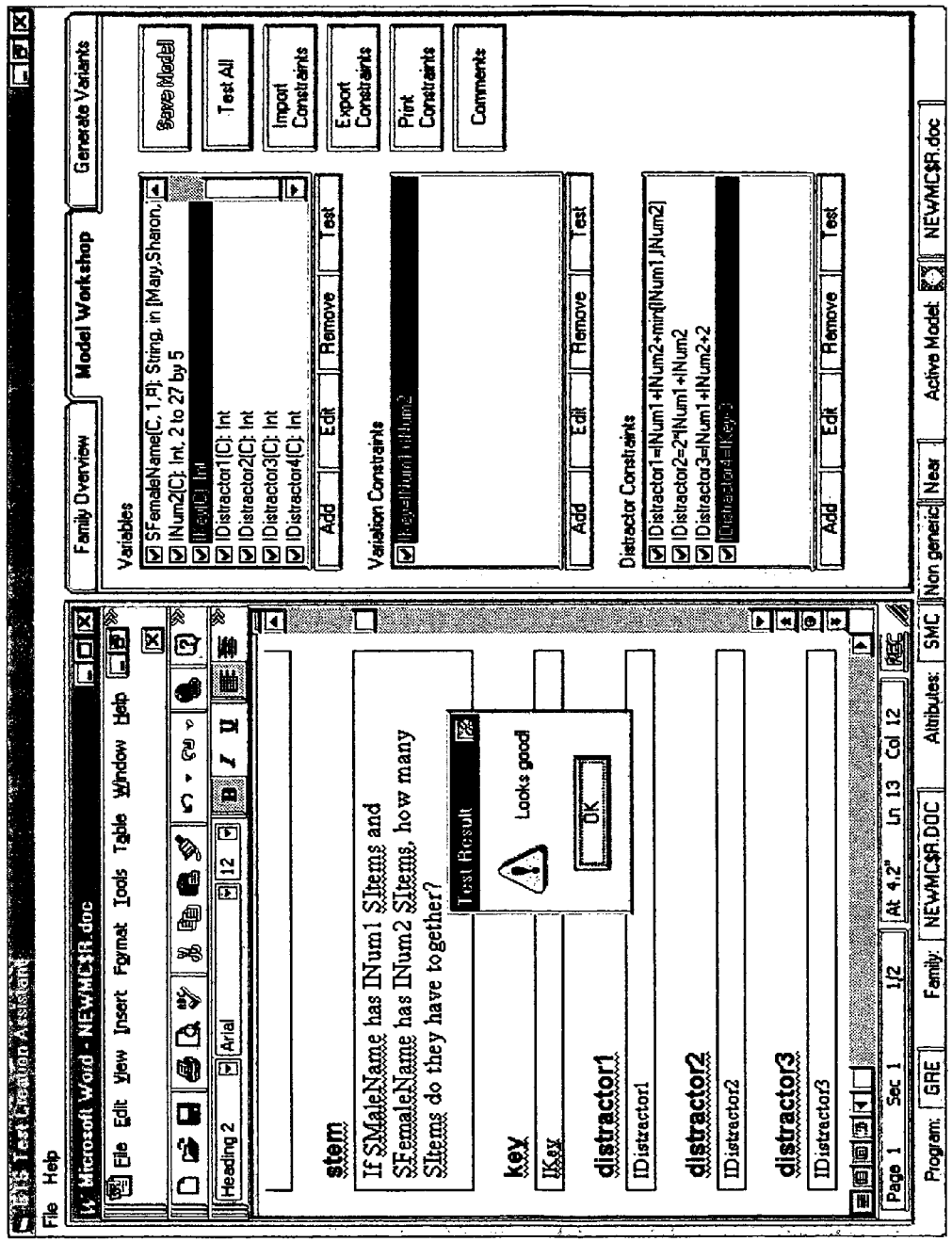
Figure 45:
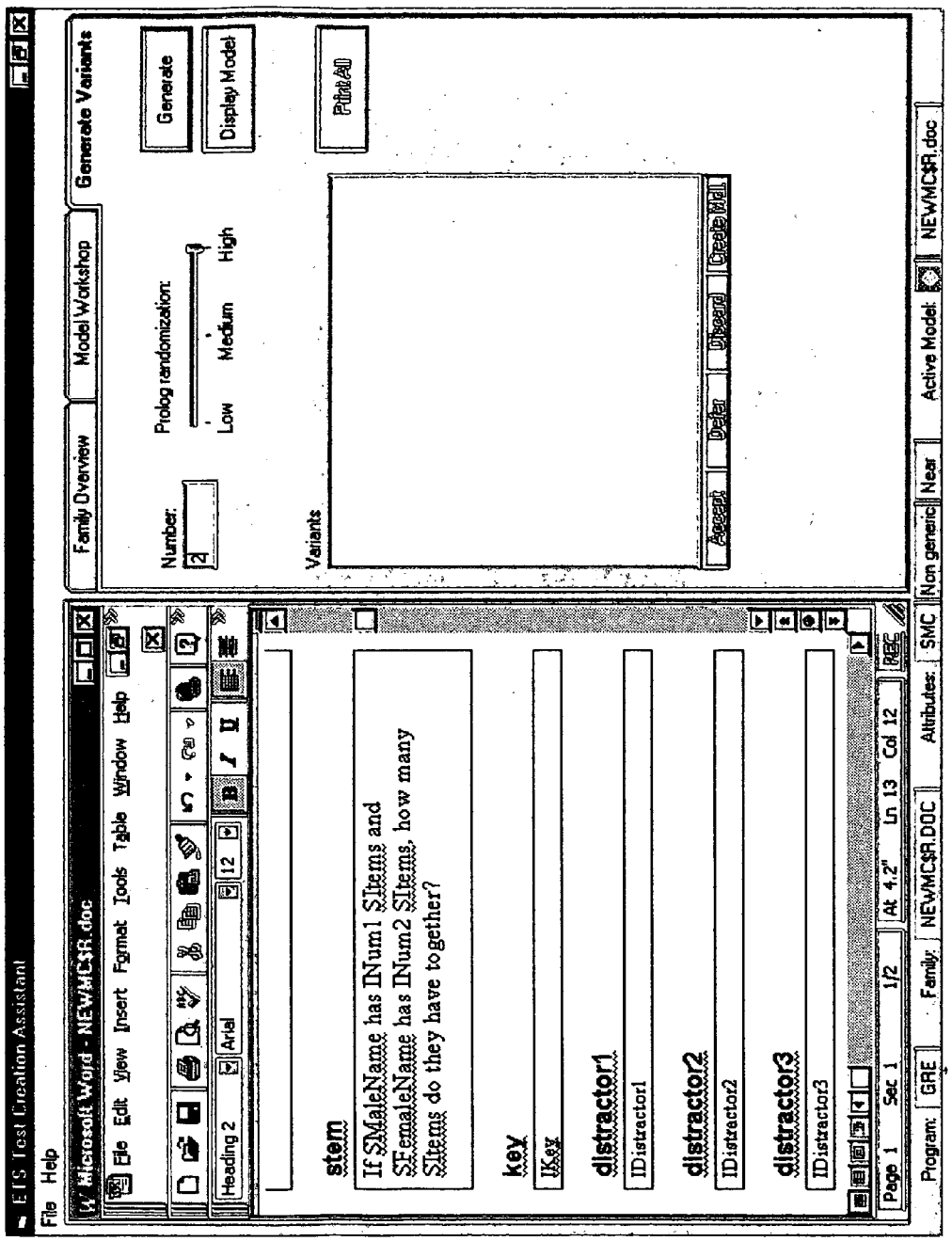

The systems permits the user to test the constraints by testing selected or all variables, variation (variable) constraints, and distractor constraints. The user checks off all the items to be tested and depending on the circumstances clicks on the "Test" buttons on the icon bar at the bottom of the appropriate Workshop window or the "Test All" button to the right of those windows. The ability to chose particular items to be tested is very helpful in locating the source of any problem. FIG. 42. After TCA finishes testing all checked variables and constraints in FIG. 42, a "Test Result" window appears. FIG. 43. The "Test Result" for FIG. 42 was "Variable IDistractor4 is underconstrained!" In fact, it had not been constrained. After constraining IDistractor4 and clicking on the "Test All" button appears the next "Test Result". FIG. 44. This time TCA tells the user that the constraints "Looks Good!". If the constraints "Looks Good!" the next step is to click on Generate Variants" tab so as to be able to use TCA to automatically generate test item variants based on the model developed in the Model Workshop. FIG. 45.

Generating Test Item Variants

Figure 46:
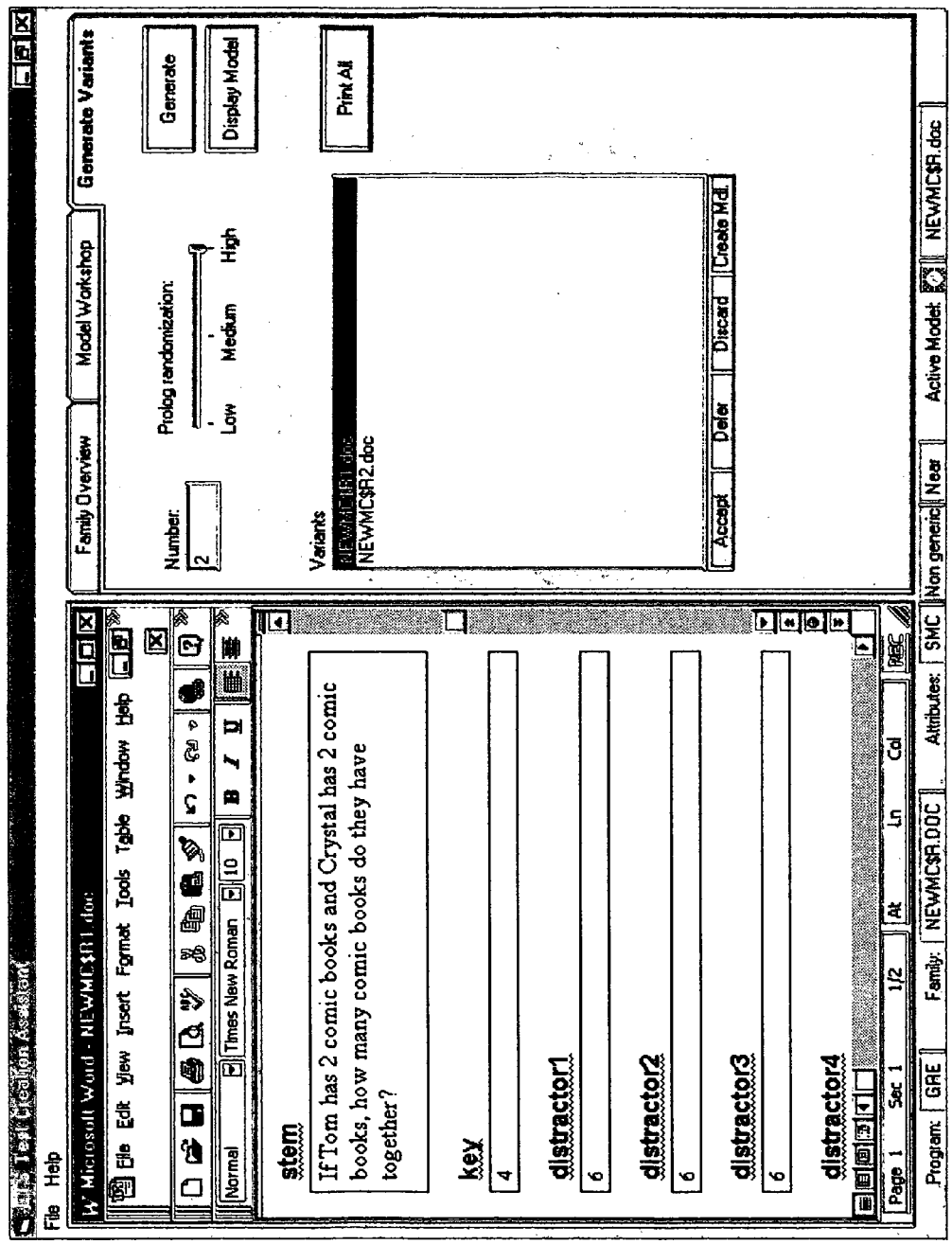

To generate variants all the user needs to do is enter the number of variants to be generated in the "Number" box and click on the "Generate" button. FIG. 45. The user can also adjust the "Prolog randomization". The generated variants will appear in the "Variants" window. In this case the system was requested to generate two (2) variants from family model "NEWMC$R.DOC". The variants generated from this model have names NEWMC$R1.doc and NEWMC$R2.doc. That is, family model name variant number 1 and number 2. FIG. 46. Selecting a variant in the "Variants" window causes the variant to be displayed in the Microsoft® WORD window. Note that at least three of the distractors for test item NEWMC$R1.doc equal the same value, namely, 6. Therefore, as initially constrained the distractors in this model can simultaneously have the same value, which is wrong. Therefore, the user will need to change the constraints to eliminate this possibility.

Figure 47:
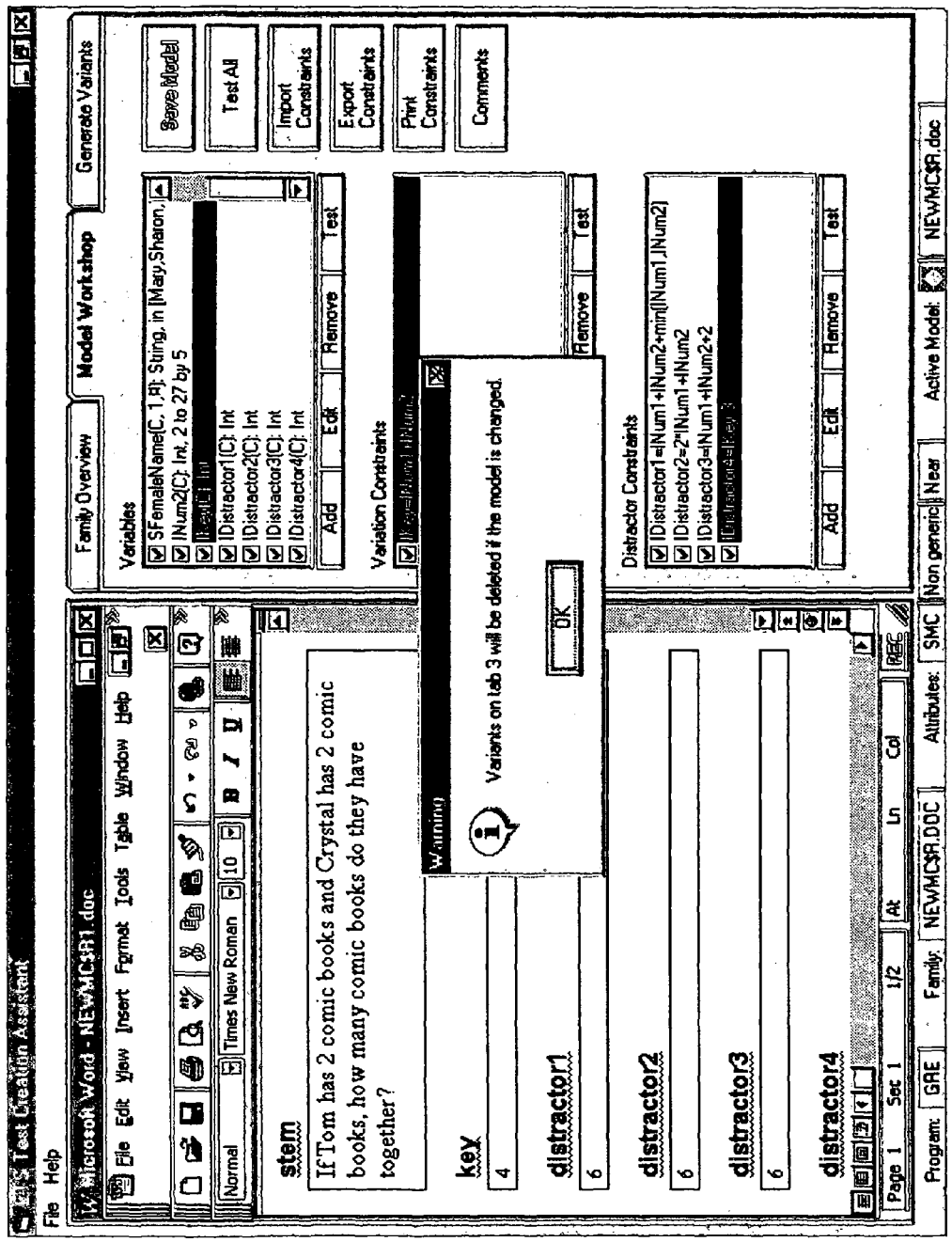
Figure 48:
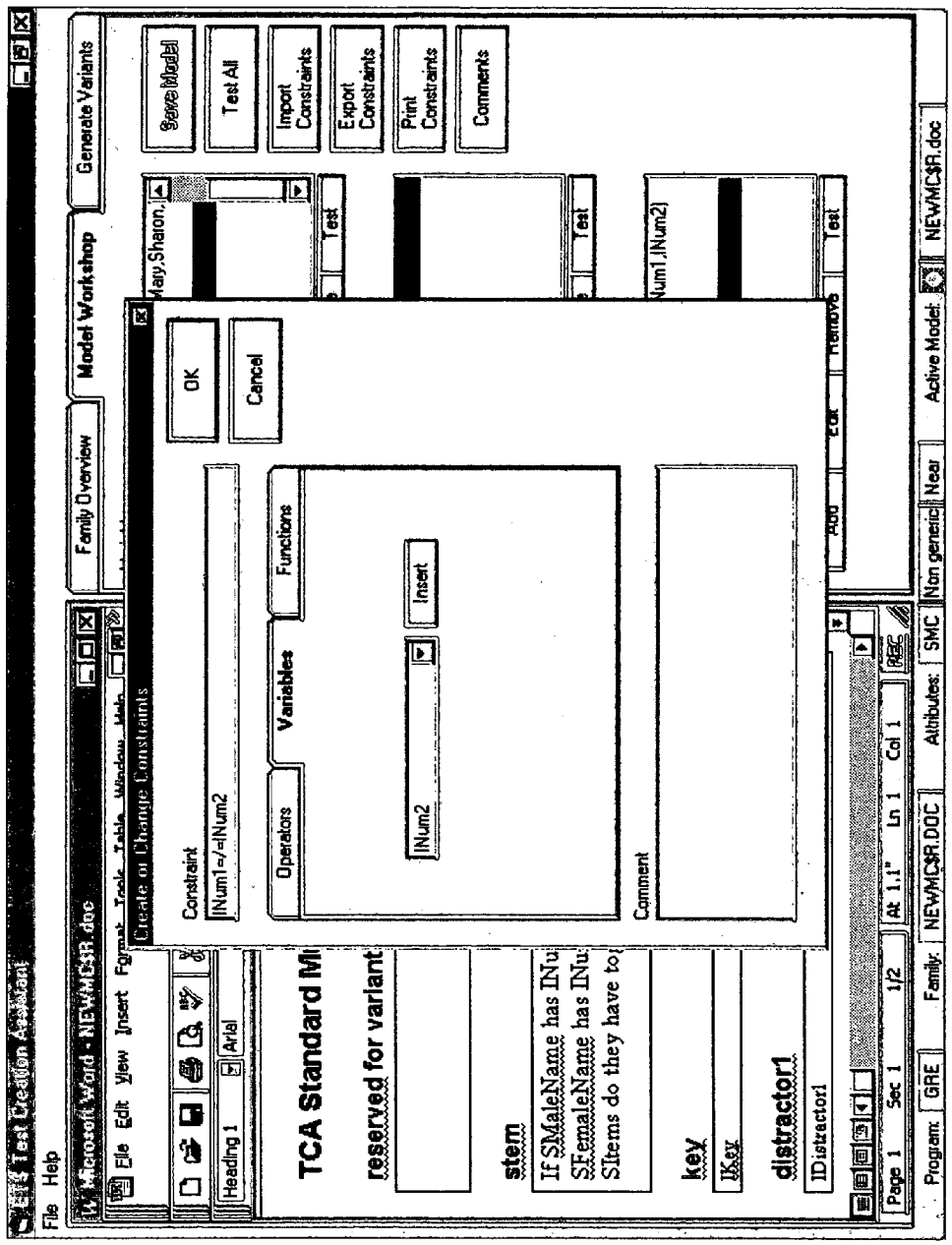
Figure 49:
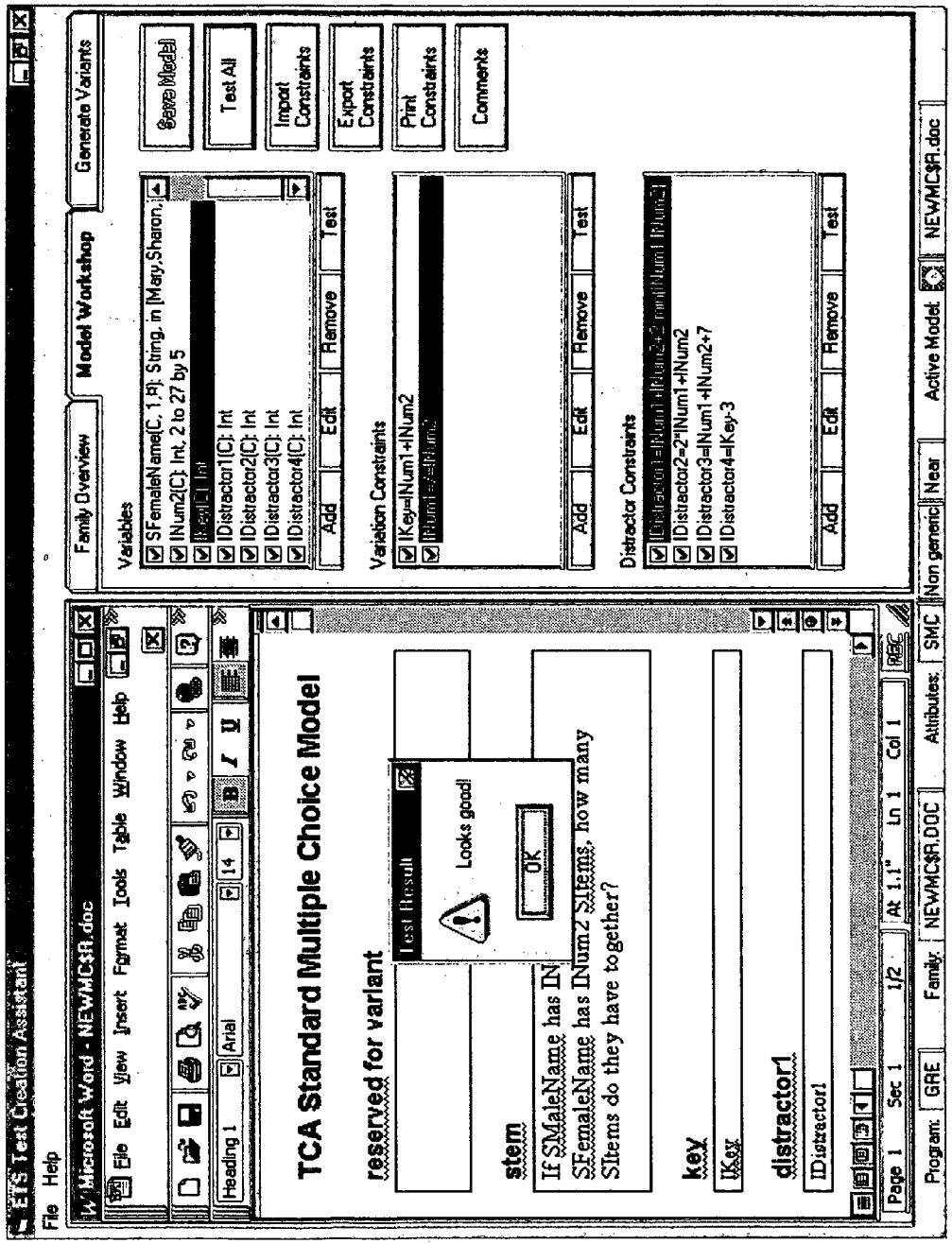

If based upon a review of the generated variants the user wishes to modify the constraints, he/she need only click on the "Model Workshop" tab. If the user does so, a warning appears to the effect that variants on tab 3 (the "Generate Variants" tab) will be deleted if not saved before changing the model. FIG. 47. FIG. 48 shows part of the process of adding a new constraint in an attempt to resolve the distractor problem. The new constraint is that INum1 cannot equal INum2. Adding this constraint and then testing results in a "Looks Good". FIG. 49.

Figure 51:
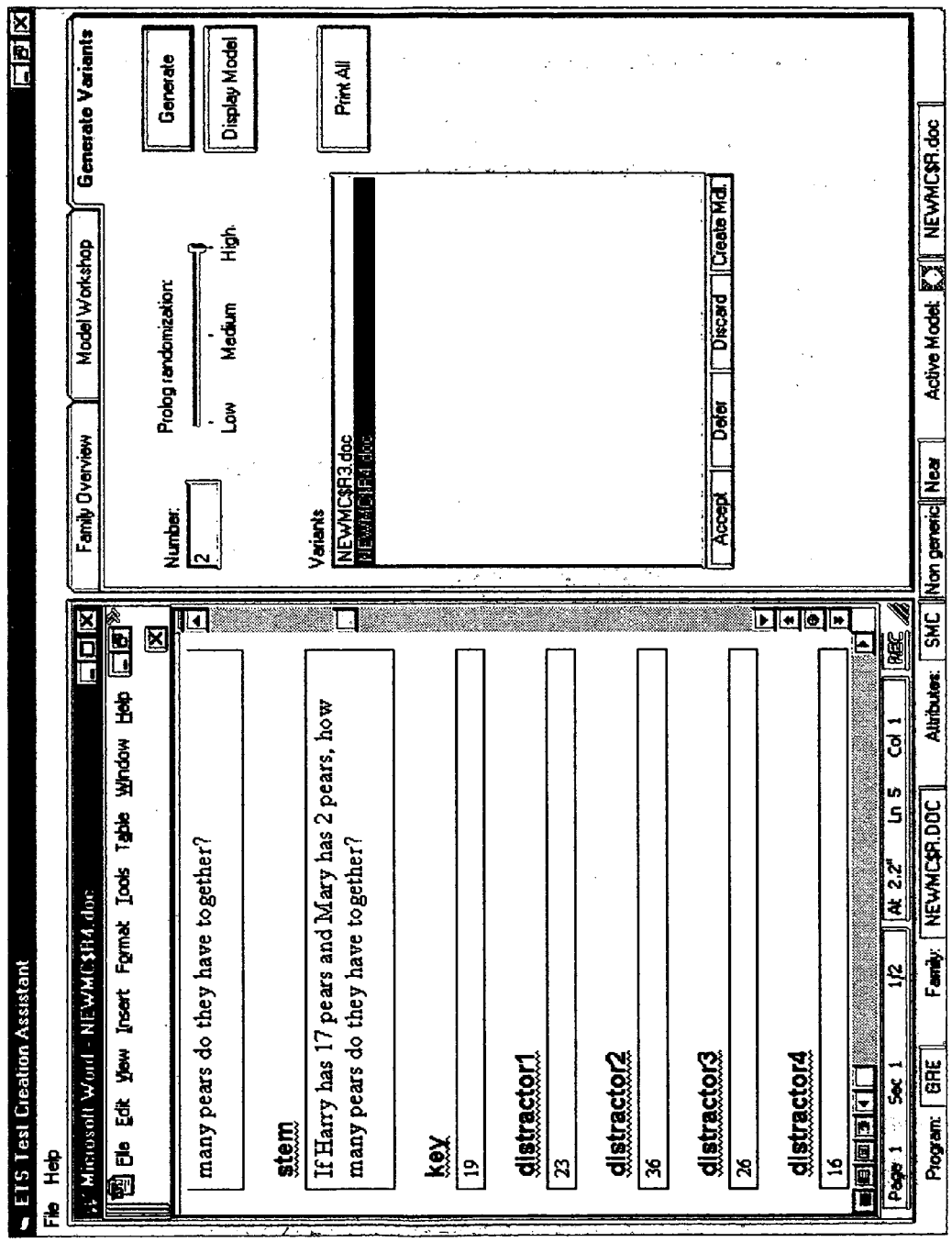

FIGS. 50-51 show the result of generating 2 variants from the new model. It appears that the distractor problem has been fixed.

Working with Generated Variants and Generating New Models Accepting Variants

Figure 52:
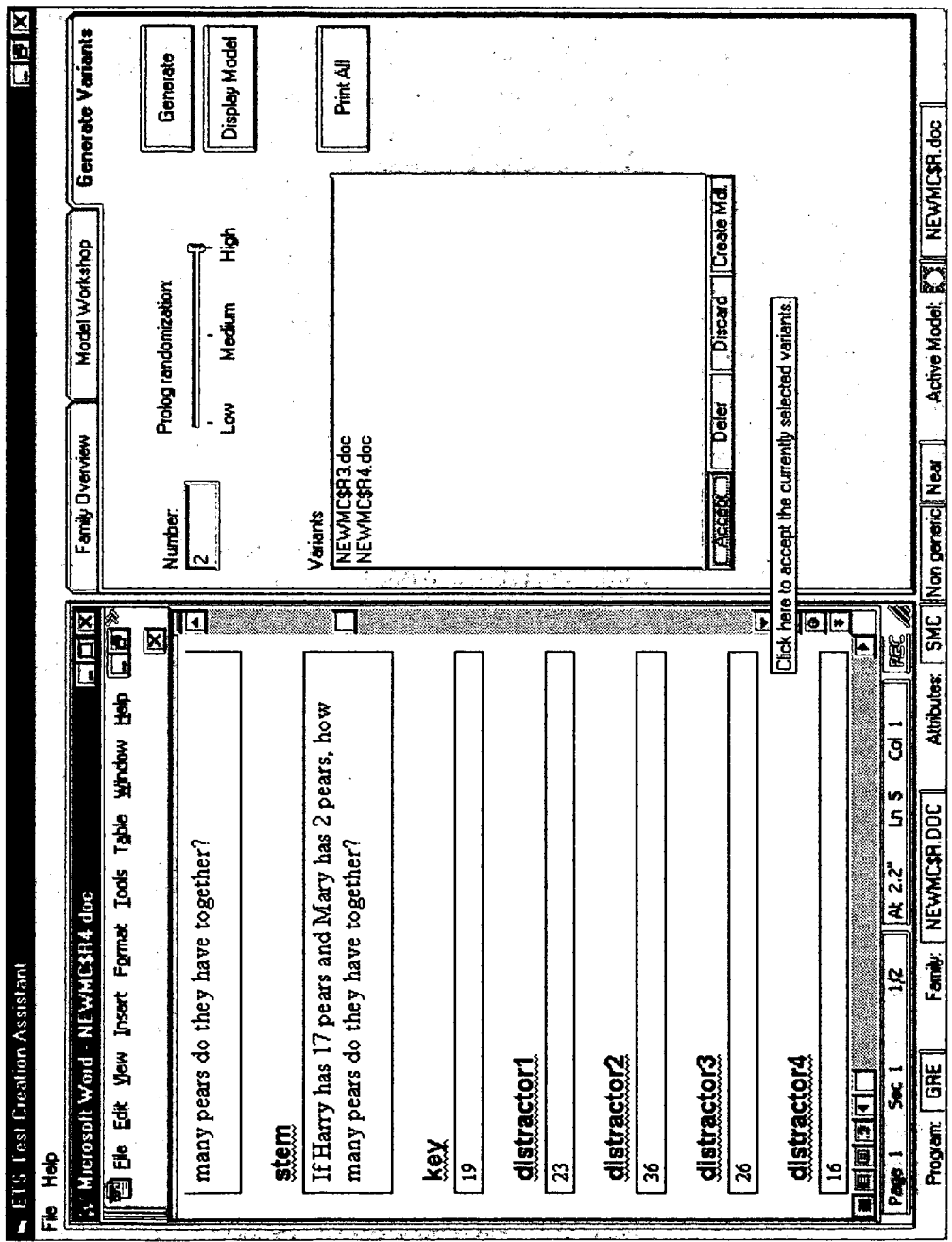
FIGS. 52-56 show how the user can work with generated variants in accordance with a preferred embodiment of the invention.
Figure 53:
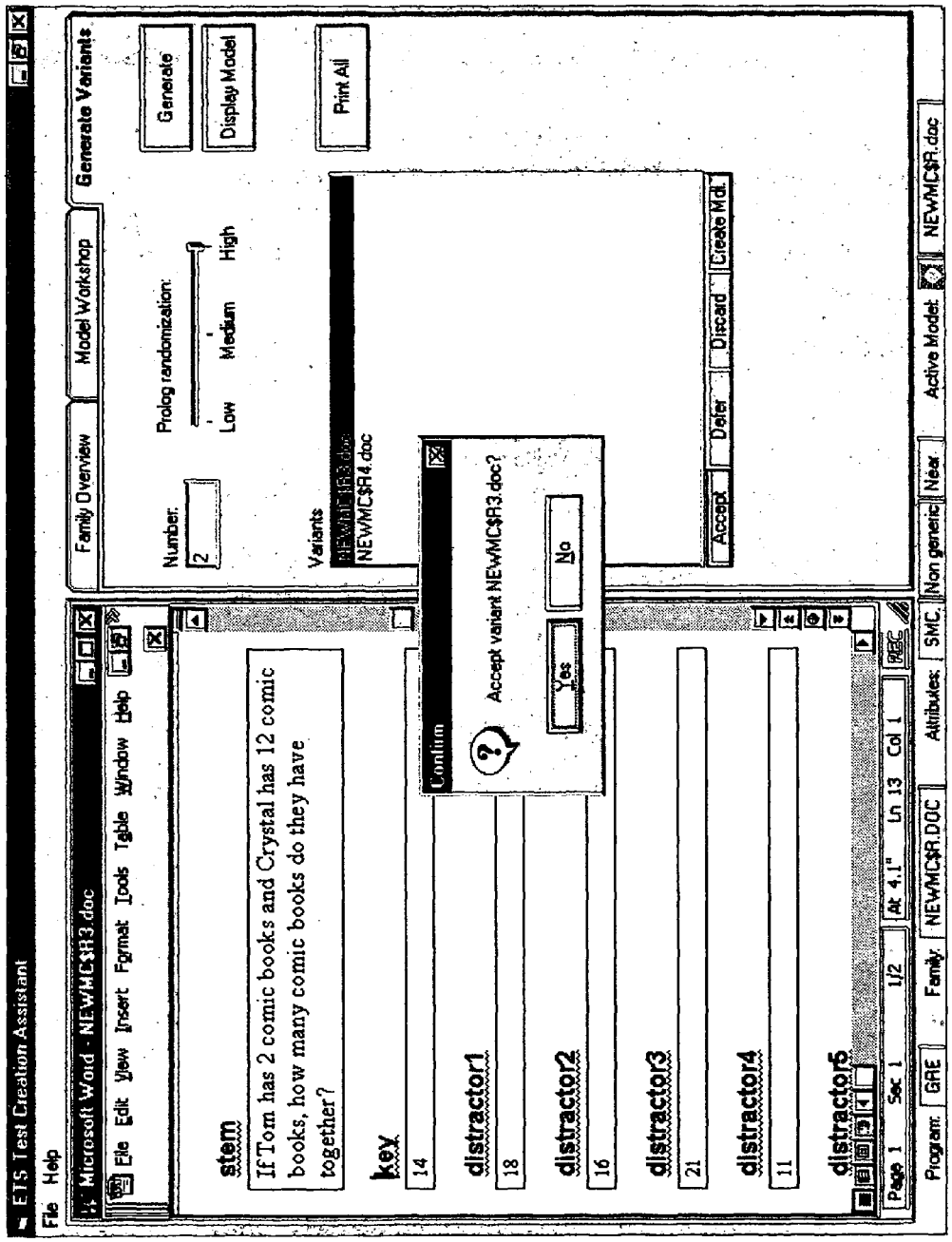

If the user is satisfied with one or more generated test item variants, the variants may be accepted. Selecting the variant "NEWMC$R3.doc" and clicking on the "Accept" button in FIG. 52 leads to FIG. 53 where a dialog box entitled "Confirm" appears and the user is given one more chance to accept the variant or not. Since the user chose to accept the variant, it no longer appears in the "Variants" window of the "Generate Variants" tab. See FIG. 54.

Deferring and Discarding Variants

Figure 54:
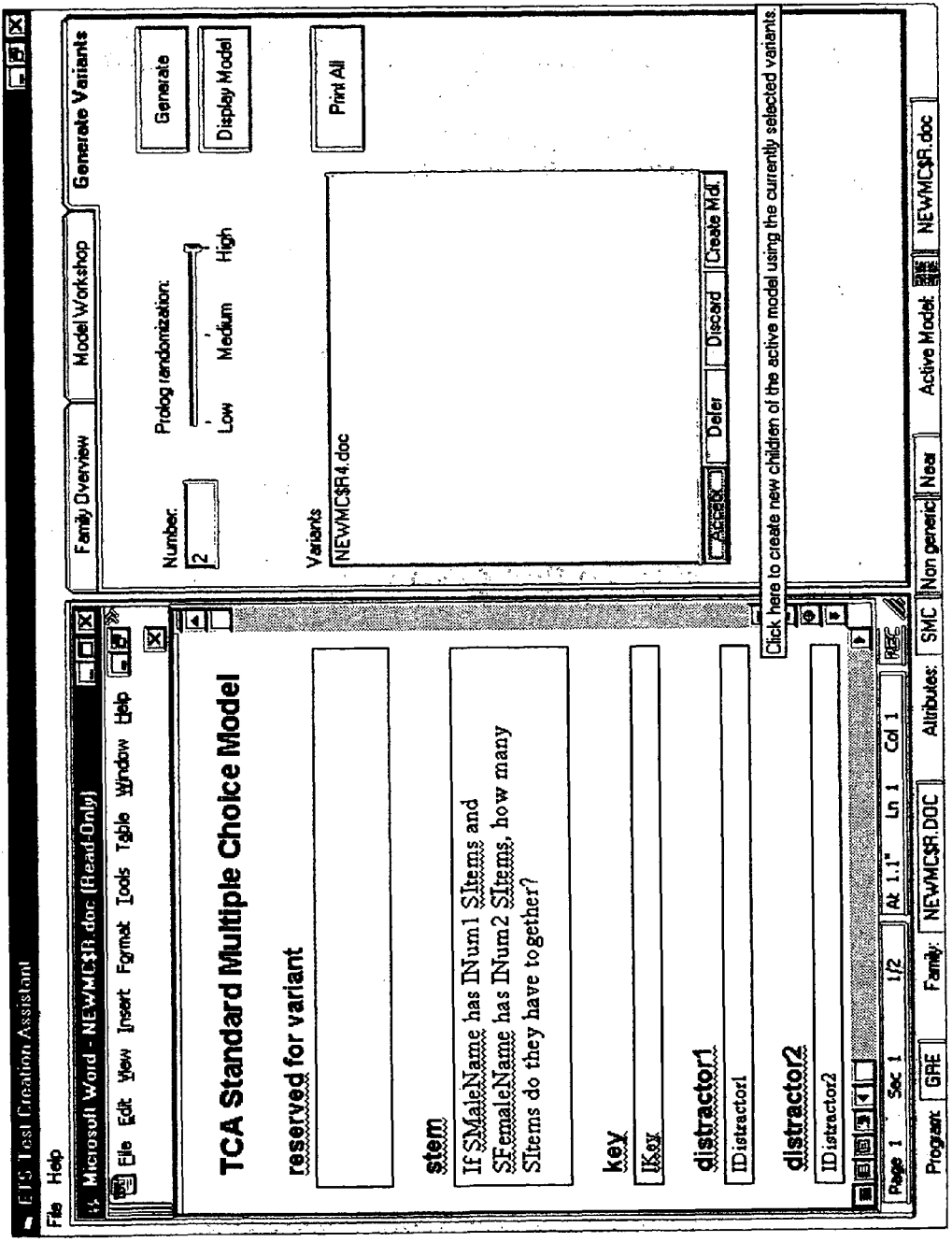
Figure 55:
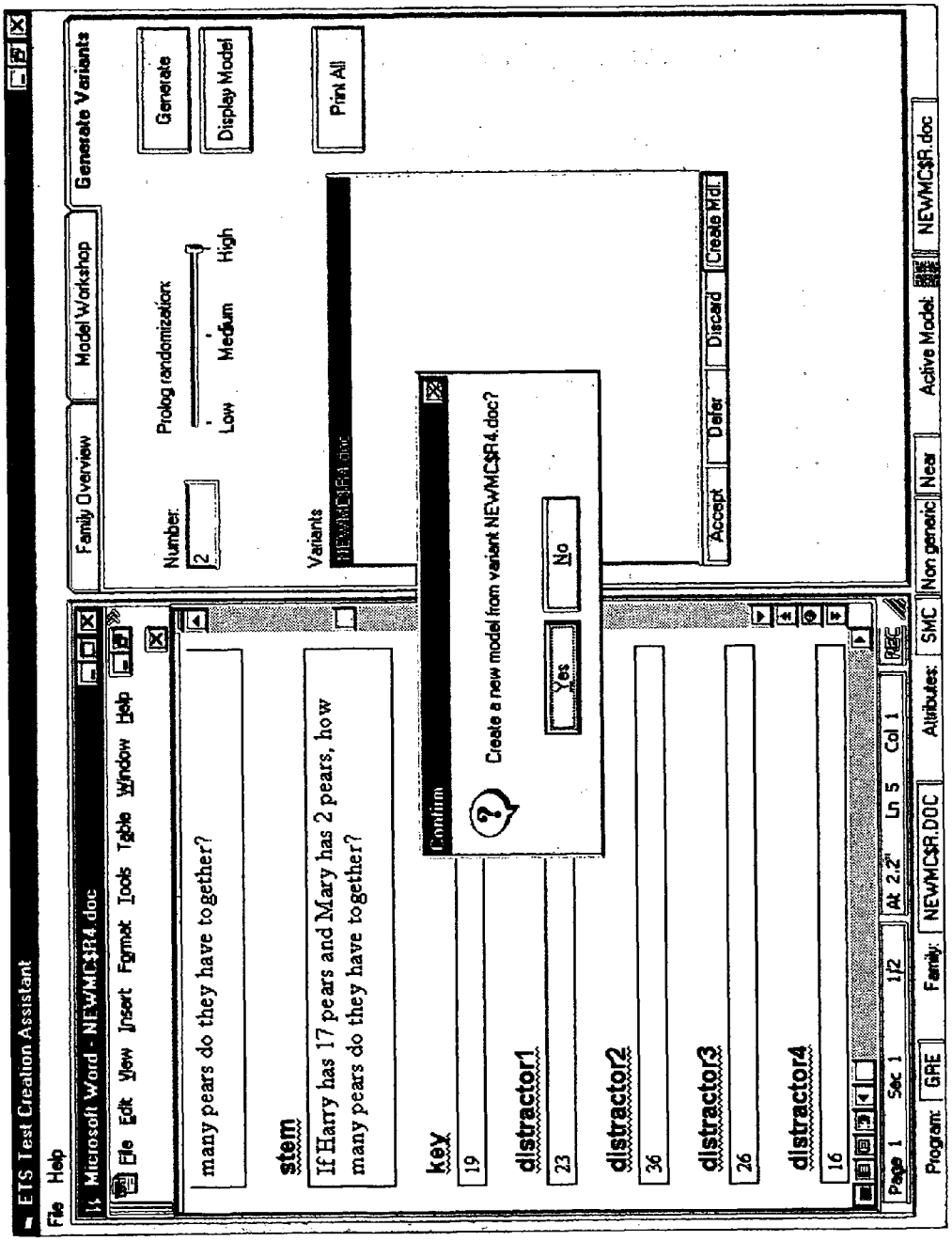

If the user does not "like" a variant, the variant can either be deferred by selecting and clicking on the "Defer" button, or discarded by selecting and clicking on the "Discard" button. FIG. 54. In deferring a variant, this preferred embodiment of TCA does not store the variant's check sum value, therefore, deferred variants could be generated again. On the other hand, discarded variant check sums are stored to ensure that they will not be regenerated in the future.

Creating New Variant Models from a Generated Variant

Figure 56:
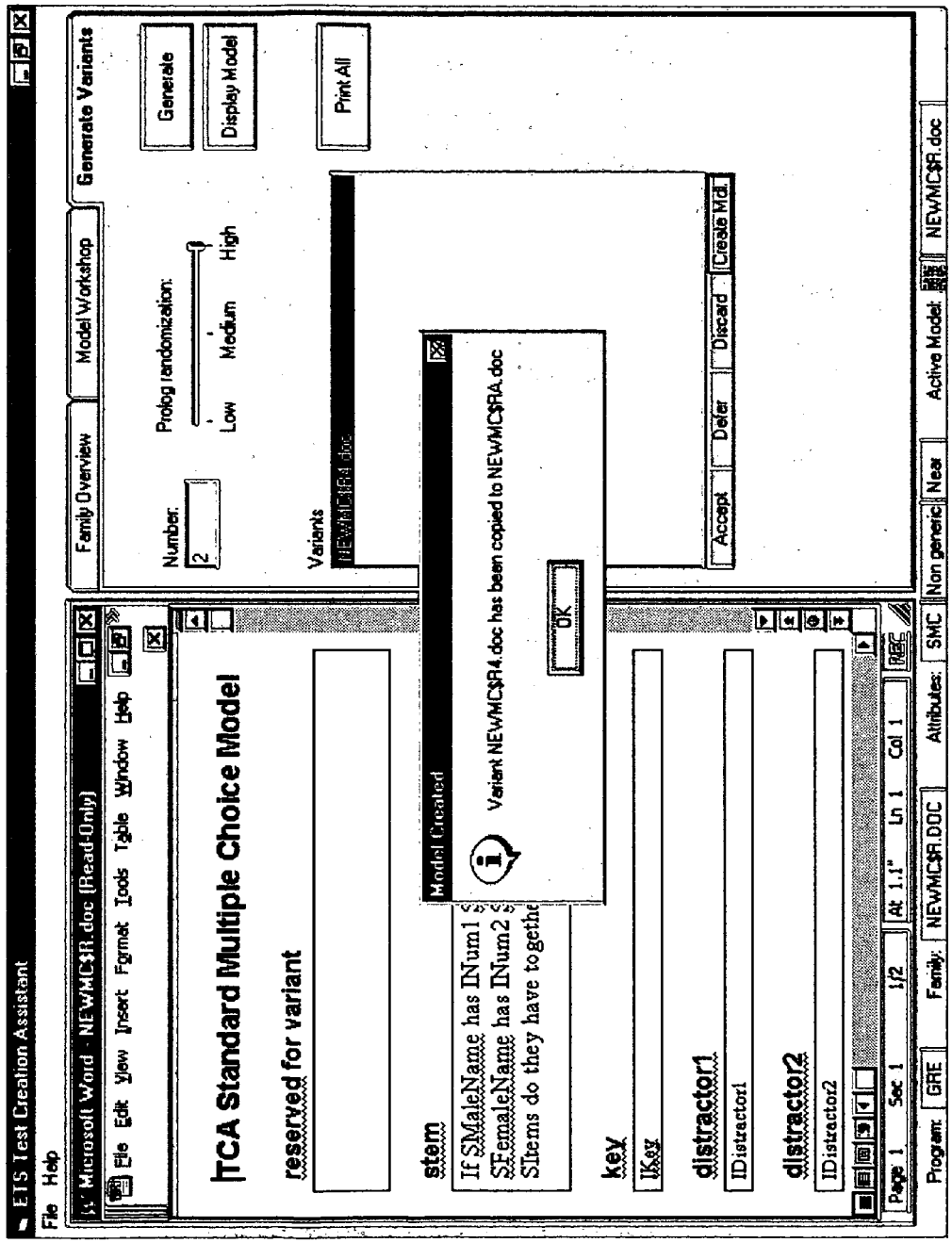

To create a new variant model (new children of the active model) from a particular variant, select the variant in the "Variants" window and click on the "Create Mdl." (Create Model) button on the icon bar located at the bottom of this window. FIG. 54. A dialog box entitled "Confirm" will appear, the user clicks on the "Yes" button, FIG. 54, to create a new model. The new model creation is confirmed by a dialog box entitled "Model Created". FIG. 56. Thus confirming that the variant has been copied with a new name. The name of the new model appears in the "Model Created" dialog box. In this case, the new model is named "NEWMC$RA.doc". The "R" means that the model is a root model, the "A" at the end of the name implies that it is a child of the model "NEWMC$R.doc". FIG. 56. In this way, the variables and the constraints of the previous model are preserved, so the user does not have to go in and start variabilizing from the beginning.

Accepted Variants and New Family Models

Figure 57:
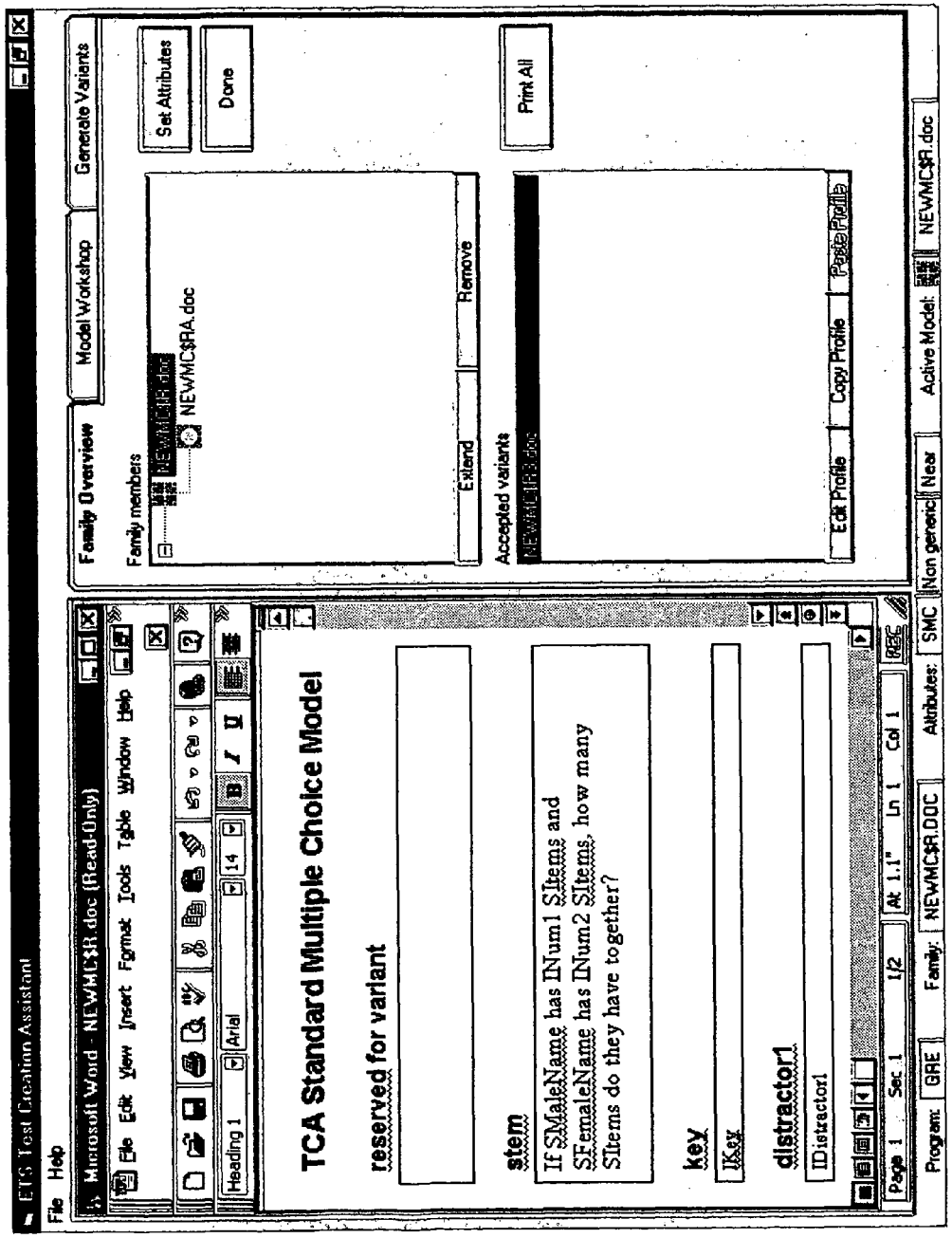

If the user clicks on the "Family Overview" tab, FIG. 57, "NEWMC$RA.doc" appears in the "Family members" window. A sun icon next to this name indicates that the model is active. The "snowflake" icon to "NEWMC$R.doc" indicates that this model is "frozen". As soon as at least one item variant generated from an item model is accepted, the item model is frozen. A frozen item model can be viewed and used to generate more item variables and unfrozen child models, but the model is blocked to future changes. Finally, the accepted variant "NEWMC$R3.doc" appears in the "Accepted variants" window. FIG. 57.

Working with Models and Accepted Variants

Figure 58:
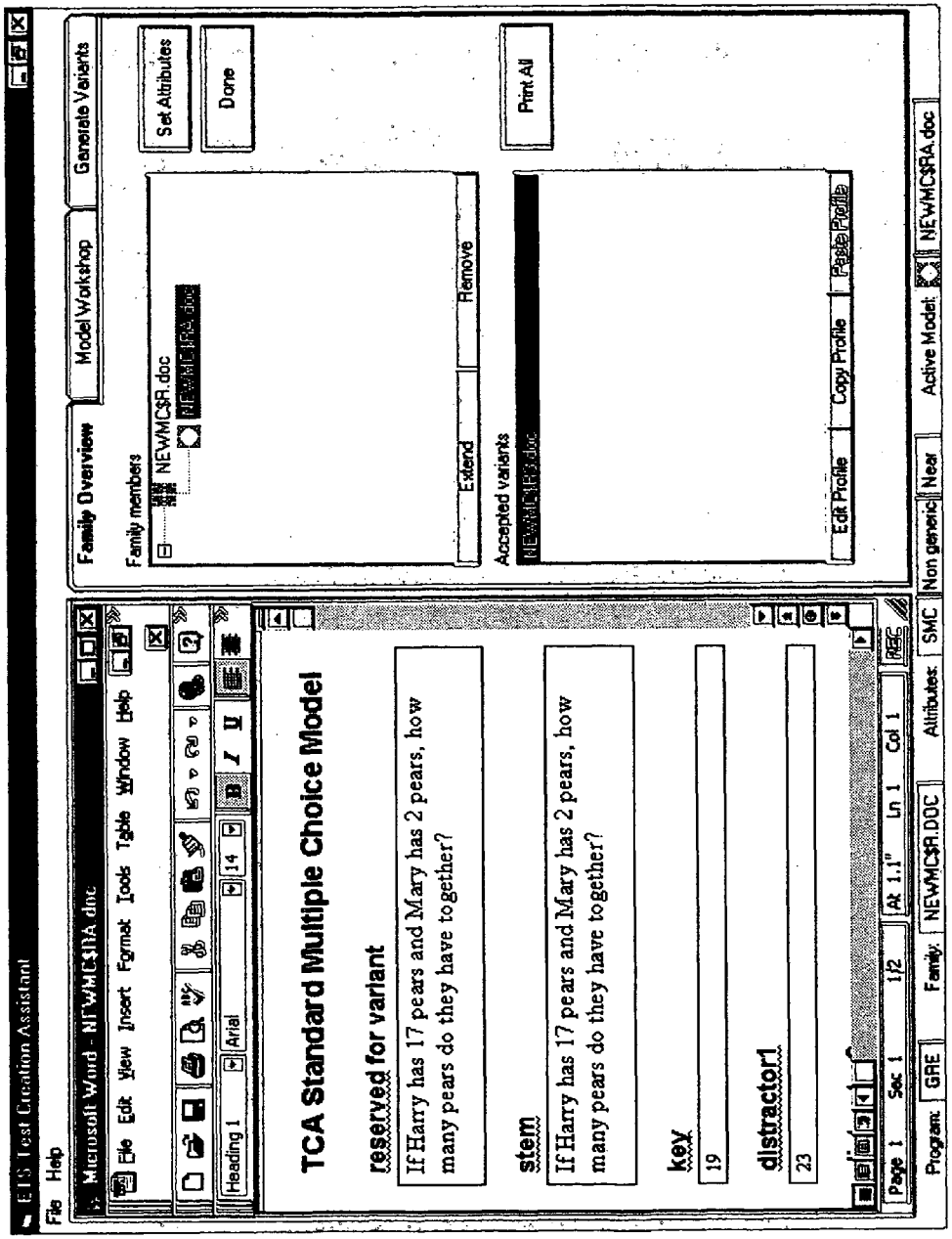
Figure 59:
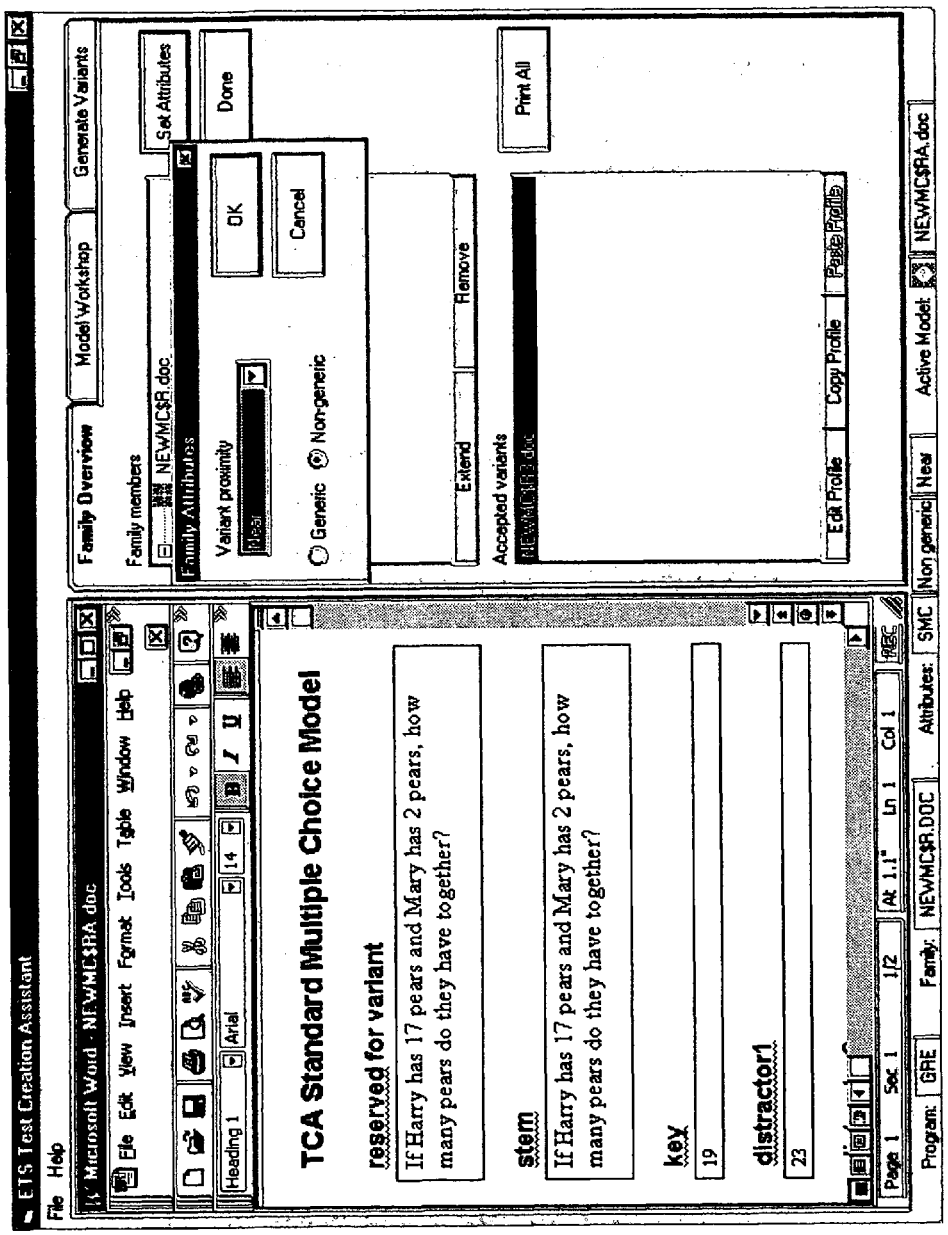
Figure 60:
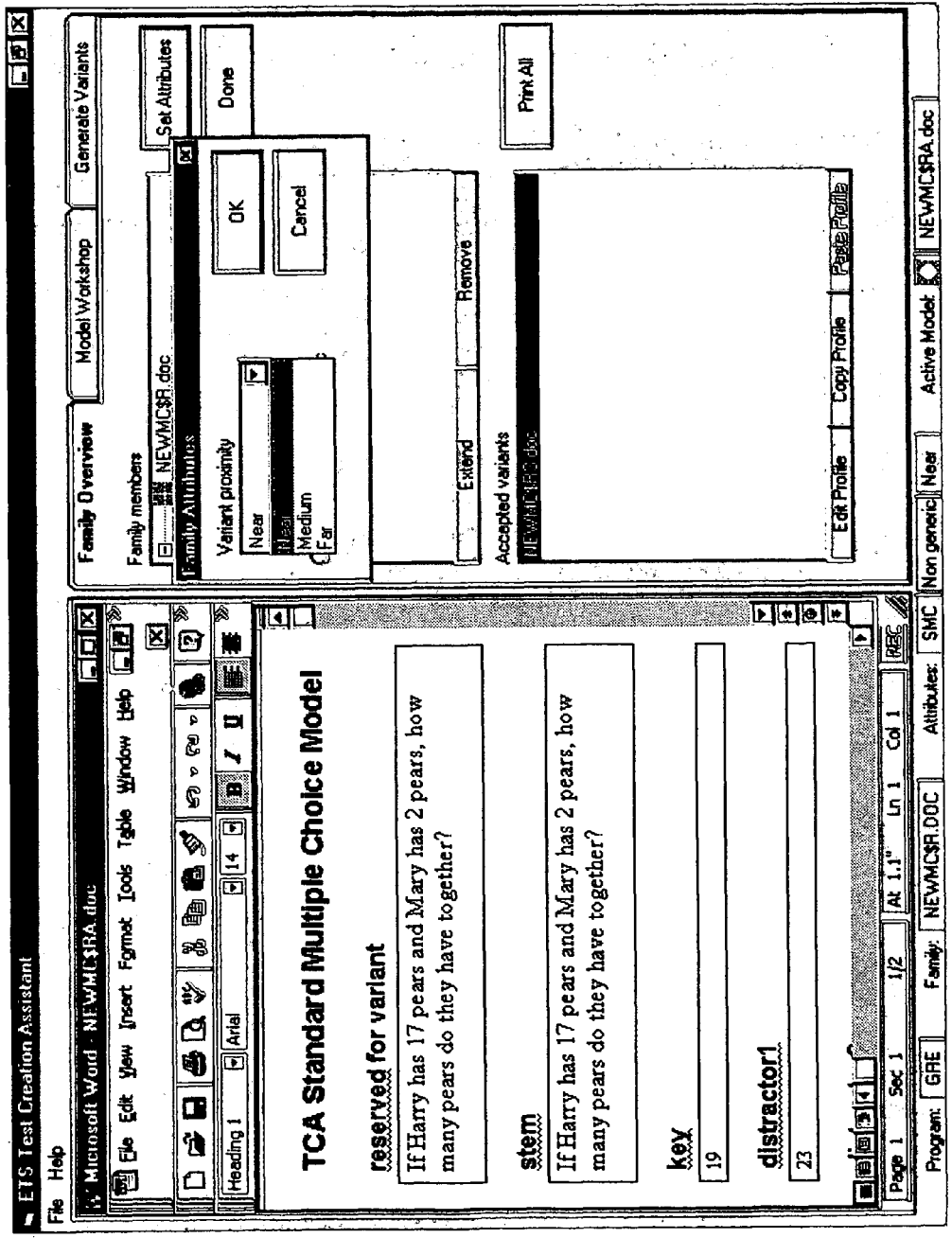

To begin working with the new model "NEWMC$RA.doc" click on the name and the model will appear in the MICROSOFT WORD® window. FIG. 58. Click on "Set Attributes" button in FIG. 58 brings up the "Family Attributes" dialog box. FIG. 59. The user has the option of choosing either "Generic" or "Non-generic". Variants are considered "generic variants" if they are very familiar in terms of structure and content, otherwise variants are called "non-generic variants". The user also has the option of choosing the "Variant proximity". As can be seen in FIG. 60 the proximity can be "Near", "Medium" or "Far". Clicking "OK" after making the appropriate selection in the "Family Attributes" box associates the selections with the model.

Figure 61:
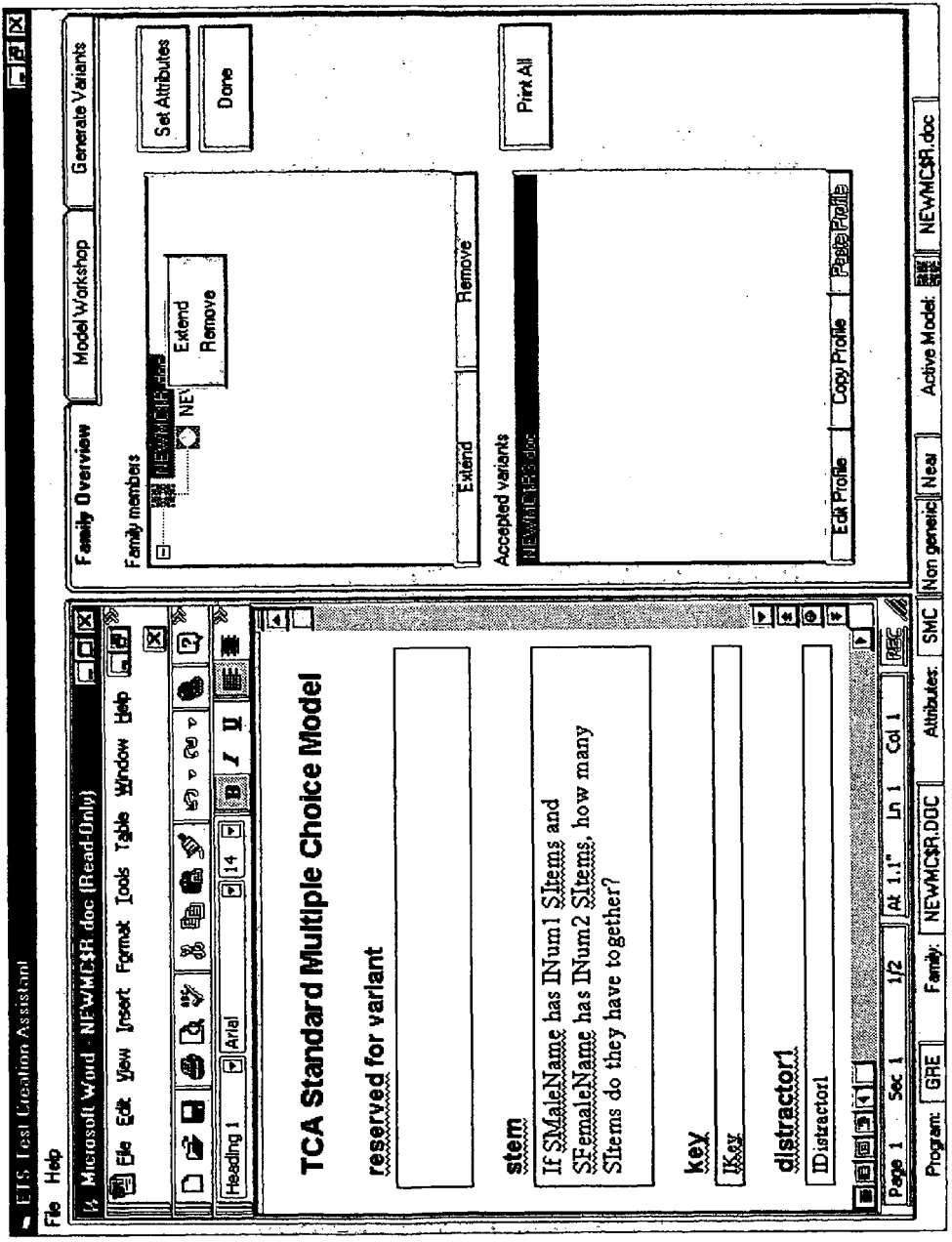
Figure 62:
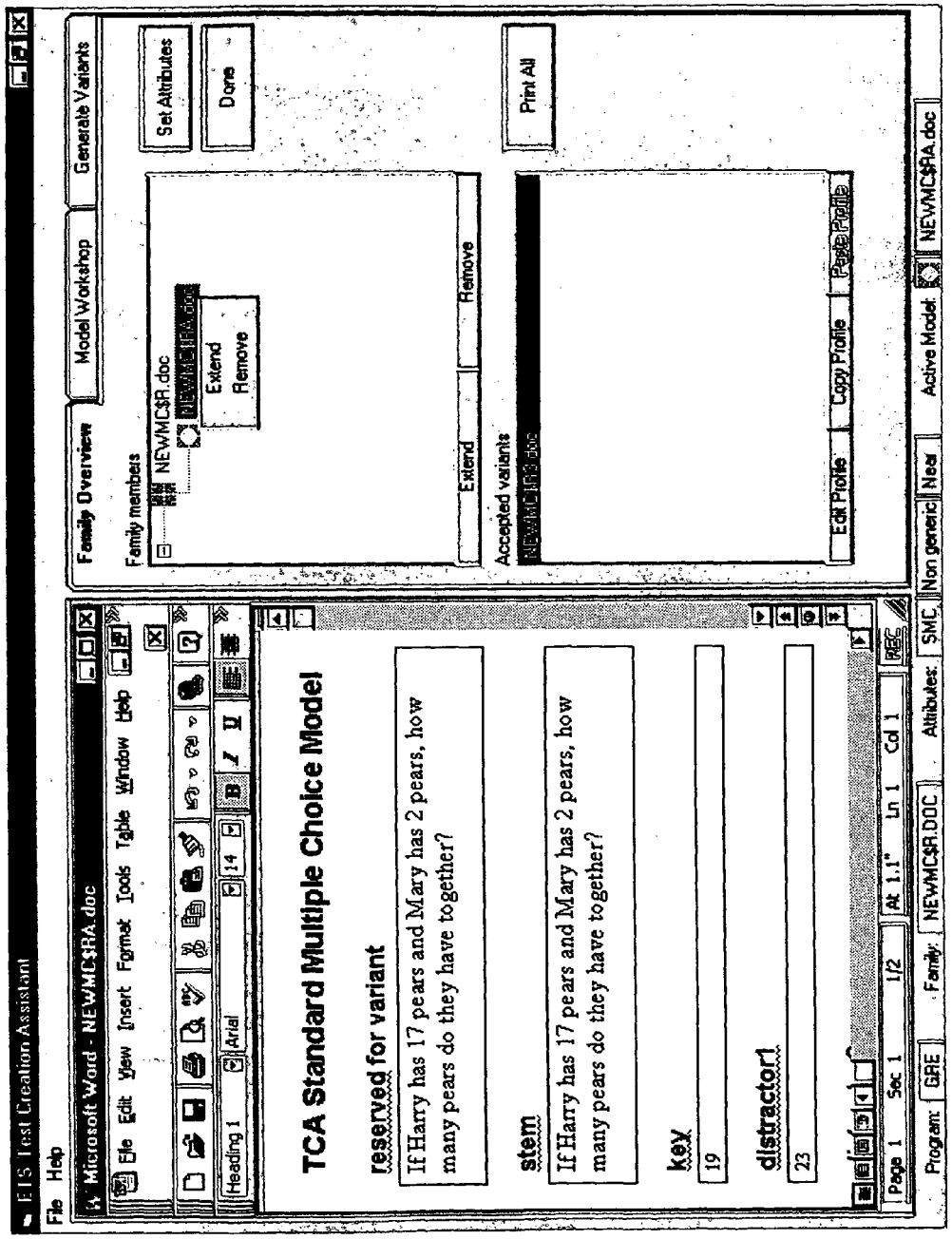

To "extend" (make a copy) or remove a "frozen" model or "un-frozen" model, the user selects the item, right mouse-button clicks, and selects "Extend" or "Remove". FIG. 61. The same could be done by using buttons "Extend" and "Remove" that are located on the bar at the bottom of the "Family members" window. FIGS. 61-62.

Editing the Profile of a Variant

Figure 63:
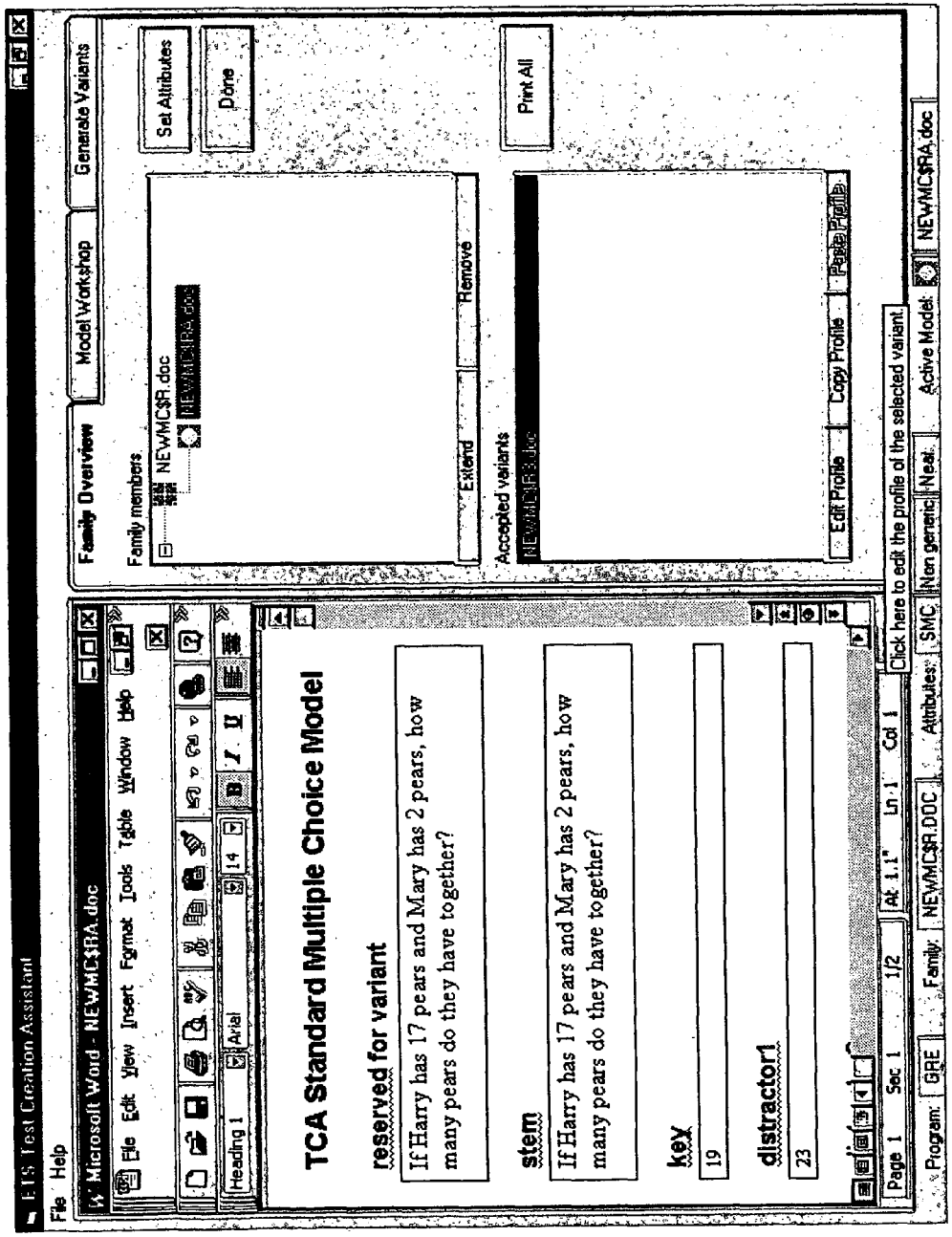
Figure 64:
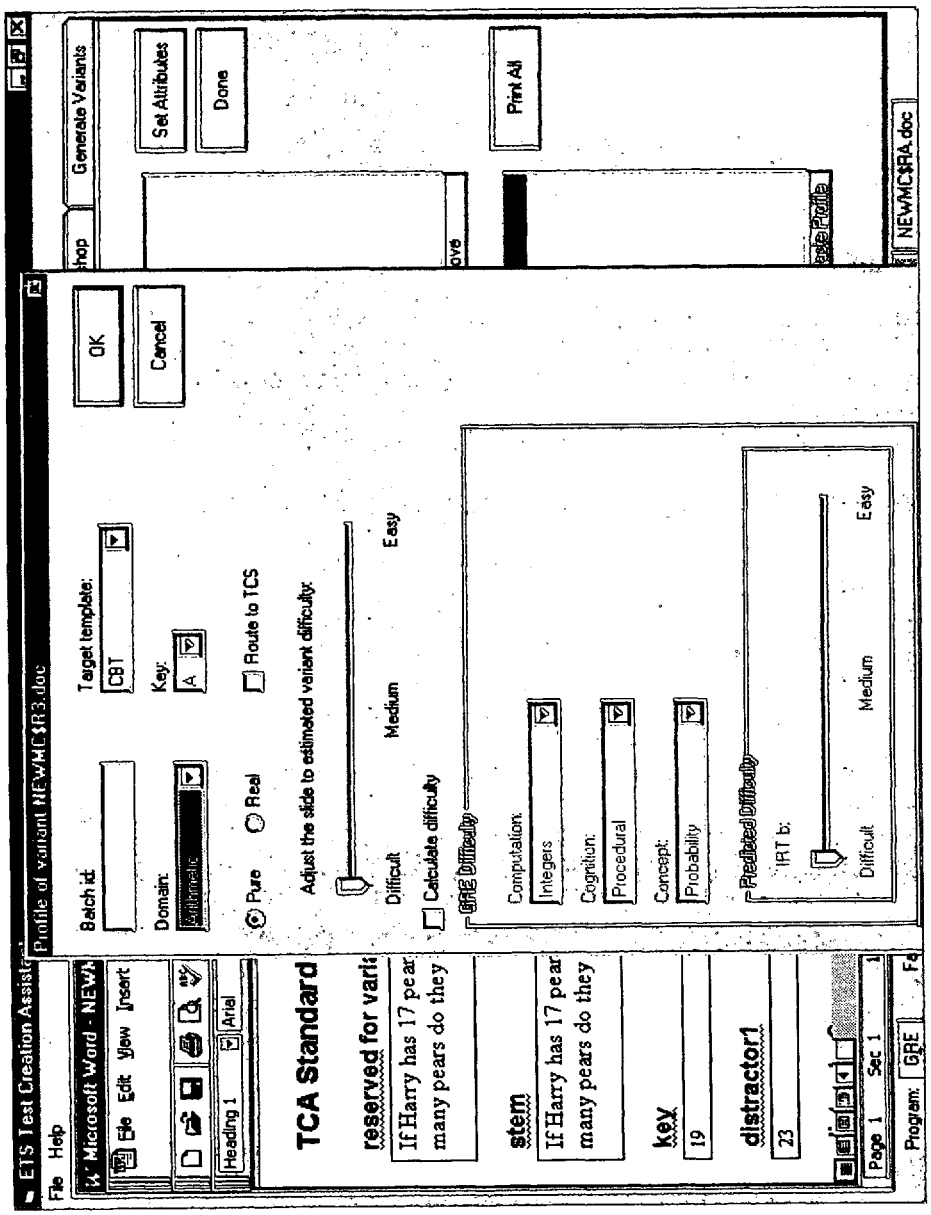
Figure 65:
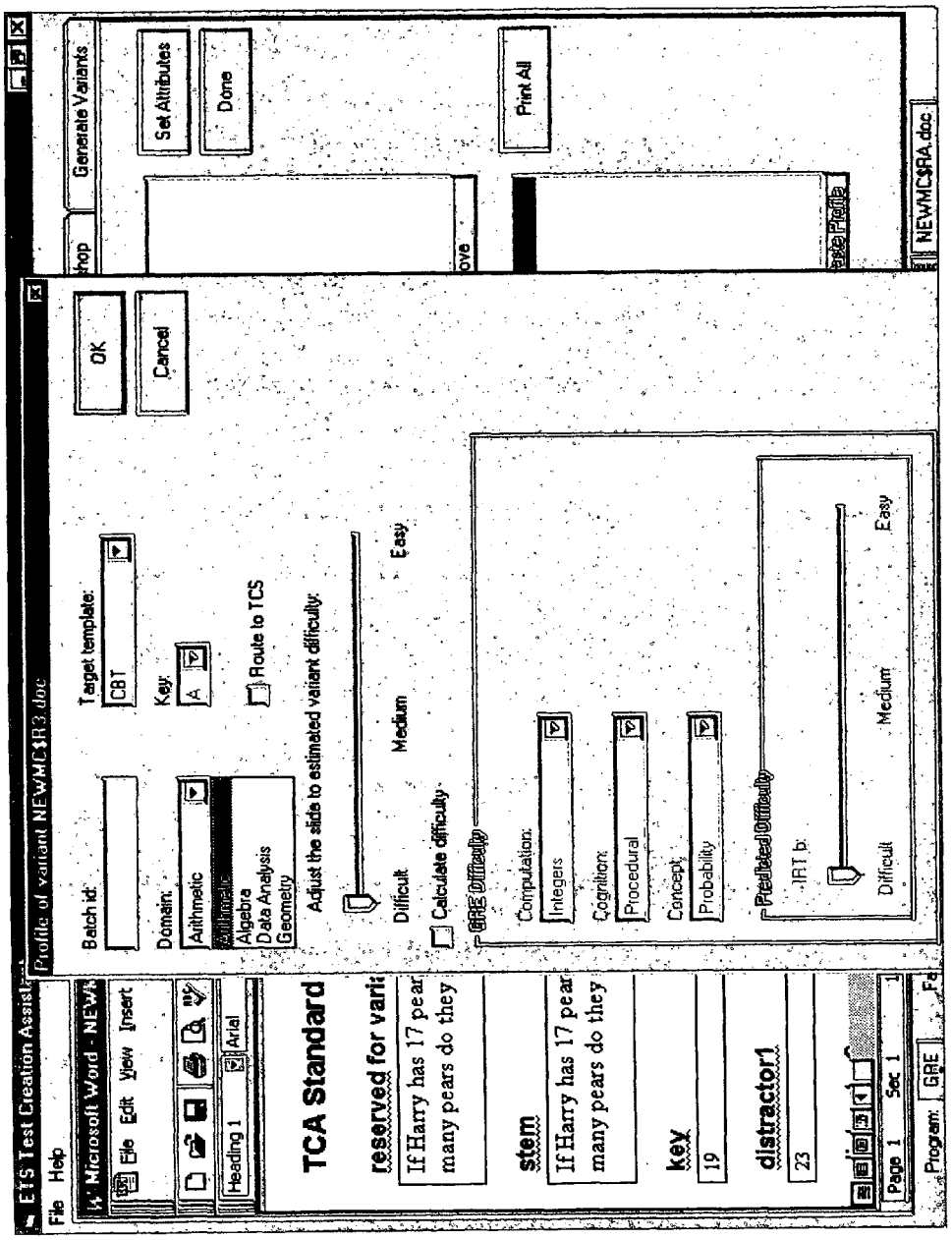
Figure 66:
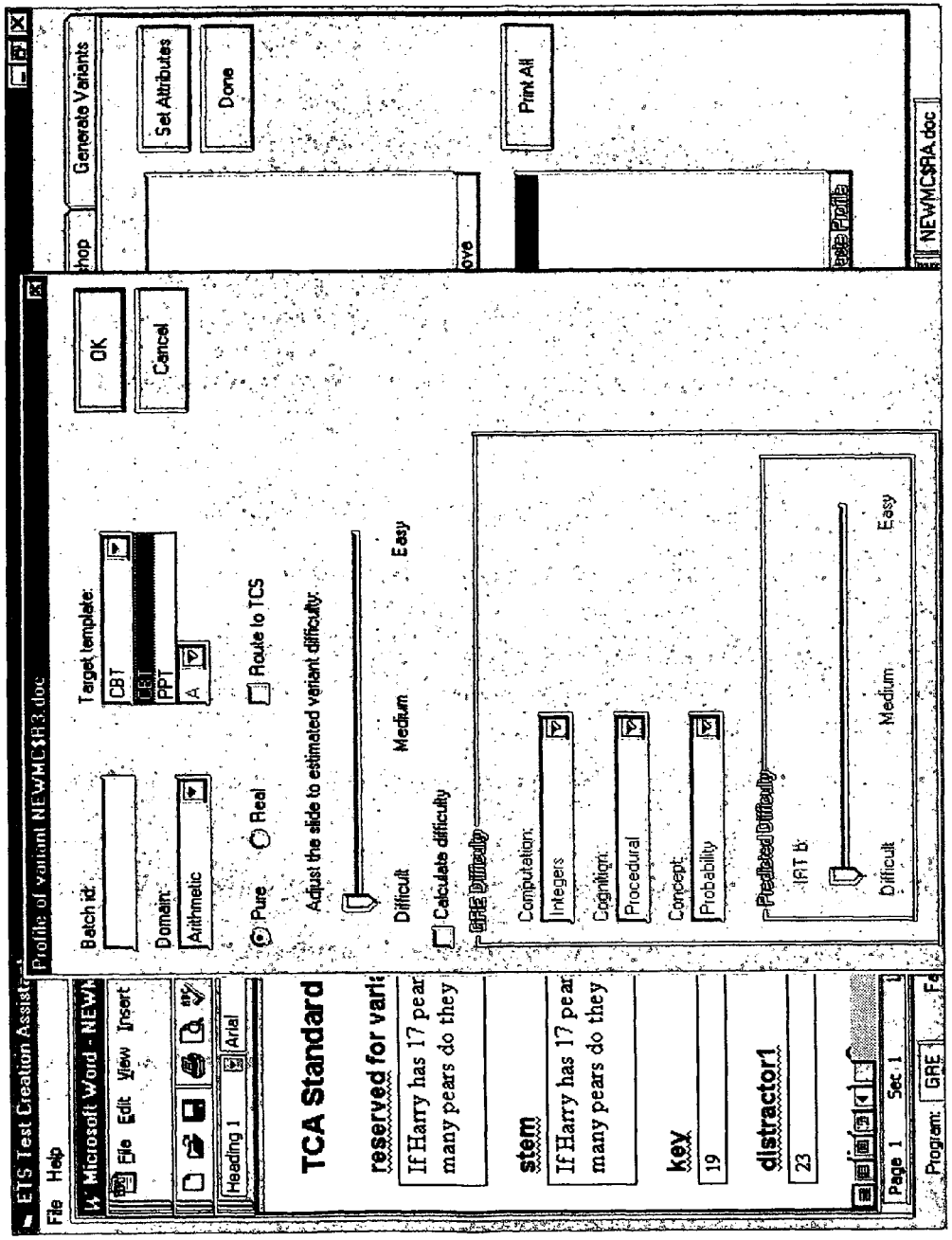

To edit or copy the profile of an accepted variant, select the variant and click on the "Edit Profile" or "Copy Profile" button as appropriate. They are located on the bar at the bottom of "Accepted variants" window. FIG. 63. Clicking on "Edit Profile" brings up the "Profile of variant [name of variant]" dialog box. FIG. 64. Clicking on the arrow next to the "Domain:" window in FIG. 64 brings down the selection of domains: Arithmetic, Algebra, Data Analysis, or Geometry. FIG. 65. Clicking on the arrow next to the "Target template:" window in FIG. 64 brings down the selection of targets: "CBT" for computer based testing or "PPT" for paper and pencil testing. FIG. 66.

The user can also select either "Pure" or "Real" shown for example in FIG. 66. A Pure test item is one in a mathematical setting. A Real test item is one that is based on a real-life situation. The user can also select Route to TCS (ETS' Test Creation System) shown for example in FIG. 66. ETS' Test Creation System is disclosed in U.S. Pat. No. 6,000,945, which is hereby fully incorporated by reference herein.

The GRE Difficulty Portion of the Profile of a Variant Window

Figure 67:
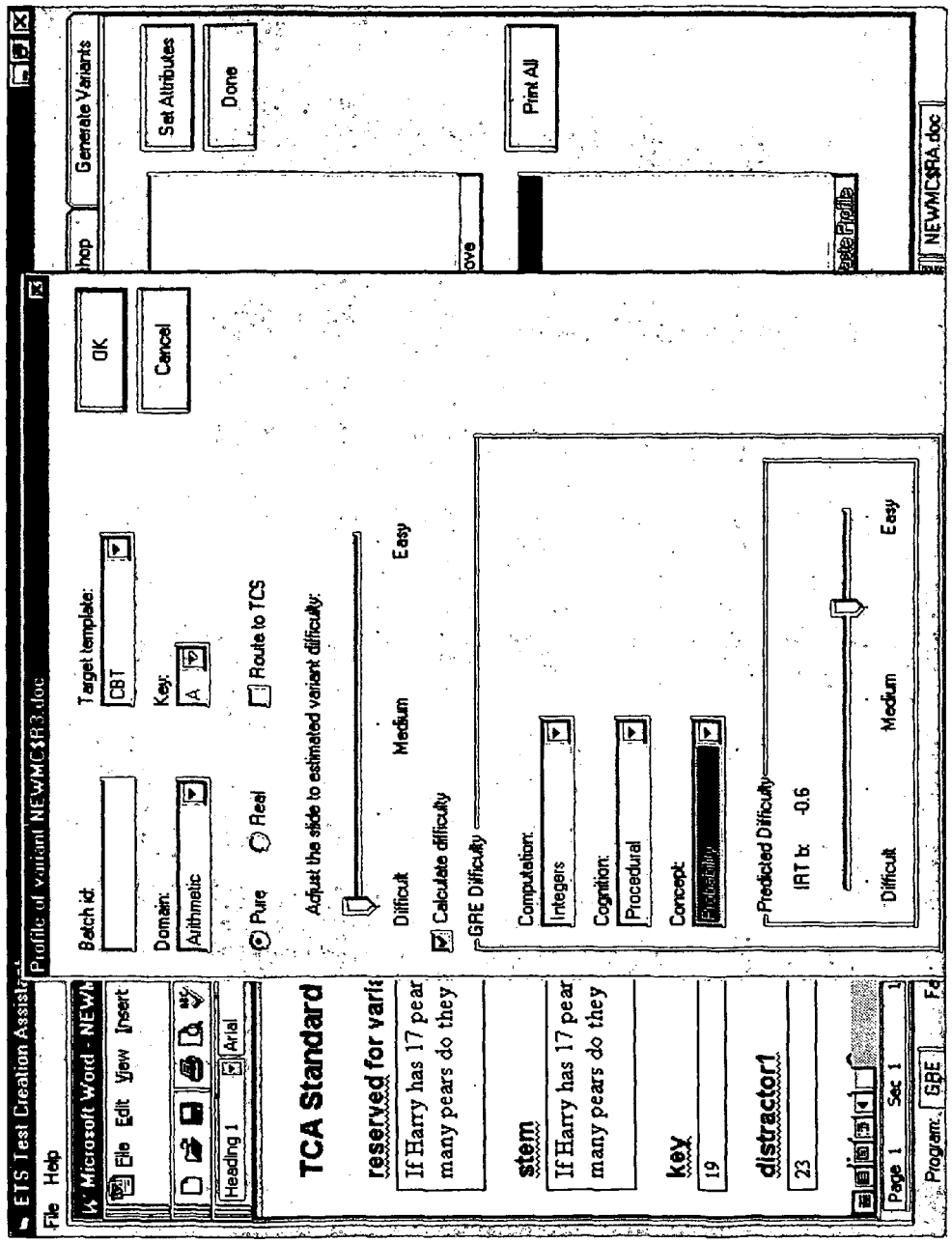
Figure 68:
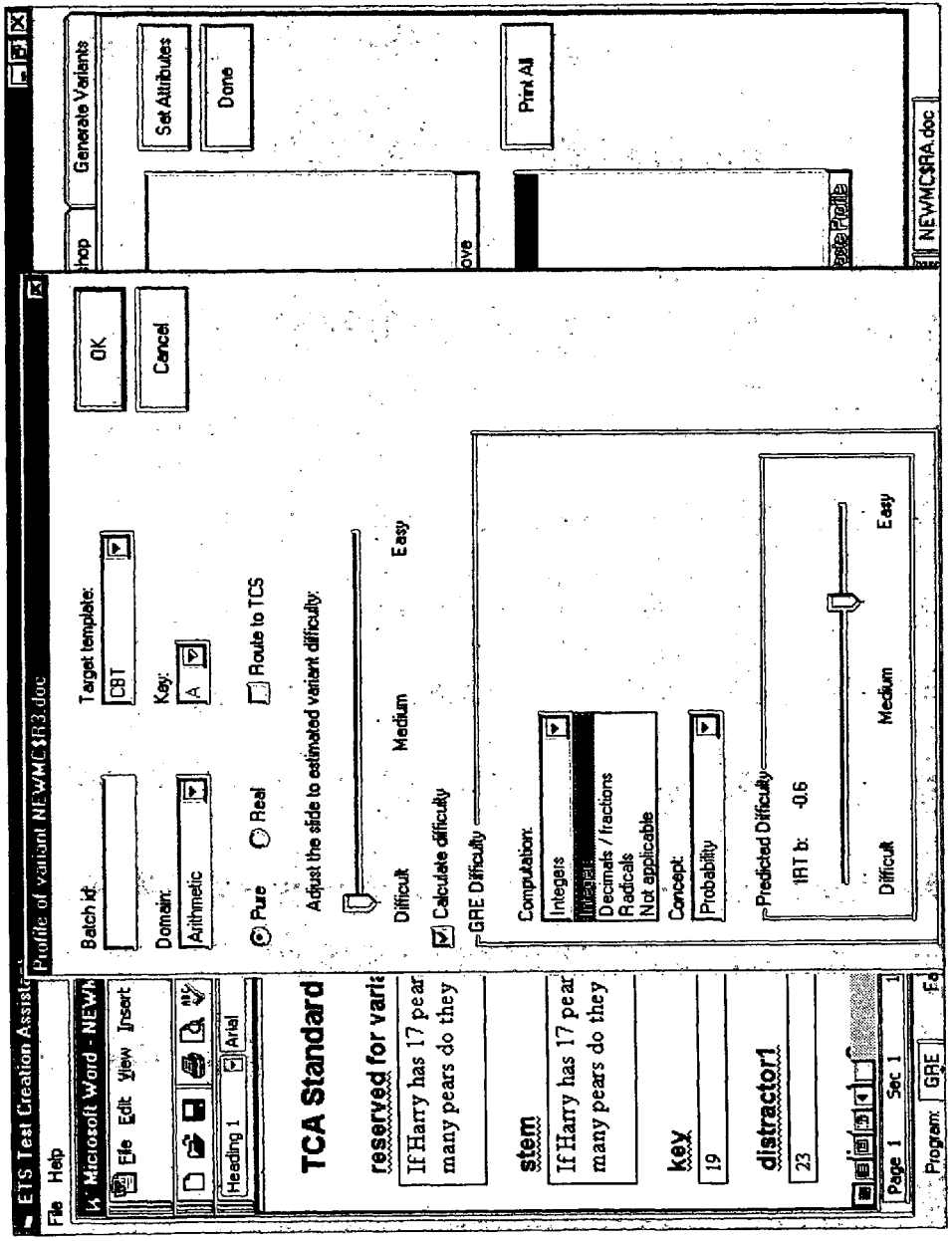
Figure 69:
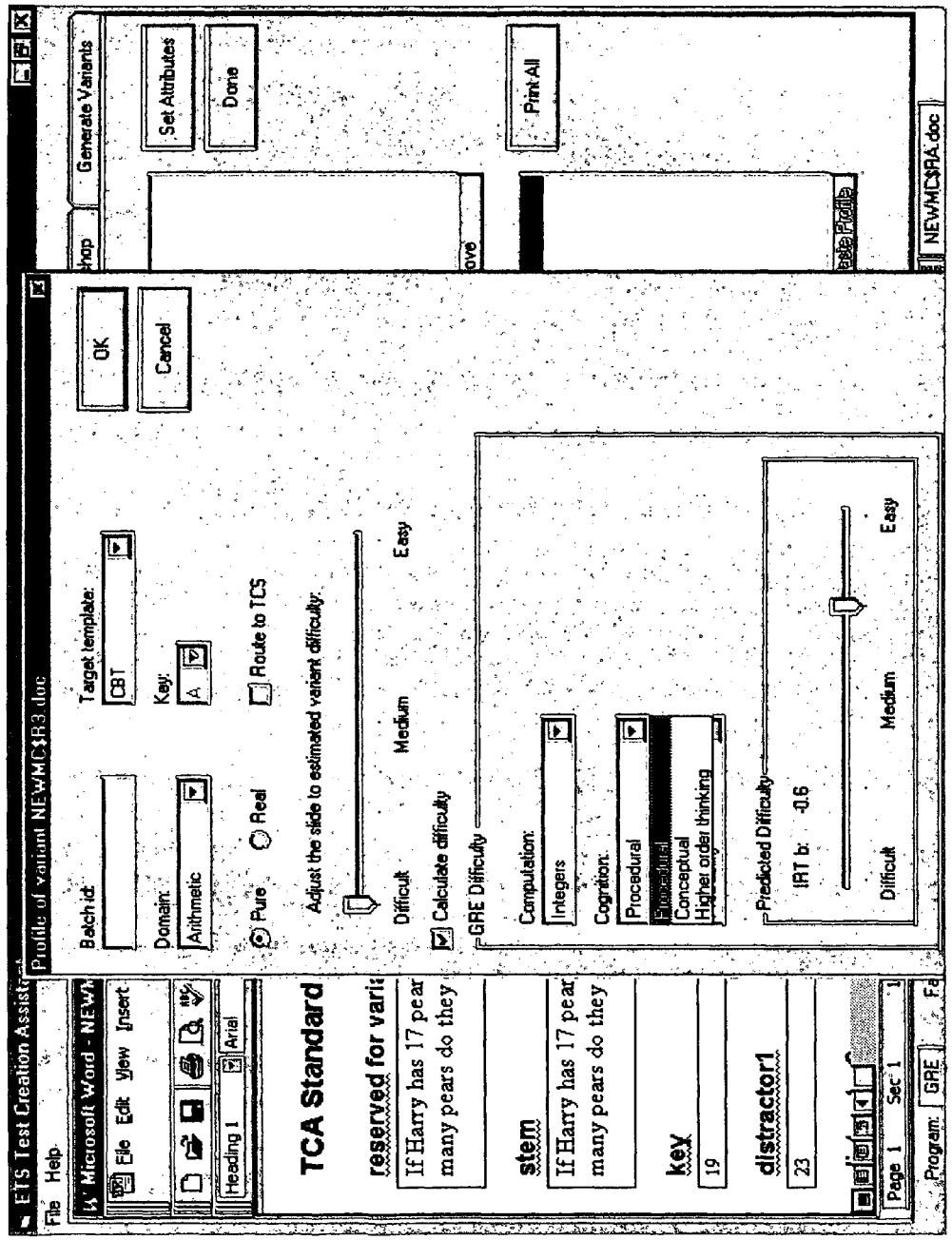
Figure 70:
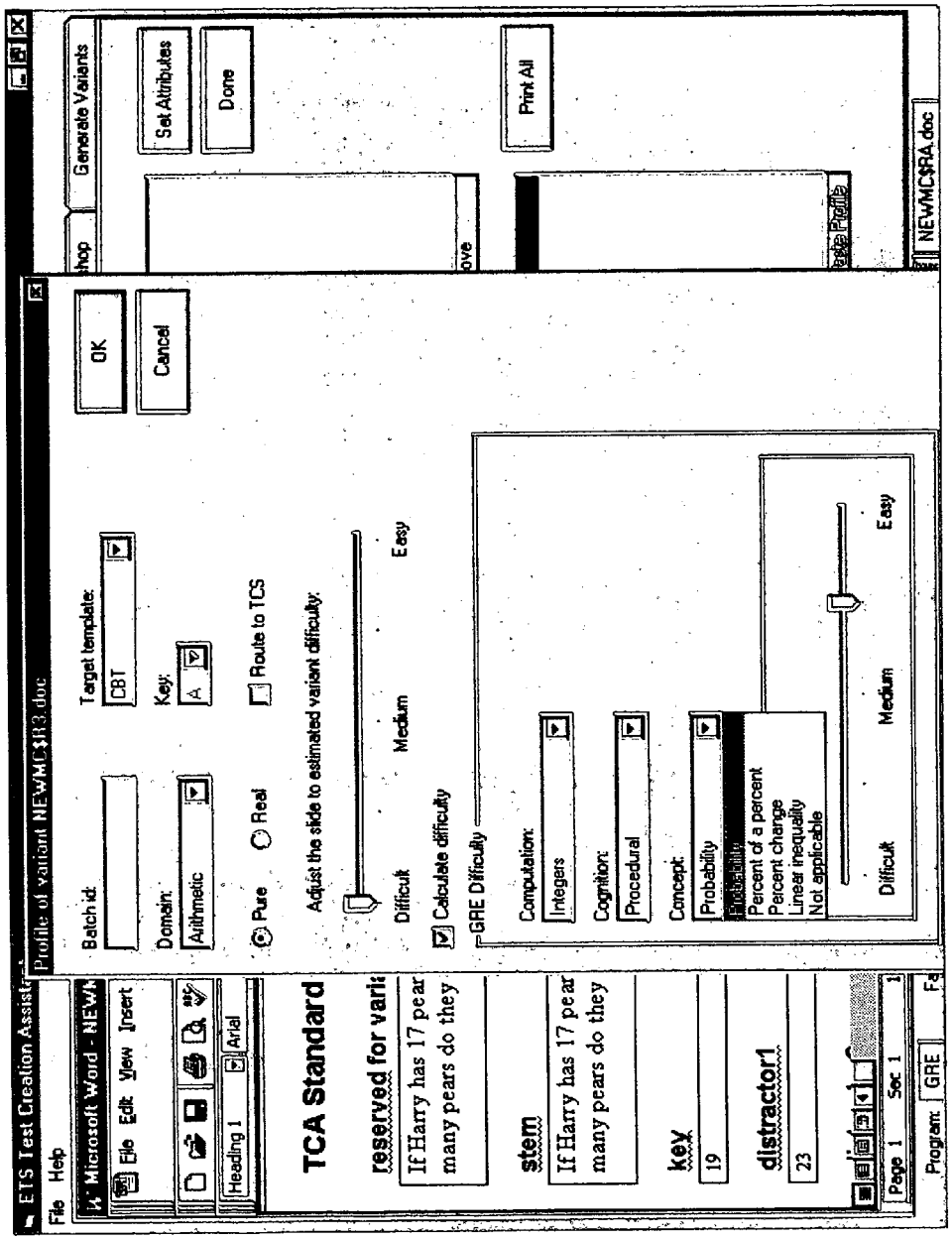

The "GRE Difficulty" portion of the Profile of variant window shown in FIG. 67, for example, has several components. Clicking on the arrow next to the "Computation:" window, brings down the following selection which denotes the type of numbers used in the test item: Integers, Decimal/fractions, Radicals, or Not applicable. FIG. 68. In the same fashion, the "Cognition:" window provides selections for denoting the sort of process the test item requires the test taker to go through to arrive at the answer, namely: Procedural, Conceptual, or Higher order thinking. FIG. 69. The "Concept" window provides selections for denoting the basic concepts tested by the item, namely: Probability, Percent of a percent, Percent change, Linear inequality, or Not applicable. FIG. 70. "Adjust the slide to estimated difficulty:" allows the user to denote his or her opinion of the difficulty of the variant. See, for example, FIG. 70. The "Key:" window allows the user to denote the correct answer. Finally, the "Predicted Difficulty" or IRT b measure is calculated from other entries in the window (e.g., whether the item is arithmetic or algebra).

Working with Family Members

Figure 71:
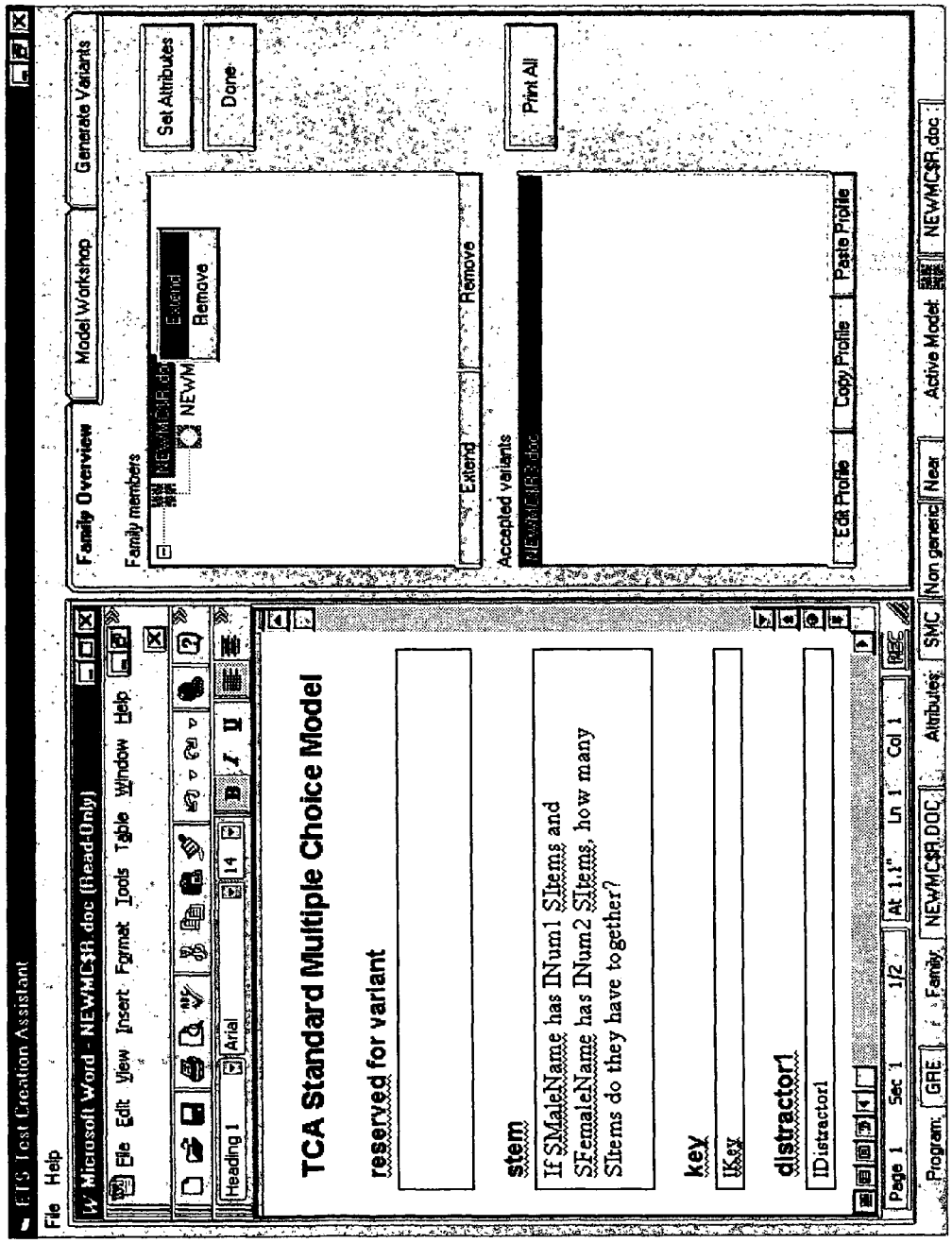
Figure 72:
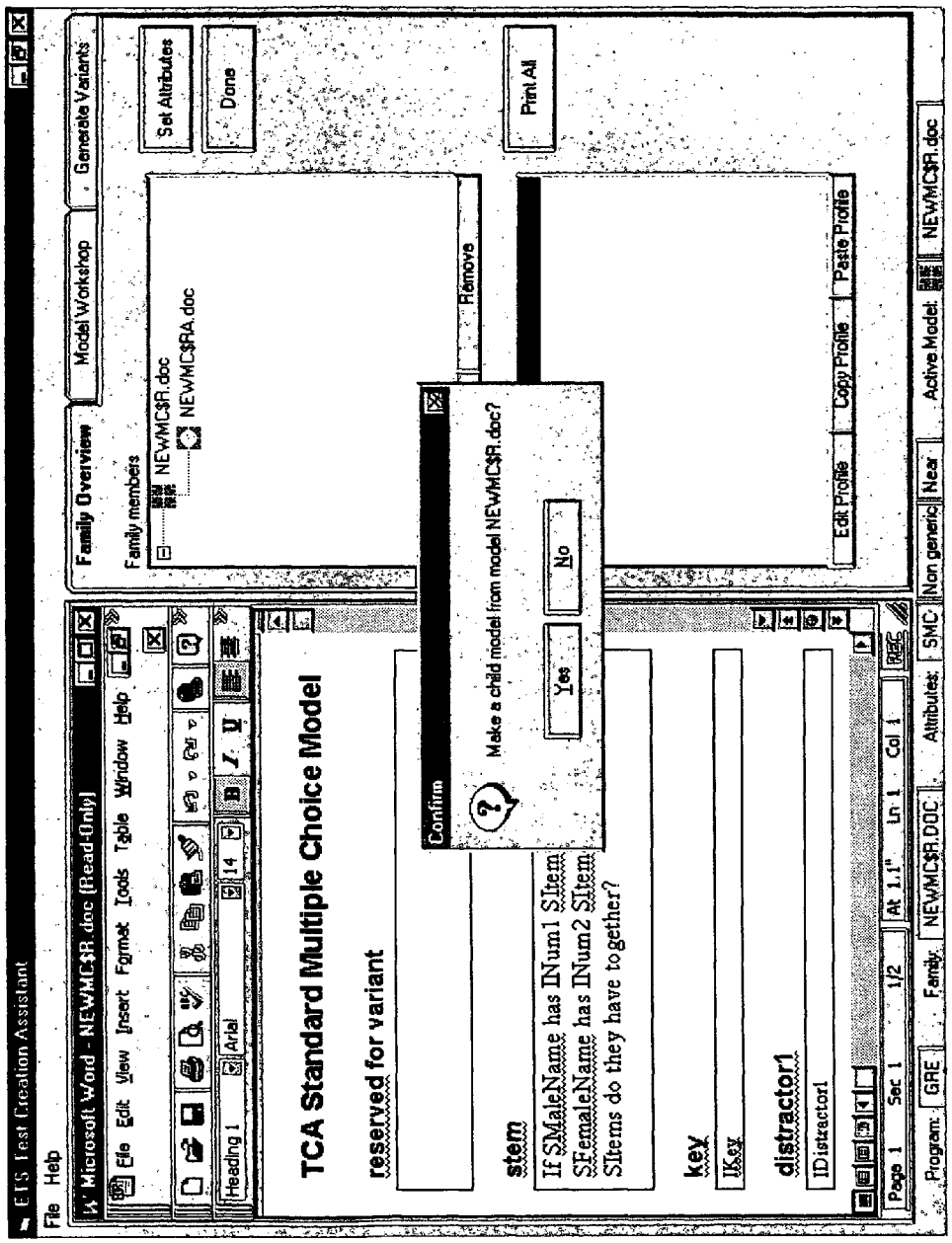
Figure 73:
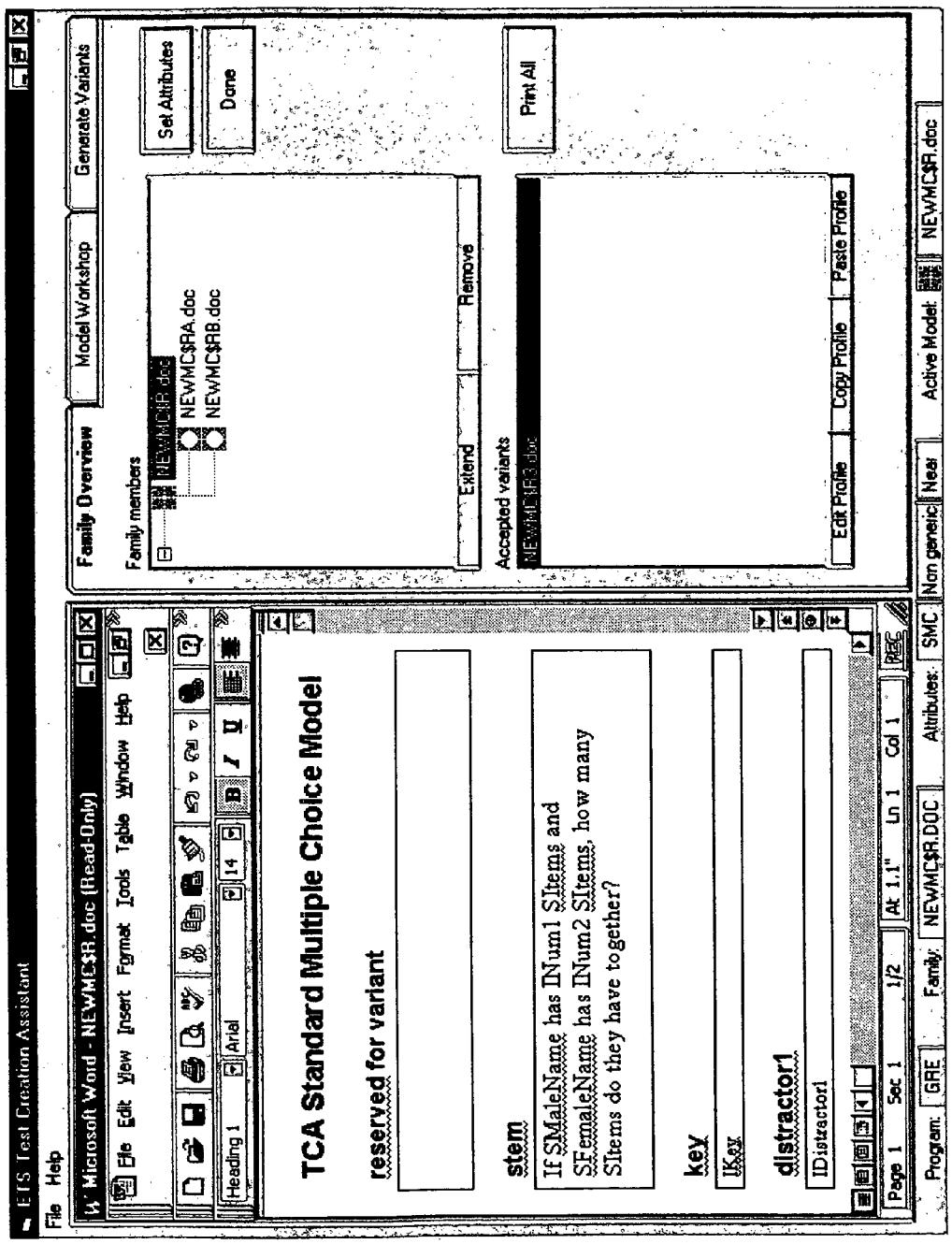

Back at the "Family Overview" window, FIG. 71, by selecting the "frozen model" "NEWMC$R.doc", right mouse-button clicking, and selecting "Extend", the user can extend the "NEWMC$R.doc". In response to selecting "Extend", the "Confirm" window pops up, FIG. 72 and clicking on "Yes" extends the model. New active model "NEWC$RB.doc" then appears in the "Family members" window. FIG. 73.

Using a New Active Model to Generate Far Variants

The new model is immediately available for the user. Clicking on the Model Workshop tab for "NEWC$RB.doc"

brings the user to a place where he or she can modify the model. For example, the user could replace the stem:

"If SMaleName had INum1 SItems and SFemaleName had INum2 SItems, how many SItems would they have together?";

with "SStem"; add "SStem" as a new variable; and add

Figure 73A:
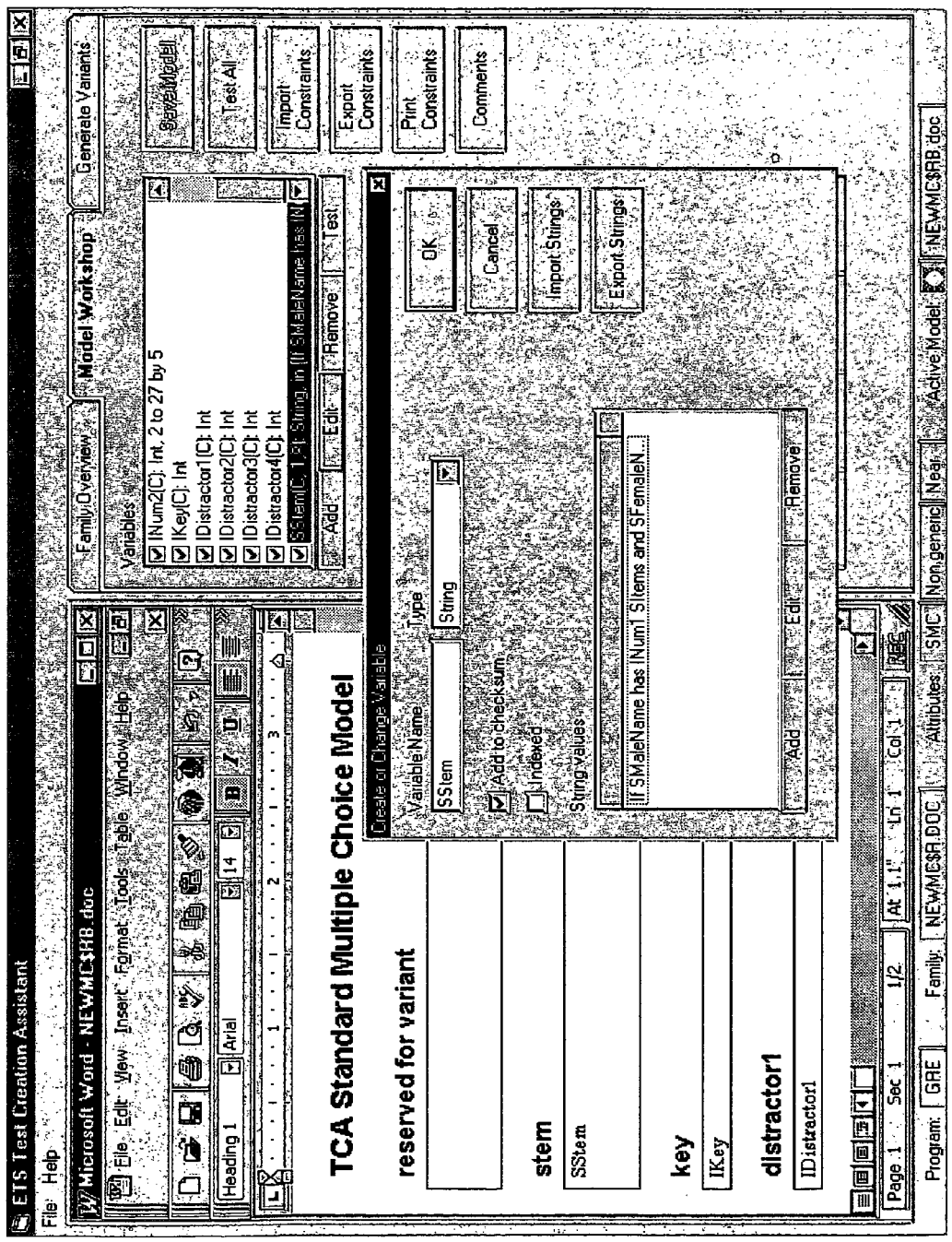

"If SMaleName had INum1 SItems and SFemaleName had INum2 SItems, how many SItems would they have together?";

as a String value for "SStem". See FIG. 73A. The user could also add other values for "SStem", for example, "INum1+INum2=?".

Figure 73B:
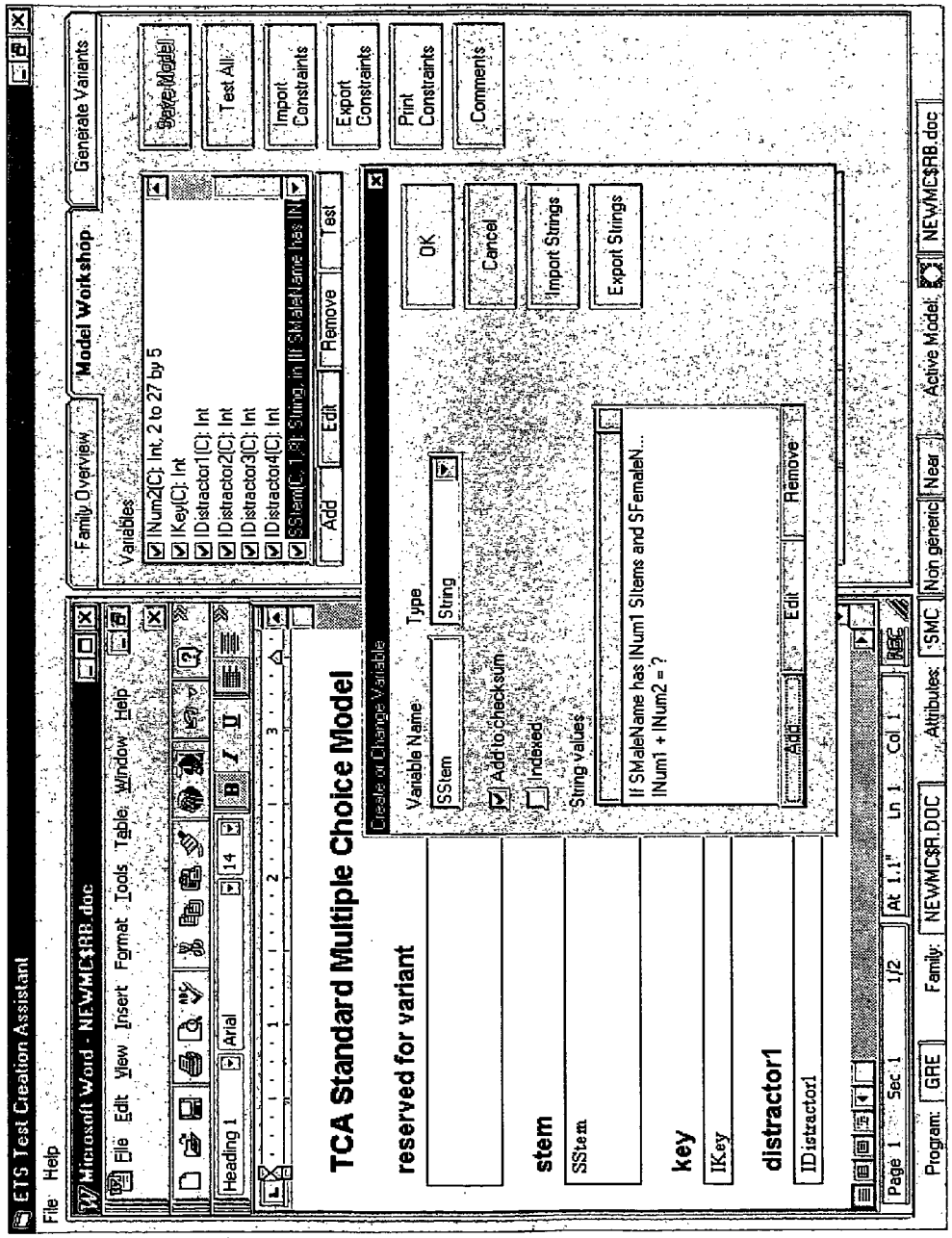
Figure 73C:
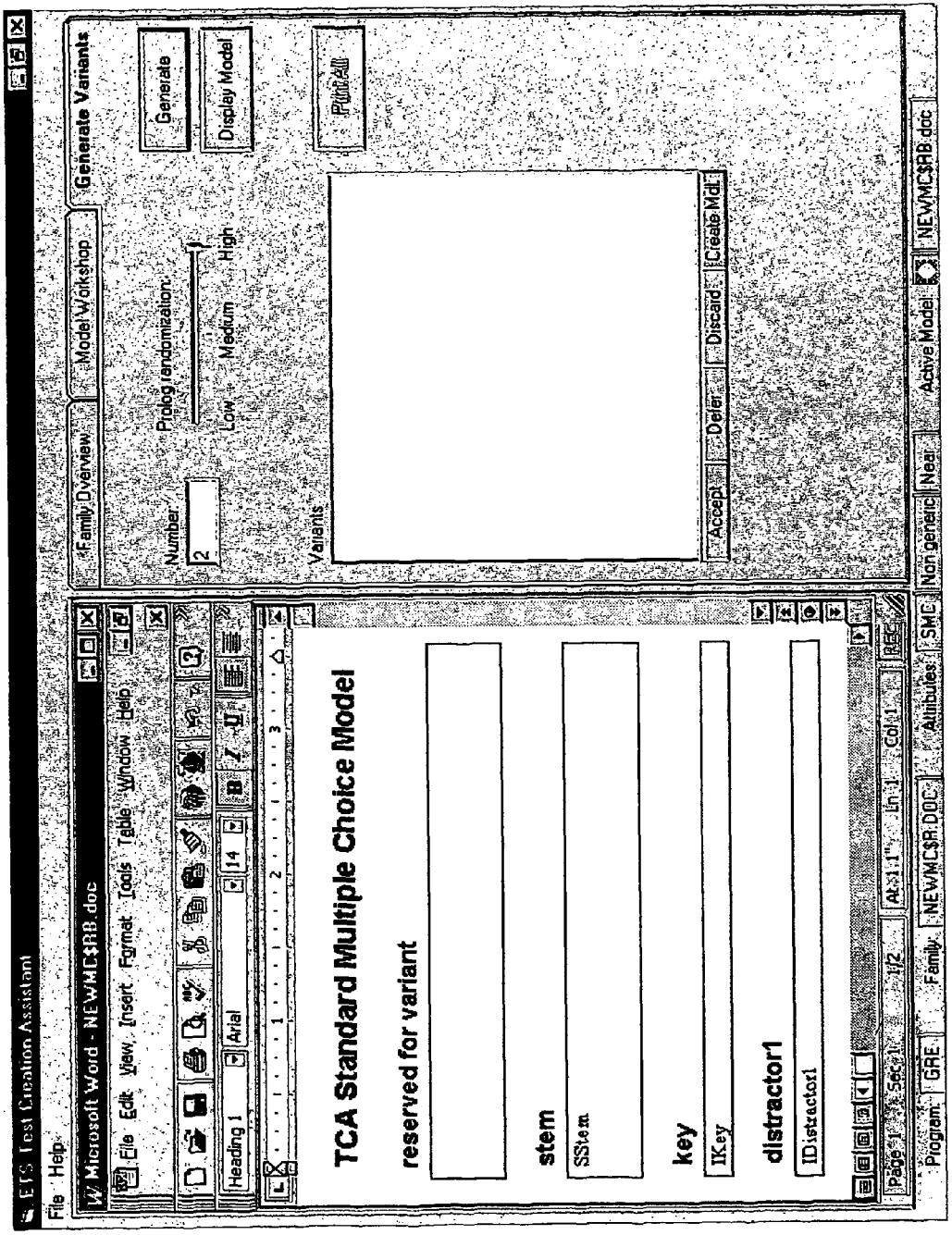
Figure 73D:
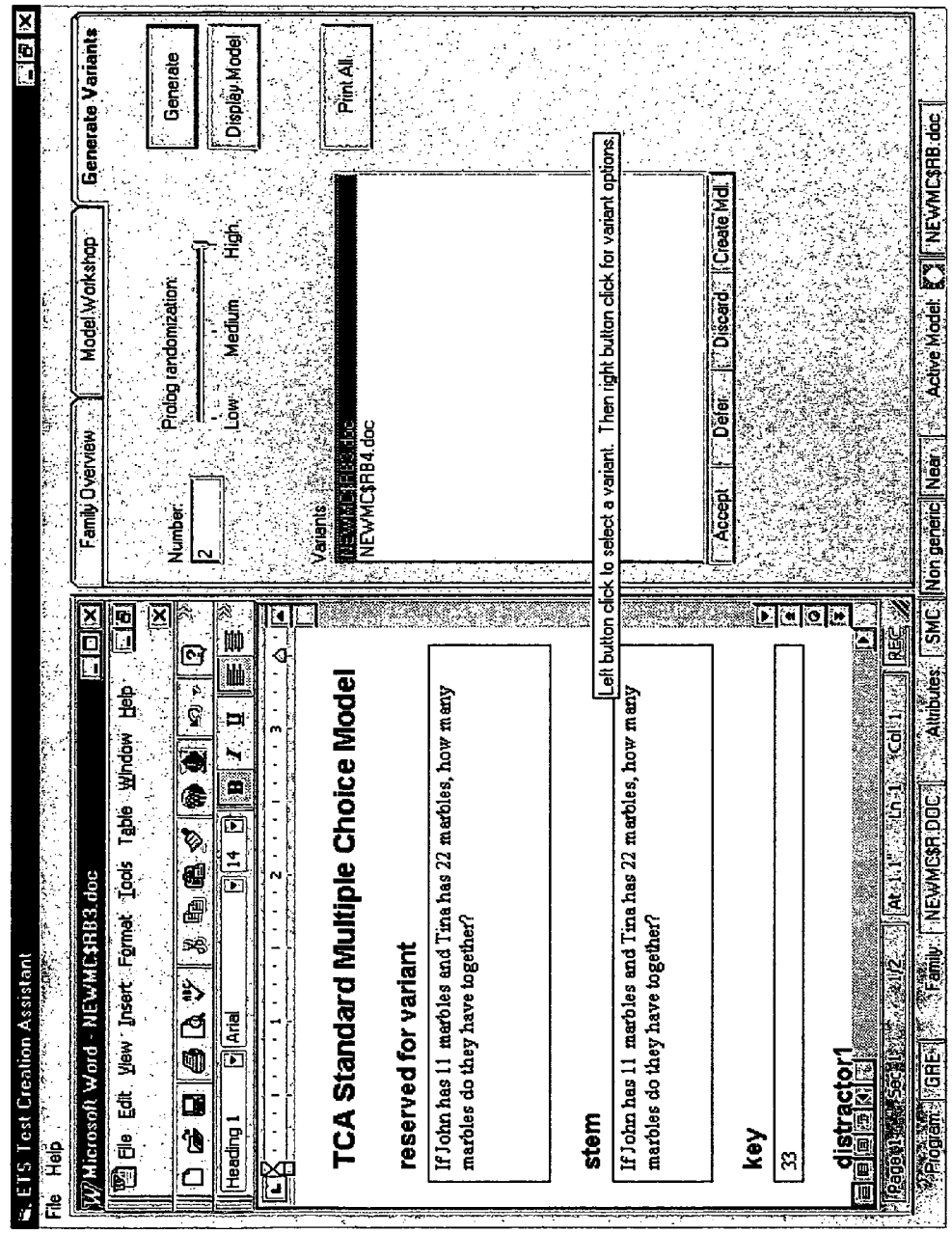
Figure 73E:
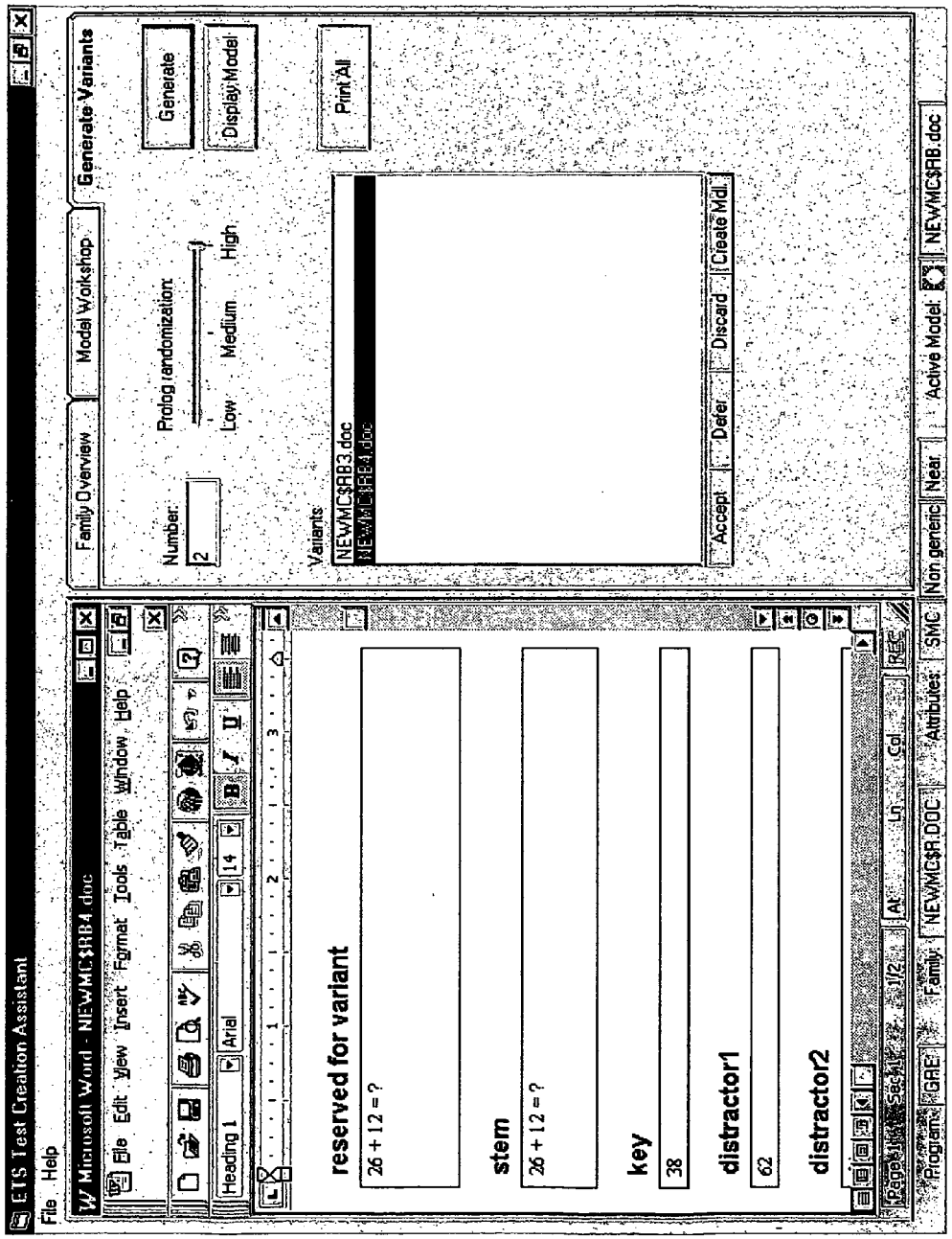
Figure 74:
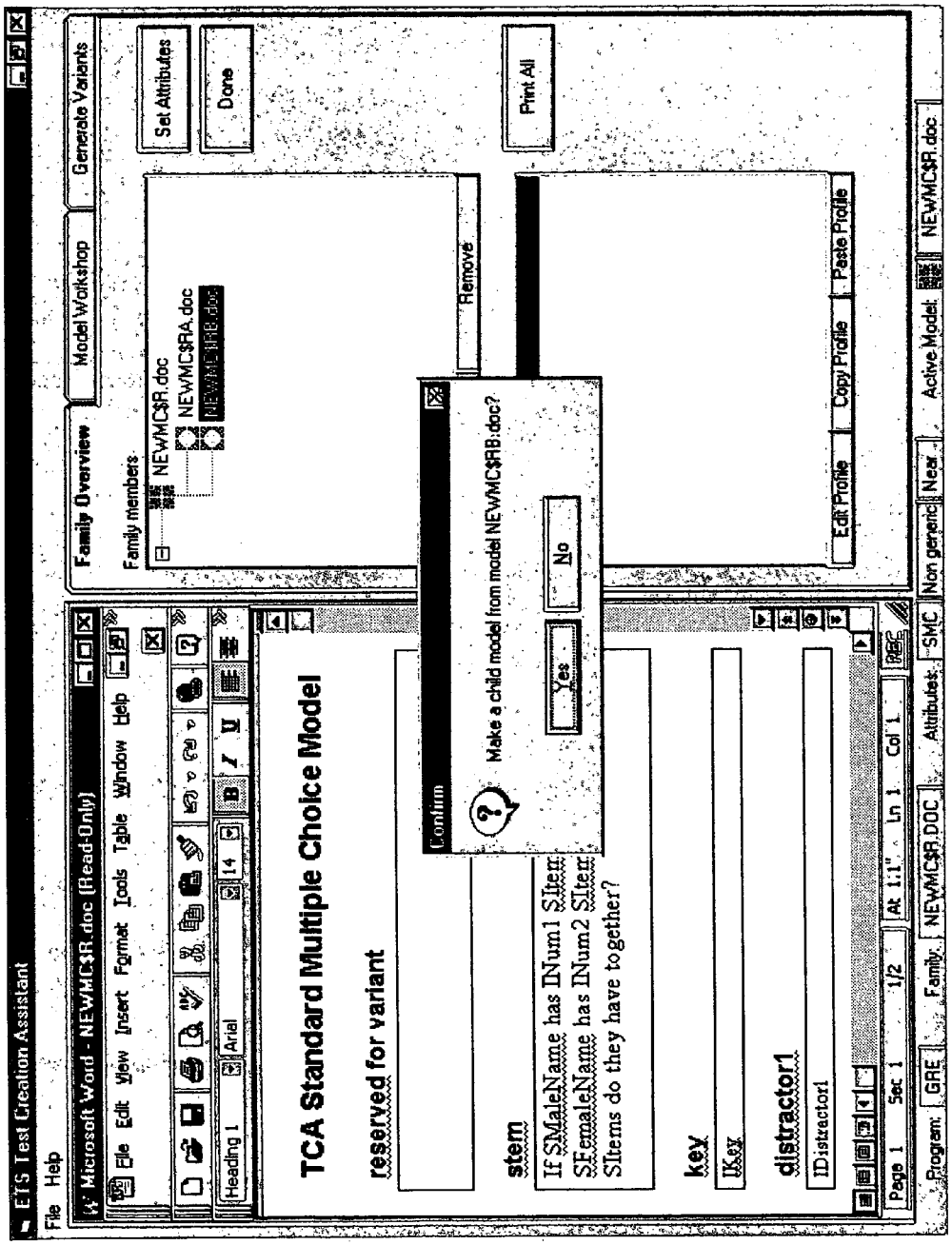

FIG. 73B. Thus, this preferred embodiment of the present invention allows the user to easily generate far variants (variants that are very different from one another) from this new stem by going to "Generate Variants", requesting 2 variants, FIG. 73D, and clicking on the "Generate" button. Thereby generating new variants "NEWMC$RB3.doc", FIG. 73D and "NEWMC$RB4.doc", FIG. 73E.

Creating Still More Models

Figure 75:
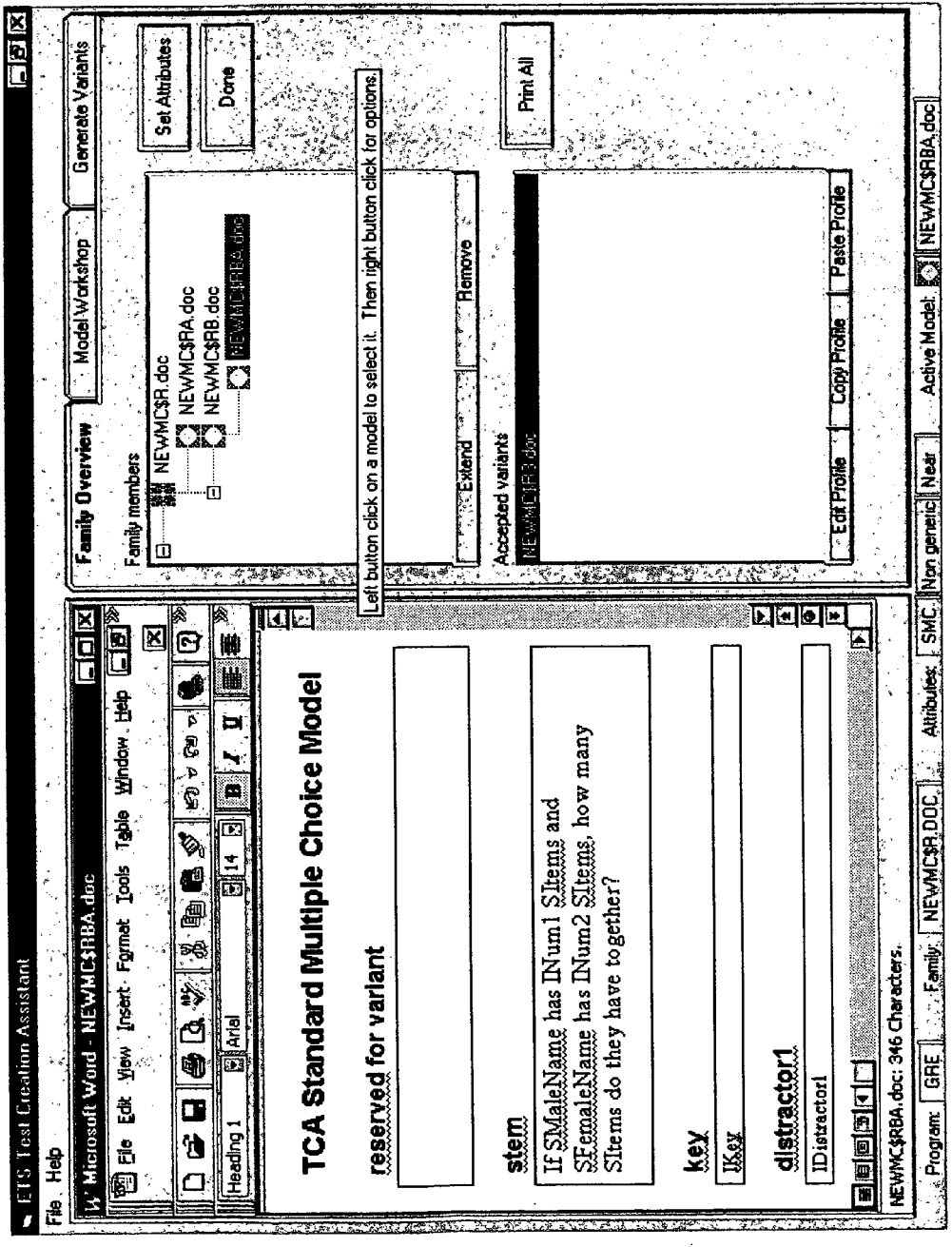
Figure 76:
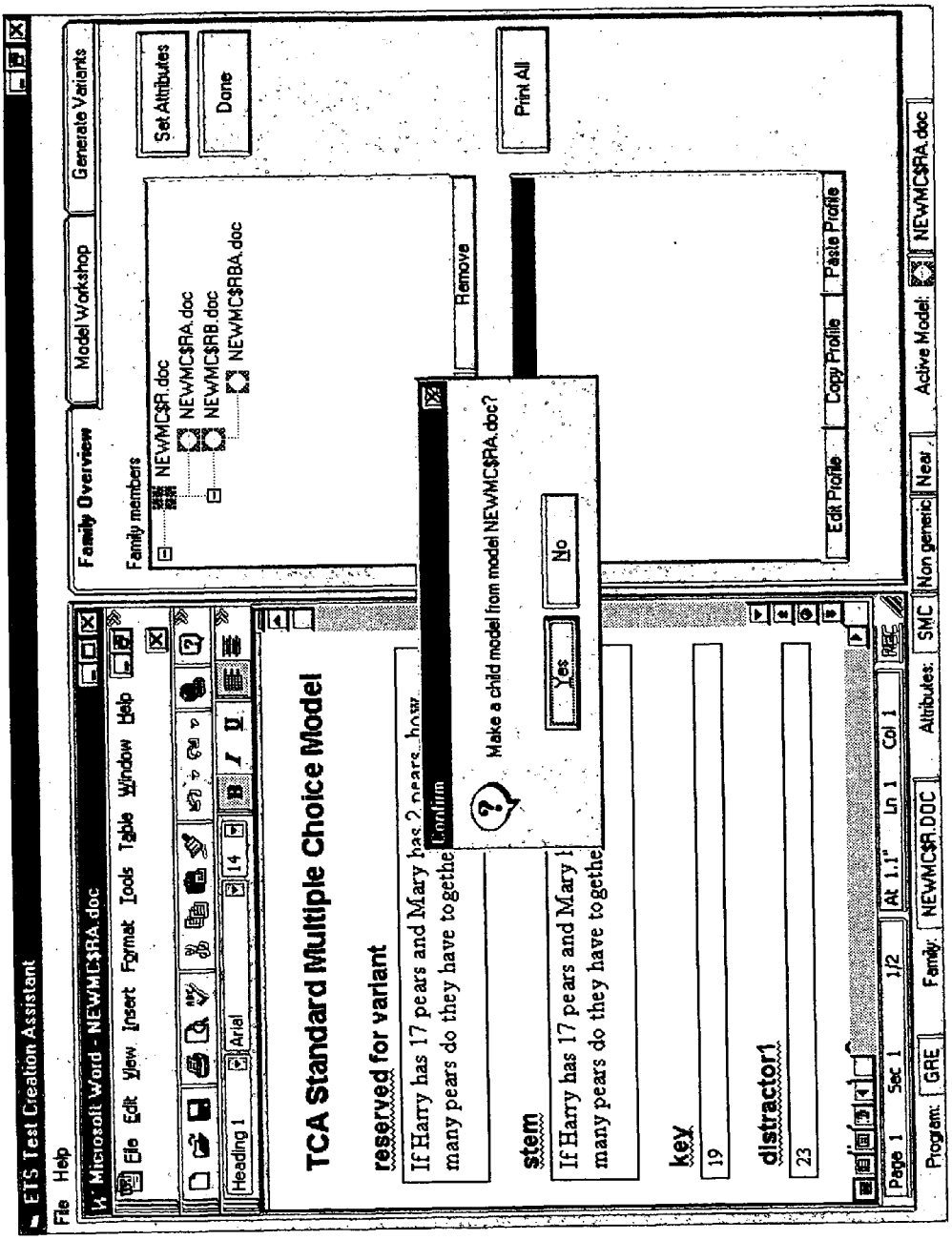
Figure 77:
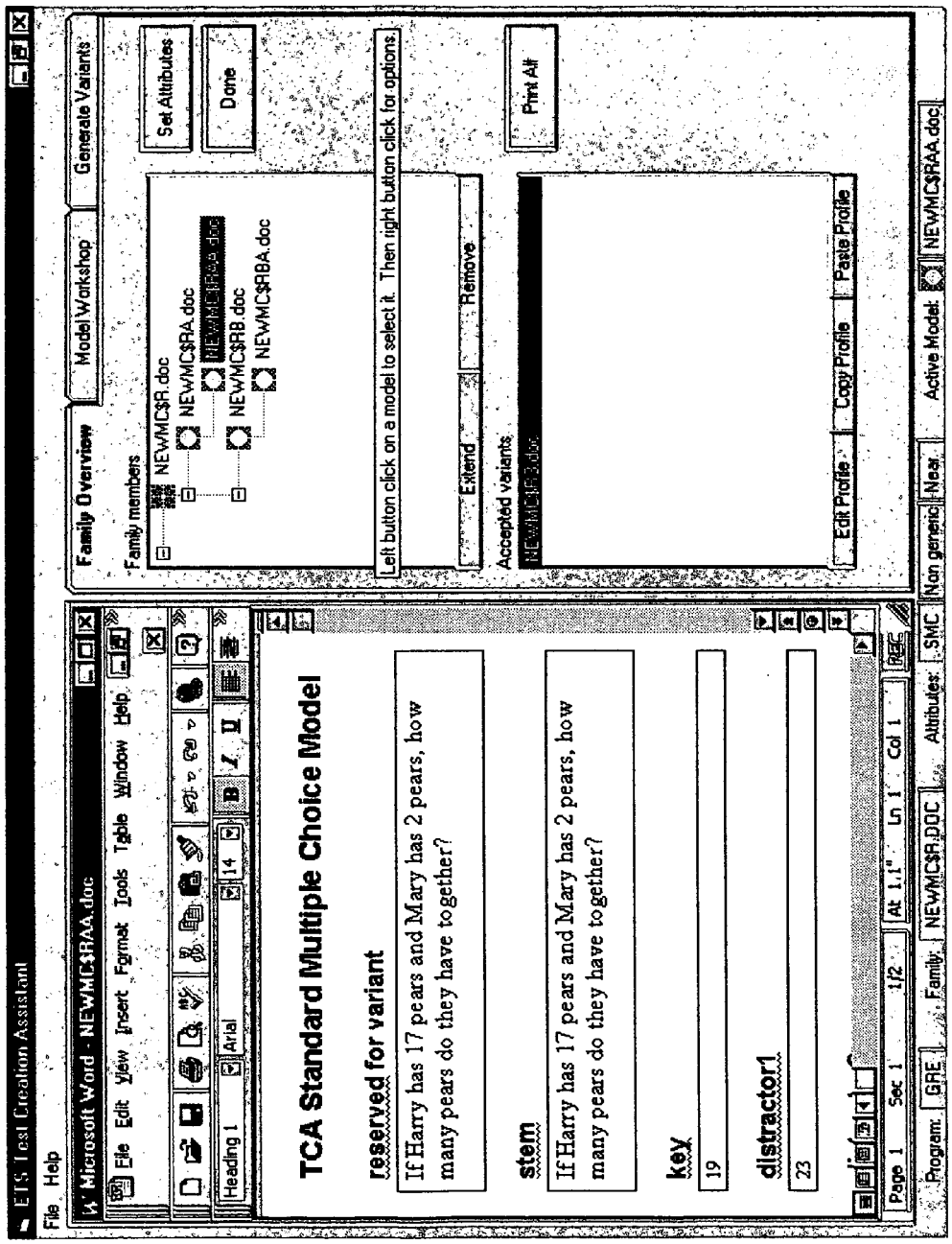

Preferred embodiments of the present invention permit the user to make a child model from the "NEWC$RB.doc" model of FIG. 73, that is, to extend it. The user selects "NEWC$RB.doc", clicks on the "Extend" button, and then enters "Yes" in the "Confirm" window, FIG. 74. New active model "NEWC$RBA.doc" appears. FIG. 75. Left button click to select this model, then right mouse button click to extend it or remove it. FIG. 75. To make a child model from new model "NEWC$RA.doc", repeat the above procedure, New active model "NEWC$RAA.doc" appears. The "AA" stands for a child of a child of the root model. See, FIGS. 76-77.

Figure 78:
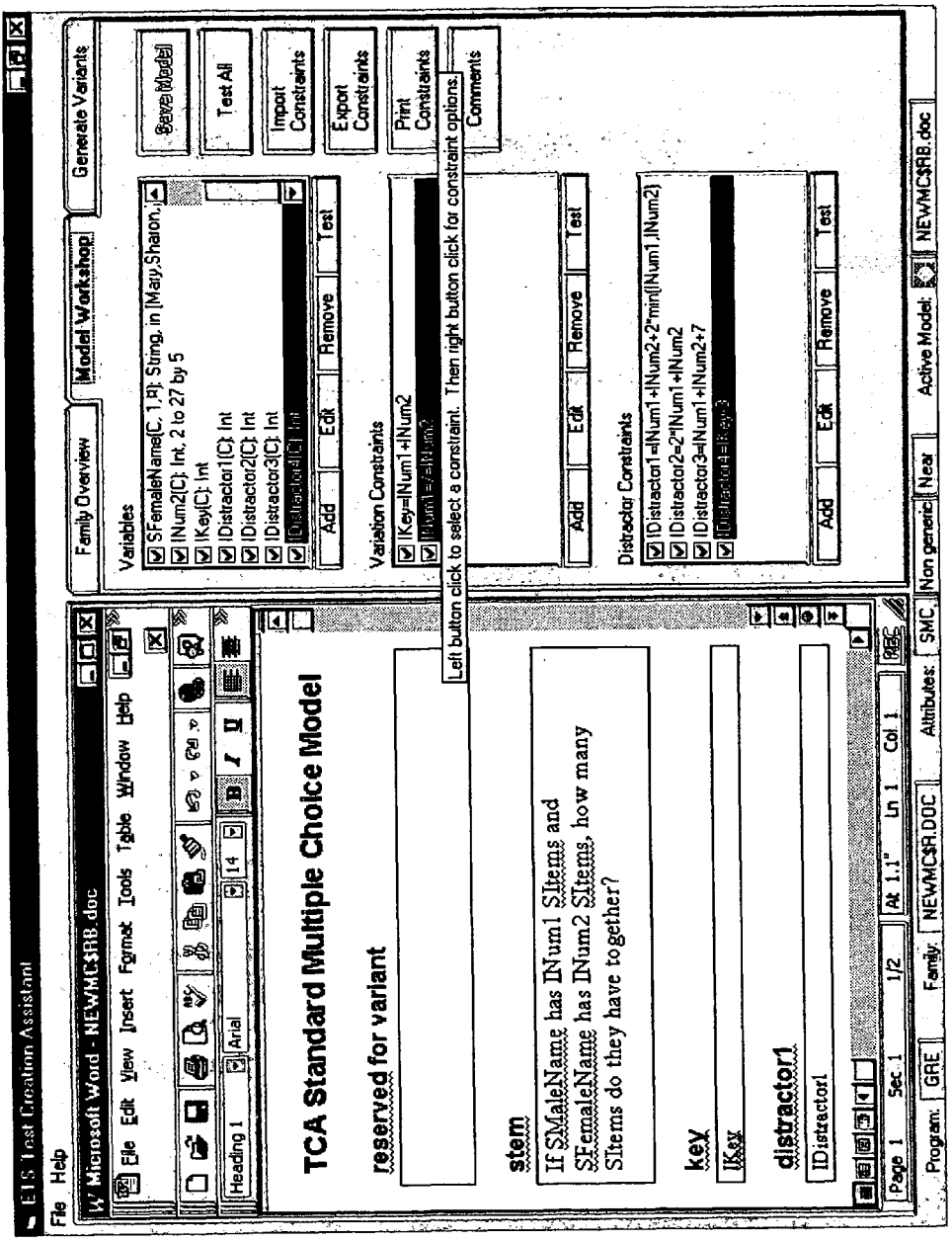

The constraints for any of the active models that are displayed in the "Family members" window can be changed. To change the constraints, select an active model in the "Family members" window, click on tab Model Workshop, left button click to select a constraint, and then right button click to get the constraint option. FIG. 78.

Print Options

Figure 79:
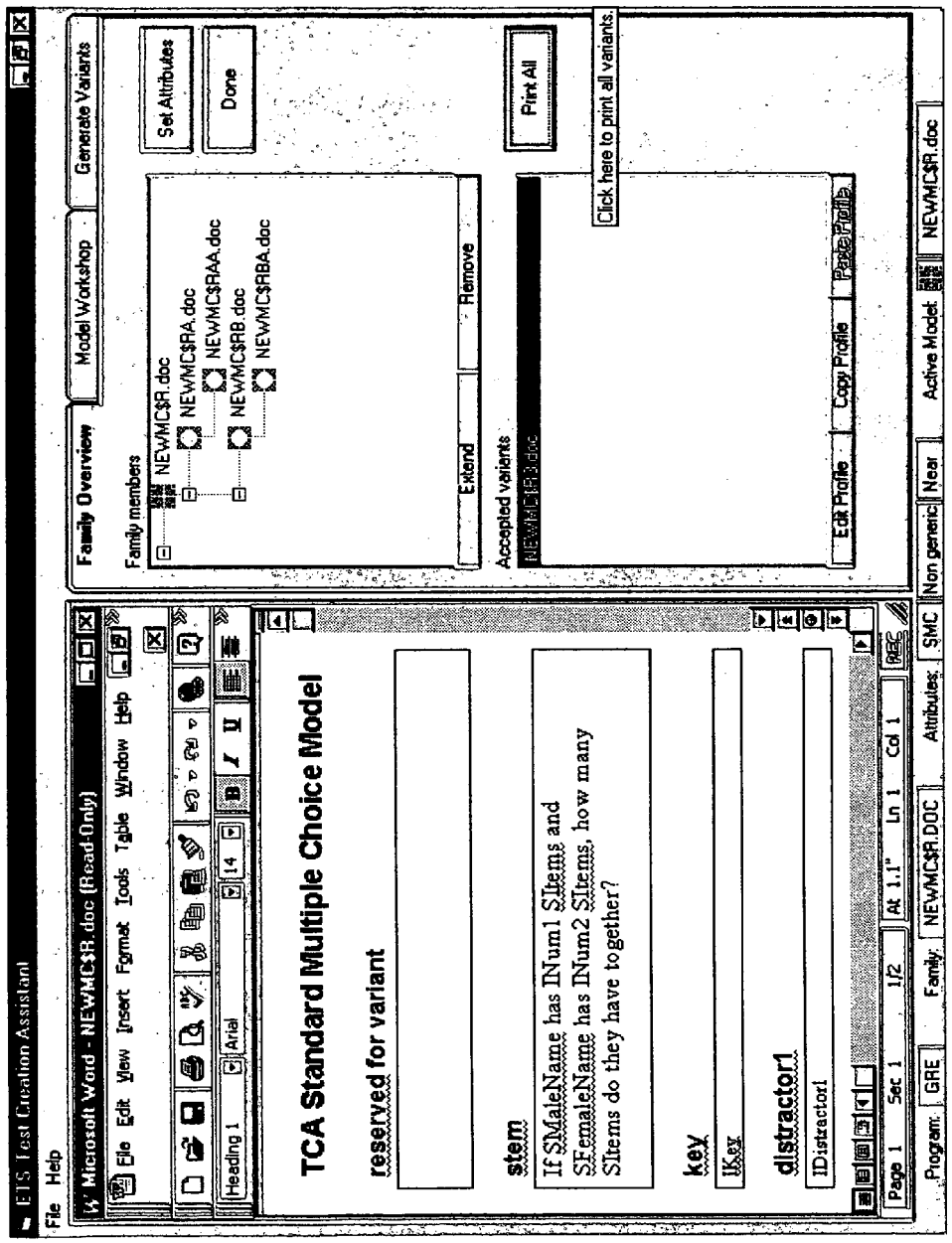
Figure 81:
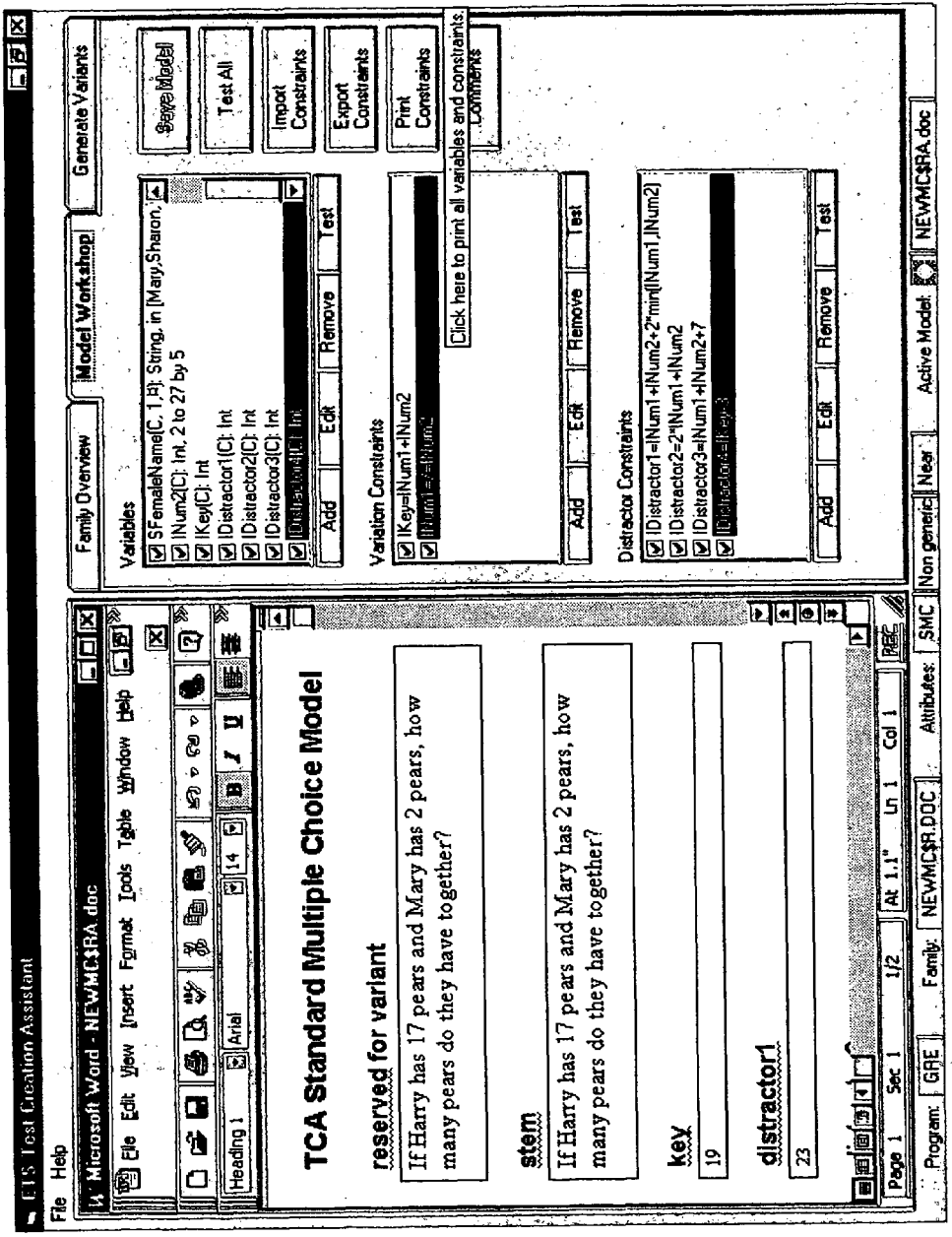

To print accepted variants click on tab "Family Overview" and then click on button "Print All" in FIG. 79. FIGS. 80A, 80B and 80C is the result. It is a print out of the variables and constraints for model "NEWMC$R". Selecting the model "NEWMC$RA" as the active model and in the Model Workshop clicking on the "Print Constraints" button in FIG. 81, results in a print out of the variables and constraints for model "NEWMC$RA". See, FIGS. 82A, 82B, and 82C.

To print a model without constraints click on the "Family Overview" tab and select a model, for example NEWMC$R. doc. In the MICROSOFT WORD® window entitled "NEWMC$R.doc", select File and Print or just click on print button. The result is a print out of model "NEWMC$R.doc" without constraints. See FIG. 83.

To print one of the accepted variants from a particular model, click on "Family Overview" tab, select a model, for example "NEWMC$R.doc". In "Accepted variants" window, select one or more variants, for example "NEWMC$R3.doc", "NEWMC$R4.doc", etc. In the Microsoft® WORD portion for each variant print out the document. The test item variants appear in FIGS. 84-88.

GRE Quantitative Comparison Items

To create a model for GRE Quantitative comparison items, the user starts as shown in FIGS. 1-3. However, instead of keeping Multiple choice as an item choice, "Quantitative comparison" is selected. FIG. 89. "Non-generic" and "Near" are also chosen is the example to be discussed. After saving this new family as "NEWQC" the result is FIG. 90.

In the MICROSOFT WORD® document appears the title "TCA Quantitative Comparison Model"; there are also sections entitled "reserved for variants", "stem", "column A", and "column B". In the right part of the window you will see "Family Overview" tab highlighted. In "Family members" you will see an icon with a sun and the name of the chosen variant, "NEWQC", next to it. The variant family name will have an extension "$R.doc". The "sun" icon again indicates that the model is active. In the "Family members" window appear two highlighted buttons: "Extend" and "Remove". These buttons enable the user to extend or remove the variant family, respectively. At the bottom of the "ETS Test Creation Assistant" window, you will see a toolbar with following titles: "Program-GRE", "Family-NEWQC$R.doc", "Attributes-QC", "Non generic", "Near", "Active Model" . . . "NEWQC$R.doc". FIG. 90.

FIG. 91 is a print out of "NEWQC$R.doc". The idea of a QC item is to compare values in columns A and B. FIG. 91.

GMAT Data Sufficiency Items

Figure 92:
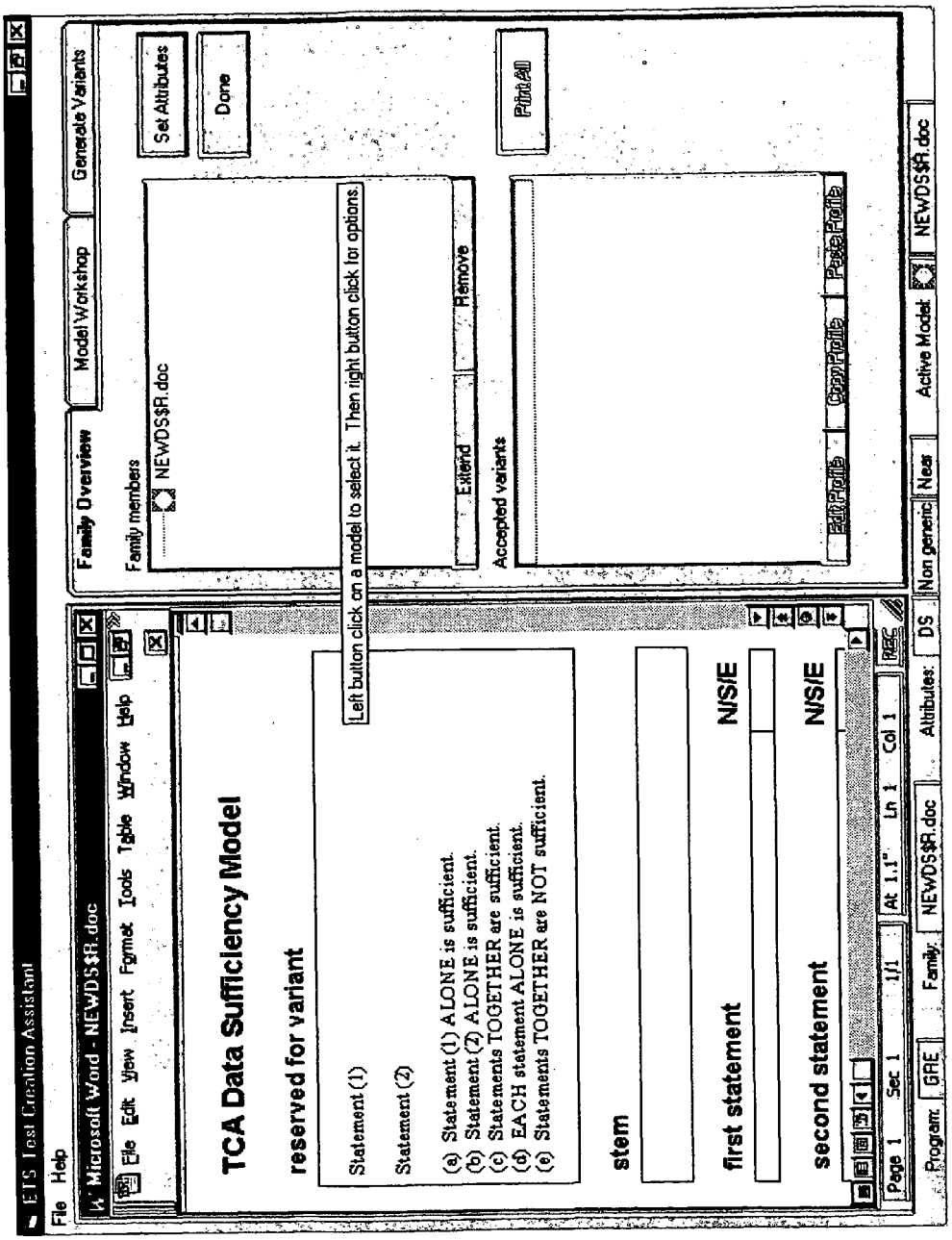
Figure 94:
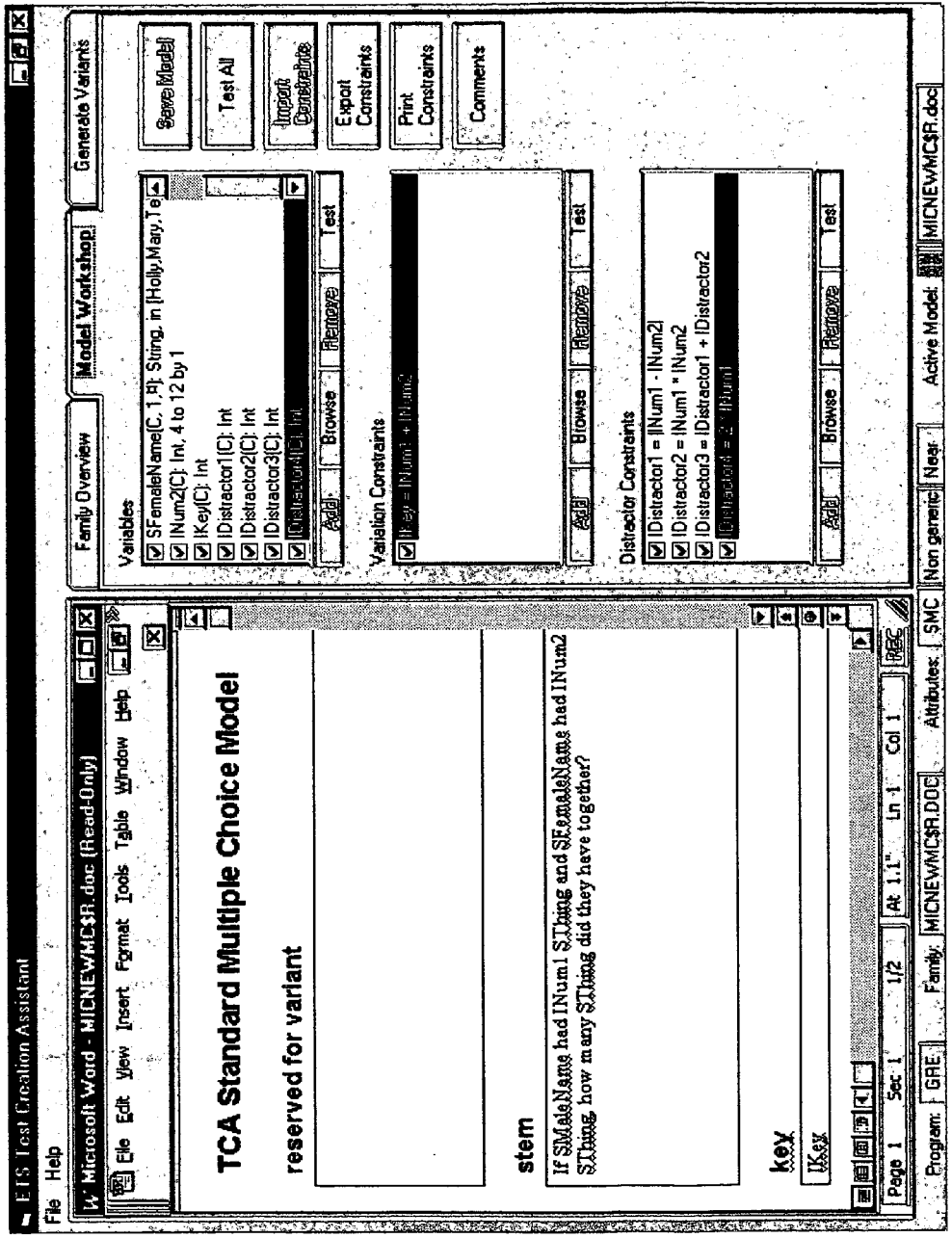
Figure 99:
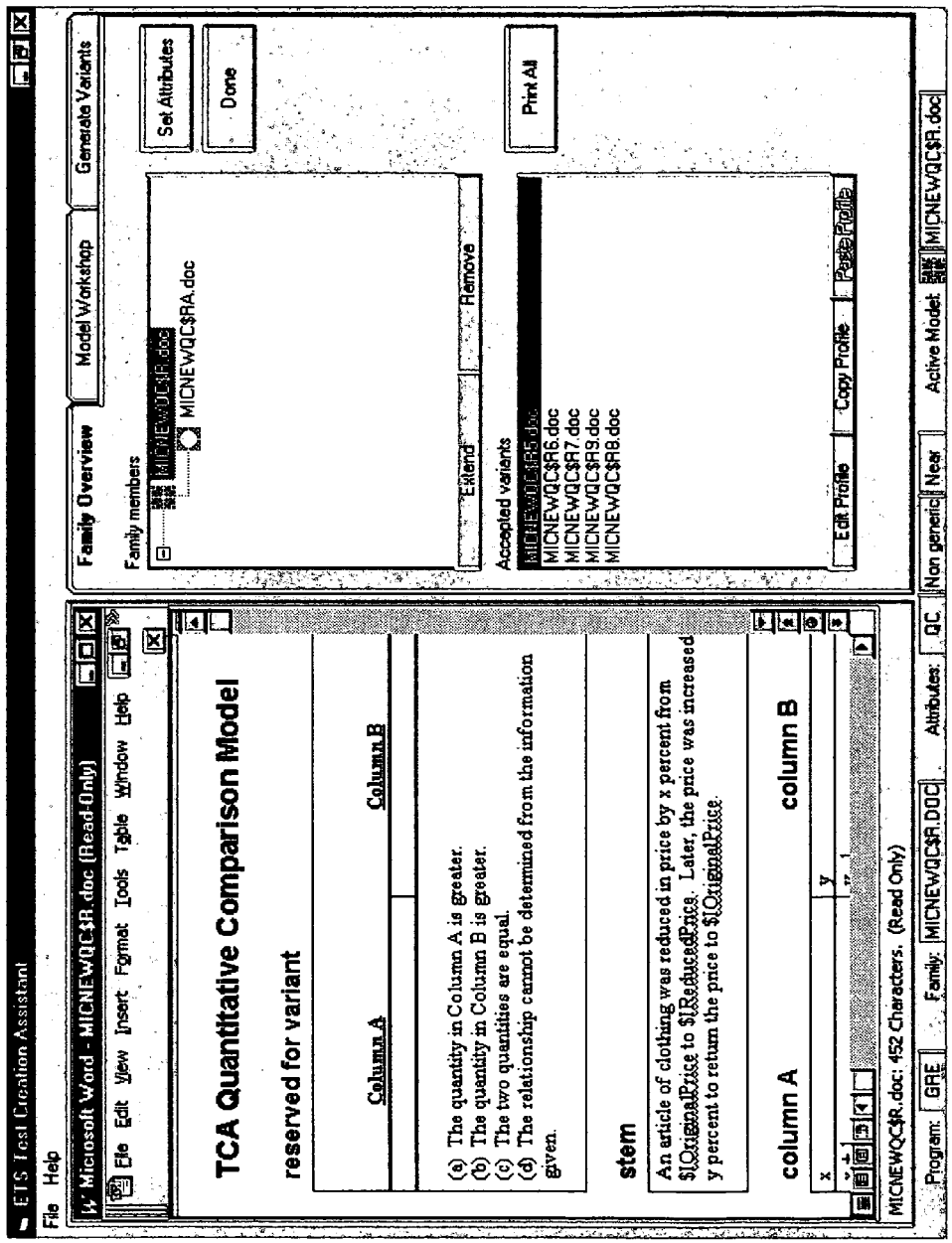

To create a model for GMAT Data Sufficiency items the approach is generally the same as with the other item types taking into account the concept behind the item type. See FIGS. 92-93.

Further Examples of Item Models

See FIGS. 94-106B for further examples of item models.

Prolog Simultaneous Constraint Solver

Preferred embodiments of the present invention use PROLOG as its simultaneous constraint solver. Details of one preferred embodiment appear in the PROLOG SOURCE CODE APPENDIX. Brief descriptions of the TCA Prolog (and Prolog-related) files are provided below.

HLP4lib.p4

This file provides a library of Prolog-predicates for use in solving mathematical constraints. For example, it provides a Prolog predicate gcd(GCD, A, B) returns the GCD of two integers A and B. This file provides a library of Prolog IV accessory relations useful in high-level API.

PrlgExpr.l

This file provides the lexical specification for the Prolog-expression scanner. Using this file, an appropriate scanner is generated. The scanner breaks the mathematical constraints into individual words and operators (called tokens) which are further used by the Prolog-expression parser.

PrlgExpr.y

This file provides the syntactic specification for the Prolog-expression parser. The file PrlgExpr.y provides the BNF-specification from which the parser-code is generated. While PrlgExpr.y is "almost" a parser, it contains, strictly speaking, a specification to generate a parser. Therefore, using this file, an appropriate parser is generated. The parser accepts the tokens from the scanner, and recognizes the syntactic patterns of mathematical constraints (or parses mathematical constraints or computes a parse-structure for mathematical constraints). Having recognized the syntactic patterns, it transforms the mathematical constraints into appropriate Prolog clauses, and calls Prolog IV to solve those clauses.

hlP4API.h

This file provides a specification for API access to the mathematical constraints-solver, Prolog IV. Using this specification, other programs can access the constraints-solver to solve mathematical constraints.

TCA Constraint Language

TCA uses a high-level language derived from Prolog and Algebra to write mathematical constraints. This section describes the language and provides some example mathematical constraints.

The TCA constraint language is intended to help the test developers in writing models for math items to be cloned. As such, it is a language very similar to the test developers' language of choice: the mathematical notation to write algebraic equations. It provides a suite of predefined high-level functions to choose from, high-level set operators (e.g. membership/iteration over a continuous range or a discrete set), and additional operators (e.g. and, or) to combine the constraints in the desired fashion.

The TCA constraint language differs from procedural languages (e.g. C, Fortran) principally in that it is a goal-oriented language, that is users need specify only the constraints to be solved, and not how to solve them. In addition, the TCA constraint language has (almost) no program-flow control mechanisms (e.g., no goto's, no while loop). Program-flow is controlled by the constraint-solver. Further, as expected from a mathematical constraint-solver, it is constraint-order independent (e.g. X=2, Y=X+2. can equally well be written as: Y=X+2, X=2).

Notational Convention

Solutions follow the arrow (=>) after the constraint.

Item* represents 0 or more instances of Item.

Item+ represents 1 or more instances of Item.

Item? represents 0 or 1 instance of Item.

func/n represents a function with n arguments, for example, max/2 represents the function max with two arguments (e.g., max(4, 7)), while max/1 represents the function max with 1 argument (e.g. max([4, 7])).

In describing the arguments to a function, the notation

+Arg is used to indicate that the value of the Arg must be given (i.e., Arg is an input argument), and −Arg to indicate that the value of the given Arg is set by the function (i.e., Arg is an output argument). A simple Arg (without + or −) indicates that one can use the argument with input or output parameter.

TCA Constraint Language in Detail

The TCA constraint language (often referred to herein as the language) is syntactically based on conventional mathematical notation system, with some additional syntactic constructs to combine multiple constraints in various ways (e.g., conjunction, disjunction, if-then-else) and to supply some low-level details often hidden in mathematical notations (e.g., type, precision, stepsize for iteration). Note that the TCA constraint language is case-sensitive; e.g., Xvar is different from xvar.

The TCA constraint solver can solve linear constraints and a large class of nonlinear constraints. The user need specify only the constraints to be solved, and not how to solve them. The TCA returns all the solutions to the specified constraints. Further, all the constraints and functions are relations which have minimal input/output directional restrictions; i.e., one can use the same argument in a function to provide a known parameter and to compute an unknown value. For example, one can use the same constraint Z*Z=X*X+Y*Y in multiple ways:

Given X (:3) and Y (:4), to compute the value of Z; i.e.: X=3, Y=4, Z*Z=X*X+Y*Y.=>{Z: 5; Z: −5}.

Given Z(:5), to compute the possible values for X and Y; i.e.: 5*5=X*X+Y*Y, int(X,Y).=>{X: 3, Y: 4; X: 4, Y: 3}.

Given Z (:5) and X (:3), compute the value of Y; i.e.: 5*5=3*3+Y*Y.=>{Y: 4}.

The constraints in the language are specified using a combination of the representational devices offered by the language: basic elements, type specifications, set specification, algebraic constraints, logical combinations.

Basic Elements

Basic elements are the basic objects of the language. These elements are later referred, in general, as the terms.

1. Constants.

a) Numbers: 4, 10, −4, 5.6, −6.7.

b) Symbolic number: pi.

c) Symbolic constants (atom): Symbolic constant-names must start with a lowercase letter. For example, countVar, accountant. Any alphanumeric symbol that starts with a lowercase letter is considered a constant. Symbolic constants may not occur in an algebraic constraints: "X=5+accountant" is invalid.

2. Variables.

Variable-names must start with an uppercase letter: X, Xin, Yout. Note that case (uppercase, lowercase) is important. For example, X is a variable whereas x is a constant.

A special variable, called anonymous variable, may also be used. An anonymous variable is written as: "_". An anonymous variable acts like a placeholder, as a don't-care variable. Each anonymous variable, even when used multiple times within the same constraint, is distinct and one may not refer to it. For example, function divmod(N, D) returns a list: [N div D, N mod D]. However, in case one is not interested in, say, the mod-result (i.e. the second member of the list), one could write: [Div, _]=divmod(N, D).

3. Lists.

A list of variables, constants, other lists using the format: [elements*], e.g.: [ ], [a, b, c], [1, 2, 4, 7], [1, [2, 3, 4], C, 7]. One can access the elements of the list using the notation: ListName [Index1 [, Index2 [, Index3 . . . ]]]. Note that the first element of the list is indexed 1, second element is indexed 2, and so on. Multiple indices are used for multilayered lists; lists containing lists as elements: [[a, b], [c, d]]. Multilayered lists can be used to represent tables. Some constraints involving lists and list-elements and their solutions are shown below:

| | | |
|---|---|---|
| L = [1, 3, 5, 7], X = L[2]. | => | X: 3. |
| L = [[1, 3], [5, 7], [9, 11]], X = L[2]. | => | X: [5, 7]. |
| L = [[1, 3], [5, 7], [9, 11]], X = L[2, 1]. | => | X: 5. |
| L = [[1, 3], [5, 7], [9, 11]], X = L[2, 2]. | => | X: 7. |
| L = [[a, [b, c]], [d, [e, f]]], X = L[2, 2]. | => | X: [e, f]. |
| L = [[a, [b, c]], [d, [e, f]]], X = L[2, 2, 1]. | => | X: e. |

4. Functions.

In accordance with the present invention, functions predefined in the constraint language can be used. General format for a function-call is: function-name(args*). For example, abs(X) or mean(A, B) or median([1, 4, 3, 7, 9]). Note that the functions return values of the types indicated below. The functions are valid only when their return-values are in the appropriate context. That is, functions returning numbers must be in the context of the algebraic expressions (e.g. (assuming X is a variable of type number): X=sqrt(25)); functions returning lists must be in the context of the list expressions (e.g. (assuming L is a variable of type list): L=sort([1, 7, 5, 3, 2]); functions returning symbols must be in the context of the symbol expressions (e.g. even(4)=true). The predefined functions for one preferred embodiment are listed below with the following notational convention:

The return-type of a function is indicated as: =>Return-Type.

Names of the function-arguments of type integer start with I;

Names of the function-arguments of type real start with R;

Names of the function-arguments of type number start with N;

Names of the function-arguments of type lists-containing-numbers start with NL;

Names of the function-arguments of type list (containing any kind of elements) start with L).

The predefined functions include:

max(+N1, +N2) (=>Number) Returns the maximum of numbers N1 and N2 e.g. X=max(4, −5).

max(+NList) (=>Number) Returns the maximum of a list of numbers e.g. X=max([2, sqrt(9)]).

min(+N1, +N2) (=>Number) Returns the minimum of numbers N1 and N2 e.g. X=min(4, −5).

min(+NList) (=>Number) Returns the minimum of a list of numbers e.g. X=min([2, sqrt(9), 2^2]).

mean(+N1, +N2) (=>Number) Returns the mean of numbers N1 and N2 e.g. X=mean(4, sqrt(9)).

Mean(+NList) (=>Number) Returns the mean of a list of numbers e.g. X=mean([2, sqrt(9), 2^2]).

median(+NList) (=>Number) Returns the median of a list of numbers e.g. X=median([2, sqrt(9), −4, 7]).

gcd(+IN1, +IN2)(=>Integer) Returns the gcd of integers IN1 and IN2 e.g. X=gcd(4, 6).

lcm(+IN1, +IN2)(=>Integer) Returns the lcm of integers IN1 and IN2 e.g. X=lcm(4, 6).

sqrt(N) (=>Number) Returns the positive square-root of (positive number) N e.g. X=sqrt(20).

cubert(N) (=>Number) Returns the cube-root of (positive number) N e.g. X=cubert(20).

reverse(+List) (=>List) Returns the reversed List e.g. X=reverse([1, 2, 3, 7, 5]).

sort(+NList) (=>List) Returns the list of numbers sorted in numerically ascending order e.g. X=sort([1, 2, 5, 3]).

permute(+List) (=>List) Returns the various permutations of the given List e.g. X=permute([1,2,3]).

select_r_of_n_ordered(IN, IR) (=>Integer) Returns no. of ordered subsets of size IR from the set of size IN.

select_r_of_n (IN, IR) (=>Integer) Returns no. of unordered subsets of size IR from the set of size IN.

random( ) (=>Integer) Returns a randomly generated integer e.g. X=random( ).

random(+List) (=>Same-as-the-Given-List-Element) Returns a random element from the given list e.g. X=random([a,2.5, 6,c]).

random(+IMax) (=>Integer) Returns a random integer between 1 through (positive integer) IMax e.g. X=random(7).

even(+IN) (=>true) Returns literal constant true if IN is an even integer e.g. even(10)=true.

odd(+IN) (=>true) Returns literal constant true if IN is an odd integer e.g. odd(11)=true.

is_perfect_square(+IN) (=>true) Returns literal constant true if IN is a perfect square e.g. perfect_square(16)=true.

isnot_perfect_square(+IN) (=>true) Returns literal constant true if IN is not a perfect square e.g. isnot_perfect_square(17)=true.

is_perfect_cube(+IN) (=>true) Returns literal 10==constant true if IN is a perfect cube e.g. perfect_square(64)=true.

isnot_perfect_cube(+IN) (=>true) Returns literal constant true if IN is not a perfect cube e.g. isnot_perfect_square(25)=true.

is_prime(+IN) (=>true) Returns literal constant true if IN is a prime integer e.g. is_prime(11)=true.

isnot_prime(+IN) (=>true) Returns literal constant true if IN is not a prime integer e.g. isnot_prime(10)=true.

5. Algebraic Expressions (referred to as: AlgExpr).

Expressions can be built by combining other algebraic expressions (e.g. numbers, variables, functions) using the arithmetic operators. Valid operations include:

"+" (addition): AlgExpr+AlgExpr, e.g. A+B, or 4+C, or sqrt(16)+7.

"−" (subtraction): AlgExpr−AlgExpr, e.g. A−B, or 4−C, or sqrt(16)−7.

"Unary−" (unary negation): −AlgExpr, e.g. −B, or −7.

"*" (multiplication): AlgExpr*AlgExpr, e.g. A*B, or 4*C., or sqrt(16)*7.

"/" (division): AlgExpr/AlgExpr, e.g. A/B, or 4/C, or sqrt(16)/7.

"%" (modulo): AlgExpr%AlgExpr, e.g. A%B, or 4%C, or sqrt(16)%7.

"\" (quotient): AlgExpr\AlgExpr, e.g. A\B, or 4\C, or sqrt(16)\7.

"^" (exponentiation): AlgExpr^AlgExpr, e.g. A^B, or 4^C, or sqrt(16)^7.

"!" (factorial): AlgExpr!, e.g. A!, or 4!.

"|" (abs): |AlgExpr|, e.g. |A−10|, or |sqrt(16)−7|.

The precedencies of the arithmetic operators are as follows (higher precedence operators are specified before the lower precedence once): !; ^; −(unary negation); % & \; /; *; +& − (subtraction); | . . . |.

Constraint Specification

1. Type Constraint Specification.

These constraints specify the type of the variables in the constraint. The default variable type is "real".

| | |
|---|---|
| "int (VarLst)" | e.g.: int (X), int (X, Y). |
| "real (VarLst)" | e.g.: real (Y), real (X, Y). |
| "fraction (VarLst)" | e.g.: fraction (X), fraction (Y, Z). |
| "symbol (VarLst)" | e.g.: symbol (X), symbol (Y, Z). |
| "list (VarLst)" | e.g.: list (X), list (X, Y). |
| "ongrid (Var)" | Specifies that the value of the given variable must be an integral multiple of its precision. [This is the default behavior of the variables.] e.g.: ongrid (X). |
| "offgrid (Var)" | Specifies that the value of the given variable need not be an integral multiple of its precision. e.g.: offgrid (X). |

2. Optimizable-Relation Specification.

A user may help the constraint-solving process by identifying the optimizable relations. Such relations must be valid for the entire constraint (i.e., they may not be a part of a disjunctive clause), and they may be moved around by the constraint-solver without any logical incorrectness, usually to the start of the clause.

The devices to identify such relations include:

| | |
|---|---|
| "eq_vars (Vars)" | Variables in the given comma-separated-list must be equal to each other. e.g.: eq_vars (X, Y, Z). |
| "neq_vars (Vars)" | Variables in the given comma-separated-list may not be equal to each other. e.g.: neq_vars (X, Y, Z). |
| "neq_varvals (Var, Vals)" | The given variable may not be equal to any of the values specified in the comma-separated-list. e.g.: neq_varvals (X, 2, 5, 7). |
| "optimizable_rel (Relation)" | The specified Relation is |

| | |
|---|---|
| | optimizable. This is a generalization of the special optimizations presented above. e.g.: optimizable_rel (X =/= 5). |

Note that neq_vars(X,Y) (and, similarly, eq_vars(X,Y)), while semantically equivalent to X=/=Y, is operationally different from X=/=Y in that the constraint-solver optimizes such declarations (which it cannot do in case of declarations such as: X=/=Y or X=Y).

3. Precision Specification.

Constraints are solved with certain precision. The default precision is: 0.01 for reals, 1 for integers. Nonlinear constraints are solved by enumerating through the potential solution-interval. A variable may assume a value which must be an integer multiple of its precision.

Precision for a variable can be changed individually by using the following construct for the variable in the type-specification: {Var, Precision}. For example, real({X, 0.02}) specifies a precision of 0.02.

4. Relational Constraints (RelExpr).

Valid relational constraints (and the associated relational operators) include:

| | |
|---|---|
| "=" (equality): | AlgExpr = AlgExpr, e.g. A = B, A + 5*Z = sqrt(16) + C. |
| "=/=" (inequality): | AlgExpr =/= AlgExpr, e.g. 4*X + 5*Y =/= 2*A + 3*B. |
| "<" (less than): | AlgExpr < AlgExpr, e.g. A < B, A + 4*Z < 4 + C. |
| ">" (greater than): | AlgExpr > AlgExpr, e.g. A > B, A + 4*Z > 4 + C. |
| "<=" (less than or equal to): | AlgExpr < = AlgExpr e.g. A< = B, A + 4*Z < = 4 + C. |
| ">=" (greater than or equal to): | AlgExpr > = AlgExpr, e.g. A > = B, A + 4*Z > = 4 + C. |
| "NOT": | NOT RelExpr, e.g. NOT(is_prime(X) = true). |

5. Ranges.

"Continuous interval": To specify a variable Var within a continuous range: [LowerExpr RL Var RL UpperExpr] where RL is one of the relational operators: {<, <=, >, >=}, e.g. to specify the constraint that X may range from 0 through 10: [0<=X<=10].

"Continuous exterval": To specify a variable Var outside a continuous range: [!LowerExpr RL Var RL UpperExpr] where (RL is one of the relational operators: {<, <=, >, >=}.) For example, to specify the constraint that X must be outside the range from of 0 through 10: [!0<=X<=10].

"Discrete inclusive range": To specify a variable Var within an enumerated range: Var in [Expr1, Expr1, . . . ]. For example, X in [1, 5, 4+3, a, Y^ 2, 15], or, X in [1, 2*Y+Z, 7, Z]. The Var assumes each value from the given set of values.

"Discrete exclusive range": To specify a variable Var outside an enumerated range: Var notin [Expr1, Expr2, . . . ]. For example, X notin [1, 5, 4+3, a, Y^ 2, 15], or, X notin [1, 2*Y+Z, 7, Z].

6. Enumerated Ranges.

To specify an enumerated range, we use: [LowerExpr RL Var RL UpperExpr step Expr] where (RL is one of the relational operators: {<, <=, >, >=}). Thus, for example, to specify that (a real variable) X enumerates through the range from 7 though 10 by a step of 0.5: [7<=X<=10 step 0.5]. The example constraint is equivalent to: (X=7; X=7.5; X=8; X=8.5; X=9; X=9.5; X=10).

To specify a discrete enumerated range, we use: Var from List. Thus, for example, to specify that (a variable) X can take one of the values from the set [a, b, c, d], we use: X from [a, b, c, d]. Similarly, to specify that another variable Y can take a value from the set of primes between 2 and 10, we can use: Y from [2, 3, 5, 7].

If a continuos enumeration range is not closed on lower [upper] side (e.g., left relational operator is <), the lower [upper] expression is incremented [decremented] by the variable-precision for expanding the enumeration range. Thus, for example, for a real variable X with precision of 0.1, [7<X<10 step 0.5].=>(X=7.1; X=7.6; X=8.1; X=8.6; X=9.1; X=9.6).

Note that an enumerated range is different from a regular (i.e. non-enumerated) range. The difference is especially visible for open (or, partially closed) ranges. For example, for a real variable X with precision of 0.1, the constraint: [7<X<10 step 0.5], X=7.4. is not successful, but the constraint: [7<X<10], X=7.4. succeeds.

Further, the main-variable in an enumerated range is considered independent, whereas the main-variable in a non-enumerated range is not independent. This difference becomes important when one is trying to generate different solutions for a constraint from the solver. While solving for different solutions, the constraint-solver tries to find different values for the independent variables in different solutions. It makes no such effort for non-independent variables.

Note that a user may not use variables in specifying the boundary(s) of an enumerated range when solving the constraints in the unique-order. As such, when solving the constraints in unique order, an enumeration range such as: [C+1<=X<=C+3 step 1] is not acceptable because it uses variables in specifying the boundaries of the enumerated range.

7. if-then-else Constraint.

if (Condition) then (Then-Constraint) else (Else-Constraint). For example, if (is_prime(X)=true) then (Y=found_an_x_as_prime) else (Y=no_x_is_prime). (if-then alone also be used e.g. if (X==5) then (Y=7).)

Note that the semantics of the if-then-else constraint is: if Condition is ever true, then only the Then-Constraint is tested (i.e. executed). Only when the Condition is never true, the Else-Condition is tested (i.e. executed). Thus, for example, the following if-then-else constraint produces the results shown below:

int(X), [1<=X<=4 step 1], if (even(X)=true)
then Y=x_is_even else Y=x_is_odd.=>
  X: 2, Y: x_is_even;
  X: 4, Y: x_is_even.

Refer to the if-then-elseif constraint for a slightly different kind of constraint.

8. if-then-elseif Constraint.

if (Then-Condition) then (Then-Constraint) elseif (Else-Condition) then (Else-Constraint). e.g. the following constraint produces the absolute-values of X:

if (X>=0) then (Y=X) elseif (X<0) then (Y=−X).

Note that the semantics of the if-then-elseif constraint is: if Then-Condition is true, then the Then-Constraint is tested (i.e. executed); or if Else-Condition is true, then the Else-Constraint is tested (i.e. executed). Thus, for example, the following if-then-elseif constraint produces the results shown:

int(X), [1<=X<=5 step 1], if (even(X)=true)
then Y=x_is_even elseif (odd(X)=true) then
Y=x_is_odd.=>
  X: 1, Y: x_is_odd;
  X: 2, Y: x_is_even;

X: 3, Y: x_is_odd;
X: 4, Y: x_is_even.

Refer to the if-then-else constraint for a slightly different kind of constraint.

9. Freeze Constraint.

Usually, one is interested in exploring the entire solution-space. However, there are times when one is satisfied with the solution (set) received so far, and wishes to freeze the solution (set) discovered so far. The freeze constraint is represented by the keyword: freeze.

10. Primitive Succeed and Fail Constraints.

One can force a constraint to fail by conjuncting fail with it. Thus, for example, X=4, fail.=>false. Similarly, succeed succeeds vacuously e.g. if (X>4) then succeed else fail.

11. Period (.) at the end of constraints.

12. Combining Constraints.

Grouping constraints together: "(Constraint)".
For example, (X=4+X, Y=2).
Conjunction (and): "Constraint1, Constraint2".
For example, X*X=25, Y=5, X=Y.=>{X: 5, Y:5}.
Disjunction (or): "Constraint1; Constraint2".
For example, X*X=25; Y=5, X=Y.=>{X: 5; X: −5; X: 5, Y: 5}.
Negation: "NOT Constraint".
For example, NOT(X=5).

Note that NOT(X=5) (i.e., it is never the case that X is 5) is not equivalent to X=/=5 (i.e. the case when X is not 5). Thus: X in [1, 2], X=/=1. produces only one answer: X: 2 (because X=/=1 succeeds when X: 2), whereas: X in [1, 2], NOT(X=1). fails (because X=1 succeeds when X: 1).

Writing Constraints in TCA Constraint Language

The TCA constraint language combines the algebraic language with the syntax and semantics of logic programming language (for example, Prolog). It differs considerably from the procedural programming languages (for example, C, Fortran) which rely on program-flow control to specify a procedure to solve the problem at hand. Major differences between procedural languages and the TCA constraint language of the present invention include:

TCA constraint language is declarative: In the TCA constraint language, one specifies only the constraints to be solved, not how to solve them.

Constraints are order-independent: In the TCA constraint language, the constraints are order-independent e.g. X=2, Y=X+2. is the same as: Y=X+2, X=2. In procedural languages, statements are order-dependent, e.g. in C, X=2; Y=X+2; is different from: Y=X+2; X=2. An exception to the order-independence of rules is the case where we use the continuous-range constraint (e.g., [2<=X<=5]) for integer variables and invoke functions with the variable from the continuous range (e.g., Z=gcd(X,Y)). In such situations, the = solver's behavior depends on the relative position of the variable-type-declaration (e.g., int(X)) vs. the continuous range declaration (e.g., [2<=X<=5]). In general, the user of the present invention should put the variable-type-declaration as soon as he/she knows it. For example, int(X), Y=5, [2<=X<=10], Z=gcd(X,Y).

Constraints are solved all at once as a whole.

TCA constraint language provides its own program-flow control. As such, the TCA constraint language provides (almost) no other program-flow control mechanism. Procedural languages, on the other hand, have to provide a large number of them. For example, goto, while, if-then-else, and the implicit left-to-right, top-to-bottom program-flow.

TCA constraints are (mostly) bidirectional. Because the TCA constraint language uses relations to implement most functions and operators, one can use the same function [operator] to map a set of arguments to a result, or to map a result back to a set of arguments. Thus, for example, X=5!·=>X: 120. Further, 120=N!·=>N: 5. In procedural languages, one has to explicitly apply the reverse function to achieve the effect illustrated above. For example, in C programming language, X=factorial(5); =>X=120; and Y=reverse_factorial (120); =>Y=5.

TCA constraint language has no value-storage and no assignment.

With these fundamental differences between the logical and procedural paradigms, the techniques to achieve solutions are also different. In the following section, we describe some of the techniques to write the constraints and to solve them in TCA.

Some Techniques to Solve Constraints in TCA

1. Variable Type Specification.

It helps if you can identify the type of the variable explicitly, particularly if it is not real (e.g. integer). Examples of such type-specification follow:

square(R)=100, int(R).
X=Y^3, X=8, int(Y).
X=Y^3, X=8, real(Y).

2. Range Specification.

One can specify boundary conditions for a variable using any of the relational operators (e.g. >, >=, <, <=) available. One can also specify the boundary using the range or the discrete set notation. Some examples of boundary specification follow:

X=2, [4<Y<5*X], Z=Y+3.
[2^2<=X<=2^4], Y=X*2.

3. Enumerated-Range Specification.

One can specify an enumerated range for a variable using the enumerated range construct. Some examples of enumerated-range specification follow:

X=2, [4<Y<5*X step 0.5], Z=Y+3.
[2^2<=X<=2^4 step 0.3], Y=X*2.

4. Efficient Solving.

For performance reasons, it is desirable to use only the constants in the enumerated range specifications of the independent variables, and impose any other constraints later in the constraint. Thus, for example, the following constraint:

int(X,Y,Z), [1<=X<=100 step 1], [1<=Y<=100 step 1], [gcd(X,Y)<=Z<=100 step 1];

can be solved more efficiently as:

int(X,Y,Z), [1<=X<=100 step 1], [1<=Y<=100 step 1], [1<=Z<=100 step 1], Z>=gcd(X,Y).

5. Representing Lists and Tables.

One can use (multilayered i.e. lists containing lists) lists represent tables. For example, a 2×3 table (i.e. a table with rows and 3 columns) can be represented as a 2-element list of 3-element lists e.g. Table_2_3=[[1, 5, 7], [10, 50, 70]]. One can access the various table-elements using the (potentially, multi-indexed) list-element-access notation: ListName [Index1 [, Index2 [, Index3 . . . ]]]. Note that the first element of the list is indexed 1, second element is indexed 2, and so on. Multiple indices are used for multilayered lists.

Some constraints involving tables and table-elements and their solutions are shown below:

| | |
|---|---|
| Tbl_4_1 = [1, 3, 5, 7], X = Tbl_4_1 [2]. | => X: 3. |
| Tbl_3_2 = [[1, 3], [5, 7], [9, 11]], X = Tbl_3_2 [2]. | => X: [5, 7]. |
| Tbl_3_2 = [[1, 3], [5, 7], [9, 11]], X = Tbl_3_2[2, 1]. | => X: 5. |
| Tbl_3_2 = [[a, b], [c, d], [e, f]], X = Tbl_3_2[2, 2]. | => X: d. |

6. Bidirectionality of Functions and Operators.

Since the operators and (a large number of) functions in TCA are implemented using relations, one can use the same operators and the functions to map forward and backward and a mixture of forward-and-backward mappings. For example, X=4!+5.=>X: 29. On the other hand, 29=N!+C, C>0.=>(N: 4, C: 5; N: 3, C: 23; N: 2, C: 27; N: 1, C: 28; N: 0, C: 28). Similarly, 29=N!+5.=>N: 4.

7. Constraints are Solved in Order-Independent Fashion.

Because the constraints are solved as a whole, solutions to the constraints in TCA are (mostly) independent of the constraint-order. Thus, the constraints: Y=X^2, Y=2*Z, Z=2. and Z=2, Y=2*Z, Y=X^2. provide exactly the same set of solutions: (X: 2, Y: 4, Z: 2; X: −2, Y: 4, Z: 2).

As a practical matter, though, since the constraints are solved left-to-right by the constraint-solver, it often helps to write the constraints in an order such that the more determined constraints are to the left of the less determined constraints.

8. Constraints are Solved as a Whole.

All the constraints specified for one constraint are all solved as a whole, and not partially. This is particularly important in the case of the TCA where constraints are entered on different lines without any explicit operators (e.g. comma or semicolon) combining them (TCA supplies the default comma-operator (i.e. conjunct) between adjacent constraints) and thus one might get the incorrect impression that the constraints are solved independently.

9. Variable Names are the Links to Bind Various Constraints.

One binds various constraints through the variables used in them. Thus, use of the same variable X in constraints C1 and C2 (when C1 and C2 are joined together by the and (i.e. comma) operator) is a statement to solve the constraints C1 and C2 to find the common value for X. For example, 5*5=X*X+Y*Y, int(X, Y), X=cubert(27)·=>{X: 3, Y: 4}. solves the constraints 5*5=X*X+Y*Y, int(X, Y) and X=cubert(27) to provide the common solution: {X: 3, Y: 4}, and discards the other solution: {X: 4, Y: 3} for the first constraint.

As a corollary, using the same variable-name in multiple constraints forces them to find a common solution. That is, you may unintentionally restrict a solution space by unintentionally using the same variable name across multiple constraints.

10. Use of Sets and Ranges.

One can use sets and ranges to solve constraints over continuous ranges or discrete sets. For example, [1<=X<=10 step 1], Y=X*X, int(X, Y). returns (in Y) squares of integers from 1 through 10. Similarly, X in [−2, −4, 2, 4], Y=X*X*X. returns (in Y) the cubes of numbers from the given set. Sets and ranges can often be used in situations which might require loop-operators in procedural languages.

11. Logical Operators.

One can use conjuncts (the comma operator: ,), disjuncts (the semicolon operator: ;), negation (NOT), and their combination (using parentheses) to provide any needed program-flow control.

12. Equality by Assigning Same Variable Name.

One can impose equality constraint on variables by explicitly equating them or by just naming them as the same variable. By corollary, variables with the same name must have identical value. Thus, for example, [Div 1, Mod 1]=divmod (16, 3), [Div 2, Mod 2]=divmod(17, 3), Div 1=Div 2.=>(Div 1: 5, Div 2: 5, Mod 1: 1, Mod 2: 2). We can impose the same constraint with more clarity and brevity as: [Div, _]=divmod (16, 3), [Div, _]=divmod(16, 3).=>(Div: 5).

Further descriptions of preferred embodiments of the present invention appears in the Figures and both Source Code Appendices, all of which are hereby incorporated herein in full.

VISUAL BASIC SOURCE CODE APPENDIX

TABLE OF CONTENTS[1]

TCA.vbp
AXProlog.vbp
Common.bas
Main.bas
modUtil.bas
MTAPI.BAS
MTDeclaration.bas
MTUtil.bsd
Timer.bas
Contraint.frm
EditConstraint.frm
Forml.frm
frmAbout.frm
frmAttributes.frm
frmComments.frm
frmDifficulty.frm
frmDrag.frm
frmIED.frm
frmIndexedString.frm
frmNew.frm
frmNewModel.frm
frmProgram.frm
frmprogress.frm
frmProlog.frm
frmSplash.frm
SetPrecision.frm
String.frm
TCA.FRM
Variable.frm
Application.cls
CClones.cls
CConstraints.cls
Checksum.cls
Clone.cls
CModels.cls
Constraint.cls
ConstraintSolver.cls
CVariables.cls
CVariants.cls
DifficultyEstimate.cls
DocStatus.cls
DSMODEL.CLS
Family.cls
File.els
FileFind.cls
GMATDifficultyEstimate.cls
GREDifficultyEstimate.cls
IniFile.cls
LockedItem.cls
Model.els
PrintModel.els
Progress.cls
Prolog.cls
PSMODEL.cls
QCModel.cls
StringSolver.cls
StringSolverx.cls
Substring.cls Value.cls
VarFraction.cls
Variable.cls
VarInteger.cls
VarReal.cls
VarString.els
VarUntyped.cls
Win32API.cls
Word.cls

[1] all software COPYRIGHT 1999 ETS except for MTAPI.BAS

PROLOG SOURCE CODE APPENDIX

TABLE OF CONTENTS[2]

HLP4lib.p4
PrlgExpr.l
PrlgExpr.y
hlP4API.h

[2] All software COPYRIGHT 1999 ETS

We claim:

1. A computerized method for creating test item models and generating test item variants comprising:
   obtaining a test item;
   creating a test item model by:
      identifying elements of the test item from which to generate variables,
      generating the variables based upon the identified elements, and
      defining the variables;
      wherein a particular element is identified based on a selected portion of text, wherein a particular variable is generated using a particular element based on selection of an instruction that controls generating the particular variable, and wherein a data type of the particular variable is automatically defined based on a format of the selected portion of text;
   receiving a plurality of constraints for a test item variant;
   generating with a computer the test item variant of the test item by generating values for the variables using a simultaneous constraint solver executed by the computer, wherein the simultaneous constraint solver resolves the plurality of constraints pertaining to the variables;
   displaying the test item variant on a display screen for review by a user; and
   accepting the test item variant for use as a test item for an examination.

2. The method according to claim 1, wherein said model creation further comprises specifying constraints that define a relationship among the variables.

3. The method according to claim 2 further comprising accepting and retrievably storing the test item variant.

4. The method according to claim 3 further comprising accepting and retrievably storing the test item model.

5. The computerized method of claim 1, wherein the simultaneous constraint solver resolves all of the plurality of constraints pertaining to the variable.

6. A computerized method for generating test item variants, the method comprising:
   identifying elements of a test item or a test item model from which to generate variables;
   generating the variables based upon the identified elements;
   defining the variables;
   wherein a particular element is identified based on a selected portion of text, wherein a particular variable is generated using a particular element based on selection of an instruction that controls generating the particular variable, and wherein a data type of the particular variable is automatically defined based on a format of the selected portion of text;
   specifying constraints for the variables;
   generating with a computer values for the variables using a simultaneous constraint solver executed by the computer based on the constraints;
   generating with the computer a test item variant with the determined values;
   displaying the test item variant on a display screen for review by a user; and
   accepting the test item variant for use as a test item for an examination.

7. A computerized method for generating test item variants from test item models comprising:
   generating test item models by:
      obtaining a test item;
      identifying elements of the test item from which to generate variables;
      generating the variables based upon the identified elements;
      defining the variables;
      wherein a particular element is identified based on a selected portion of text, wherein a particular variable is generated using a particular element based on selection of an instruction that controls generating the particular variable, and wherein a data type of the particular variable is automatically defined based on a format of the selected portion of text; and
      accepting the test item with defined variables as a test item model;
   selecting a test item model;
   simultaneously solving test item model constraints with a simultaneous constraint solver executed by a computer to generate values for variables of the selected test item model and generating test item solutions with the computer based on the selected test item model;
   displaying the test item solutions on a display screen for review by a user; and
   accepting a displayed test item solution for use as a test item for an examination.

8. The computerized method of claim 7 further comprising specifying constraints that define the relationship among the variables.

9. The computerized method of claim 8 wherein the variables are new variables for which new constraints are defined as needed.

10. The computerized method of claim 7 further comprising displaying and retrievably storing the accepted test item model.

11. The computerized method of claim 7 wherein the test item model constraints are simultaneously solved using PROLOG IV and Test Creation Assistant constraint language.

12. The computerized method of claim 7 wherein variables can be defined by values which are variables.

13. A computerized system for creating test item models and generating test item variants comprising:
   a computer including a memory, wherein the computer is configured to execute steps comprising:
      obtaining a test item;
      creating a test item model by:
         identifying elements of the test item from which to generate variables,
         generating the variables based upon the identified elements, and defining the variables;
wherein a particular element is identified based on a selected portion of text, wherein a particular variable is generated using a particular element based on selection of an instruction that controls generating the particular variable, and wherein a data type of the particular variable is automatically defined based on a format of the selected portion of text;
receiving a plurality of constraints for a test item variant; and
generating the test item variant of the test item using a processor by generating values for the variables using a simultaneous constraint solver, wherein the simultaneous constraint solver resolves the plurality of constraints pertaining to the variables.

14. The system according to claim 13, wherein the model creation further comprises specifying constraints that define a relationship among the variables.

15. The system according to claim 14, wherein the method further comprises accepting and retrievably storing the test item variant.

16. The system according to claim 15, wherein the method further comprises accepting and retrievably storing the test item model.

17. A computerized system for generating test item variants, comprising:
a computer including a memory, wherein the computer is configured to execute steps comprising:
identifying elements of a test item or a test item model from which to generate variables;
generating the variables based upon the identified elements;
defining the variables;
wherein a particular element is identified based on a selected portion of text, wherein a particular variable is generated using a particular element based on selection of an instruction that controls generating the particular variable, and wherein a data type of the particular variable is automatically defined based on a format of the selected portion of text;
specifying constraints for the variables;
using a simultaneous constraint solver to generate values for the variables based on the constraints using a processor; and
generating a test item variant with the determined values.

18. A computerized system for generating test item variants from test item models, comprising:
a computer including a memory, wherein the computer is configured to execute steps comprising:
generating test item models by:
obtaining a test item;
identifying elements of the test item from which to generate variables;
generating the variables based upon the identified elements;
defining the variables;
wherein a particular element is identified based on a selected portion of text, wherein a particular variable is generated using a particular element based on selection of an instruction that controls generating the particular variable, and wherein a data type of the particular variable is automatically defined based on a format of the selected portion of text; and
accepting the test item with defined variables as a test item model;
selecting a test item model;
simultaneously solving test item model constraints using a processor to generate values for variables of the selected test item model and generating test item solutions based on the selected test item model; and
displaying, accepting and retrievably storing valid test item solutions.

19. The computerized system of claim 18, wherein the method further comprises specifying constraints that define the relationship among the variables.

20. The computerized system of claim 18, wherein the method further comprises displaying and retrievably storing the accepted test item model.

21. The computerized system of claim 18, wherein the test item model constraints are simultaneously solved using PROLOG IV and Test Creation Assistant constraint language.

22. The computerized system of claim 18, wherein variables can be defined by values which are variables.

23. The computerized system of claim 18 wherein the variables are new variables for which new constraints are defined as needed.

* * * * *